(12) United States Patent
Richards et al.

(10) Patent No.: US 10,371,070 B2
(45) Date of Patent: Aug. 6, 2019

(54) ACTIVE CYLINDER CONFIGURATION FOR AN ENGINE INCLUDING DEACTIVATING ENGINE CYLINDERS

(71) Applicant: Ford Global Technologies, LLC, Dearborn, MI (US)

(72) Inventors: Adam J. Richards, Canton, MI (US); John Eric Rollinger, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 84 days.

(21) Appl. No.: 15/428,544

(22) Filed: Feb. 9, 2017

(65) Prior Publication Data

US 2017/0356368 A1  Dec. 14, 2017

Related U.S. Application Data

(60) Provisional application No. 62/347,834, filed on Jun. 9, 2016.

(51) Int. Cl.
| | |
|---|---|
| *F02D 7/00* | (2006.01) |
| *F02D 41/00* | (2006.01) |
| *F02D 41/12* | (2006.01) |
| *F02P 5/00* | (2006.01) |
| *F02D 13/06* | (2006.01) |
| *F02D 17/02* | (2006.01) |

(52) U.S. Cl.
CPC ..... *F02D 41/0087* (2013.01); *F02D 41/0007* (2013.01); *F02D 41/123* (2013.01); *F02D 13/06* (2013.01); *F02D 17/02* (2013.01); *F02D 2041/001* (2013.01); *Y02T 10/144* (2013.01)

(58) Field of Classification Search
CPC ...... F02D 13/06; F02D 41/0087; F02D 37/02; F02P 5/00
USPC ...... 123/481, 198 F, 406.11, 406.12, 406.23, 123/406.24
See application file for complete search history.

(56) References Cited

U.S. PATENT DOCUMENTS

| | | | |
|---|---|---|---|
| 5,351,661 | A | 10/1994 | Doll |
| 5,803,040 | A | 9/1998 | Biesinger et al. |
| 6,332,446 | B1 | 12/2001 | Matsumoto et al. |
| 7,819,096 | B2 | 10/2010 | McConville et al. |
| 8,245,692 | B2 | 8/2012 | Glugla et al. |
| 8,727,943 | B2 | 5/2014 | Surnilla et al. |

(Continued)

OTHER PUBLICATIONS

Glugla, Chris Paul, "System and Method for Reactivating Engine Cylinders," U.S. Appl. No. 15/428,353, filed Feb. 9, 2017, 188 pages.

(Continued)

*Primary Examiner* — John Kwon
(74) *Attorney, Agent, or Firm* — Julia Voutyras; McCoy Russell LLP

(57) ABSTRACT

Systems and methods for operating an engine with deactivating and non-deactivating valves are presented. A common engine block and cylinder head may be used in two different vehicles where a first of the two different vehicles includes valves of selected cylinders that are always active when the first of the two different vehicles is operating. The second of the two different vehicles includes valves of selected cylinders that are always active when the second of the two different vehicles is operating, the valves of the selected cylinders of the second vehicle different from the valves of the selected cylinders of the first vehicle.

6 Claims, 49 Drawing Sheets

(56) References Cited

U.S. PATENT DOCUMENTS

| | | | |
|---|---|---|---|
| 8,800,515 | B1 | 8/2014 | Smith |
| 9,120,478 | B2 | 9/2015 | Carlson et al. |
| 9,175,613 | B2 | 11/2015 | Parsels et al. |
| 9,249,748 | B2* | 2/2016 | Verner ............... F02D 41/0087 |
| 9,506,411 | B2 | 11/2016 | Glugla et al. |
| 9,707,648 | B2* | 7/2017 | Kwak .................. B23P 19/042 |
| 2009/0042463 | A1* | 2/2009 | Kinoshita ............. B63B 35/731 440/38 |
| 2009/0241872 | A1* | 10/2009 | Wang ........................ F01L 9/04 123/90.11 |
| 2011/0030657 | A1 | 2/2011 | Tripathi et al. |
| 2012/0143471 | A1 | 6/2012 | Tripathi et al. |
| 2012/0221217 | A1 | 8/2012 | Sujan et al. |
| 2013/0092127 | A1 | 4/2013 | Pirjaberi et al. |
| 2013/0092128 | A1 | 4/2013 | Pirjaberi et al. |
| 2014/0041625 | A1 | 2/2014 | Pirjaberi et al. |
| 2014/0350823 | A1 | 11/2014 | Glugla |
| 2015/0308301 | A1 | 10/2015 | McConville et al. |
| 2015/0367830 | A1 | 12/2015 | Soliman et al. |
| 2016/0003168 | A1* | 1/2016 | Leone ..................... F02D 17/02 123/406.47 |
| 2016/0115884 | A1 | 4/2016 | VanDerWege et al. |
| 2016/0222899 | A1 | 8/2016 | Glugla |
| 2017/0276081 | A1* | 9/2017 | Shin ........................ F02D 13/06 |

OTHER PUBLICATIONS

Glugla, Chris Paul, "System and Method for Controlling Engine Knock," U.S. Appl. No. 15/428,376, filed Feb. 9, 2017, 189 pages.

Glugla, Chris Paul, "System and Method for Controlling Engine Knock of a Variable Displacement Engine," U.S. Appl. No. 15/428,433, filed Feb. 9, 2017, 194 pages.

Rollinger, John Eric, et al., "System for Deactivating Engine Cylinders," U.S. Appl. No. 15/428,465, filed Feb. 9, 2017, 195 pages.

Richards, Adam J., et al., "System and Method for Adjusting Intake Manifold Pressure," U.S. Appl. No. 15/428,539, filed Feb. 9, 2017, 193 pages.

Rollinger, John Eric, et al., "System for Reactivating Deactivated Cylinders," U.S. Appl. No. 15/428,551, filed Feb. 9, 2017, 194 pages.

Doering, Jeffrey Allen, et al., "System and Method for Selecting a Cylinder Deactivation Mode," U.S. Appl. No. 15/429,807, filed Feb. 10, 2017, 193 pages.

Doering, Jeffrey Allen, et al., "System and Method for Controlling Engine Torque While Deactivating Engine Cylinders," U.S. Appl. No. 15/429,817, filed Feb. 10, 2017, 193 pages.

Rollinger, John Eric, et al., "System and Method for Controlling Busyness of Cylinder Mode Changes," U.S. Appl. No. 15/429,824, filed Feb. 10, 2017, 193 pages.

Richards, Adam J., et al., "System and Method for Intake Manifold Pressure Control," U.S. Appl. No. 15/429,834, filed Feb. 10, 2017, 193 pages.

Willard, Karen, et al., "System and Method for Operating an Engine Oil Pump," U.S. Appl. No. 15/429,840, filed Feb. 10, 2017, 193 pages.

Rollinger, John Eric, et al., "System and Method for Mitigating Cylinder Deactivation Degradation," U.S. Appl. No. 15/429,841, filed Feb. 10, 2017, 189 pages.

Glugla, Chris Paul, "Cylinder Deactivation Control for Driveline Braking," U.S. Appl. No. 15/429,887, filed Feb. 10, 2017, 189 pages.

Glugla, Chris Paul, "System and Method for Improving Cylinder Deactivation," U.S. Appl. No. 15/429,927, filed Feb. 10, 2017, 189 pages.

McConville, Gregory Patrick, "Valve Deactivating System for an Engine," U.S. Appl. No. 15/429,389, filed Feb. 10, 2017, 28 pages.

Richards, Adam J., et al., "System and Method for Controlling Fuel for Reactivating Engine Cylinders," U.S. Appl. No. 15/446,889, filed Mar. 1, 2017, 194 pages.

\* cited by examiner

ACTIVE CYLINDER CONFIGURATION FOR AN ENGINE INCLUDING DEACTIVATING ENGINE CYLINDERS

CROSS REFERENCE TO RELATED APPLICATION

The present application claims priority to U.S. Provisional Patent Application Ser. No. 62/347,834, filed on Jun. 9, 2016. The entire contents of the above-referenced application are hereby incorporated by reference in its entirety for all purposes.

FIELD

The present description relates to systems and methods for selectively deactivating one or more cylinders of an internal combustion engine. The systems and methods may be applied to engines that operate poppet valves to control flow into and out of engine cylinders.

BACKGROUND AND SUMMARY

Cylinders of an engine may be deactivated to reduce engine pumping work and to increase thermal efficiency in cylinders that remain active. A first group of engine cylinders may remain active and combusting air and fuel while a second group of engine cylinders are deactivated by holding intake and exhaust valves closed during an entire cycle of the engine. The first group of engine cylinders is always the same group of cylinders.

More recently, engines have been implemented with deactivating valve operators such that all of an engine's cylinders may be selectively activated and deactivated. This allows the active cylinders that combust air and fuel to periodically deactivate and deactivated cylinders to activate. The combination of active and deactivated cylinders provides the desired engine torque. Further, to provide the desired engine torque, an actual total number of active cylinders may remain the same while the active cylinders that form the actual total number of active cylinders may change from engine cycle to engine cycle. This may be referred to as a rolling variable displacement engine. Such engines provide flexibility to activate different engine cylinders, but the ability to activate and deactivate every engine cylinder adds cost to the engine system, and the cost may be prohibitive for engines with a greater number of cylinders (e.g., six and eight cylinder engines).

The inventors herein have recognized the above-mentioned disadvantages and have developed vehicle systems, comprising: a first vehicle including a first cylinder block and a first cylinder head casting, a first actual total number of deactivating valve operators coupled to the first cylinder head casting; and a second vehicle including a second cylinder block and a second cylinder head casting, a second actual total number of deactivating valve operators coupled to the second cylinder head casting, the first cylinder block same as the second cylinder block, the first cylinder head casting same as the second cylinder head casting.

By configuring different vehicles with the same engine block and cylinder heads and different actual total numbers of deactivating valve operators, it may be possible to reduce vehicle system costs for different vehicles. In particular, a larger higher mass vehicle may be configured with fewer deactivating valve operators than a lower mass vehicle that includes a same engine block and cylinder head as the higher mass vehicle. A smaller actual total number of deactivating valve operators in the higher mass vehicle increases the actual total number of non-deactivating valve operators in the higher mass vehicle so that the higher mass vehicle always has a greater total number of cylinders that cannot be deactivated when the higher mass vehicle's engine is operating as compared to the actual total number of cylinders that cannot be deactivated in the lower mass vehicle. Configuring the actual total number of deactivating valve operators based on vehicle mass or performance objectives may be desirable since the higher mass vehicle uses a greater number of active cylinders to propel the vehicle even at light driver demand conditions. In this way, a same engine block and cylinder head may be configured to reduce system cost and improve engine fuel efficiency.

The present description may provide several advantages. For example, the approach may reduce vehicle system cost. Further, the approach may provide the benefits of cylinder deactivation such as lower engine pumping work. Further still, the approach may improve reliability of cylinder deactivation since fewer deactivating valve operators may be applied based on vehicle configuration and objectives.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to systems and methods for selectively activating and deactivating cylinders and cylinder valves of an internal combustion engine. The engine may be configured and operate as is shown in FIGS. 1A-6D. Various methods and prophetic operating sequences for an engine that includes deactivating valves are shown in FIGS. 7-42. The different methods may operate cooperatively and with the systems shown in FIGS. 1A-6D.

Figure 1A:
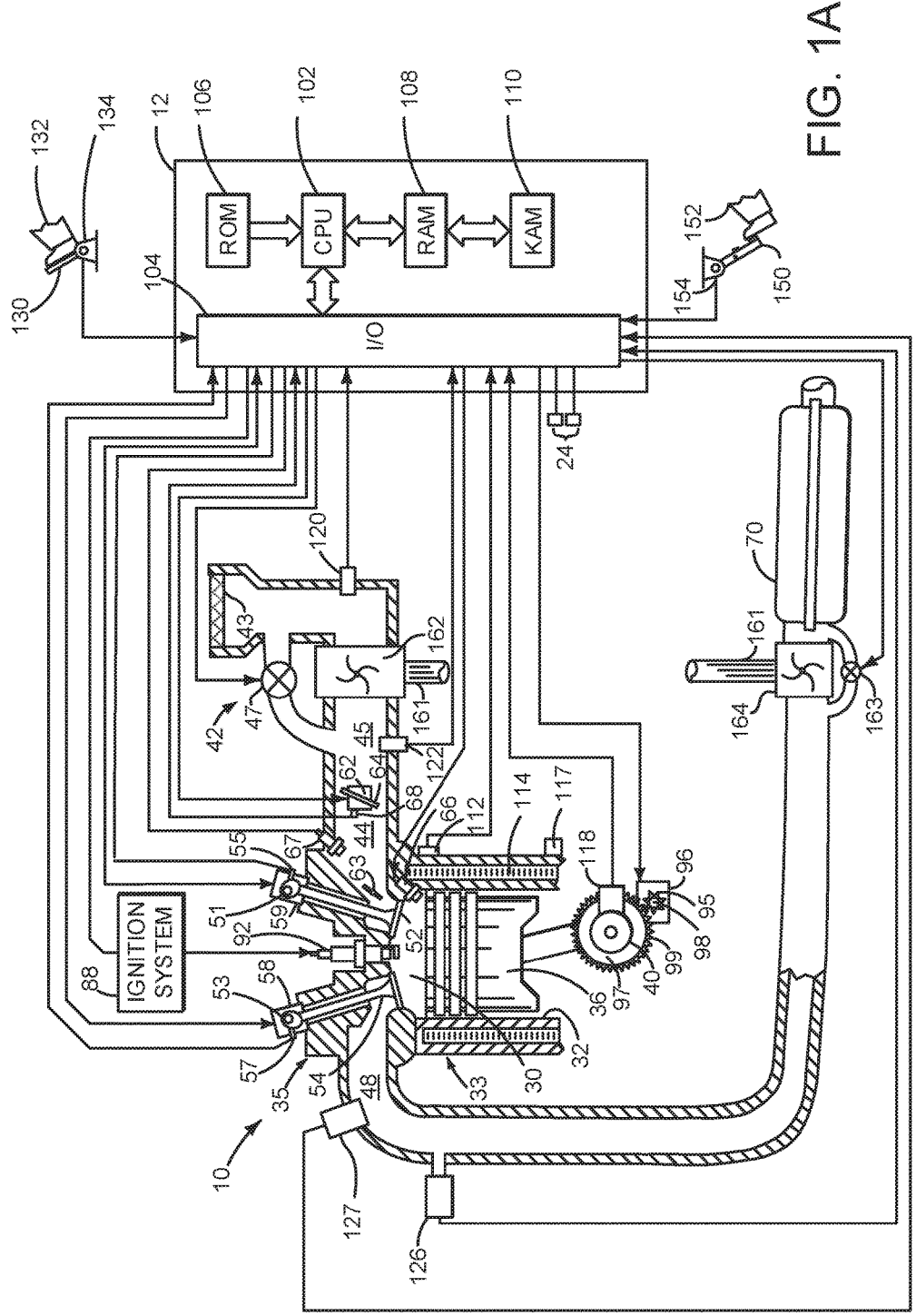
FIG. 1A is a schematic diagram of a single cylinder of an engine.

Referring to FIG. 1A, internal combustion engine 10, comprising a plurality of cylinders, one cylinder of which is shown in FIG. 1A, is controlled by electronic engine controller 12. Engine 10 is comprised of cylinder head casting 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake camshaft 51 and an exhaust camshaft 53. The position of intake camshaft 51 may be determined by intake cam sensor 55. The position of exhaust camshaft 53 may be determined by exhaust cam sensor 57. An angular position of intake valve 52 may be moved relative to crankshaft 40 via phasing adjusting device 59. An angular position of exhaust valve 54 may be moved relative to crankshaft 40 via phasing adjusting device 58.

Valve operators shown in detail below may transfer mechanical energy from intake camshaft 51 to intake valve 52 and from exhaust camshaft 53 to exhaust valve 54. Further, in other examples, a single camshaft may operate intake valve 52 and exhaust valve 54.

Fuel injector 66 is shown positioned to inject fuel directly into cylinder 30, which is known to those skilled in the art as direct injection. Optional fuel injector 67 is shown positioned to port inject fuel to cylinder 30, which is known to those skilled in the art as port fuel injection. Fuel injectors 66 and 67 deliver liquid fuel in proportion to pulse widths from controller 12. Fuel is delivered to fuel injectors 66 and 67 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle or central throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, a charge motion control valve 63 is positioned downstream of throttle 62 and upstream of intake valve 52 in a direction of air flow into engine 10 and operated by controller 12 to regulate air flow into combustion chamber 30. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126. Pressure sensor 127 is shown positioned in exhaust manifold 48 as an exhaust pressure sensor. Alternatively, pressure sensor 127 may be position in combustion chamber 30 as a cylinder pressure sensor. Spark plug 92 may also serve as an ion sensor for ignition system 88.

Converter 70 can include multiple catalyst bricks, in one example. In another example, multiple emission control devices, each with multiple bricks, can be used. Converter 70 can be a three-way type catalyst in one example. Further, converter 70 may include a particulate filter.

Controller 12 is shown in FIG. 1A as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; engine mount with integrated vibration and/or movement sensors 117 which may provide feedback to compensate and evaluate engine noise, vibration, and harshness; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined. Controller 12 may also receive information from other sensors 24 which may include but are not limited to engine oil pressure sensors, ambient pressure sensors, and engine oil temperature sensors. During operation, each cylinder within engine 10 typically undergoes a four stroke cycle: the cycle includes the intake stroke, compression stroke, expansion stroke, and exhaust stroke. A cylinder cycle for a four stroke engine is two engine revolutions and an engine cycle is also two revolutions. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head casting 35 so as to compress the air within combustion chamber 30. The point at which piston 36 is at the end of its stroke and closest to the cylinder head casting 35 (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Driver demand torque may be determined via a position of accelerator pedal 130 and vehicle speed. For example, accelerator pedal position and vehicle speed may index a table that outputs a driver demand torque. The driver demand torque may represent a desired engine torque or torque at a location along a driveline that includes the engine. Engine torque may be determined from driver demand torque via adjusting the driver demand torque for gear ratios, axle ratios, and other driveline components.

Figure 1B:
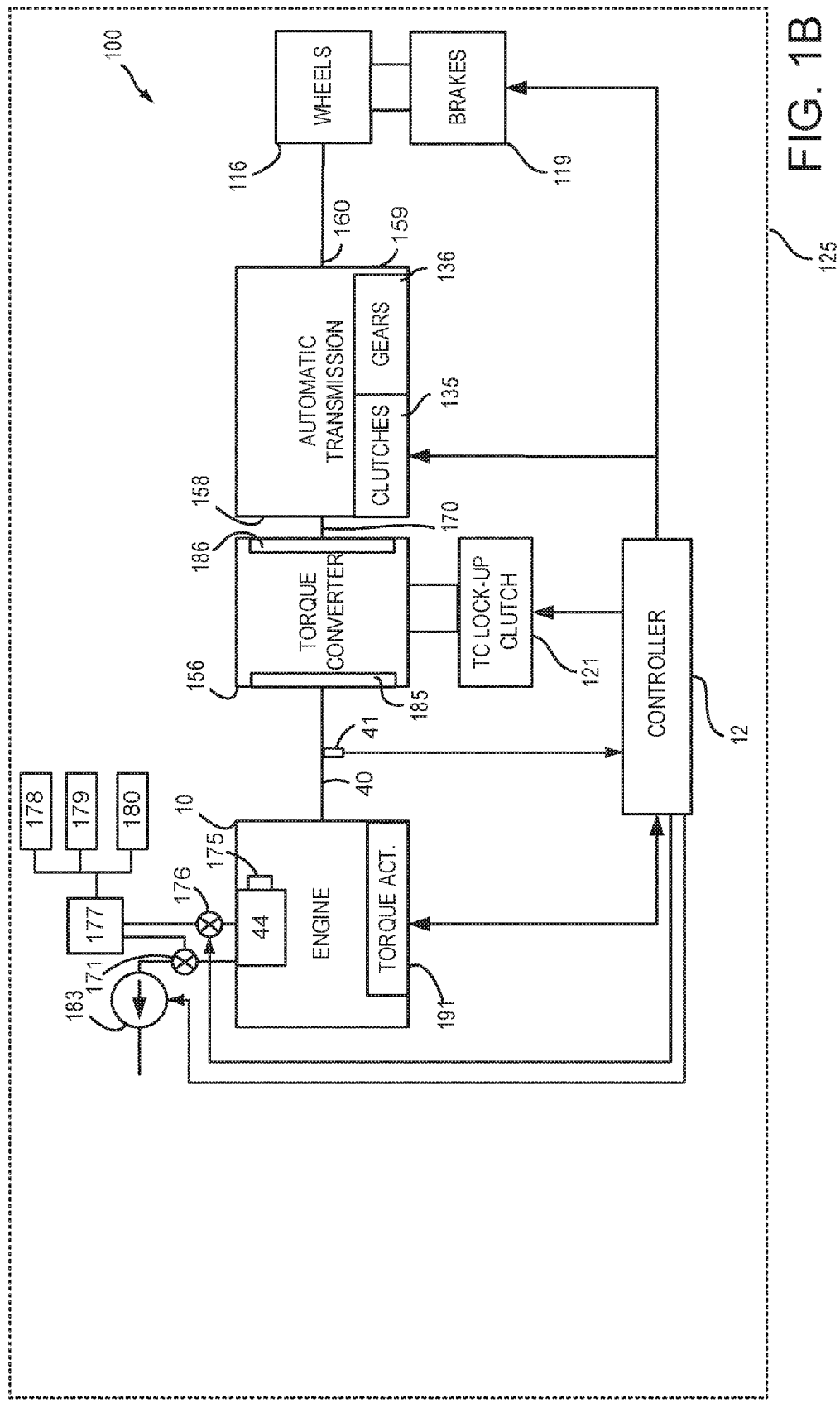
FIG. 1B is a schematic diagram of the engine of FIG. 1A included in a powertrain.

Referring now to FIG. 1B, FIG. 1B is a block diagram of a vehicle 125 including a driveline 100. The driveline of FIG. 1B includes engine 10 shown in FIG. 1A. Driveline 100 may be powered by engine 10. Engine torque may be adjusted via engine torque actuator 191, which may be a fuel injector, camshaft, throttle, or other device. Engine crankshaft 40 is shown coupled to torque converter 156. In particular, engine crankshaft 40 is mechanically coupled to torque converter impeller 285. Torque sensor 41 provides torque feedback and it may be used to evaluate engine noise, vibration, and harshness. Torque converter 156 also includes a turbine 186 to output torque to transmission input shaft 170. Transmission input shaft 170 mechanically couples torque converter 156 to automatic transmission 158. Torque converter 156 also includes a torque converter bypass lock-up clutch 121 (TCC). Torque is directly transferred from impeller 185 to turbine 186 when TCC is locked. TCC is electrically operated by controller 12. Alternatively, TCC may be hydraulically locked. In one example, the torque converter may be referred to as a component of the transmission.

When torque converter lock-up clutch 121 is fully disengaged, torque converter 156 transmits engine torque to automatic transmission 158 via fluid transfer between the torque converter turbine 186 and torque converter impeller 185, thereby enabling torque multiplication. In contrast, when torque converter lock-up clutch 121 is fully engaged, the engine output torque is directly transferred via the torque converter clutch to an input shaft 170 of transmission 158. Alternatively, the torque converter lock-up clutch 121 may be partially engaged, thereby enabling the amount of torque directly relayed to the transmission to be adjusted. The controller 12 may be configured to adjust the amount of torque transmitted by torque converter 121 by adjusting the torque converter lock-up clutch in response to various engine operating conditions, or based on a driver-based engine operation request.

Automatic transmission 158 includes gears (e.g., reverse and gears 1-6) 136 and forward clutches 135 for the gears. The gears 136 (e.g., 1-10) and clutches 135 may be selectively engaged to propel a vehicle. Torque output from the automatic transmission 158 may in turn be relayed to wheels 116 to propel the vehicle via output shaft 160. Specifically, automatic transmission 158 may transfer an input driving torque at the input shaft 170 responsive to a vehicle traveling condition before transmitting an output driving torque to the wheels 116.

Further, a frictional force may be applied to wheels 116 by engaging wheel brakes 119. In one example, wheel brakes 119 may be engaged in response to the driver pressing his foot on a brake pedal as shown in FIG. 1A. In other examples, controller 12 or a controller linked to controller 12 may apply engage wheel brakes. In the same way, a frictional force may be reduced to wheels 116 by disengaging wheel brakes 119 in response to the driver releasing his foot from a brake pedal. Further, vehicle brakes may apply a frictional force to wheels 116 via controller 12 as part of an automated engine stopping procedure.

Controller 12 may be configured to receive inputs from engine 10, as shown in more detail in FIG. 1A, and accordingly control a torque output of the engine and/or operation of the torque converter, transmission, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 12 may initiate engine shutdown by shutting off fuel and/or spark to the engine. However, the engine may continue to rotate in some examples. Further, to maintain an amount of torsion in the transmission, the controller 12 may ground rotating elements of transmission 158 to a case 159 of the transmission and thereby to the frame of the vehicle. When engine restart conditions are satisfied, and/or a vehicle operator wants to launch the vehicle, controller 12 may reactivate engine 10 by craning engine 10 and resuming cylinder combustion.

Intake manifold 44 of engine 10 is in pneumatic communication with vacuum reservoir 177 via valve 176. Vacuum reservoir may provide vacuum to brake booster 178, heating/ventilation/cooling system 179, waste gate actuator 180, and other vacuum operated systems. In one example, valve 176 may be a solenoid valve that may be opened and closed to selectively allow or prevent communication between intake manifold 44 and vacuum consumers 178-180. Additionally, a vacuum source 183, such as a pump or ejector, may selectively provide vacuum to engine intake manifold 44 so that if there is leakage through the throttle 62, engine 10 may be restarted with the engine intake manifold pressure being less than atmospheric pressure. Vacuum source 183 may also selectively supply vacuum to vacuum consumers 178-180 via three way valve 171, for example when vacuum level in vacuum reservoir 177 is less than a threshold. The volume of intake manifold 44 may be adjusted via variable plenum volume valve 175.

Figure 2C:
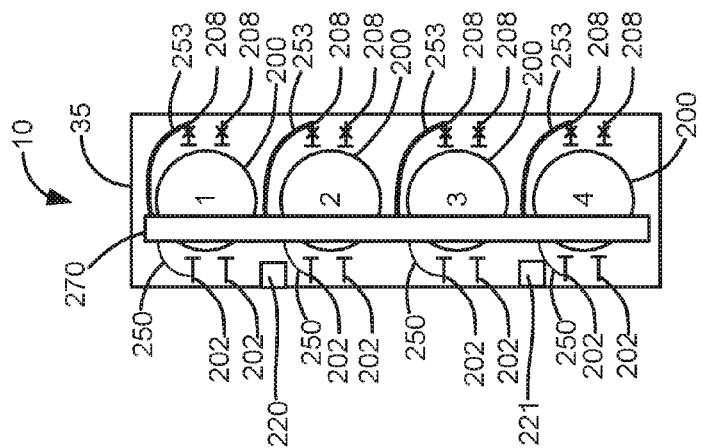
FIGS. 2A-2F show example valve configurations for four cylinder engines with cylinders that may be deactivated.
Figure 2B:
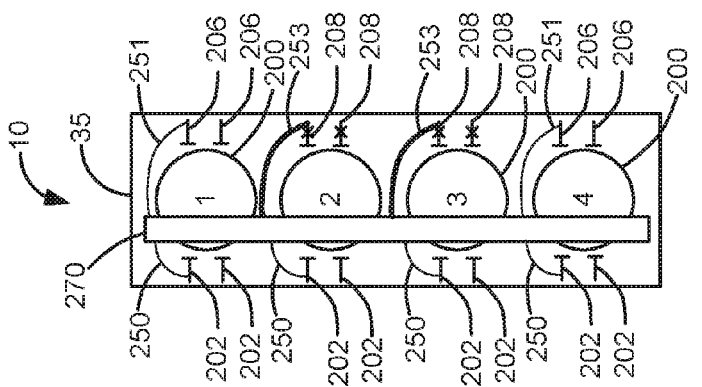
Figure 2A:
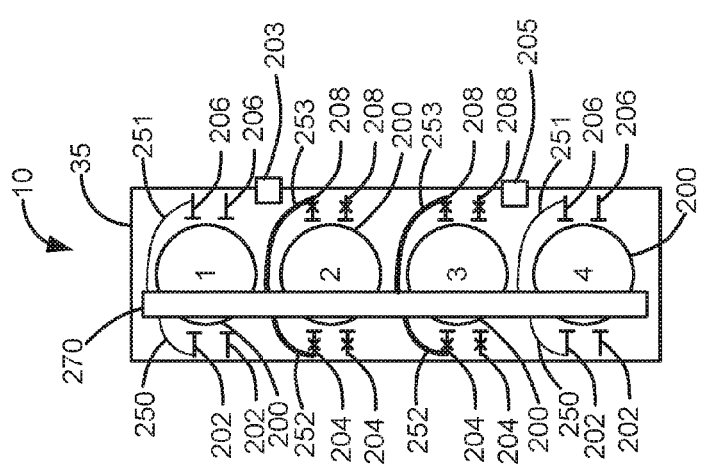

Referring now to FIG. 2A, an example engine configuration of engine 10 is shown. In this configuration, engine 10 is an inline four cylinder engine with a first valve configuration. Portions of the engine's combustion chambers formed in cylinder head casting 35, which also may be referred to as part of a cylinder, are numbered from 1-4 according to cylinder numbers 1-4 as indicated for each engine cylinder 200. In this example, each combustion chamber is shown with two intake valves and two exhaust valves. Deactivating intake valves 208 are shown as poppet valves with an X through the poppet valve shaft. Deactivating exhaust valves 204 are shown as poppet valves with an X through the poppet valve shaft. Non-deactivating intake valves 206 are shown as poppet valves. Non-deactivating exhaust valves 202 are also shown as poppet valves.

Camshaft 270 is shown in mechanical communication with non-deactivating exhaust valves 202 via non-deactivating exhaust valve operators 250. Camshaft 270 is also in mechanical communication with non-deactivating intake valves 206 via non-deactivating intake valve operators 251. Camshaft 270 is shown in mechanical communication with deactivating exhaust valves 204 via deactivating exhaust valve operators 252. Camshaft 270 is also in mechanical communication with deactivating intake valves 208 via deactivating intake valve operators 253. Some intake and exhaust valves are not shown with valve operators to reduce busyness in the figure, but each valve is accompanied by a valve operator (e.g., non-deactivating valves are accompanied with non-deactivating valve operators and deactivating valves are accompanied with deactivating valve operators).

In this configuration, cylinders 2 and 3 are shown with deactivating intake valves 208 and deactivating exhaust valves 204. Cylinders 1 and 4 are shown with non-deactivating intake valves 206 and non-deactivating exhaust valves 202. However, in some examples, non-deactivating intake valves 206 and non-deactivating exhaust valves 202 may be replaced with deactivating exhaust valves and deactivating intake valves so that all engine cylinders may be selectively deactivated.

The configuration of FIG. 2A provides for deactivating cylinders 2 and 3 together or separately. Further, since both intake and exhaust valves of cylinders 2 and 3 are deactivating, these cylinders are deactivated by closing both intake and exhaust valves for an entire engine cycle and ceasing fuel flow to cylinders 2 and 3. For example, if the engine has a firing order of 1-3-4-2, the engine may fire in an order of 1-2-1-2, or 1-3-2-1-4-2, or 1-3-2-1-3- 2-1-4-2, or other combinations where cylinders 1 and 2 combust air and fuel. However, if cylinders 1-4 each included deactivating intake and exhaust valves, cylinders 1 and 2 may not fire (e.g., combust air and fuel) during some engine cycles. For example, the engine firing order may be 3-4-3-4, or 1-3-2-1-3-2, or 3-4-2-3-4-2, or other combinations where cylinders 1 and 2 do not combust air and fuel during an engine cycle. It should be noted that a deactivated cylinder may trap exhaust gases or fresh air depending on whether or not fuel is injected into the cylinder and combusted before the exhaust valves are deactivated in a closed position.

FIG. 2A also slows a first knock sensor 203 and a second knock sensor 205. First knock sensor 203 is positioned closer to cylinders 1 and 2. Second knock sensor 205 is positioned closer to cylinders 3 and 4. First knock sensor may be used to detect knock from cylinders 1 and 2 during some conditions and knock from cylinders 1-4 during other conditions. Likewise, second knock sensor 205 may be used to detect knock from cylinders 3 and 4 during some conditions and knock from cylinders 1-4 during other conditions. Alternatively, the knock sensors may be mechanically coupled to the engine block.

Referring now to FIG. 2B, an alternative example engine configuration of engine 10 is shown. In this configuration, engine 10 is an inline four cylinder engine with a fraction of cylinders having only deactivating intake valves. Portions of the engine's combustion chambers formed in cylinder head casting 35 are again numbered from 1-4 as indicated for engine cylinders 200. Each cylinder is shown with two intake valves and two exhaust valves. Cylinders 1-4 include non-deactivating exhaust valves 202 and no non-deactivating exhaust valves. Cylinders 1 and 4 also include non-deactivating intake valves 206 and no deactivating intake valves. Cylinders 2 and 3 include deactivating intake valves 208 and no non-deactivating intake valves.

Camshaft 270 is shown in mechanical communication with non-deactivating exhaust valves 202 via non-deactivating exhaust valve operators 250. Camshaft 270 is also in mechanical communication with non-deactivating intake valves 206 via non-deactivating intake valve operators 251. Camshaft 270 is also in mechanical communication with deactivating intake valves 208 deactivating intake valve operators 253. Some intake and exhaust valves are not shown with valve operators to reduce busyness in the figure, but each valve is accompanied by a valve operator (e.g., non-deactivating valves are accompanied with non-deactivating valve operators and deactivating valves are accompanied with deactivating valve operators).

The configuration of FIG. 2B provides for deactivating cylinders 2 and 3 together or separately via deactivating intake valves 208. The exhaust valves of cylinders 2 and 3 continue to open and close during an engine cycle as the engine rotates. Further, since only intake valves of cylinders 2 and 3 deactivate, these cylinders are deactivated by closing only intake valves for an entire engine cycle and ceasing fuel flow to cylinders 2 and 3. Once again, if the engine has a firing order of 1-3-4-2, the engine may fire in an order of 1-2-1-2, or 1-3-2-1-4-2, or 1-3-2-1-3-2-1-4-2, or other combinations where cylinders 1 and 2 combust air and fuel. It should be noted that a deactivated cylinder in this configuration pulls exhaust into itself and expels exhaust during the deactivated cylinder's exhaust stroke. Specifically, exhaust is drawn into the deactivated cylinder when the deactivated cylinder's exhaust valve opens near the beginning of the exhaust stroke, and exhaust is expelled from the deactivated cylinder when the cylinder's piston approaches top-dead-center exhaust stroke before the exhaust valve closes.

In other examples, cylinders 1 and 4 may include the deactivating intake valves while cylinders 2 and 3 include non-deactivating intake valves. Otherwise, the valve arrangement may be the same.

Referring now to FIG. 2C, another alternative example engine configuration of engine 10 is shown. In this configuration, engine 10 is an inline four cylinder engine and all engine cylinders include deactivating intake valves 208, and none of the cylinders include deactivating exhaust valves. Portions of the engine's combustion chambers formed in cylinder head casting 35 are again numbered from 1-4 as indicated for engine cylinders 200. Each cylinder is shown with two intake valves and two exhaust valves. Cylinders 1-4 include deactivating intake valves 208 and no deactivating intake valves. Cylinders 1-4 also include non-deactivating exhaust valves 202 and no deactivating exhaust valves. Engine 10 is also shown with first knock sensor 220 and second knock sensor 221.

Camshaft 270 is shown in mechanical communication with non-deactivating exhaust valves 202 via non-deactivating exhaust valve operators 250. Camshaft 270 is also in mechanical communication with deactivating intake valves 208 deactivating intake valve operators 253. Some intake and exhaust valves are not shown with valve operators to reduce busyness in the figure, but each valve is accompanied by a valve operator (e.g., non-deactivating valves are accompanied with non-deactivating valve operators and deactivating valves are accompanied with deactivating valve operators).

The configuration of FIG. 2C provides for deactivating cylinders 1-4 in any combination during an engine cycle via deactivating only intake valves of cylinders 1-4. The exhaust valves of cylinders 1-4 continue to open and close during an engine cycle as the engine rotates. Further, cylinders 1-4 may be deactivated by closing only intake valves for an entire engine cycle and ceasing fuel flow to cylinders 1-4, or combinations thereof. If the engine has a firing order of 1-3-4-2, the engine may fire in an order of 1-2-1-2, or 1-3-2-1-4-2, or 1-3-2-1-3-2-1- 4-2, or other combinations of cylinders 1-4 since each cylinder may be deactivated individually without deactivating other engine cylinders. It should be noted that a deactivated cylinder in this configuration pulls exhaust into itself and expels exhaust during the deactivated cylinder's exhaust stroke. Specifically, exhaust is drawn into the deactivated cylinder when the deactivated cylinder's exhaust valve opens near the beginning of the exhaust stroke, and exhaust is expelled from the deactivated cylinder when the cylinder's piston approaches top-dead-center exhaust stroke before the exhaust valve closes.

Figure 2F:
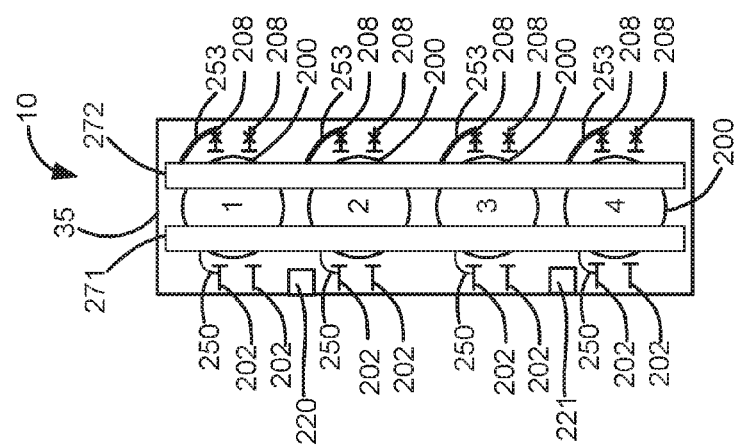
Figure 2E:
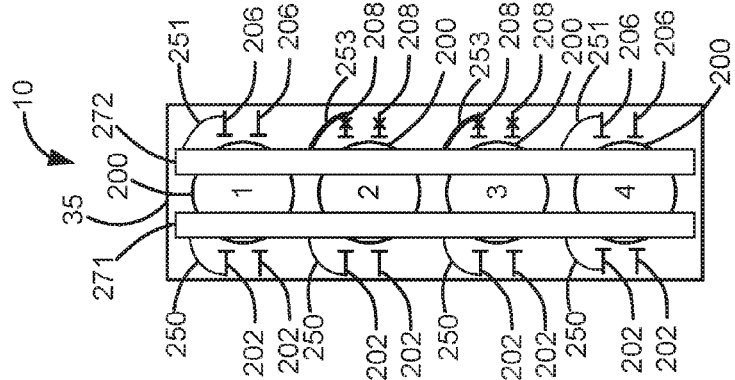
Figure 2D:
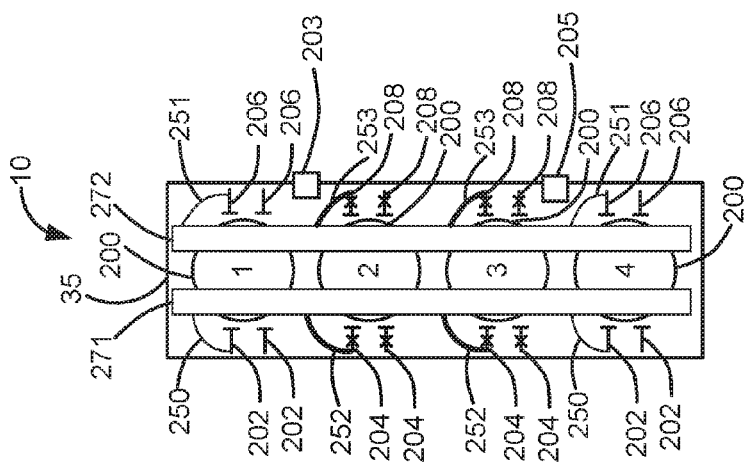

Referring now to FIG. 2D, another alternative engine configuration of engine 10 is shown. The system of FIG. 2D is identical to the system of FIG. 2A, except the system of FIG. 2D includes an intake camshaft 271 and an exhaust camshaft 272. Portions of the engine's combustion chambers formed in cylinder head casting 35, which also may be referred to as part of a cylinder, are numbered from 1-4 according to cylinder numbers 1-4 as indicated for each engine cylinder 200.

Camshaft 271 is shown in mechanical communication with non-deactivating exhaust valves 202 via non-deactivating exhaust valve operators 250. Camshaft 272 is in mechanical communication with non-deactivating intake valves 206 via non-deactivating intake valve operators 251. Camshaft 271 is shown in mechanical communication with deactivating exhaust valves 204 via deactivating intake valve operators 252. Camshaft 272 is in mechanical communication with deactivating intake valves 208 via deactivating intake valve operators 253. Some intake and exhaust valves are not shown with valve operators to reduce busyness in the figure, but each valve is accompanied by a valve operator (e.g., non-deactivating valves are accompanied with non-deactivating valve operators and deactivating valves are accompanied with deactivating valve operators).

Referring now to FIG. 2E, another alternative engine configuration of engine 10 is shown. The system of FIG. 2E is identical to the system of FIG. 2B, except the system of FIG. 2E includes an intake camshaft 271 and an exhaust camshaft 272. Portions of the engine's combustion chambers formed in cylinder head casting 35, which also may be referred to as part of a cylinder, are numbered from 1-4 according to cylinder numbers 1-4 as indicated for each engine cylinder 200.

Camshaft 271 is shown in mechanical communication with non-deactivating exhaust valves 202 via non-deactivating exhaust valve operators 250. Camshaft 272 is in mechanical communication with non-deactivating intake valves 206 via non-deactivating intake valve operators 251. Camshaft 272 is also in mechanical communication with deactivating intake valves 208 deactivating intake valve operators 253. Some intake and exhaust valves are not shown with valve operators to reduce busyness in the figure, but each valve is accompanied by a valve operator (e.g., non-deactivating valves are accompanied with non-deactivating valve operators and deactivating valves are accompanied with deactivating valve operators).

Referring now to FIG. 2F, another alternative engine configuration of engine 10 is shown. The system of FIG. 2F is identical to the system of FIG. 2C, except the system of FIG. 2F includes an intake camshaft 271 and an exhaust camshaft 272. Portions of the engine's combustion chambers formed in cylinder head casting 35, which also may be referred to as part of a cylinder, are numbered from 1-4 according to cylinder numbers 1-4 as indicated for each engine cylinder 200.

Camshaft 271 is shown in mechanical communication with non-deactivating exhaust valves 202 via non-deactivating exhaust valve operators 250. Camshaft 272 is in mechanical communication with deactivating intake valves 208 deactivating intake valve operators 253. Some intake and exhaust valves are not shown with valve operators to reduce busyness in the figure, but each valve is accompanied by a valve operator (e.g., non-deactivating valves are accompanied with non-deactivating valve operators and deactivating valves are accompanied with deactivating valve operators).

The deactivating valve operators shown in FIGS. 2A-2F may be a lever type (e.g., see FIG. 6B), a sleeve type (e.g., see U.S. Patent Publication No. 2014/0303873, U.S. patent application Ser. No. 14/105,000, entitled "Position Detection For Lobe Switching Camshaft System," filed Dec. 12, 2013 and hereby fully incorporated by reference for all purposes), a cam lobe type, or a lash adjuster type. Further, each of the cylinder heads shown in FIGS. 2A-2F may be mechanically coupled to a same block 33 shown in FIG. 1A. The cylinder heads shown in FIGS. 2A-2F may be formed from a same casting and the deactivating and non-deactivating valve operators for each cylinder head configuration may be varied as shown in FIGS. 2A-2F.

Figure 3B:
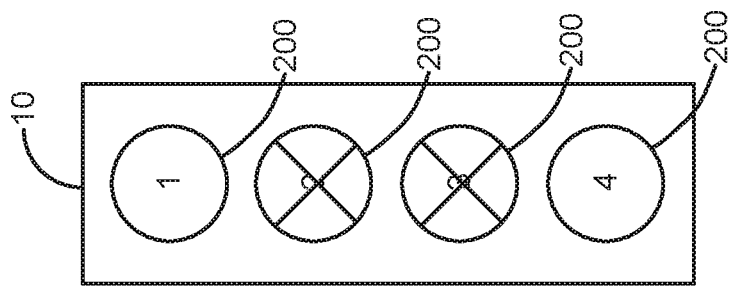
FIGS. 3A and 3B show example patterns of activated and deactivated cylinders of a four cylinder engine.
Figure 3A:
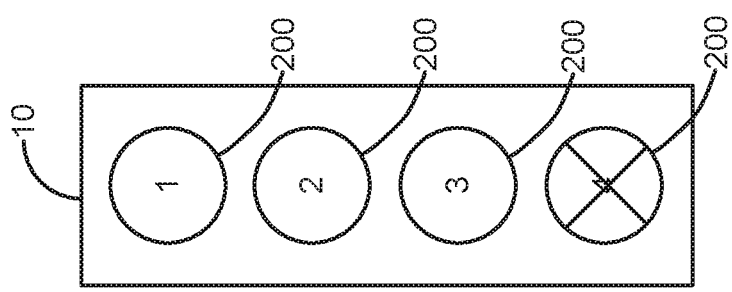

Referring now to FIG. 3A, an example cylinder deactivation pattern is shown. In FIG. 3A, cylinder 4 of engine 10 is shown with an X through it to indicate that cylinder 4 may be deactivated during an engine cycle while cylinders 1, 2, and 3 remain active. Active cylinders are shown without Xs to indicate the cylinders are active. One cylinder may be deactivated during an engine cycle via the system shown in FIG. 2C. As an alternative, cylinder 1 may be the only deactivated cylinder during an engine cycle when engine 10 is configured as is shown in FIG. 2C. Cylinder 2 may be the only deactivated cylinder during an engine cycle when engine 10 is configured as is shown in FIGS. 2A, 2B, and 2C. Likewise, cylinder 3 may be the only deactivated cylinder during an engine cycle when engine 10 is configured as is shown in FIGS. 2A, 2B, and 2C. Cylinders 200 are shown in a line.

Referring now to FIG. 3B, another example cylinder deactivation pattern is shown. In FIG. 3B, cylinders 2 and 3 of engine 10 is shown with Xs through them to indicate that cylinder 2 and 3 may be deactivated during an engine cycle while cylinders 1 and 4 remain active. Active cylinders are shown without Xs to indicate the cylinders are active. Cylinders 2 and 3 may be deactivated during an engine cycle via the systems shown in FIGS. 2A, 2B, and 2C. As an alternative, cylinders 1 and 4 may be the only deactivated cylinder during an engine cycle when engine 10 is configured as is shown in FIG. 2C. Deactivated cylinders shown in FIGS. 2 and 3 are cylinders where valves are closed to prevent flow from the engine intake manifold to the engine exhaust manifold while the engine rotates and where fuel injection ceases to the deactivated cylinders. Spark provided to deactivated cylinders may also cease. Cylinders 200 are shown in a line.

In this way, individual cylinders or cylinder groups may be deactivated. Further, deactivated cylinders may be reactivated from time to time to reduce the possibility of engine oil seeping into engine cylinders. For example, a cylinder may fire 1-4-1-4-1-4-2-1-4-3-1-4-1-4 to reduce the possibility of oil seeping into cylinders 2 and 3 after cylinders 2 and 3 have been deactivated.

Figure 4A:
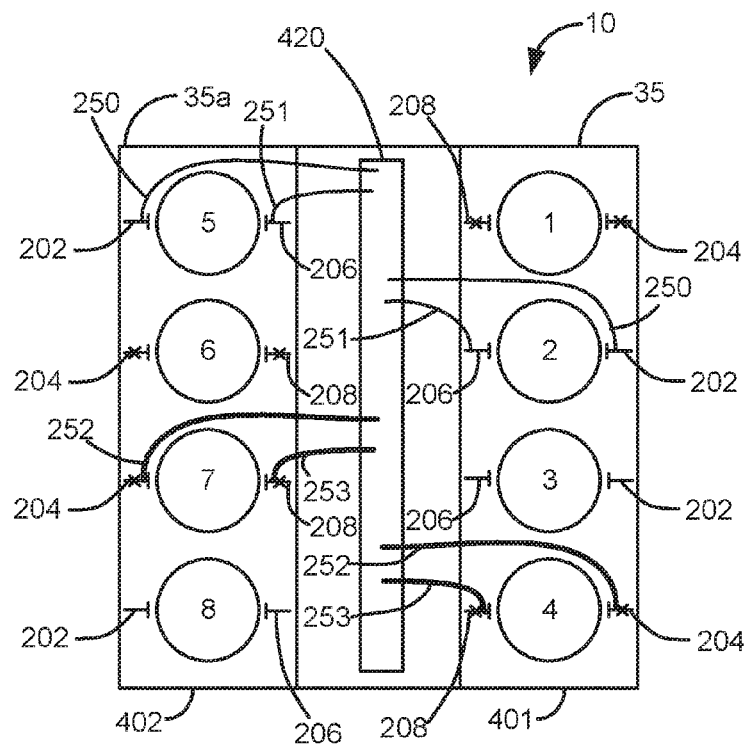
FIGS. 4A-4C show example valve configurations for eight cylinder engine with cylinders that may be deactivated.

Referring now to FIG. 4A, another example configuration of engine 10 is shown. Portions of the engine's combustion chambers formed in cylinder heads 35 and 35a, which also may be referred to as part of a cylinder, are numbered from 1-8 according to cylinder numbers 1-8 as indicated for each engine cylinder. Engine 10 includes a first bank of cylinders 401 including cylinders 1-4 in cylinder head casting 35 and a second bank of cylinders 402 including cylinders 5-8 in cylinder head casting 35a. In this configuration, engine 10 is a V eight engine that includes deactivating intake valves 208 and non-deactivating intake valves 206. Engine 10 also includes deactivating exhaust valves 204 and non-deactivating exhaust valves 202. The valves control air flow from the engine intake manifold to the engine exhaust manifold via engine cylinders 200. In some examples, deactivating exhaust valves 204 may be replaced with non-deactivating exhaust valves 202 to reduce system expense while preserving the capacity to deactivate engine cylinders (e.g., cease fuel flow to the deactivated cylinder and cease air flow from an engine intake manifold to engine exhaust manifold via a cylinder while the engine rotates). Thus, in some examples, engine 10 may include only non-deactivating exhaust valves 202 in combination with deactivating intake valves 208 and non-deactivating intake valves 206.

In this example, cylinders 5, 2, 3, and 8 are shown as cylinders that have valves that are always active so that air flows from the engine intake manifold to the engine exhaust manifold as the engine rotates via cylinders 5, 2, 3, and 8. Cylinders 1, 6, 7, and 4 are shown as cylinders that have valves that may be selectively deactivated in closed positions so that air does not flow from the engine intake manifold to the engine exhaust manifold via cylinders 1, 6, 7, and 4 respectively when valves in the respective cylinders are deactivated in a closed state during an engine cycle. In other examples, such as FIG. 4B, the cylinders that have valves that are always active are cylinders 5 and 2. The actual total number of cylinders that have valves that are always active may be based on vehicle mass and engine displacement or other considerations.

Figure 5C:
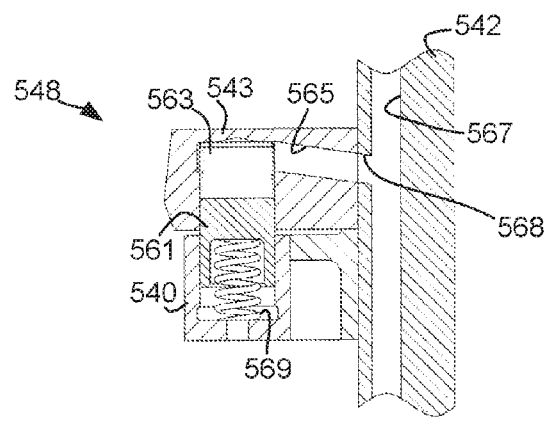
FIG. 5C shows an example valve operator for the hydraulically operated valve deactivating system shown in FIG. 5A.
Figure 6A:
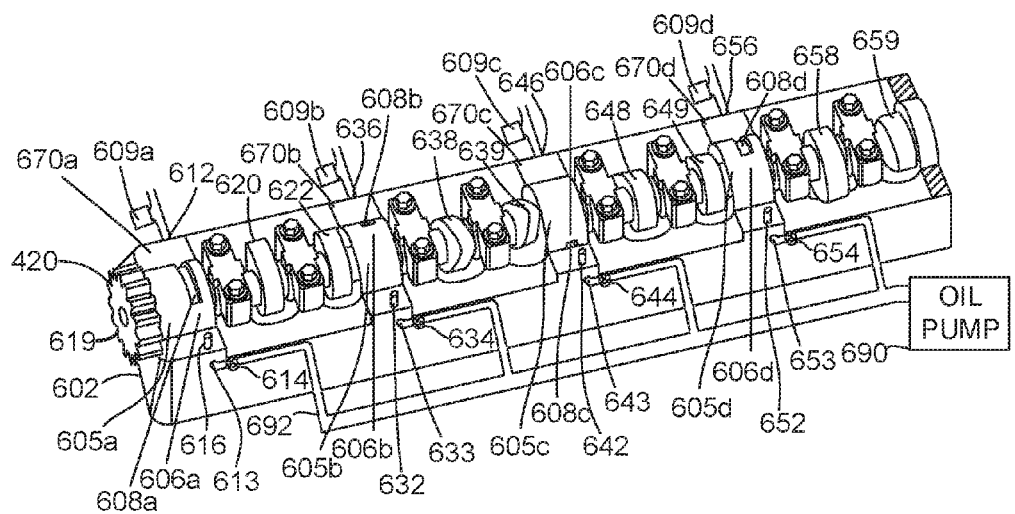
FIG. 6A shows an example camshaft for an alternative hydraulically operated valve deactivating system.
Figure 6B:
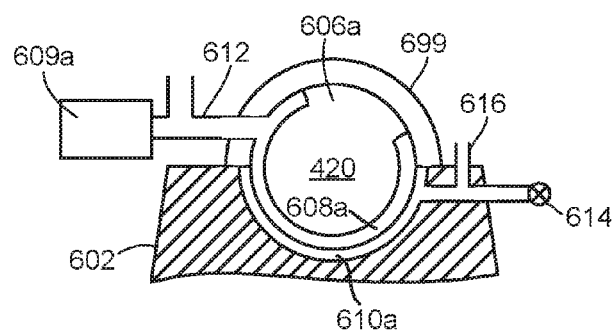
FIG. 6B shows a cross section of a camshaft and saddle for the hydraulically operated valve deactivating system shown in FIG. 6A.

Valves 202, 204, 206, and 208 are opened and closed via a single camshaft 420. The valves 202, 204, 206, and 208 may be in mechanical communication with sole camshaft 320 via pushrods and conventional lash adjusters or deactivating adjusters or hydraulic cylinders as shown in U.S. Patent Publication No. 2003/0145722, entitled "Hydraulic Cylinder Deactivation with Rotary Sleeves," filed Feb. 1, 2002 and hereby fully incorporated by reference for all purposes. Alternatively, valves 202, 204, 206, and 208 may be operated via conventional roller cam followers and/or via valve operators as shown in FIGS. 6A, 6B, and 5C. In still other examples, valves may be deactivated via sleeved cam lobes as shown in U.S. Patent Publication No. 2014/0303873.

Camshaft 420 is shown in mechanical communication with non-deactivating exhaust valves 202 via non-deactivating exhaust valve operators 250. Camshaft 420 is also in mechanical communication with non-deactivating intake valves 206 via non-deactivating intake valve operators 251. Camshaft 420 is also in mechanical communication with deactivating intake valves 208 deactivating intake valve operators 253. Camshaft 420 is also in mechanical communication with deactivating exhaust valves 204 via deactivating intake valve operators 252. Some intake and exhaust valves are not shown with valve operators to reduce busyness in the figure, but each valve is accompanied by a valve operator (e.g., non-deactivating valves are accompanied with non-deactivating valve operators and deactivating valves are accompanied with deactivating valve operators).

Figure 4B:
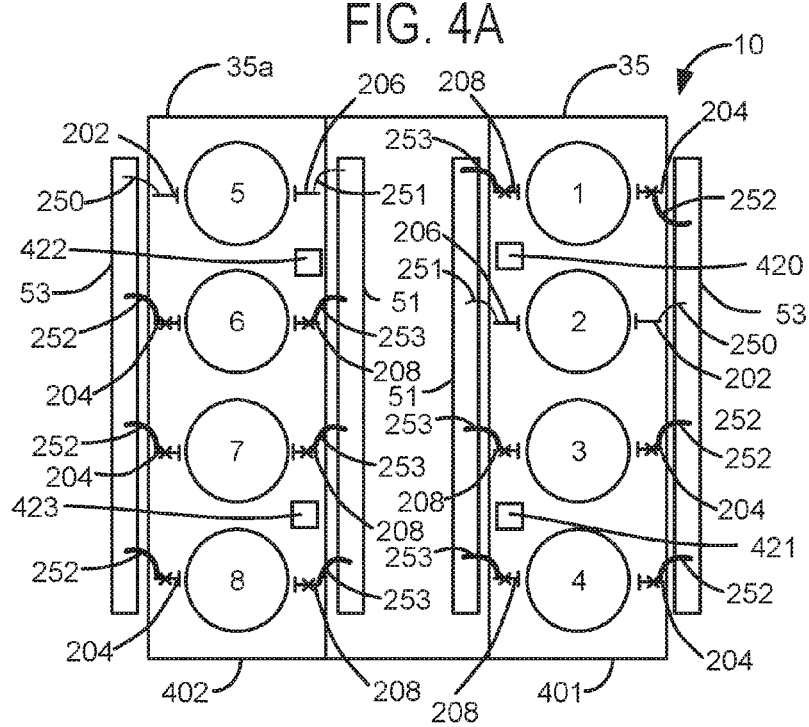

Referring now to FIG. 4B, another example configuration of engine 10 is shown. Portions of the engine's combustion chambers formed in cylinder heads 35 and 35a, which also may be referred to as part of a cylinder, are numbered from 1-8 according to cylinder numbers 1-8 as indicated for each engine cylinder. Engine 10 includes a first bank of cylinders 401 including cylinders 1-4 in cylinder head casting 35 and a second bank of cylinders 402 including cylinders 5-8 in cylinder head casting 35a. In this configuration, engine 10 is also a V eight engine that includes deactivating intake valves 208 and non-deactivating intake valves 206. Engine 10 also includes deactivating exhaust valves 204 and non-deactivating exhaust valves 202. The valves control air flow from the engine intake manifold to the engine exhaust manifold via engine cylinders 200. Valves 202, 204, 206, and 208 are operated via intake camshaft 51 and exhaust camshaft 53. Each cylinder bank includes an intake camshaft 51 and an exhaust camshaft 53.

In some examples, deactivating exhaust valves may be replaced with non-deactivating exhaust valves 204 to reduce system expense while preserving the capacity to deactivate engine cylinders (e.g., cease fuel flow to the deactivated cylinder and cease air flow from an engine intake manifold to engine exhaust manifold via a cylinder while the engine rotates). Thus, in some examples, engine 10 may include only non-deactivating exhaust valves 202 in combination with deactivating intake valves 208 and non-deactivating intake valves 206.

In this example, cylinders 5 and 2 are shown as cylinders that have valves that are always active so that air flows from the engine intake manifold to the engine exhaust manifold as the engine rotates via cylinders 5 and 2. Cylinders 1, 3, 4, 6, 7, and 8 are shown as cylinders that have intake and exhaust valves that may be selectively deactivated in closed positions so that air does not flow from the engine intake manifold to the engine exhaust manifold via cylinders 1, 3, 4, 6, 7, and 8 respectively when valves in the respective cylinders are deactivated in a closed state. In this example, cylinders are deactivated by deactivating intake and exhaust valves of the cylinder being deactivated. For example, cylinder 3 may be deactivated so that air does not flow through cylinder 3 via deactivating valves 208 and 204.

Valves 202, 204, 206, and 208 are opened and closed via four camshafts. The valves 202, 204, 206, and 208 may be in mechanical communication with a camshaft via valve operators shown in FIGS. 6A, 6B, and 5C or hydraulic cylinders or tappets, which may deactivate the valves. The engines shown in FIGS. 4A and 4B have a firing order of 1-5-4-2-6-3-7-8.

Engine 10 is also shown with first knock sensor 420, second knock sensor 421, third knock sensor 422, and fourth knock sensor 423. Thus, first cylinder bank 401 includes first knock sensor 420 and second knock sensor 421. First knock sensor 420 may detect knock in cylinder numbers 1 and 2. Second knock sensor 421 may detect knock in cylinder numbers 3 and 4. Second cylinder bank 402 includes third knock sensor 422 and fourth knock sensor 423. Third knock sensor 422 may detect knock in cylinders 5 and 6. Fourth knock sensor 423 may detect knock in cylinders 7 and 8.

Exhaust camshaft 53 is shown in mechanical communication with non-deactivating exhaust valves 202 via non-deactivating exhaust valve operators 250. Intake camshaft 51 is in mechanical communication with non-deactivating intake valves 206 via non-deactivating intake valve operators 251. Exhaust camshaft 53 is also in mechanical communication with deactivating exhaust valves 204 deactivating intake valve operators 252. Intake camshaft 51 is also in mechanical communication with deactivating intake valves 208 via deactivating intake valve operators 253. Some intake and exhaust valves are not shown with valve operators to reduce busyness in the figure, but each valve is accompanied by a valve operator (e.g., non-deactivating valves are accompanied with non-deactivating valve operators and deactivating valves are accompanied with deactivating valve operators).

The cylinder head configuration shown in FIG. 4B may be incorporated in vehicles of lower mass than the vehicles in which the cylinder head configuration shown in FIG. 4A is included. The configuration of FIG. 4B may be incorporated in vehicle of low mass since lower mass vehicles may only use two cylinders to cruise at a steady highway speed. Conversely, the configuration of FIG. 4A may be incorporated in vehicles of higher mass since vehicle's having a higher mass may use four cylinders to cruise at a steady highway speed. Likewise, the cylinder heads shown in FIGS. 2A-2F that have lower actual total numbers of cylinders that are not deactivating may be incorporated into lower mass vehicles. The cylinder heads shown in FIGS. 2A-2F that have higher actual total numbers of cylinders that are not deactivating may be incorporated into higher mass vehicles. Additionally, the number of cylinders in cylinder head castings shown in FIGS. 2A-4C that are not deactivating cylinders may be based on the vehicle's axle ratio. For example, if a vehicle has a lower axle ratio (e.g., 2.69:1 versus 3.73:1), a cylinder head configuration with a lower actual total number of cylinders that are not deactivating may be selected so that highway cruising efficiency may be improved. Thus, different vehicles with different masses and axle ratios may include a same engine block and cylinder head castings, but the actual total number of deactivating and non-deactivating valve operators may be different between the different vehicles.

Figure 4C:
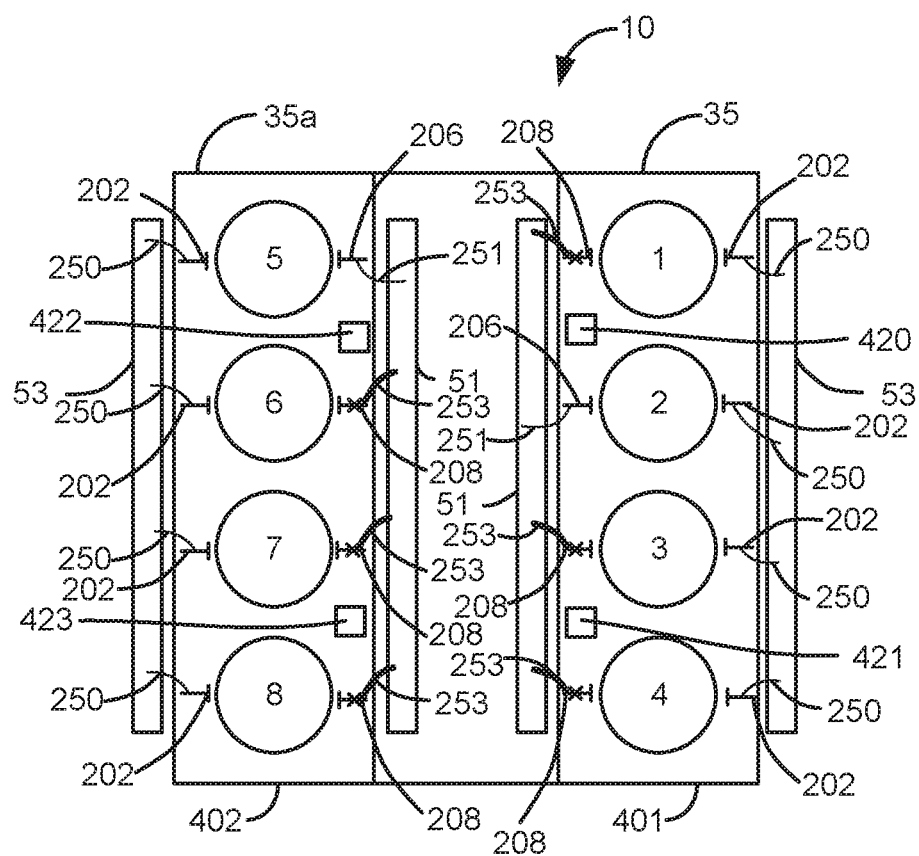

Referring now to FIG. 4C, another example configuration of engine 10 is shown. Portions of the engine's combustion chambers formed in cylinder heads 35 and 35a, which also may be referred to as part of a cylinder, are numbered from 1-8 according to cylinder numbers 1-8 as indicated for each engine cylinder. Engine 10 includes a first bank of cylinders 401 including cylinders 1-4 in cylinder head casting 35 and a second bank of cylinders 402 including cylinders 5-8 in cylinder head casting 35a. In this configuration, engine 10 is also a V eight engine that includes deactivating intake valves 208 and non-deactivating intake valves 206. Engine 10 also includes non-deactivating exhaust valves 202. The valves control air flow from the engine intake manifold to the engine exhaust manifold via engine cylinders 200. Valves 202, 206, and 208 are operated via intake camshaft 51 and exhaust camshaft 53. Each cylinder bank includes an intake camshaft 51 and an exhaust camshaft 53.

In this example, all engine exhaust valves 202 are non-deactivating. Exhaust camshaft 53 is shown in mechanical communication with non-deactivating exhaust valves 202 via non-deactivating exhaust valve operators 250. Intake camshaft 51 is in mechanical communication with non-deactivating intake valves 206 via non-deactivating intake valve operators 251. Intake camshaft 51 is also in mechanical communication with deactivating intake valves 208 via deactivating intake valve operators 253. Some intake and exhaust valves are not shown with valve operators to reduce busyness in the figure, but each valve is accompanied by a valve operator (e.g., non-deactivating valves are accompanied with non-deactivating valve operators and deactivating valves are accompanied with deactivating valve operators).

The deactivating valve operators shown in FIGS. 4A-4C may be a lever type (e.g., see FIG. 6B), a sleeve type (e.g., see U.S. Patent Publication No. 2014/0303873, U.S. patent application Ser. No. 14/105,000, entitled "Position Detection For Lobe Switching Camshaft System," filed Dec. 12, 2013 and hereby fully incorporated by reference for all purposes), a cam lobe type, or a lash adjuster type. Further, each of the cylinder heads shown in FIGS. 4A-4C may be mechanically coupled to a same block 33 shown in FIG. 1A. The cylinder heads 35 shown in FIGS. 4A-4C may be formed from a same casting and the deactivating and non-deactivating valve operators for each cylinder head configuration may be varied as shown in FIGS. 4A-4C. Likewise, the cylinder heads 35a shown in FIGS. 4A-4C may be formed from a same casting and the deactivating and non-deactivating valve operators for each cylinder head configuration may be varied as shown in FIGS. 4A-4C.

Figure 5A:
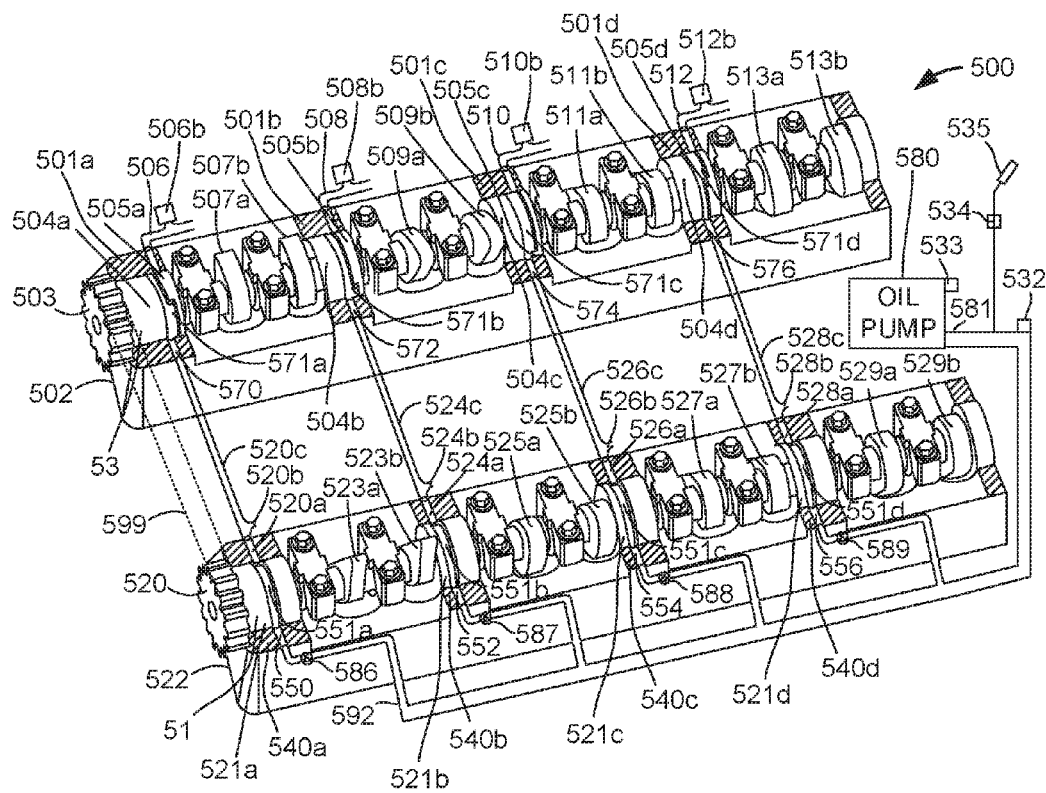
FIG. 5A shows example camshafts for a hydraulically operated valve deactivating system.

Referring now to FIG. 5A, an example valve operating system is shown. The depicted embodiment may represent a mechanism for an inline four cylinder engine or one of two mechanisms for a V-8 engine. Similar mechanisms with for different numbers of engine cylinders are possible. Valve operating system 500 includes an intake camshaft 51 and an exhaust camshaft 53. Chain, gear, or belt, 599 mechanically couples camshaft 51 and camshaft 53 so that they rotate together at a same speed. In particular, chain 599 mechanically couples sprocket 520 to sprocket 503.

Figure 5B:
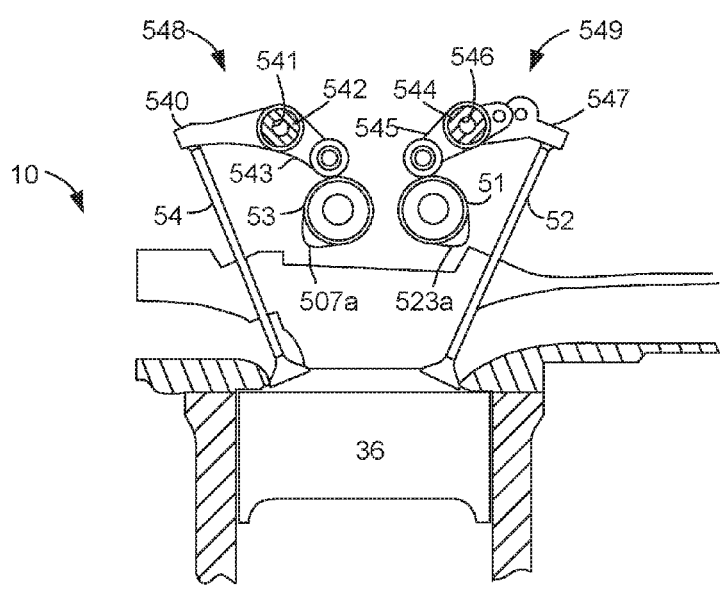
FIG. 5B shows example deactivating valve operators for the hydraulically operated valve deactivating system shown in FIG. 5A.

Exhaust camshaft 53 includes cylindrical journals 504a, 504b, 504c, and 504d that rotate within respective valve bodies 501a, 501b, 501c, and 501d. Valve bodies 501a, 501b, 501c, and 501d are shown incorporated into exhaust camshaft saddle 502, which may be part of cylinder head casting 35. Discontinuous metering grooves 571a, 571b, 571c, and 571d are incorporated into journals 504a, 504b, 504c, and 504d. Discontinuous metering grooves 571a, 571b, 571c, and 571d may be aligned with crankshaft 40 shown in FIG. 1A to allow oil flow through journals 504a, 504b, 504c, and 504d coincident with a desired engine crankshaft angle range so that exhaust valve operators shown in FIG. 5B are deactivated at a desired crankshaft angle, thereby ceasing airflow from engine cylinders. Lands 505a, 505b, 505c, and 505d prevent oil flow to valve operators shown in FIG. 5B when the respective lands cover respective valve body outlets 506, 508, 510, and 512.

Oil may flow to valve operators shown in FIG. 5B via valve body outlets 506, 508 510 and 512. Pressurized oil from oil pump 580 may selectively pass through valve body inlets 570, 572, 574, and 576; metering grooves 571a, 571b, 571c, and 571d; and valve body outlets when lands are not blocking valve body inlets and outlets 506, 508, 510 and 512. The pressurized oil may deactivate valve operators as described in further detail below. Lands 505a, 505b, 505c, and 505d selectively open and close access to valve bodies 501a, 501b, 501c, and 501d for pressurized oil from oil pump 580 as exhaust camshaft 53 rotates. Exhaust camshaft 53 also includes cam lobes 507a, 507b, 509a, 509b, 511a, 511b, 513a, and 513b to open and close exhaust valves as lobe lift increases and decreases in response to exhaust camshaft rotation.

In one example, pressurized oil selectively flows through metering groove 571a via valve body inlet 570 to exhaust valve operators for cylinder number one. Cam lobes 507a and 507b may provide mechanical force to lift exhaust valves of cylinder number one of a four or eight cylinder engine as exhaust camshaft 53 rotates. Similarly, pressurized oil selectively flows through metering groove 571b via valve body inlet 572 to exhaust valve operators for cylinder number two. Cam lobes 509a and 509b may provide mechanical force to lift exhaust valves of cylinder number two of the four or eight cylinder engine as exhaust camshaft 53 rotates. Likewise, pressurized oil selectively flows through metering groove 571c via valve body inlet 574 to exhaust valve operators for cylinder number three. Cam lobes 511a and 511b may provide mechanical force to lift exhaust valves of cylinder number three of a four or eight cylinder engine as exhaust camshaft 53 rotates. Also, pressurized oil selectively flows through metering groove 571d via valve body inlet 576 to exhaust valve operators for cylinder number four. Cam lobes 513a and 513b may provide mechanical force to lift exhaust valves of cylinder number four of a four or eight cylinder engine as exhaust camshaft 53 rotates. Thus, exhaust camshaft 53 may provide force to open poppet valves of a cylinder bank.

Intake camshaft 51 includes cylindrical journals 521a, 521b, 521c, and 521d that rotate within respective valve bodies 540a, 540b, 540c, and 540d. Valve bodies 540a, 540b, 540c, and 540d are shown incorporated into intake camshaft saddle 522, which may be part of cylinder head casting 35. Continuous metering grooves 551a, 551b, 551c, and 551d are incorporated into journals 521a, 521b, 521c, and 521d. However, in some examples, continuous metering grooves 551a, 551b, 551c, and 551d may be eliminated and oil may be supplied directly from pump 580 to intake valve operators.

Pressurized oil flows from oil pump 580 via passage or gallery 581 to control valves 586, 587, 588, and 589. Control valve 586 may be opened to allow oil to flow into valve body inlet 550, metering groove 551a, and valve body outlet 520a before oil flows to cylinder number one intake valve operators via passage 520b. Pressurized oil is also supplied to inlet 570 via passage or conduit 524c. Thus, by closing valve 586, deactivation of intake valves and exhaust valves of cylinder number one may be prevented. Outlet 506 supplies oil to accumulator 506b and to exhaust valve operators for cylinder number one.

Selective operation of intake and exhaust valves for cylinder number two is similar to selective operation of intake and exhaust valves for cylinder number one. Specifically, pressurized oil flows from oil pump 580 via passage or gallery 581 to valve 587, which may be opened to allow oil to flow into valve body inlet 552, metering groove 551b, and valve body outlet 524a before oil flows to cylinder number two intake valve operators via passage 524b. Pressurized oil is also supplied to valve body inlet 572 via passage or conduit 524c. Thus, by closing valve 587, deactivation of intake valves and exhaust valves of cylinder number two may be prevented. Outlet 508 supplies oil to accumulator 508b and to exhaust valve operators for cylinder number two.

Selective operation of intake and exhaust valves for cylinder number three is similar to selective operation of intake and exhaust valves for cylinder number one. For example, pressurized oil flows from oil pump 580 via passage or gallery 581 to valve 588, which may be opened to allow oil to flow into valve body inlet 554, metering groove 551c, and valve body outlet 526a before oil flows to cylinder number three intake valve operators via passage 526b. Pressurized oil is also supplied to valve body inlet 574 via passage or conduit 526c. Thus, by closing valve 588, deactivation of intake valves and exhaust valves of cylinder number three may be prevented. Outlet 510 supplies oil to accumulator 510b and to exhaust valve operators for cylinder number three.

Selective operation of intake and exhaust valves for cylinder number four is also similar to selective operation of intake and exhaust valves for cylinder number one. In particular, pressurized oil flows from oil pump 580 via passage or gallery 581 to valve 589, which may be opened to allow oil to flow into valve body inlet 556, metering groove 551d, and valve body outlet 528a before oil flows to cylinder number four intake valve operators via passage 528b. Pressurized oil is also supplied to control valve body inlet 576 via passage or conduit 528c. Thus, by closing valve 589, deactivation of intake valves and exhaust valves of cylinder number four may be prevented. Outlet 512 supplies oil to accumulator 512b and to exhaust valve operators for cylinder number four. Intake valve operators shown in FIG. 5B may be urged by cam lobes 523a-529b to operate intake valves of a bank of cylinders. In particular, cam lobes 523a and 523b respectively operate two intake valves of cylinder number one. Cam lobes 525a and 525b respectively operate two intake valves of cylinder number two. Cam lobes 527a and 527b respectively operate two intake valves of cylinder number three. Cam lobes 529a and 529b respectively operate two intake valves of cylinder number four.

Thus, intake and exhaust valves of a cylinder bank may be individually activated and deactivated. Further, in some examples as previously noted, oil may be supplied directly from valves 586-589 to intake valve operators such that continuous metering grooves 551a-551d may be omitted to reduce system cost if desired.

Oil pump 580 also supplies oil to cooling jet 535 to spray piston 36 shown in FIG. 1A via cooling jet flow control valve 534. Oil pressure in gallery 581 may be controlled via dump valve 532 or via adjusting oil pump displacement actuator 533 which adjusts the displacement of oil pump 580. Controller 12 shown in FIG. 1A may be in electrical communication with cooling jet flow control valve 534, oil pump displacement actuator 533, and dump valve 532. Oil pump displacement actuator may be a solenoid valve, a linear actuator, or other known displacement actuator.

Referring now to FIG. 5B, example deactivating intake valve operator 549 and exhaust valve operator 548 for the hydraulically operated valve deactivating system shown in FIG. 5A are shown. Intake camshaft 51 rotates so that lobe 523a selectively lifts intake follower 545, which selectively opens and closes intake valve 52. Rocker shaft 544 provides a selective mechanical linkage between intake follower 545 and intake valve contactor 547. Passage 546 allows pressurized oil to reach a piston shown in FIG. 5C so that intake valve 52 may be deactivated (e.g., remain in a closed position during an engine cycle) Intake valve 52 may be activated when oil pressure in passage 546 is low.

Similarly, Exhaust camshaft 53 rotates so that lobe 507a selectively lifts exhaust follower 543, which selectively opens and closes exhaust valve 54. Rocker shaft 542 provides a selective mechanical linkage between exhaust follower 543 and exhaust valve contactor 540. Passage 541 allows oil to reach a piston shown in FIG. 5C so that exhaust valve 54 may be activated (e.g., open and close during an engine cycle) or deactivated (e.g., remain in a closed position during an engine cycle).

Referring now to FIG. 5C, an example exhaust valve operator 548 is shown Intake valve operators include similar components and operate similar to the way the exhaust valve actuator operates. Therefore, for the sake of brevity, a description of intake valve operators is omitted.

Exhaust follower 543 is shown with oil passage 565, which extends within camshaft follower 564. Oil passage 565 fluidly communicates with port 568 in rocker shaft 542. Piston 563 and latching pin 561 selectively lock follower 543 to exhaust valve contactor 540, which causes exhaust valve contactor 540 to move in response to the motion of follower 543 when oil is not acting on piston 563. The exhaust valve operator 548 is in an activated state during such conditions.

Piston 563 may be acted upon by oil pressure within oil passages 567 and 565. Piston 563 is forced from its at-rest position shown in FIG. 5C (e.g., its normally activated state) by high pressure oil in passage 565 acting against force of spring 569 to its deactivated state. Spring 565 biases piston 563 into a normally locked position that allows exhaust valve contactor 540 to operate an exhaust valve 54 when oil pressure in passage 565 is low.

Latching pin 561 stops at a position (e.g., unlocked position) where follower 543 is no longer locked to exhaust valve contactor 540, thereby deactivating exhaust valve 54 when normally locked latching pin 561 is fully displaced by high pressure oil operating on piston 563. Camshaft follower 564 is rocked according to the movement of cam lobe 507a when exhaust valve operator 548 is in a deactivated state.

Exhaust valve 54 and exhaust valve contactor 540 remain stationary when piston latching pin 561 is in its unlocked position.

Thus, oil pressure may be used to selectively activate and deactivate intake and exhaust valves via intake and exhaust valve operators. Specifically, intake and exhaust valves may be deactivated by allowing oil to flow to the intake and exhaust valve operators. It should be noted that intake and exhaust valve operators may be activated and deactivated via the mechanism shown in FIG. 5C. FIGS. 5B and 5C depict rocker shaft mounted deactivating valve actuators. Other types of deactivating valve actuators are possible and compatible with the invention including deactivating roller finger followers, deactivating lifters, or deactivating lash adjusters.

Figure 5D:
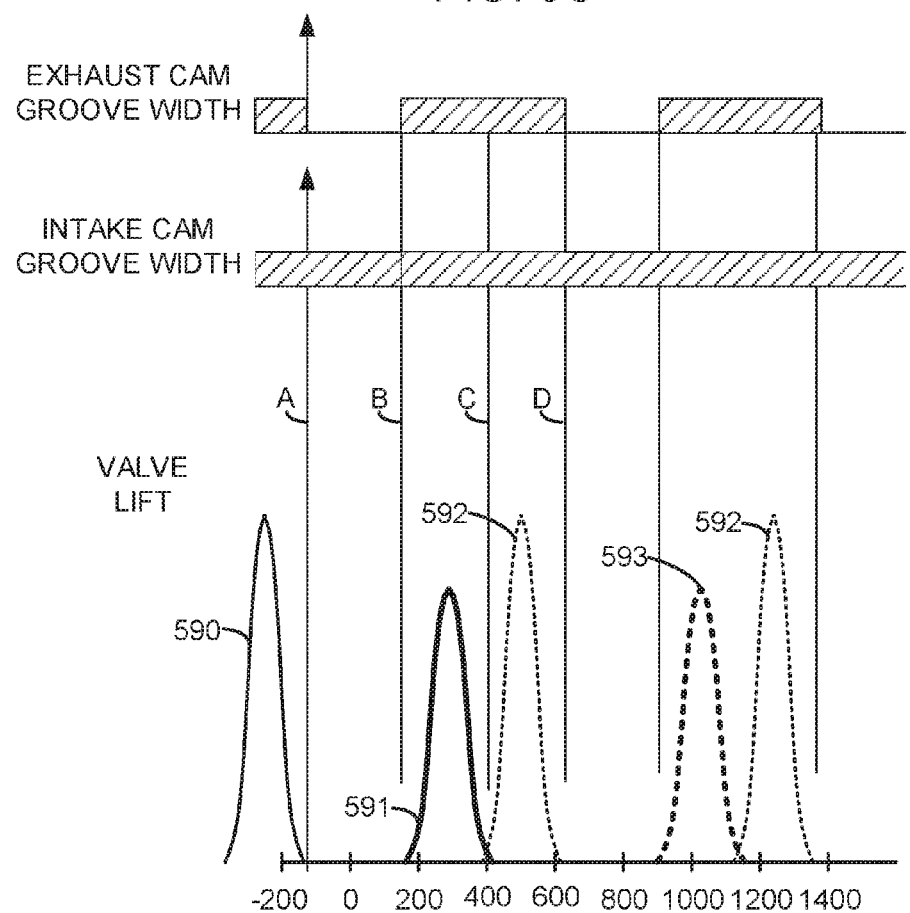
FIG. 5D shows an example cylinder and valve deactivation sequence for the hydraulically operated valve deactivating system shown in FIG. 5A.

Referring now to FIG. 5D, a valve and cylinder deactivation sequence for the mechanism of FIGS. 5A-5C is shown. The valve deactivation sequence may be provided by the system of FIGS. 1A and 5A-5C.

The first plot from the top of FIG. 5D is a plot of exhaust cam groove width versus crankshaft angle. The vertical axis represents exhaust camshaft groove width measured at the location of the oil outlet passage, such as passage 506 of FIG. 5A. Groove width increases in the direction of the vertical axis arrow. The horizontal axis represents engine crankshaft angle, where zero is top-dead-center compression stroke for the cylinder whose intake and exhaust grooves are shown. In this example, the exhaust groove corresponds to 571a of FIG. 5A. The crankshaft angles for the exhaust groove width are the same as the crankshaft angle in the third plot from the top of FIG. 5D.

The second plot from the top of FIG. 5D is a plot of intake cam groove width versus crankshaft angle. The vertical axis represents intake camshaft groove width and groove width increases in the direction of the vertical axis arrow. The horizontal axis represents engine crankshaft angle, where zero is top-dead-center compression stroke for the cylinder whose intake and exhaust grooves are shown. In this example, the intake groove corresponds to 551a of FIG. 5A. The crankshaft angles for the intake groove width are the same as the crankshaft angle in the third plot from the top of FIG. 5D.

The third plot from the top of FIG. 5D is a plot of intake and exhaust valve lift versus engine crankshaft angle. The vertical axis represents valve lift and valve lift increases in the direction of the vertical axis arrow. The horizontal axis represents engine crankshaft angle and the three plots are aligned according to crankshaft angle. Thin solid line 590 represents intake valve lift for cylinder number one when its intake valve operator is activated. Thick solid line 591 represents exhaust valve lift for cylinder number one when its exhaust valve operator is activated. Thin dashed lines 592 represent intake valve lift for cylinder number one if its intake valve operator were activated. Thin dashed line 593 represents exhaust valve lift for cylinder number one if its exhaust valve operator were activated. Vertical lines A-D represent crankshaft angles of interest for the sequence.

The intake valve lift for cylinder number one is shown increasing and then decreasing before crankshaft angle A. An oil control valve, such as 586 of FIG. 5A, is closed before crankshaft angle A to prevent intake and exhaust valve deactivation. The intake valve lift 590 is shown increasing during cylinder number one's intake stroke before crankshaft angle A. Pressurized oil sufficient to deactivate intake valves is not present in the continuous intake camshaft groove before crankshaft angle A.

At crankshaft angle A, the oil control valve (e.g., 586 of FIG. 5A) may be opened to deactivate intake and exhaust valves. The continuous intake camshaft groove width is pressurized with oil after the oil control valve is opened so that the intake valve operator latching pin may be displaced while the camshaft lobe is on a base circle for the intake valve of cylinder number one. The exhaust camshaft groove 571a is also pressurized with oil at crankshaft angle A. Outlet passage 506 is not pressurized with oil at angle A because the land 505a (shown in FIG. 5A) covers the valve body outlet 506 (shown in FIG. 5A). Therefore, only the intake valve begins to be deactivated at crankshaft angle A. The intake valve operator latching pin is disengaged from its normal position before crankshaft angle C to prevent the intake valve from opening.

At crankshaft angle B, the land of the exhaust camshaft journal 521a for cylinder number one makes way for the discontinuous groove 571a, which allows oil to reach the exhaust valve operator for cylinder number one. Oil can flow to the intake valve operator and the exhaust valve operator at crankshaft angle B, but since the exhaust valve is partially lifted at crankshaft angle B, the exhaust valve operates until the exhaust valve closes near crankshaft angle C. The exhaust valve operator latching pin is disengaged from its normally engaged position before crankshaft angle D to prevent the exhaust valve from opening.

At crankshaft angle C, the intake valve does not open since the intake valve operator is deactivated for the engine cycle. Further, the exhaust valve operator latching pin is disengaged from its normal position before crankshaft angle D to prevent the exhaust valve from opening. Consequently, the exhaust valve does not open for the cylinder cycle. The intake and exhaust valves may remain deactivated until the intake and exhaust operators are reactivated by reducing oil pressure to the intake and exhaust valve operators.

The intake and exhaust valve may be reactivated via deactivating the oil control valve 586 and allowing oil pressure in the intake and exhaust valve operators to be reduced or via dumping oil pressure from the intake and exhaust valve operators via a dump valve (not shown).

Oil accumulator 506b maintains oil pressure in oil passage 506 during the portion of the cycle after crankshaft angle D when the exhaust cam groove land blocks passage 506. The accumulator 506b compensates for oil leakage through various clearances during the time when oil supply from the pump is interrupted. The oil accumulator 506b may include a dedicated piston and spring or may be combined with the latch pin mechanism such as the mechanism depicted in FIG. 5C.

Referring now to FIG. 6A, a camshaft for an alternative hydraulically operated valve deactivating system is shown. Camshaft 420 may be included in the engine system shown in FIG. 4A.

In this example, camshaft 420 may be an intake camshaft or an exhaust camshaft or a camshaft that operates both intake and exhaust valves. The intake and exhaust valves of each engine cylinder may be individually activated and deactivated. Camshaft 420 includes sprocket 619 that allows crankshaft 40 of FIG. 1A to drive camshaft 420 via a chain Camshaft 420 includes four journals 605a-605d, which include lands 606a-606d, and discontinuous grooves 608a-608d. Camshaft saddle 602 includes stationary grooves 610a (shown in FIG. 6B) for each of valve bodies 670a, 670b, 670c, and 670d. The stationary grooves 610a are situated to axially align with discontinuous grooves 608a-608d. Camshaft 420 also includes cam lobes. In one example, camshaft 420 may operate both intake and exhaust valves as camshaft 420 rotates. In particular, lobe 620 operates an intake valve of cylinder number one and lobe 622 operates an exhaust valve of cylinder number one. Lobe 638 operates an intake valve of cylinder number two and lobe 639 operates an exhaust valve of cylinder number two. Lobe 648 operates an intake valve of cylinder number three and lobe 649 operates an exhaust valve of cylinder number three. Lobe 658 operates an intake valve of cylinder number four and lobe 659 operates an exhaust valve of cylinder number four.

Camshaft saddle 602 includes valve bodies 670a, 670b, 670c, and 670d to support and provide oil passages leading to camshaft grooves. In particular, valve body 670a includes inlet 613, first outlet 612, and second outlet 616. First outlet 612 provides oil to exhaust valve operators. Second outlet 616 provides oil to intake valve operators. Valve body 670b includes inlet 633, first outlet 636, and second outlet 632. First outlet 636 provides oil to exhaust valve operators. Second outlet 632 provides oil to intake valve operators. Valve body 670c includes inlet 643, first outlet 646, and second outlet 642. First outlet 646 provides oil to exhaust valve operators. Second outlet 642 provides oil to intake valve operators. Valve body 670d includes inlet 653, first outlet 656, and second outlet 652. First outlet 656 provides oil to exhaust valve operators. Second outlet 652 provides oil to intake valve operators. Passages 616, 632, 642, and 652 supply pressurize oil from oil pump 690 to intake valve operators 649 (shown in FIG. 6C) via gallery or passage 692 for respective cylinder numbers 1-4 when control valves 614, 634, 644, and 654 are activated and open. Outlets 612, 636, 646, and 656 may supply oil pressure to exhaust valve operators 648 (shown in FIG. 6C) when control valves 614, 634, 644, and 654 are open. Discontinuous grooves 608a-608d selectively provide an oil path between inlets 613, 633, 643, and 653 and valve body outlets 612, 636, 646, and 656 that lead to exhaust valve operators. Journals 605a-605d are partially circumscribed by discontinuous grooves 608a-608d. Accumulators 609a-609d provide oil to keep exhaust valves deactivated when land 606a covers passage 612 for short periods of time.

Referring now to FIG. 6B, a cross section valve body 670a and its associated components is shown. Camshaft 420 is coupled to camshaft saddle 602 via cap 699. Cap covers stationary groove 610a formed in camshaft saddle 602. Camshaft 420 includes discontinuous groove 608a that is axially aligned with stationary groove 610a. Valve 614 selectively allows oil to flow to intake valve operators via passage 616 and into stationary groove 610a. Land 606a selectively covers and uncovers outlet 612 which provides oil to accumulator 609a and exhaust valve operators as camshaft 420 rotates.

Figure 6C:
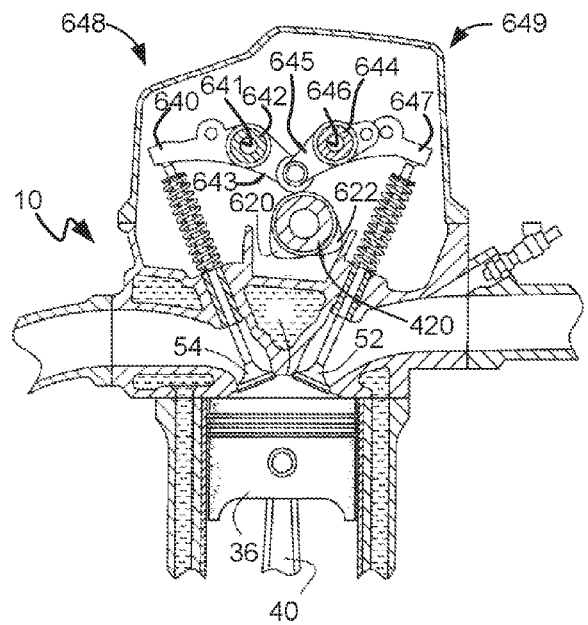
FIG. 6C shows example valve deactivating valve operators for the hydraulically operated valve deactivating system shown in FIG. 6A.

Referring now to FIG. 6C, example deactivating intake valve operator 649 and deactivating exhaust valve operator 648 for the hydraulically operated valve deactivating system shown in FIG. 6A are shown. Camshaft 420 rotates so that lobe 620 selectively lifts intake follower 645, which selectively opens and closes intake valve 52. Rocker shaft 644 provides a selective mechanical linkage between intake follower 645 and intake valve contactor 647. The intake valve operator 649 and the exhaust valve operator 648 include the components and operate as the operator described in FIG. 5C. Passage 646 allows pressurized oil to reach a piston shown in FIG. 5C so that intake valve 52 may be deactivated (e.g., remain in a closed position during an engine cycle) Intake valve 52 may be activated (e.g., open and close during an engine cycle) when oil pressure in passage 646 is low.

Similarly, cam lobe 622 rotates to selectively lifts exhaust follower 643, which selectively opens and closes exhaust valve 54. Rocker shaft 642 provides a selective mechanical linkage between exhaust follower 643 and exhaust valve contactor 640. Passage 641 allows oil to reach a piston shown in FIG. 5C so that exhaust valve 54 may be deactivated (e.g., remain in a closed position during an engine cycle). Low oil pressure in passage 641 activates (e.g., open and close during an engine cycle) exhaust valve 54 when piston 563 shown in FIG. 5C is returned to its normal or base position via spring 569.

In this way, a single cam may operate intake and exhaust valves. Further, the intake and exhaust valves that are driven via the single cam may be deactivated via the intake and exhaust valve operators 648 and 649.

Figure 6D:
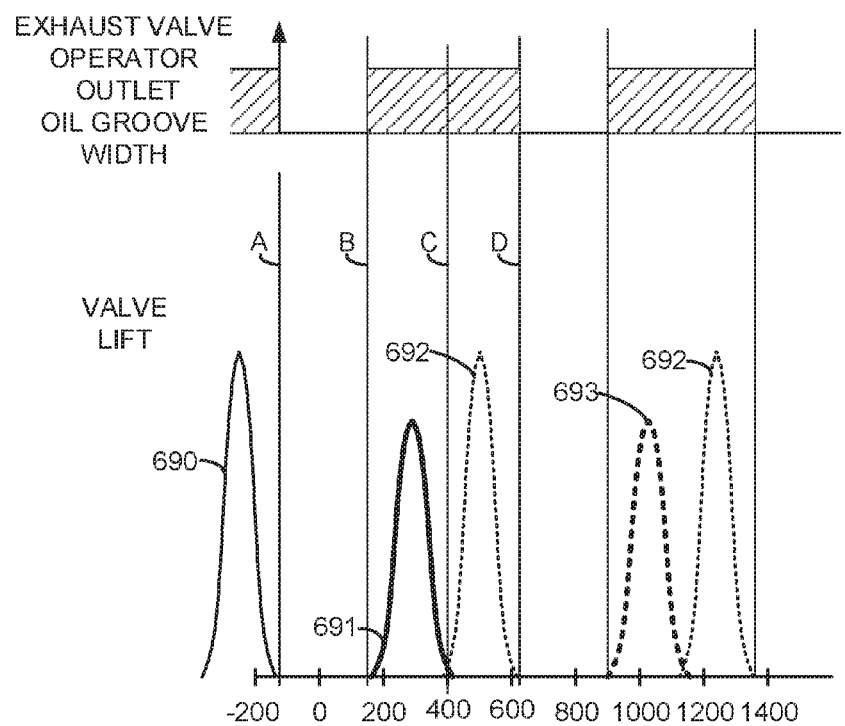
FIG. 6D is an example cylinder and valve deactivation sequence for the hydraulically operated valve deactivating system shown in FIG. 6A.

Referring now to FIG. 6D, a valve and cylinder deactivation sequence for the mechanism of FIGS. 6A-6C is shown. The valve deactivation sequence may be provided by the system of FIGS. 1A and 6A-6C.

The first plot from the top of FIG. 6D is a plot of exhaust cam groove width at the passage leading to the exhaust valve operator versus crankshaft angle. The vertical axis represents exhaust camshaft groove width and groove width increases in the direction of the vertical axis arrow. The horizontal axis represents engine crankshaft angle, where zero is top-dead-center compression stroke for the cylinder whose intake and exhaust grooves are shown. In this example, the exhaust groove corresponds to the width of groove 608a of FIG. 6A measured at the oil outlet passage 612. The crankshaft angles for the exhaust groove width are the same as the crankshaft angle in the third plot from the top of FIG. 6D.

The second plot from the top of FIG. 6D is a plot of intake and exhaust valve lift versus engine crankshaft angle. The vertical axis represents valve lift and valve lift increases in the direction of the vertical axis arrow. The horizontal axis represents engine crankshaft angle and the three plots are aligned according to crankshaft angle. Thin solid line 690 represents intake valve lift for cylinder number one when its intake valve operator is activated. Thick solid line 691 represents exhaust valve lift for cylinder number one when its exhaust valve operator is activated. Thin dashed lines 692 represent intake valve lift for cylinder number one if its intake valve operator were activated. Thin dashed line 693 represents exhaust valve lift for cylinder number one if its exhaust valve operator were activated. Vertical lines A-D represent crankshaft angles of interest for the sequence.

The intake valve lift for cylinder number one is shown increasing and then decreasing before crankshaft angle A. An oil control valve, such as 614 of FIG. 6A, is closed before crankshaft angle A to prevent intake and exhaust valve deactivation. The intake valve lift 690 is shown increasing during cylinder number one's intake stroke before crankshaft angle A. Pressurized oil sufficient to deactivate intake valves is not present in the continuous intake camshaft groove before crankshaft angle A.

At crankshaft angle A, the oil control valve (e.g., 614 of FIG. 6A) may be opened to deactivate intake and exhaust valves. The stationary groove width (e.g., 608a of FIG. 6B) and passage 616 are pressurized with oil after the oil control valve is opened so that the intake valve operator latching pin may be displaced while the outlet 616 is covered via land 606a. Thus, outlet passage 616 is not pressurized with oil at angle A because the land 606a (shown in FIG. 6A) covers the valve body outlet 616. Therefore, only the intake valve begins to be deactivated at crankshaft angle A. The intake valve operator latching pin is disengaged from its normal position before crankshaft angle C to prevent the intake valve from opening.

At crankshaft angle B, the land of the exhaust camshaft land 606a for cylinder number one makes way for the discontinuous groove 608a, which allows oil to reach the outlet 616 and exhaust valve operator for cylinder number one. Oil can flow to the intake valve operator and the exhaust valve operator at crankshaft angle B, but since the exhaust valve is partially lifted at crankshaft angle B, the exhaust valve operates until the exhaust valve closes near crankshaft angle C. The exhaust valve operator latching pin is disengaged from its normally engaged position before crankshaft angle D to prevent the exhaust valve from opening.

At crankshaft angle C, the intake valve does not open since the intake valve operator is deactivated for the engine cycle. Further, the exhaust valve operator latching pin is disengaged from its normal position before crankshaft angle D to prevent the exhaust valve from opening. Consequently, the exhaust valve does not open for the cylinder cycle. The intake and exhaust valves may remain deactivated until the intake and exhaust operators are reactivated by reducing oil pressure to the intake and exhaust valve operators.

The intake and exhaust valve may be reactivated via deactivating the oil control valve 614 and allowing oil pressure in the intake and exhaust valve operators to be reduced or via dumping oil pressure from the intake and exhaust valve operators via a dump valve (not shown).

Oil accumulator 609a maintains oil pressure in oil passage 616 during the portion of the cycle after crankshaft angle D when the exhaust cam groove land blocks passage 616. The accumulator 609a compensates for oil leakage through various clearances during the time when oil supply from the pump is interrupted. The oil accumulator 609a may include a dedicated piston and spring or may be combined with the latch pin mechanism such as the mechanism depicted in FIG. 5C.

Thus, the systems of FIGS. 1A-6D provide for vehicle systems, comprising: a first vehicle including a first cylinder block and a first cylinder head casting, a first actual total number of deactivating valve operators coupled to the first cylinder head casting; and a second vehicle including a second cylinder block and a second cylinder head casting, a second actual total number of deactivating valve operators coupled to the second cylinder head casting, the first cylinder block same as the second cylinder block, the first cylinder head casting same as the second cylinder head casting.

In some examples, the vehicle systems includes where the first actual total number of deactivating valves operators is different than the second actual total number of deactivating valve operators. The vehicle systems includes where the first cylinder head casting includes deactivating intake valve operators and does not include deactivating exhaust valve operators. The vehicle systems includes where the second cylinder head casting includes deactivating intake valve operators and deactivating exhaust valve operators. The vehicle systems further comprise a controller including executable instructions stored in non-transitory memory to decrease boost pressure output of a turbocharger by a first amount at an engine speed and driver torque demand in response to a request to reactivate a cylinder in the first cylinder head. The vehicle systems further comprise additional instructions to decrease boost pressure output of the turbocharger by a second amount at the engine speed and driver demand torque in response to reactivate a cylinder in the second cylinder head. The vehicle systems include where the cylinder head is part of a bank of cylinders.

The vehicle systems also comprise: a first vehicle including a first engine, the first engine including a first block and a first cylinder head casting, a first actual total number of non-deactivating valve operators coupled to the first cylinder head casting including; and a second vehicle including a second engine, the second engine including a second block and a second cylinder head casting, a second actual total number of non-deactivating valve operators coupled to the second cylinder head casting, the first block same as the second block, the first cylinder head casting same as the second cylinder head casting. The vehicle systems include where first and second engines include deactivating valve operators, the deactivating valve operators sliding along a camshaft to selectively activate and deactivate cylinders.

In some examples, the system further comprises a controller including executable instructions stored in non-transitory memory to deactivate one or more cylinders via deactivating valve operators and ceasing to supply fuel to the one or more engine cylinder. The system further comprises additional instructions to adjust an actual total number of deactivated cylinders in an engine cycle in response to an estimate of an amount of oil in one or more deactivated cylinders, where deactivating the one or more cylinders includes holding intake valves in a closed state during an engine cycle. The system further comprises additional instructions to sample an exhaust gas oxygen sensor via a first method in response to deactivating a cylinder of the engine and sample the exhaust gas oxygen sensor via a second method in response to activating the cylinder. The system further comprises additional instructions to sample a camshaft position sensor via a first method in response to deactivating a cylinder of the engine and sample the camshaft sensor via a second method in response to activating the cylinder. The system includes where the engine includes one or more deactivating valve operators, and where the one or more deactivating valve operators hold intake valves in a closed state over an entire engine cycle.

The systems may also comprise: an engine including a block and a cylinder head, a total actual number of cylinders included in the block, the cylinder head including a first actual total number of deactivating valve operators in a first configuration, the cylinder head including a second actual total number of deactivating valve operators in a second configuration; and a controller including executable instructions stored in non-transitory memory to deactivate a first actual total number of cylinders and change an engine firing order while deactivating the first actual total number of cylinders. The vehicle system includes where a first cylinder is activated and a second cylinder is deactivated to change the engine firing order while deactivating the first actual total number of cylinders, and where the first actual total number of cylinders is a constant value. The vehicle system includes where engine cylinders are deactivated via holding cylinder poppet valves in closed states while the engine rotates over an engine cycle. The vehicle system further comprises additional instructions to cease fuel flow to deactivated cylinders. The vehicle system further comprises additional instructions to adjust boost pressure provided via a turbocharger in response to a request to activate an engine cylinder. The vehicle system includes where the engine firing order always includes a same two cylinder numbers.

It should be noted that the systems of FIGS. 1A-6D may be operated to provide a desired engine torque where an actual total number of active cylinders may remain the same while the active cylinders that form the actual total number of active cylinders may change from engine cycle to engine cycle. In addition, the actual total number of cylinders combusting air and fuel during an engine cycle to produce the desired engine torque may change from engine cycle to engine cycle, if desired. This may be referred to as a rolling variable displacement engine. For example, a four cylinder engine having a firing order of 1-3-4-2 may fire cylinders 1 and 3 during a first engine cycle, cylinders 3 and 2 during a next engine cycle, cylinders 1-3-2 during a next engine cycle, cylinders 3-4-2 during a next engine cycle, and so on to provide a constant desired engine torque.

Figure 7:
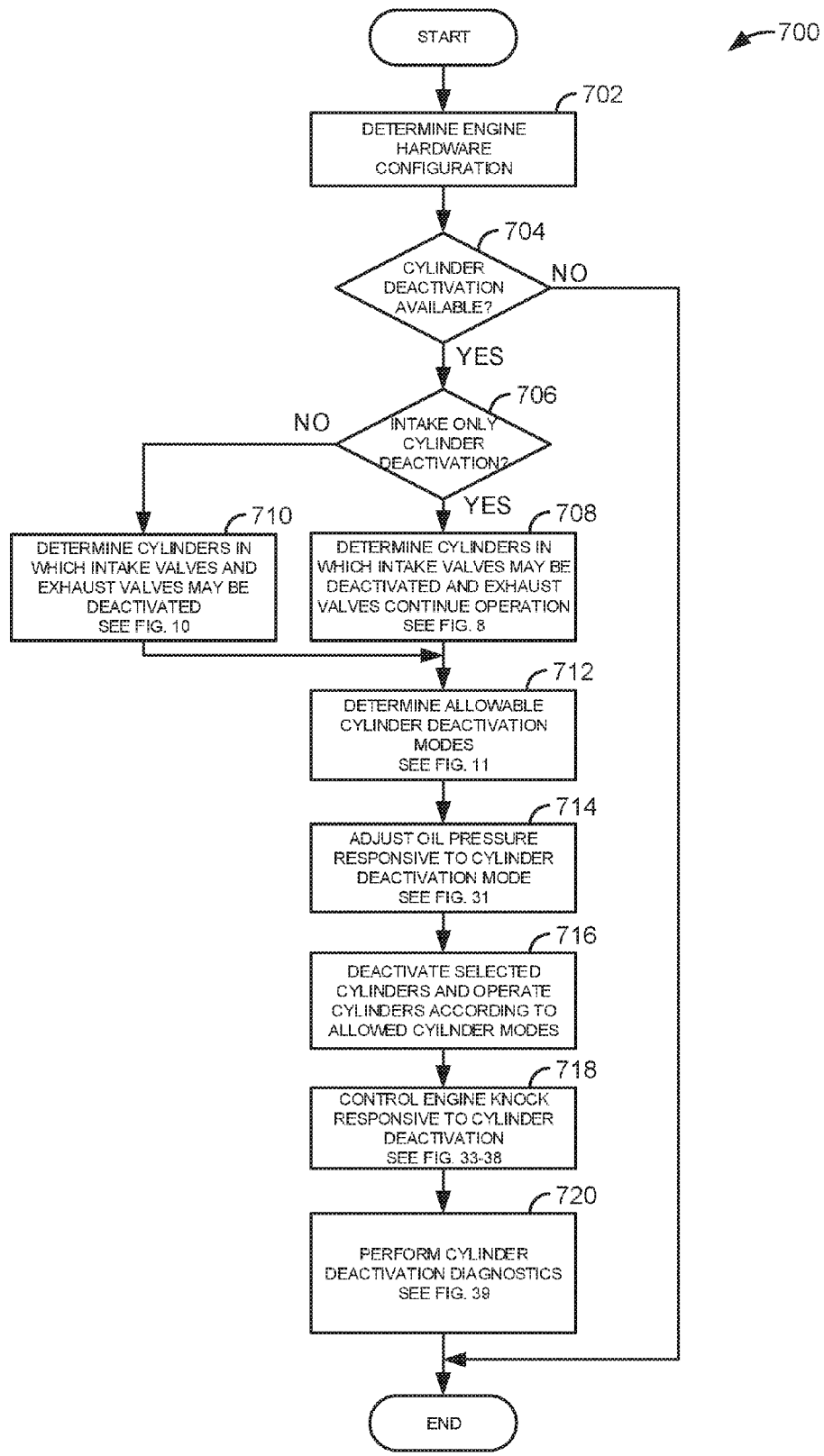
FIG. 7 is a flowchart of an example method for operating an engine with deactivating cylinders and valves.

Referring now to FIG. 7, a method for operating an engine with deactivating cylinders and valves is shown. The method of FIG. 7 may be included in the system described in FIGS. 1A-6C. The method may be included as executable instructions stored in non-transitory memory. The method of FIG. 7 may perform in cooperation with system hardware and other methods described herein to transform an operating state of an engine or its components.

At 702, method 700 determines the engine hardware configuration. In one example, the engine hardware configuration may be stored in memory at a time of manufacture. The engine hardware configuration information may include but is not limited to information describing a total actual number of engine cylinders, a total actual number of engine cylinders that do not include deactivating intake and exhaust valves, an actual total number of engine cylinders that include deactivating exhaust valves, an actual total number of engine cylinders that include deactivating intake valves, identities (e.g., cylinder numbers) of cylinders that include deactivating intake valves, identities of cylinders that include deactivating exhaust valves, identities of cylinders that do not include deactivating intake and exhaust valves, engine knock sensor locations, an actual total number of engine knock sensors, and other system configuration parameters. Method 700 reads the vehicle configuration information from memory and proceeds to 704.

At 704, method 700 judges if cylinder deactivation via deactivating intake and/or exhaust valves is available given the system configuration information retrieved at 702. If method 700 judges that cylinder deactivation is not available or possible via intake and/or exhaust valves, the answer is no and method 700 proceeds to exit. Otherwise, the answer is yes and method 700 proceeds to 706.

At 706, method 700 judges if only intake only cylinder deactivation is available. In other words, method 700 judges if only intake valves of engine cylinders may be deactivated (e.g., held in a closed state throughout an engine cycle) to deactivate cylinders while all exhaust valves of all engine cylinders continue to operate as an engine rotates. In some engine configurations it may be desirable to deactivate only intake valves of cylinders being deactivated to reduce system cost. FIGS. 2B and 2C show two examples of such an engine configuration. Cylinder intake and exhaust valves may be deactivated in a closed state where they do not open from a closed position over an engine cycle. Method 700 may judge that only intake valves of engine cylinders may be deactivated to deactivate engine cylinders while all engine exhaust valves of engine cylinders continue to operate as the engine rotates based on the hardware configuration determined at 702. If method 700 judges that only intake valves of engine cylinders may be deactivated to deactivate engine cylinders while all engine exhaust valves of engine cylinders continue to operate as the engine rotates, the answer is yes and method 700 proceeds to 708. Otherwise, the answer is no and method 700 proceeds to 710.

At 708, method 700 determines engine cylinders in which intake valves may be deactivated and exhaust valves continue to operate as the engine rotates. Method may determine engine cylinders in which intake valves may be deactivated while exhaust valves continue to operate based on the method of FIG. 8. Method 700 proceeds to 712 after engine cylinders in which intake valves may be deactivated are determined.

At 710, method 700 determines engine cylinders in which intake valves and exhaust valves may be deactivated as the engine rotates. Method may determine engine cylinders in which intake and exhaust valves may be deactivated based on the method of FIG. 10. Method 700 proceeds to 712 after engine cylinders in which intake and exhaust valves may be deactivated are determined.

At 712, method 700 determines the allowed or allowable cylinder modes for operating the engine. A cylinder mode identifies how many engine cylinders are active and which cylinders are active (e.g., cylinder number 1, 3, and 4). Method 700 determines the allowed cylinder modes according to the method of FIG. 11. Method 700 proceeds to 714 after the allowed cylinder modes are determined.

At 714, method 700 adjusts engine oil pressure responsive to cylinder modes. Method 700 adjusts engine oil pressure according to the method of FIG. 31. Method 700 proceeds to 716 after engine oil pressure is adjusted.

At 716, method 700 deactivates selected cylinders according to the allowed cylinder modes. Method 700 deactivates intake and/or exhaust valves to deactivate selected cylinders according to the allowed cylinder modes determined at 712. For example, if the engine is a four cylinder engine and the allowed cylinder mode includes three active cylinders, method 700 deactivates one cylinder. The particular cylinders that are active and the cylinders that are deactivated may be based on cylinder modes. The cylinder modes may change with vehicle operating conditions so that a same actual total number of cylinders may be active and a same actual total number of cylinders may be deactivated, but the cylinders that are activated and deactivated may change from cylinder cycle to cylinder cycle. Valves operation of deactivated cylinders is based on the cylinder deactivation mode associated with the deactivated cylinder. For example, if the allowed cylinder modes include cylinder deactivation modes from the method of FIG. 20, the valves in deactivated cylinders may operate according to the cylinder deactivation modes described in FIG. 20.

If a plurality of actual total numbers of active cylinders is allowed, the actual total number of active cylinders in a particular cylinder mode that provides lowest fuel consumption while providing the desired driver demand torque is activated. Further, the allowed transmission gears that may be associated with the allowed cylinder mode that is activated may be engaged.

Method 700 may deactivate intake and/or exhaust valves via the systems described herein or via other known valve deactivation systems. If an engine knock sensor or other sensor indicates engine noise greater than a threshold or vibration greater than a threshold immediately after changing cylinder modes, a different actual total number of active cylinders and transmission gear may be selected (e.g., the transmission gear and cylinder mode prior to changing the cylinder mode, which may be a greater actual total number of active cylinders). The knock sensor may be sampled at an engine crankshaft interval outside of an engine knock window to avoid switching modes based on knock. Knock sensor output from within the knock window may be excluded for reactivating a cylinder in response to engine vibration.

Engine cylinders may be deactivated via holding intake valves in closed positions over an entire engine cycle. Further, injection of fuel to deactivated cylinders may also be ceased. Spark delivery to deactivated cylinders may also be ceased. In some examples, exhaust valves of cylinders being deactivated are also held in closed positions over the entire engine cycle while the intake valves are deactivated so that gases are trapped in the deactivated cylinders. Method 700 proceeds to 718 after selected engine cylinders are deactivated via intake and exhaust valves.

At 718, method 700 controls engine knock responsive to cylinder deactivation. Method 700 controls engine knock according to the method of FIGS. 33-38. Method 700 proceeds to 720 after controlling engine knock.

At 720, method 700 performs cylinder deactivation diagnostics. Method 700 performs cylinder diagnostics according to the method of FIGS. 39-40. Method 700 proceeds to exit after performing cylinder diagnostics.

Figure 8A:
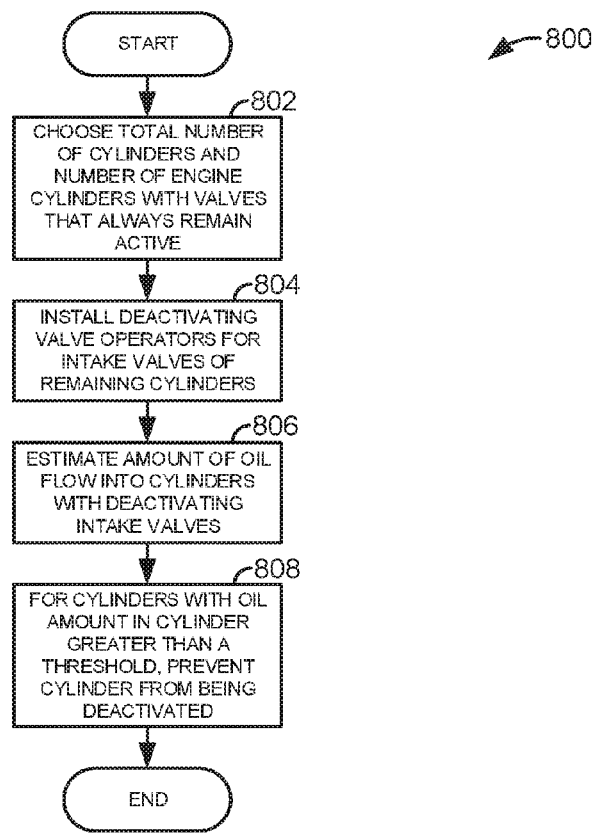
FIG. 8A is a flowchart of an example method for selectively activating and deactivating cylinders and cylinder valves of an engine with both deactivating and non-deactivating intake valves and only non-deactivating exhaust valves.

Referring now to FIG. 8A, a method to determine cylinders in which intake valves may be deactivated is shown. The method of FIG. 8 may be included in the system described in FIGS. 1A-6C. The method may be included as executable instructions stored in non-transitory memory. The method of FIG. 8 may perform in cooperation with system hardware and other methods described herein to transform an operating state of an engine or its components.

At 802, method 800 chooses an actual total number of cylinders for the engine. The actual total number of cylinders may be based on vehicle mass and performance requirements. In some examples, the engine will have four cylinders while in other examples the engine will have six or eight cylinders. Further, the actual total number of engine cylinders with valves that always remain active while the engine rotates is determined. In one example, the actual total number of cylinders that have valves (e.g., intake and exhaust poppet valves) that remain active while the engine rotates is based on an amount of power the vehicle requires to operate at a desired speed (e.g., 60 KPH). If the engine has the capacity to provide the amount of power with two or more cylinders, the engine may be produced with two cylinders that have valves that always remain active (e.g., opening and closing over an engine cycle). If the engine has the capacity to provide the amount of power with four or more cylinders, the engine may be produced with four cylinders that have valves that always remain active. The remaining cylinders are provided with deactivating intake valves and non-deactivating exhaust valves. Method 800 proceeds to 804 after the actual total number of engine cylinders and the actual total number of cylinders with valves that always remain active are determined.

At 804, the engine is constructed with non-deactivating intake valve operators and non-deactivating exhaust valve operators in engine cylinders that always remain active while the engine rotates. The remaining engine cylinders are provided deactivating intake valve operators and non-deactivating exhaust valve operators. Method 800 proceeds to 806 after the engine is assembled with deactivating and non-deactivating valves.

At 806, method 800 estimates an amount of oil in cylinders with intake valves that are deactivated during an engine cycle so that the intake valves do not open during an engine cycle or a cycle of the cylinder in which the intake valves operate. In one example, the amount of oil in engine cylinders is estimated based on the empirical model described in FIG. 8B. Method 800 determines amounts of oil in each engine cylinder where intake valves of the cylinder are deactivated and where the cylinder is deactivated such that air flow through the cylinder is substantially ceased (e.g., less than 10% of the air flow through the cylinder at idle conditions). The amount of oil in each cylinder is revised each engine cycle. Method 800 proceeds to 808 after the oil amount in each cylinder is determined.

Additionally, method 800 may estimate engine oil quality at 806. Engine oil quality may be an estimate of contaminants in the engine oil. The engine oil quality may be assigned a value from 0 to 100, zero corresponding to oil at an end of its life cycle and one hundred corresponding to fresh oil. In one example, the estimate of engine oil quality is based on engine operating time, engine load during the operating time, and engine speed during the operating time. For example, average engine load and speed may be determined over the engine operating time. The average engine load and speed index a table of empirically determined values and the table outputs an oil quality value. It may be desirable to limit an amount of time cylinder deactivation is available in response to oil quality because low oil quality may increase engine wear during cylinder deactivation and/or increase engine emissions during cylinder deactivation.

Method 800 may also determine an actual total number of particulate regenerations since a last time engine oil was changed. A particulate filter may be regenerated via raising particulate filter temperature and combusting carbonaceous soot stored in the particulate filter. Each time the particulate filter is regenerated after an engine oil change, an actual total number of particulate filter regenerations is increased.

At 808, method 800 prevents cylinders containing more than a threshold amount of oil from being deactivated. In other words, if a cylinder with deactivated intake valves (e.g., intake valves that remain closed over an engine cycle) contains more than a threshold amount of oil, the cylinder is reactivated (e.g., cylinder intake and exhaust valves open and close during an engine cycle and air and fuel are combusted in the cylinder) so that oil entry into the cylinder may be limited. The cylinder is reactivated via activating the intake valve operator and supplying spark and fuel to the cylinder. If the cylinder is reactivated, it remains activated at least until an amount of oil in the cylinder is less than a threshold amount. Further, the amount of intake valve and exhaust valve opening time overlap may be increased in response to the amount of oil in the deactivated cylinder exceeding a threshold. By increasing intake valve and exhaust open time overlap in response to the amount of oil in a cylinder exceeding a threshold, it may be possible to evacuate oil vapors from the cylinder to improve subsequent combustion event stability and emissions. Further, one cylinder may be activated in response to an amount of oil in the one cylinder, while during a same engine cycle, a second cylinder may be deactivated so that a total actual number of active engine cylinders remains constant during an engine cycle. The cylinders may be activated and deactivated as described elsewhere herein. For example, the one cylinder may be activated via opening intake and exhaust valves during a cycle of the one cylinder. The second cylinder may be deactivated via closing and holding closed intake, or intake and exhaust valves, closed during a cycle of the second cylinder.

If a cylinder with deactivating intake valves and non-deactivating exhaust valves is deactivated by holding intake valves of the deactivated cylinder closed during a cycle of the deactivated cylinder, while exhaust valves continue to open and close, closing timing of exhaust valves may be adjusted in response to deactivating the cylinder so that cylinder compression and expansion losses may be reduced. Method 800 proceeds to exit after cylinders containing more than a threshold amount of oil are reactivated.

Additionally at 808, cylinders may not be deactivated or may be reactivated (e.g., combusting air and fuel in the cylinders) in response to oil quality being less than a threshold value. Further, method 800 may activate engine cylinders or prevent engine cylinders from being deactivated in response to an actual total number of particulate filter regenerations since a last engine oil change being greater than a threshold. These actions may improve vehicle emissions and/or reduce engine wear.

Figure 8B:
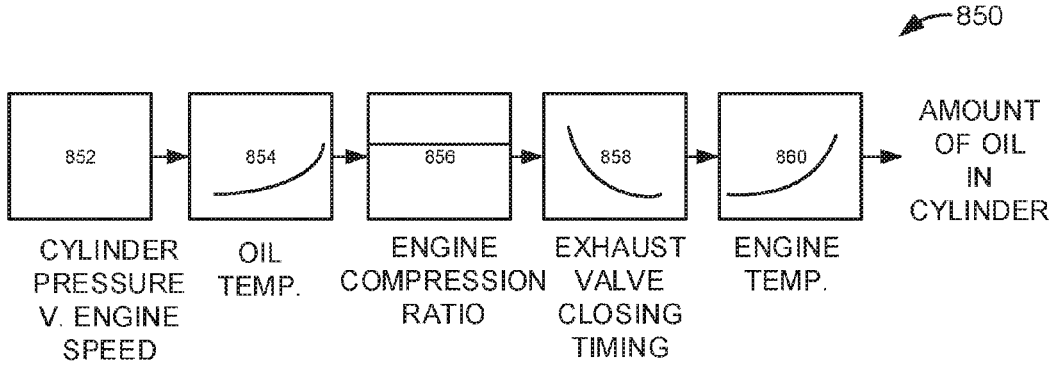
FIG. 8B is a block diagram for estimating an amount of oil in a deactivated cylinder.

Referring now to FIG. 8B, a block diagram of an example empirical model for estimating an amount of oil in an engine cylinder is shown. An amount of oil in each deactivated cylinder may be estimated via a model similar to model 850, although variables in the described functions or tables may have different values depending on the cylinder number.

Model 850 estimates a base oil amount that enters into cylinders that have deactivated intake valves (e.g., intake valves that remain in a closed position over an engine or cylinder cycle) and operating exhaust valves at block 852. The cylinder oil amounts are empirically determined and installed into a table or function that is stored in controller memory. In one example, the table or function is indexed by engine speed and in cylinder or exhaust pressure. The table or function outputs an amount of oil in the cylinder. The amount of oil is directed to block 854. At block 854, the amount of oil in a cylinder is multiplied by a scalar or real number that adjusts the amount of oil in response to oil temperature. Oil viscosity may vary with oil temperature and the amount of oil that may enter a deactivated cylinder may vary with oil temperature. Since oil viscosity can decrease with oil temperature, the amount of oil that may enter a deactivated cylinder may increase with increased oil temperature. In one example, block 854 includes a plurality of empirically determined scalars for different oil temperatures. The amount of oil from block 852 is multiplied by the scalar in block 854 to determine the amount of oil in the engine cylinder as a function of oil temperature.

At 856, a scalar based on engine or cylinder compression ratio (CR) is multiplied by the output of block 854 to determine the amount of oil in the engine cylinder as a function of oil temperature and engine compression ratio. In one example, the amount of oil in the cylinder is increased for higher cylinder compression ratios since a vacuum is created in the cylinder after the exhaust valve closes. The value of 856 is empirically determined and stored to memory.

At 858, the amount of oil in the cylinder is multiplied by a value that is a function of exhaust valve closing position or trapped cylinder volume. The value decreases as exhaust valve closing timing is retarded from top-dead-center exhaust stroke since additional volume of exhaust gas is trapped in the cylinder as exhaust valve closing retard increases. The value decreases as exhaust valve closing timing is advanced from top-dead-center exhaust stroke since additional volume of exhaust gas is trapped in the cylinder as exhaust valve closing advance increases. The function of 858 is empirically determined and stored to memory. The amount oil in the cylinder is passed to block 860.

At block 860, the amount of oil in a cylinder is multiplied by a scalar that adjusts the amount of oil in response to engine temperature. Engine temperature may affect clearances between engine components and the amount of oil that enters the cylinder may vary with engine temperature and engine component clearances. In one example, block 860 includes a plurality of empirically determined scalars for different engine temperatures. The amount of oil that enters the cylinder decreases as engine temperature increases since clearance between engine components may decrease with increasing engine temperature. Block 860 outputs an estimate of oil in an engine cylinder.

Figure 9:
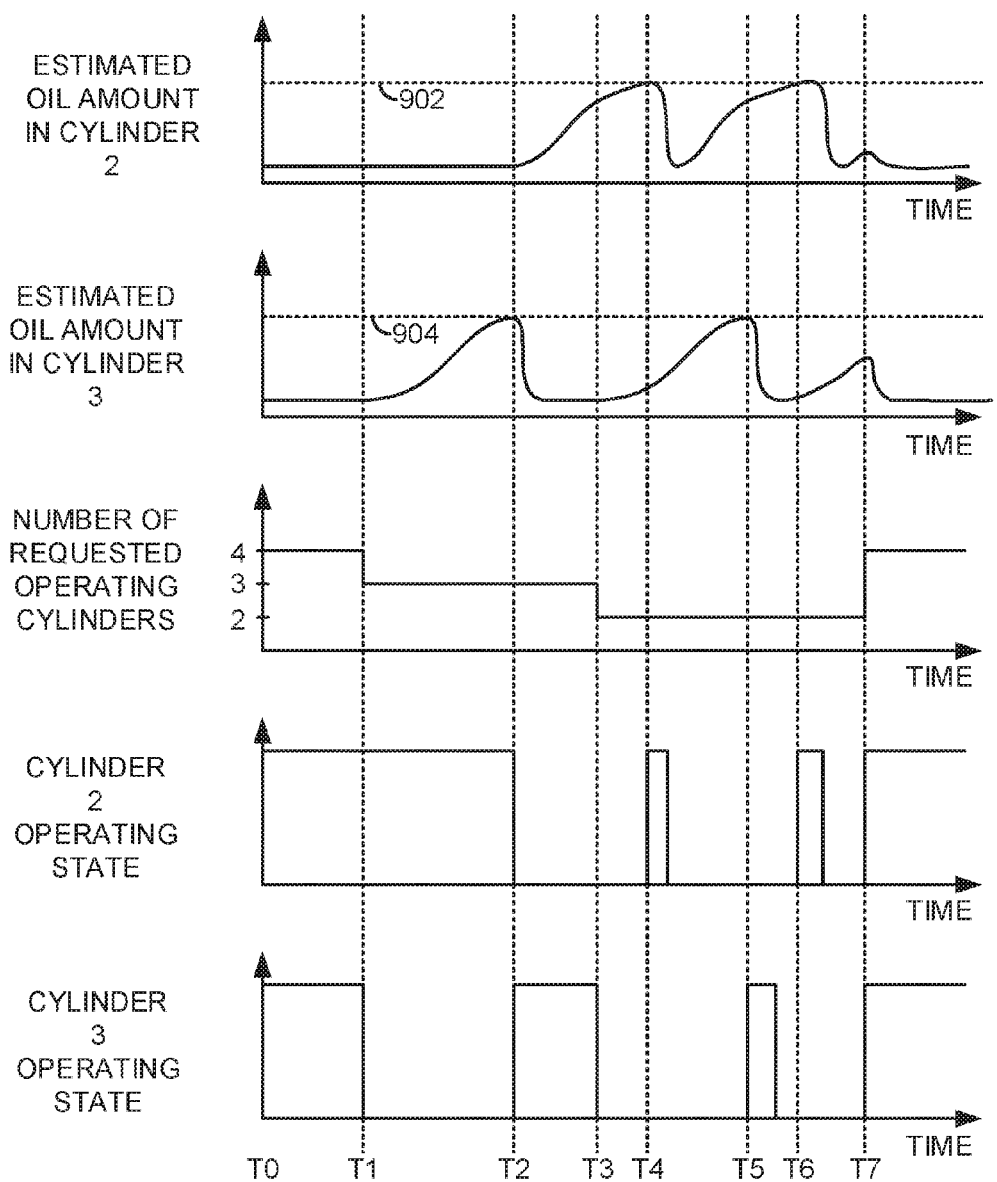
FIG. 9 is an example sequence for activating and deactivating cylinders and cylinder valves of an engine having both deactivating and non-deactivating intake valves and only non-deactivating exhaust valves.

Referring now to FIG. 9, an example operating sequence for a four cylinder engine is shown. In this example, engine cylinder numbers two and three may be selectively activated and deactivated via activating and deactivating intake valves of cylinder numbers two and three. The four cylinder engine has a 1-3-4-2 firing order when it combusts air and fuel. The vertical markers at time T0-T7 represent times of interest in the sequence. The plots of FIG. 9 are time aligned and occur at the same time.

The first plot from the top of FIG. 9 is a plot of estimated oil in cylinder number two versus time. The vertical axis represents an estimated amount of oil in cylinder number two and the estimated amount of oil in cylinder number two increases in the direction of the vertical axis arrow. The horizontal axis represents time and time increases from the left side of the plot to the right side of the plot. Horizontal line 902 represents a threshold limit for an amount of oil in cylinder number two which is not to be exceeded.

The second plot from the top of FIG. 9 is a plot of estimated oil in cylinder number three versus time. The vertical axis represents an estimated amount of oil in cylinder number three and the estimated amount of oil in cylinder number three increases in the direction of the vertical axis arrow. The horizontal axis represents time and time increases from the left side of the plot to the right side of the plot. Horizontal line 904 represents a threshold limit for an amount of oil in cylinder number three which is not to be exceeded.

The third plot from the top of FIG. 9 is a plot of the number of requested operating cylinders. The number of requested operating cylinders may be a function of driver torque demand, engine speed, and other operating conditions. The vertical axis represents the requested number of operating engine cylinders and the requested number of operating engine cylinders are shown along the vertical axis. The horizontal axis represents time and time increases from the left side of the plot to the right side of the plot.

The fourth plot from the top of FIG. 9 is a plot of the operating state of cylinder number two versus time. The vertical axis represents cylinder number two operating state. Cylinder number two is operating combusting air and fuel with intake and exhaust valves opening and closing during an engine cycle when the trace is at a higher level near the vertical axis arrow. Cylinder number two is not operating and not combusting air and fuel when the trace is at a lower level near the horizontal axis. The intake valves are closed for the entire engine cycle when the trace is near the horizontal axis and exhaust valves open and close during an engine cycle when the trace is at the lower level near the horizontal axis arrow.

The fifth plot from the top of FIG. 9 is a plot of the operating state of cylinder number three versus time. The vertical axis represents cylinder number three operating state. Cylinder number three is operating combusting air and fuel with intake and exhaust valves opening and closing during an engine cycle when the trace is at a higher level near the vertical axis arrow. Cylinder number three is not operating and not combusting air and fuel when the trace is at a lower level near the horizontal axis. The intake valves are closed for the entire engine cycle when the trace is near the horizontal axis and exhaust valves open and close during an engine cycle when the trace is at the lower level near the horizontal axis arrow.

At time T0, the estimated amount of oil in cylinder number two is low. The estimated amount of oil in cylinder number three is also low. The engine is operating with four active (e.g., cylinders combusting air and fuel) cylinders as indicated by the requested number of cylinders being equal to four and the operating states of cylinder number two and number three being active (e.g., cylinder operating state traces are at higher levels). Cylinder numbers one and four are active whenever the engine is miming and combusting air and fuel.

At time T1, the estimated amounts of oil in cylinder numbers two and three is low. The number of requested operating cylinders is reduced from four to three. The requested number of engine cylinders may be reduced in response to a lower driver demand torque. Cylinder number three is deactivated (e.g., combustion is stopped in cylinder number three, intake valves of cylinder number three are deactivated such that they do not open and close during an engine cycle, fuel delivery to the cylinder ceases, spark delivery to the cylinder may be ceased, and exhaust valves of cylinder number three continue to open and close during each engine cycle) in response to the requested number of cylinders being three. Cylinder number two continues to operate with active intake valves and combustion.

Between time T1 and time T2, the estimated amount of oil in cylinder number two remains low and constant. The estimated amount of oil in cylinder number three is increasing. The amount of oil in cylinder number three increases because a vacuum may form in cylinder number three after exhaust valves of cylinder number three close because intake valves of cylinder number three are deactivated.

At time T2, the amount of oil in cylinder number three equals or exceeds threshold 904. Therefore, cylinder number three is reactivated which increases pressure in the cylinder and pushes oil out of the cylinder past the cylinder rings, thereby reducing the amount of oil in cylinder number three. However, since the requested number of cylinders is three, cylinder number two is deactivated (e.g., combustion is stopped in cylinder number two, intake valves of cylinder number two are deactivated such that they do not open and close during an engine cycle, fuel delivery to the cylinder ceases, spark delivery to the cylinder may be ceased, and exhaust valves of cylinder number two open and close during each engine cycle). In this way, the requested number of operating cylinders is provided even when the oil amount of one cylinder is at or above a threshold limit. The estimated amount of oil in cylinder number two is at a lower level. The operating state of cylinder number two is low to indicate cylinder number two is deactivated. The operating state of cylinder number three is high to indicate cylinder number three is activated.

At time T3, the number of requested operating cylinders is two and the estimated amount of oil in cylinder number three is low. Cylinder number three is deactivated in response to the low amount of oil in cylinder number three and the number of requested operating cylinders. Cylinder number two remains in a deactivated state. The amount of oil in cylinder number two continues to increase.

At time T4, the amount of oil in cylinder number two exceeds threshold level 902 and the number of requested operating cylinders is two. Cylinder number two is reactivated to evacuate oil from cylinder number two. Cylinder number three remains deactivated so that the number of cylinders combusting is near the requested number of operating cylinders. A short time after time T4, cylinder number two is reactivated in response to the estimated amount of oil in cylinder number two being low.

At time T5, the amount of oil in cylinder number three exceeds threshold level 904 and the number of requested operating cylinders is two. Cylinder number three is reactivated to evacuate oil from cylinder number three. Cylinder number two remains deactivated so that the number of cylinders combusting is near the requested number of operating cylinders. A short time after time T5, cylinder number three is reactivated in response to the estimated amount of oil in cylinder number three being low.

At time T6, the amount of oil in cylinder number two exceeds threshold level 902 and the number of requested operating cylinders is two. Cylinder number two is reactivated to evacuate oil from cylinder number two. Cylinder number three remains deactivated so that the number of cylinders combusting is near the requested number of operating cylinders. A short time after time T6, cylinder number two is reactivated in response to the estimated amount of oil in cylinder number two being low.

At time T7, the requested number of operating cylinders is increased in response to an increase in driver demand torque. The operating states of cylinder numbers two and three changes to active to indicate cylinder numbers two and three have been reactivated in response to the number of operating cylinders. The estimated amount of oil in cylinder numbers two and three is reduced by activating cylinder numbers two and three.

In this way, engine cylinders may be selectively deactivate and activated to conserve fuel and reduce oil in engine cylinders. Further, the activated cylinders may be deactivated to reduce oil in engine cylinders and to attempt to match the requested number of operating cylinders. Activating cylinders to remove oil from cylinders has priority over deactivating cylinders to match the requested number of operating cylinders so that oil consumption may be reduced.

Figure 10:
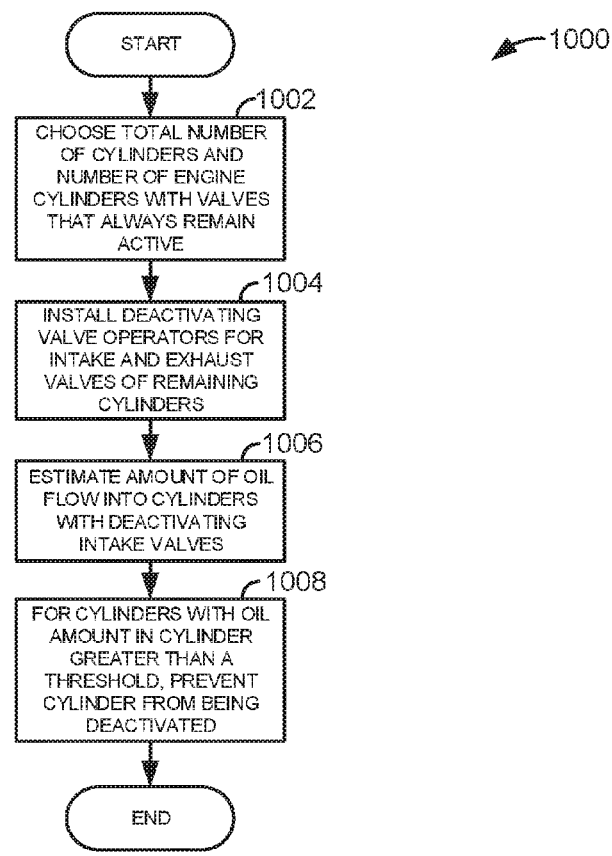
FIG. 10 is a flowchart of an example method for selectively activating and deactivating cylinders and cylinder valves of an engine with both deactivating and non-deactivating intake valves and non-deactivating and deactivating exhaust valves.

Referring now to FIG. 10, a method to determine cylinders in which intake valves may be deactivated is shown. The method of FIG. 10 may be included in the system described in FIGS. 1A-6C. The method may be included as executable instructions stored in non-transitory memory. The method of FIG. 10 may perform in cooperation with system hardware and other methods described herein to transform an operating state of an engine or its components.

At 1002, method 1000 an actual total number of cylinders for the engine is chosen. The actual total number of cylinders may be based on vehicle mass and performance requirements. In some examples, the engine will have four cylinders while in other examples the engine will have six or eight cylinders. Further, the actual total number of engine cylinders with valves that always remain active while the engine rotates is determined. In one example, the actual total number of cylinders that have valves (e.g., intake and exhaust poppet valves) that remain active while the engine rotates is based on an amount of power the vehicle requires to operate at a desired speed (e.g., 60 KPH). If the engine has the capacity to provide the amount of power with four or more cylinders, the engine may be produced with four cylinders that have valves that always remain active (e.g., opening and closing over an engine cycle). If the engine has the capacity to provide the amount of power with six or more cylinders, the engine may be produced with six cylinders that have valves that always remain active. The remaining cylinders are provided with deactivating intake valves and non-deactivating exhaust valves. Method 1000 proceeds to 1004 after the actual total number of engine cylinders and the actual total number of cylinders with valves that always remain active are determined.

At 1004, the engine is constructed with non-deactivating intake valve operators and non-deactivating exhaust valve operators in engine cylinders that always remain active while the engine rotates. The remaining engine cylinders are provided deactivating intake valve operators and deactivating exhaust valve operators. Method 1000 proceeds to 1006 after the engine is assembled with deactivating and non-deactivating valves.

At 1006, method 1000 estimates an amount of oil in cylinders with intake valves that are deactivated during an engine cycle so that the intake valves do not open during an engine cycle or a cycle of the cylinder in which the intake valves operate. In one example, the amount of oil in engine cylinders is estimated based on the empirical model described in FIG. 8B; however, the functions and/or tables described in FIG. 8B may include different variable values than those for an engine with cylinders that are deactivated via closing only intake valves over an engine cycle. Method 1000 determines amounts of oil in each engine cylinder where intake valves of the cylinder are deactivated and where the cylinder is deactivated such that air flow through the cylinder is substantially ceased (e.g., less than 10% of the air flow through the cylinder at idle conditions). The amount of oil in each cylinder is revised each engine cycle. Method 1000 proceeds to 1008 after the oil amount in each cylinder is determined. At 1008, method 1000 prevents cylinders containing more than a threshold amount of oil from being deactivated. In other words, if a cylinder with deactivated intake and exhaust valves (e.g., intake and exhaust valves that remain closed over an engine cycle) contains more than a threshold amount of oil, the cylinder is reactivated (e.g., cylinder intake and exhaust valves open and close during an engine cycle and air and fuel are combusted in the cylinder) so that oil entry into the cylinder may be limited. The cylinder is reactivated via activating the intake valve operator and supplying spark and fuel to the cylinder. Method 1000 proceeds to exit after cylinders containing more than a threshold amount of oil are reactivated.

Figure 11:
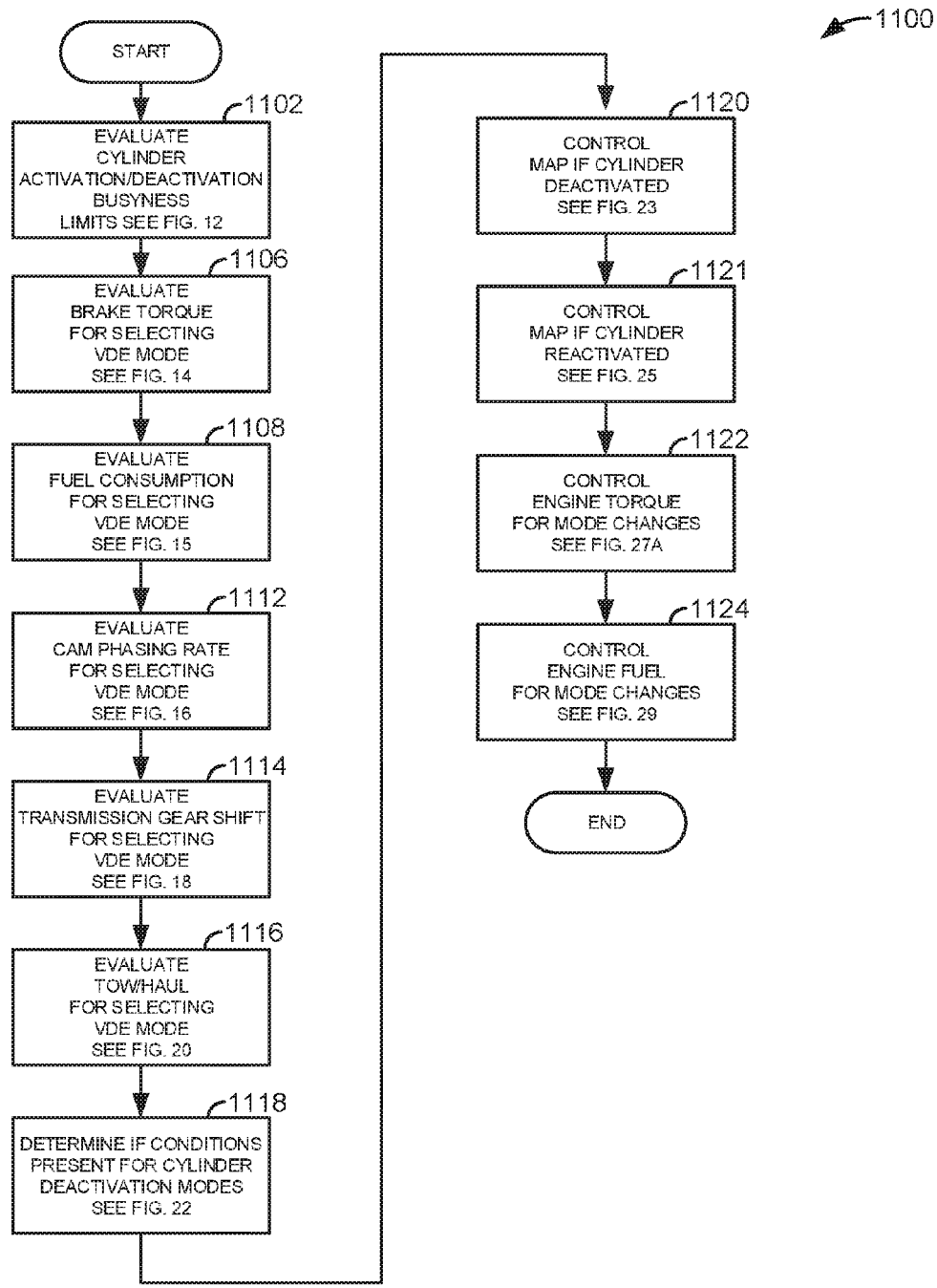
FIG. 11 is a flowchart of a method for determining available cylinder modes.

Referring now to FIG. 11, a method to determine available cylinder modes for an engine is shown. The method of FIG. 11 may be included in the system described in FIGS. 1A-6C. The method may be included as executable instructions stored in non-transitory memory. The method of FIG. 11 may perform in cooperation with system hardware and other methods described herein to transform an operating state of an engine or its components.

At 1102, method 1100 evaluates engine cylinder mode busyness against limits to determine if changing of cylinder modes is too busy or if it is reasonable. If the cylinder mode is switched too often, the vehicle's occupants may be made aware of cylinder mode shifting such that cylinder mode shifting becomes undesirable. Method 1100 evaluates cylinder mode shifting according to the method of FIG. 12 and proceeds to 1106.

At 1106, method 1100 evaluates which cylinder modes may provide a requested amount of engine brake torque. Method 1100 proceeds to the method of FIG. 14 to determine which cylinder modes may provide the requested amount of engine brake torque. Method 1100 proceeds to 1108 after determining which cylinder modes may provide the requested amount of brake torque.

At 1108, method 1100 evaluates if changing cylinder mode will reduce fuel consumption. Method 11 proceeds to the method of FIG. 15 to determine if changing the cylinder mode may conserve fuel. Method 1100 proceeds to 1112 after it is determined if changing cylinder mode will conserve fuel.

At 1112, method 1100 evaluates a cam phasing rate for determining the cylinder mode. The cam phasing rate is a rate that a cam torque actuated phasor changes a position of an engine's cam relative to a position of the engine's crankshaft. Because cam torque actuated variable valve timing phase actuators rely on valve spring force to operate, and because deactivating a cylinders valves reduces the reaction force provided by the valve springs, it may not be desirable to use some cylinder modes when high rates of change of cam phase is desired. Method 1100 evaluates the cam phase rate for available cylinder modes according to the method of FIG. 16 and then proceeds to 1114.

At 1114, method 1100 evaluates different transmission gears for selecting the cylinder mode. Method 1100 evaluates different transmission gears for selecting the cylinder mode according to the method of FIG. 18. Method 1100 proceeds to 1116 after evaluating different transmission gears for selecting the cylinder mode.

At 1116, method 1100 evaluates towing and hauling modes for selecting the cylinder mode. Method 1100 evaluates towing and hauling modes for selecting the cylinder mode according to the method of FIG. 20. Method 1100 proceeds to 1118 after evaluating towing and hauling modes for selecting the cylinder mode.

At 1118, method 1100 judges if select conditions are present for selecting the cylinder mode. Method 1100 determines of conditions are present for determining the cylinder mode according to the method of FIG. 22. Method 1100 proceeds to 1120 after determining if conditions are present for selecting the cylinder mode.

At 1120, method 1100 controls engine manifold absolute pressure (MAP) during conditions when one or more cylinders are being deactivated via deactivating intake and/or exhaust valves of engine cylinders. Further, fuel delivery to the cylinder and spark delivery to the cylinder are ceased when the cylinder is deactivated. Method 1100 controls MAP according to the method of FIG. 23 and proceeds to 1121.

At 1121, method 1100 controls engine manifold absolute pressure (MAP) during conditions when one or more cylinders are being activated via activating intake and/or exhaust valves of engine cylinders. Further, fuel delivery to the cylinder and spark delivery to the cylinder are activated when the cylinder is activated. Method 1100 controls MAP according to the method of FIG. 25 and proceeds to 1122.

At 1122, method 1100 controls engine torque during changing cylinder modes. Method 1100 controls engine torque according to the method of FIG. 27A before proceeding to 1124.

At 1124, method 1100 controls fuel supplied to the engine for changing cylinder modes. Method 1100 controls fuel supplied to the engine according to the method of FIG. 29. Method 1100 proceeds to exit after controlling fuel flow to the engine.

Figure 12:
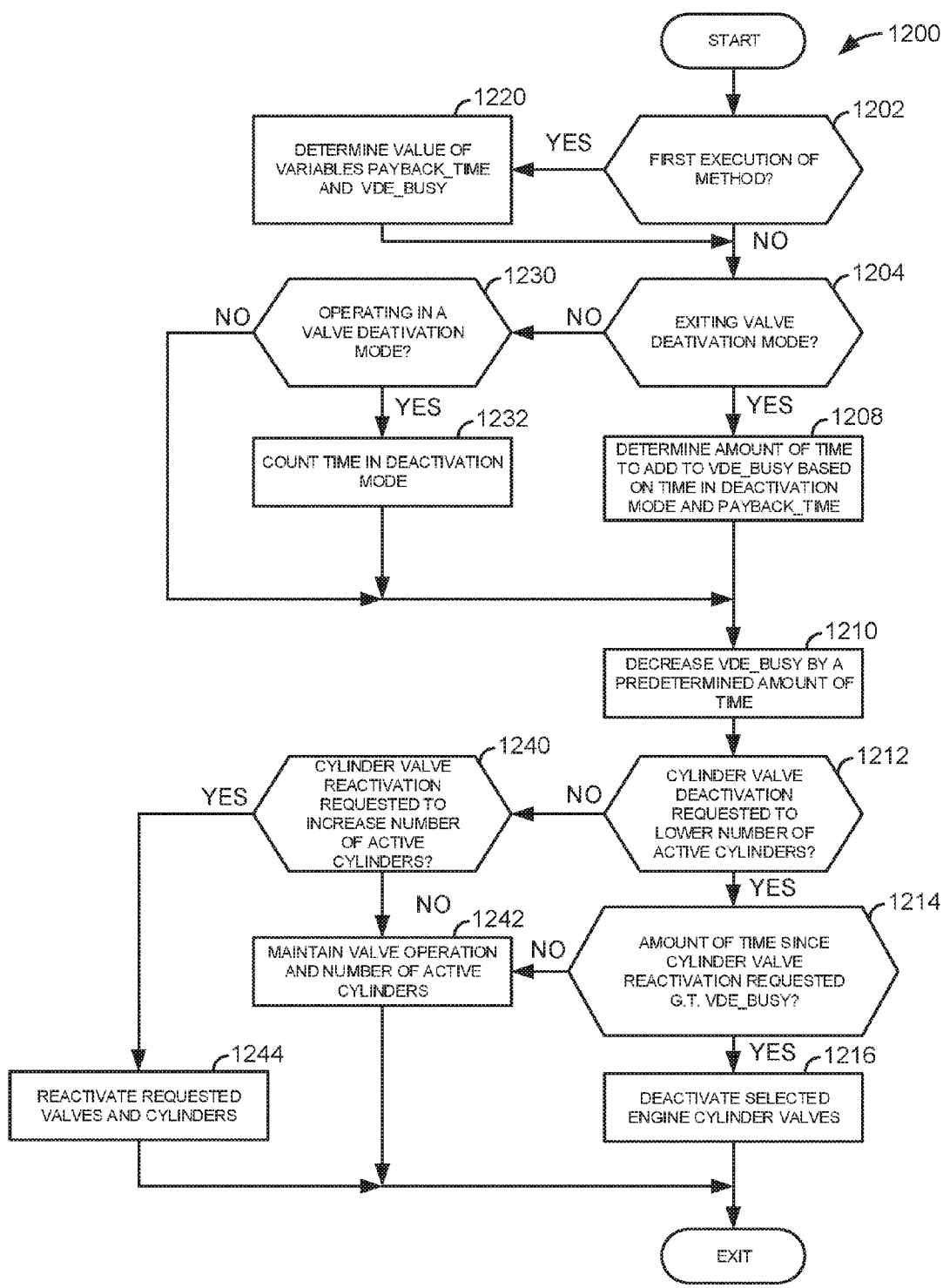
FIG. 12 is a flowchart of a method for evaluating whether or not cylinder deactivation may be performed responsive to cylinder activation/deactivation busyness.

Referring now to FIG. 12, a method for evaluating whether or not changing the cylinder mode exceeds busyness limits is shown. The method of FIG. 12 may be included in the system described in FIGS. 1A-6C. The method of FIG. 12 may be included as executable instructions stored in non-transitory memory. The method of FIG. 12 may perform in cooperation with system hardware and other methods described herein to transform an operating state of an engine or its components.

At 1202, method 1200 judges if the present execution of method 1200 is a first execution of method 1200 since the vehicle and engine were stopped and shutdown. Method 1200 may judge that the present execution of method 1200 is a first execution since the vehicle was activated after the vehicle was deactivated (e.g., stopped without intent to restart immediately). In one example, method 1200 judges that the present execution is a first execution when a value in memory is zero and the method has not been executed since a driver requested the vehicle to start via a pushbutton or key. If method 1200 judges that the present execution of method 1200 is a first execution of method 1200 since the engine was stopped, the answer is yes and method 1200 proceeds to 1220. Otherwise, the answer is no and method 1200 proceeds to 1204.

Figure 13:
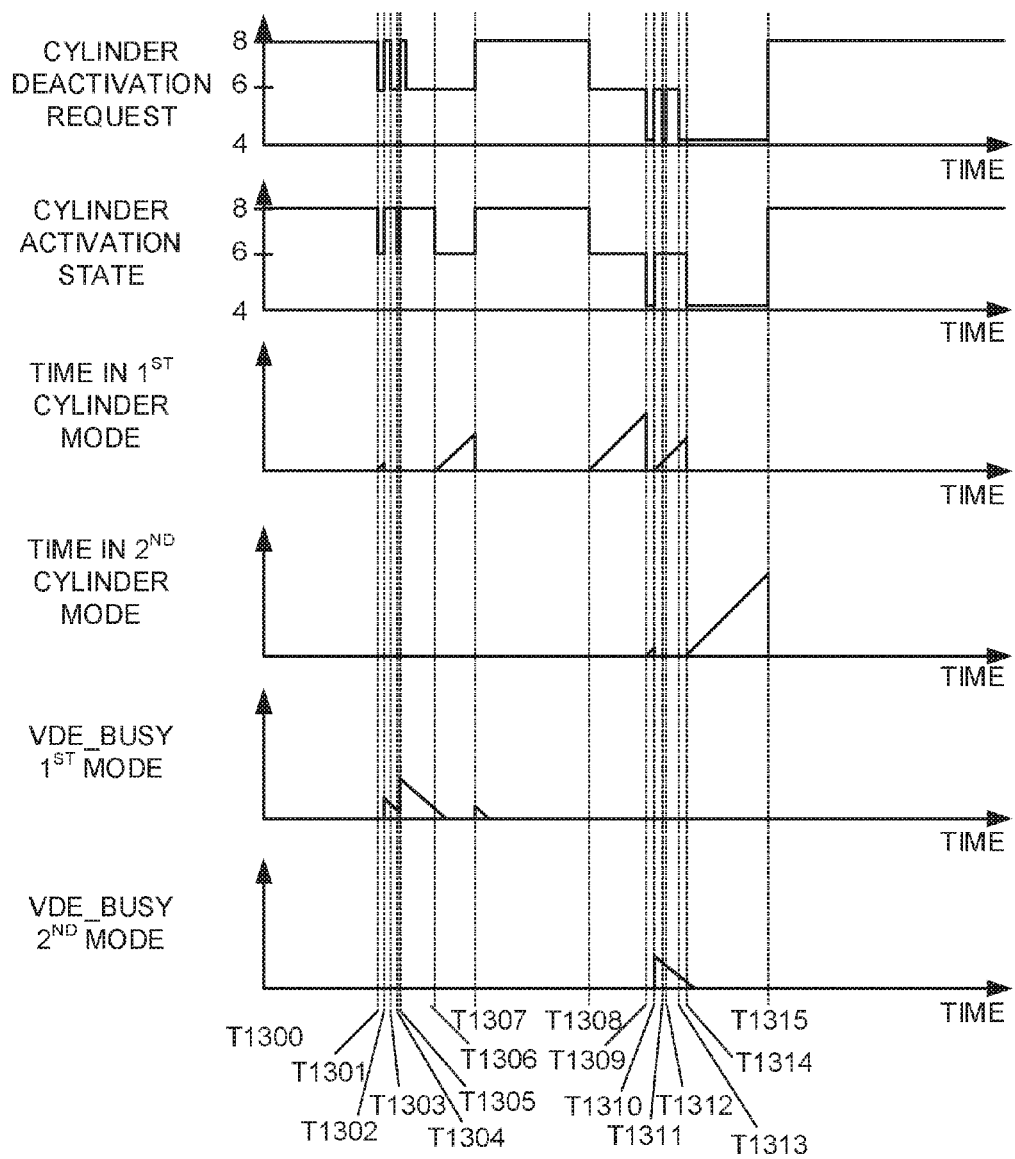
FIG. 13 is a sequence showing cylinder activation and deactivation according to the method of FIG. 12.

At 1220, method 1200 determines values of variables PAYBACK_TIME and VDE_BUSY. The variable PAYBACK_TIME is an amount of time it takes in a newly selected cylinder mode or variable displacement engine (VDE) mode to cover the fuel cost of transitioning from one cylinder mode or VDE mode to the next cylinder mode or VDE mode. The fuel cost may be due to reducing engine torque via spark retard or some other adjustment to control engine torque during mode transitions. The variable VDE_BUSY is a value that is a basis for determining whether or not cylinder mode or VDE switching is occurring at a higher than desired frequency. The value is updated based on the number of cylinder mode or VDE transitions and the amount of time spent in a cylinder mode or VDE mode. VDE_BUSY is initially set to zero and PAYBACK_TIME is empirically determined and stored in memory. In one example, the variable PAYBACK_TIME may vary depending on the cylinder mode being exited and the cylinder mode being entered. There may be VDE_BUSY variables for each cylinder mode as shown in FIG. 13. Method 1200 proceeds to 1204 after the variable values are determined.

At 1204, method 1200 judges if the engine is exiting a valve deactivation mode. Method 1200 may judge that the engine is exiting a valve deactivation mode if valves of one or more cylinders are being activated (e.g., intake valves transition from not opening and closing during an engine cycle to opening and closing during an engine cycle) in an engine cycle. If method 1200 judges that the engine is exiting a valve deactivation mode and valves of at least one cylinder are being reactivated during an engine cycle, the answer is yes and method 1200 proceeds to 1208. Otherwise, the answer is no and method 1200 proceeds to 1230.

At 1230, method 1200 judges if the engine is operating in a valve deactivation mode. Method 1200 may judge that the engine is operating in a valve deactivation mode if intake and/or exhaust valves of an engine cylinder stay closed and do not open and close during an engine cycle. If method 1200 judges that the engine is operating in a valve deactivation mode, the answer is yes and method 1200 proceeds to 1232. Otherwise, the answer is no and method 1200 proceeds to 1210.

At 1232, method 1200 counts an amount of time one or more cylinders have valves in a deactivated state to determine an amount of time the engine is in a deactivation mode. The engine may have more than one deactivation mode and time in each deactivation mode may be determined. For example, an eight cylinder engine may deactivate two cylinders or four cylinders to provide two deactivation modes. The first deactivation mode is where two cylinders are deactivated and the second deactivation mode is where four cylinders are deactivated. Method 1200 determines the amount of time the engine has two deactivated cylinders and the amount of time the engine has four deactivated cylinders. Method 1200 proceeds to 1210 after determining an amount of time one or more engine cylinders are in a deactivation mode.

At 1208, method 1200 determines an amount of time to add or subtract from the VDE_BUSY variable based on an amount of time one or mode cylinders have deactivated valves and the PAYBACK_TIME. A larger number is added to the VDE_BUSY variable if the engine has deactivated cylinders in a mode for a short period of time relative to the PAYBACK_TIME. For example, when an eight cylinder engine operates with active valves in four cylinders for four seconds method 1200 may add a value of 120 to the VDE_BUSY variable when the variable PAYBACK_TIME is 20. On the other hand, when an eight cylinder engine operates with active valves in four cylinders for 19 seconds method 1200 may add a value of 40 to the VDE_BUSY variable when the variable PAYBACK_TIME is 20. If the eight cylinder engine operates with active valves in four cylinders for 45 seconds method 1200 may add a value of −10 to the VDE_BUSY variable when the variable PAYBACK_TIME is 20. The value added to VDE_BUSY may be a linear or non-linear function of the difference between the amount of time the engine spends in the cylinder deactivation mode and the value of PAYBACK_TIME. Method 1200 proceeds to 1210 after the value of VDE_BUSY has been adjusted.

At 1210, method 1200 subtracts a predetermined amount or value from the VDE_BUSY variable. For example, method 1210 may subtract a value of 5 from the VDE_BUSY variable. By subtracting a predetermined amount from the VDE_BUSY variable, the VDE_BUSY variable may be driven toward a value of zero. The variable VDE_BUSY is limited to positive values greater than zero. Method 1200 proceeds to 1212 after subtracting the predetermined amount from the VDE_BUSY variable.

At 1212, method 1200 judges if cylinder valve deactivation is requested to lower the number of active cylinders. Cylinder valves deactivation may be requested in response to a lower driver demand torque or other driving conditions. If method 1200 judges that cylinder valve deactivation is requested from the present cylinder mode or VDE mode, the answer is yes and method 1200 proceeds to 1214. Otherwise, the answer is no and method 1200 proceeds to 1240.

At 1240, method 1200 judges if cylinder valve reactivation is requested to increase the number of active cylinders (e.g., if intake valves of two cylinders are requested to be reactivated in response to an increase in driver demand torque). Cylinder valves may be reactivated to reactivate a cylinder. The cylinder may be reactivated in response to an increase in driver demand torque or another condition. If method 1200 judges that cylinder valve reactivation is requested, the answer is yes and method 1200 proceeds to 1244. Otherwise, the answer is no and method 1200 proceeds to 1242.

At 1244, method 1200 authorizes reactivation of deactivated cylinder valves and cylinders. The cylinder valves may be reactivated via the mechanisms shown in FIGS. 6A and 6B or other known mechanisms Method 1200 proceeds to exit after authorizing reactivation of deactivated cylinder valves. The valves may be activated according to the method of FIG. 22.

At 1242, method 1200 does not authorize activating or deactivating a different number of cylinder valves than those that are presently activated or deactivated. In other words, the number of activated valves and cylinders is maintained at its present value. Method 1200 proceeds to exit after maintaining the present number of activated and deactivated cylinders.

At 1214, method 1200 judges if an amount of time since a cylinder valve reactivation request is greater than the value of variable VDE_BUSY. If so, the answer is yes and method 1200 proceeds to 1216. Otherwise, the answer is no and method 1200 proceed to 1242. In this way, cylinder valve deactivation may be delayed until an amount of time between cylinder mode or VDE mode changes is greater than the value of VDE_BUSY which increases when the frequency of cylinder valve deactivation increases and decreases when the frequency of cylinder valve deactivation decreases.

At 1216, method 1200 authorizes deactivation of selected cylinder valves to deactivate selected cylinders. Deactivation of fuel supplied to the cylinders and spark to the cylinders may also be authorized. The valves may be deactivated according to the method of FIG. 22.

Referring now to FIG. 13, an engine operating sequence according to the method of FIG. 12 is shown. The vertical lines at time T1300-T1314 represent times of interest in the sequence. FIG. 13 shows six plots and the plots are time aligned and occur at the same time. In this example, deactivating a cylinder means deactivating at least intake valves of the cylinder being deactivated so that the deactivated intake valves remain in closed states during an entire engine cycle. In some examples, exhaust valves of deactivated cylinders are also deactivated so that the exhaust valves remain in a closed state during a cycle of the engine. Spark and fuel are not supplied to deactivated cylinders so that combustion does not occur in deactivated cylinders. Alternatively, cylinder deactivation may include ceasing combustion and fuel injected to a cylinder while valves of the cylinder continue to operate.

The first plot from the top of FIG. 13 is a plot of cylinder deactivation request versus time. Engine cylinders may be deactivated in response to the cylinder deactivation request. The vertical axis represents cylinder deactivation request and the horizontal axis represents time. Time increases from the left side of the figure to the right side of the figure. In this example, the engine is an eight cylinder engine that may operate with four, six, or eight active cylinders. The numbers along the vertical axis identify which cylinders are requested or not requested to be deactivated. For example, when the trace is at the level of eight, no cylinders are requested deactivated. When the trace is at the level of six, two cylinders are requested deactivated. Four cylinders are requested deactivated when the trace is at the level of four. A cylinder deactivation request may be based on driver demand torque or other vehicle conditions. In some examples, only intake valves of a cylinder are deactivated to deactivate a cylinder. In other examples, intake valves and exhaust valves are deactivated to deactivate a cylinder. If a cylinder is deactivated, spark and fuel flow cease to the cylinder.

The second plot from the top of FIG. 13 is a plot of cylinder activation state versus time. The cylinder activation state provides the actual operating state of engine cylinders. The vertical axis represents cylinder activation state and the horizontal axis represents time. The numbers along the vertical axis identify which cylinders are activated. For example, when the trace is at the level of eight, all cylinders are activated. If the trace is at the level of six, six cylinders are activated. Four cylinders are activated when the trace is at the level of four. The horizontal axis represents time and time increases from the left side of the figure to the right side of the figure. The third plot from the top of FIG. 13 is a plot of the amount of time the engine is in the first cylinder mode, six cylinder operation in this example. The vertical axis represents the amount of time in the first cylinder mode and time in the first cylinder mode increases in the direction of the vertical axis arrow. The horizontal axis represents time and time increases from the left side of the figure to the right side of the figure.

The fourth plot from the top of FIG. 13 is a plot of the amount of time the engine is in the second cylinder mode, four cylinder operation in this example. The vertical axis represents the amount of time in the second cylinder mode and time in the second cylinder mode increases in the direction of the vertical axis arrow. The horizontal axis represents time and time increases from the left side of the figure to the right side of the figure.

The fifth plot from the top of FIG. 13 is a plot of the value of the VDE_BUSY variable for the first cylinder valve deactivation mode, six cylinder operation in this example. The vertical axis represents the value of the VDE_BUSY variable in the first cylinder mode. The value corresponds to an amount of time that has to pass after a request to enter the first cylinder mode is requested before the first cylinder mode may be entered. The horizontal axis represents time and time increases from the left side of the figure to the right side of the figure.

The sixth plot from the top of FIG. 13 is a plot of the value of the VDE_BUSY variable for the second cylinder mode, four cylinder operation in this example. The vertical axis represents the value of the VDE_BUSY variable in the second cylinder mode. The value corresponds to an amount of time that has to pass after a request to enter the second cylinder mode is requested before the second cylinder mode may be entered. The horizontal axis represents time and time increases from the left side of the figure to the right side of the figure.

At time T1300, the engine is operating with all valves and cylinders active as indicated by the cylinder activation state being a value of eight. The cylinder deactivation request is not requesting to deactivate any valves or cylinders and the amount of time in the first and second cylinder modes is zero. The VDE_BUSY variable for the first cylinder mode, which deactivates cylinders, is zero. The VDE_BUSY variable for the second cylinder mode, which deactivates cylinders, is also zero.

At time T1301, the cylinder deactivation request changes state to request deactivation of valves of two cylinders so that the eight cylinder engine operates with six active cylinders. The cylinder activation state changes state to indicate that the engine is operating with six active cylinders and with valves of two cylinders deactivated. Time begins to accumulate in the first cylinder mode because the engine is in the first cylinder mode (e.g., operating with six active cylinders). No time accumulates in the second cylinder mode because the engine is not operating in the second cylinder mode (e.g., operating with four active cylinders). The variables VDE_BUSY for the first cylinder mode and VDE_BUSY for the second cylinder mode are zero since the engine has not exited the first or second cylinder modes.

At time T1302, the cylinder deactivation request change state to request deactivation of no cylinder valves so that the engine operates as an eight cylinder engine. The cylinder activation state changes state to indicate that the engine is operating with eight active cylinders and with no deactivated valves. Accumulation of time in the first cylinder mode ceases because the engine is operating all cylinder valves and as an eight cylinder engine. No time accumulates in the second cylinder mode because the engine is not operating in the second cylinder mode. The value of VDE_BUSY for the first cylinder mode increases based on the time duration the engine was in the first cylinder mode.

At time T1303, the cylinder deactivation request again changes state to request deactivation of valves of two cylinders so that the eight cylinder engine operates with six active cylinders. The cylinder activation state does not change state because the value of VDE_BUSY for the first cylinder mode is greater than the variable PAYBACK_TIME (not shown). The value of VDE_BUSY for the first cylinder mode decreases as a predetermined amount of time is subtracted from VDE_BUSY first cylinder mode each time the method is executed. No time accumulates in the second cylinder mode because the engine is not operating in the second cylinder mode (e.g., operating with four active cylinders). VDE_BUSY for the second cylinder mode is zero since the engine has not exited the second cylinder mode.

At time T1304, the value of VDE_BUSY for the first cylinder mode is equal to or less than the value of the variable PAYBACK_TIME so cylinder valves are deactivated to provide six cylinder engine operation as indicated by the cylinder activation state transitioning to the level that indicates six cylinder engine operation. The amount of time in the first cylinder mode begins to increase. The amount of time in the second cylinder mode remains at zero. The value of VDE_BUSY for the first cylinder valve deactivation mode continues to decrease and the value of VDE_BUSY for the second cylinder valve deactivation mode remains at zero.

At time T1305, the cylinder deactivation request transitions back to the value of eight. The cylinder activation state also transitions back to a value of eight based on the cylinder deactivation request. The amount of time in the first cylinder mode is small so the value of VDE_BUSY for the first cylinder mode is increased by a large amount. The value of VDE_BUSY for the second cylinder mode is zero because the engine was not in the second cylinder mode. Shortly thereafter, the cylinder deactivation request transitions to a value of six to request deactivation of valves in two engine cylinders so that the engine operates as a six cylinder engine combusting air fuel mixtures in six of eight cylinders. However, the engine is not switched into six cylinder operation as indicated by the cylinder activation state remaining at a value of eight. The engine does not switch into six cylinder mode and deactivate valves of two cylinders because the value of VDE_BUSY for the first cylinder mode is greater than the value of the variable PAYBACK_TIME (not shown).

At time T1306, the engine transitions to six cylinder mode where cylinder valves in two engine cylinders are deactivated to deactivate two cylinders. Fuel and spark are not provided to the two deactivated cylinders. The cylinder activation state transitions to a value of six to indicate that the engine is operating in six cylinder mode with cylinder valves deactivated in two cylinders. The amount of time in the first cylinder mode begins to increase. The amount of time in the second cylinder mode remains at zero. The value of VDE_BUSY for the first cylinder mode continues to decrease and the value of VDE_BUSY for the second cylinder mode remains at zero.

At time T1307, the cylinder deactivation request transitions to eight to request eight active cylinders. The amount of time the engine operated in the first cylinder mode is long so the value of VDE_BUSY for the first mode is revised to a small value. The cylinder activation state is transitioned to a value of eight to indicate that the engine has activated all eight cylinders and valves. The amount of time in the second cylinder mode is zero and the value of VDE_BUSY for the second cylinder mode is zero.

At time T1308, the cylinder deactivation request transitions to a value of six in response to a reduced driver demand torque (not shown). At nearly the same time, the cylinder activation state also transitions to a value of six based on the cylinder deactivation request. The amount of time in the first cylinder mode begins to increase and the amount of time in the second cylinder mode remains at zero. The values of VDE_BUSY for the first and second valve deactivation modes are zero.

At time T1309, the cylinder deactivation request transitions to a value of four in response to driver demand torque (not shown). The cylinder activation state also transitions to a value of four in response to the cylinder deactivation request value. The amount of time in the first cylinder mode is transitioned to zero and the VDE_BUSY value for the first cylinder mode is made zero. The amount of time in the second cylinder mode begins to increase and the VDE_BUSY value for the second cylinder valve deactivation mode remains at a value of zero. At time T1310, the cylinder valve deactivation request transitions back to a value of six in response to the driver demand torque increasing (not shown). The cylinder activation state transitions back to a value of six in response to the value of the cylinder deactivation request. The value of VDE_BUSY for the second cylinder valve deactivation mode is increased in response to the short amount of time the engine is operated in four cylinder mode. The amount of time in the first cylinder mode begins to increase and the amount of time in the second cylinder mode is made zero.

At time T1311, the cylinder deactivation request transitions back to a value of four in response to the driver demand torque decreasing (not shown). The cylinder activation state remains at a value of six because the value of VDE_BUSY for the second cylinder mode is greater than the value of the variable PAYBACK_TIME (not shown). The amount of time in the first cylinder mode continues to increase and the amount of time in the second cylinder mode remains at zero. The value of VDE_BUSY for the first cylinder valve deactivation mode remains at zero.

At time T1312, the cylinder deactivation request transitions back to a value of six in response to the driver demand torque increasing (not shown). The cylinder activation state is at a value of six based on the value of the cylinder deactivation request. The amount of time in the first cylinder mode continues to increase and the amount of time in the second cylinder mode is zero. The value of VDE_BUSY for the second cylinder mode continues to decrease since the engine was not transitioned out of the second cylinder mode.

At time T1313, the cylinder deactivation request transitions to a value of four in response to the driver demand torque decreasing (not shown). The cylinder activation state remains at a value of six because the value of VDE_BUSY for the second cylinder mode is greater than the value of the variable PAYBACK_TIME (not shown). Thus, valves of two cylinders are deactivated even though the cylinder deactivation request is at a value of four. The amount of time in the first cylinder mode continues to increase and the amount of time in the second cylinder mode remains at zero. The value of VDE_BUSY for the first cylinder mode remains at zero.

At time T1314, the cylinder deactivation request remains at a value of four and the cylinder activation state transitions to a value of four in response to the value of PAYBACK_TIME (not shown). Thus, valves of four cylinders are deactivated and four cylinders are activated. The amount of time in the first cylinder mode is transitioned to zero and the VDE_BUSY value for the first cylinder mode is made zero. The amount of time in the second cylinder mode begins to increase and the VDE_BUSY value for the second cylinder mode continues to decrease.

At time T1315, the cylinder deactivation request transitions to a value of eight to request activation of all cylinder valves and cylinders. The cylinder activation state is transitioned to a value of eight to indicate that all cylinder valves and cylinders are activated. The amount of time in the second cylinder mode is long so the value of VDE_BUSY for the second valve mode is made small, thereby permitting a quick transition into four cylinder mode where cylinder valves of four cylinders are deactivated.

Thus, it may be observed that entry into various cylinder modes may be prevented based on the amount of time in a cylinder mode relative to a payback time. Further, the cylinder modes are not locked out in response to cylinder mode shifting busyness. Instead, entry into the various cylinder modes may be delayed for varying amounts of time to reduce a driver's perception of cylinder mode switching busyness.

Figure 14:
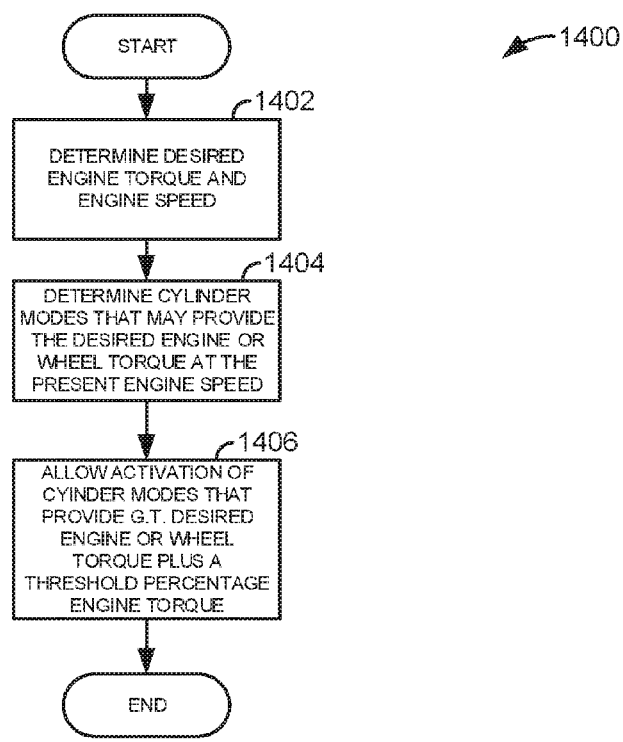
FIG. 14 is a flowchart of a method for evaluating engine fuel consumption as a basis for selectively allowing cylinder deactivation.

Referring now to FIG. 14, a method for evaluating engine brake torque in available cylinder modes as a basis for selectively allowing cylinder deactivation is shown. The method of FIG. 14 may be included in the system described in FIGS. 1A-6C. The method of FIG. 14 may be included as executable instructions stored in non-transitory memory. The method of FIG. 14 may perform in cooperation with system hardware and other methods described herein to transform an operating state of an engine or its components.

At 1402, method 1400 determines a desired engine torque and present engine speed. Engine speed may be determined via an engine position or speed sensor. An amount of time it takes for the engine to travel between two positions is the engine speed. The desired engine torque may be determined from a driver demand torque. In one example, the driver demand torque is based on accelerator pedal position and vehicle speed. Accelerator pedal position and vehicle speed index a table of empirically determined driver demand torque values. The driver demand torque value corresponds to a desired torque at a position along the driveline. The position along the driveline may be the engine crankshaft, the transmission input shaft, transmission output shaft, or vehicle wheel. If the driver demand torque is an engine torque, output from the table is the desired or demanded engine torque. Torques at other locations along the driveline may be determined via adjusting a desired torque at one location based on gear ratios, torque multiplication devices, losses, and torque capacities of clutches.

For example, if driver demand torque is a wheel torque, engine torque may be determined by multiplying the driver demand torque (or the desired wheel torque) by the gear ratios between the wheel and the engine. Further, if the driveline includes a torque converter, the desired wheel torque may be divided by the torque converter torque multiplication factor to determine engine torque. Torque transferred via clutches may be estimated as a multiplier. For example, if a clutch is not slipping torque input to the clutch equals torque output from the clutch and the multiplier value is one. Torque input to the clutch multiplied by one yields clutch output torque. If the clutch is slipping, the multiplier is a value from 0 to a number less than one. The multiplier value may be based on the clutch's torque capacity. Method 1400 proceeds to 1404.

At 1404, method 1400 determines cylinder modes that may provide the desired engine torque. In one example, an engine torque table may be provided that describes maximum engine torque output as a function of cylinder mode and engine speed. The desired engine torque is compared to engine cylinder valve timing and barometric pressure compensated outputs from the engine torque table indexed by the cylinder mode at the present engine speed, barometric pressure, and cylinder valve timing (e.g., intake valve closing timing). If the engine torque table outputs a torque value that is greater than the desired engine torque plus an offset torque, the cylinder mode corresponding to the torque output by the table may be determined to be a cylinder mode that provides the desired engine torque. Values stored in the engine torque table may be empirically determined and stored to controller memory.

On example of an engine brake torque table is shown in FIG. 1. It is an engine torque table for a four cylinder engine. The engine torque table may include torque output values for three cylinder modes; a mode with two active cylinders, a mode with three active cylinders, and a mode with four active cylinders. The engine torque table may also include a plurality of engine speeds. Torque values between the engine speeds may be interpolated.

TABLE 1

|  |  | Engine speed | | | | |
| --- | --- | --- | --- | --- | --- | --- |
|  |  | 500 | 1000 | 2000 | 3000 | 4000 |
| Active cylinders | 2 | 39 | 48 | 52 | 49 | 43 |
|  | 3 | 58 | 74 | 79 | 76 | 65 |
|  | 4 | 77 | 96 | 104 | 100 | 88 |

Table 1.

Thus, table 1 includes rows of active cylinder modes and columns of engine speed. Table 1 outputs torque values in units of N-m in this example. The engine brake torque values output from the brake torque table may be adjusted by functions based on spark timing from minimum spark for best torque (MBT), intake valve closing time from a nominal intake valve closing time, engine air-fuel ratio, and engine temperature. The functions output empirically determined multipliers that modify the engine brake torque value output from the engine brake torque table. The desired engine brake torque is compared to the modified value output from the engine brake torque table. Note that a desired wheel torque may be converted to a desired engine torque via multiplying the desired wheel torque by the gear ratio between the wheels and the engine. Further, determining engine torque may include modifying the wheel torque according to the torque multiplication of the transmission torque converter. Additionally, or alternatively, cylinder modes that include different firing orders or active cylinders in an engine cycle may also be a basis for indexing and storing values in an engine brake torque table. Method 1400 proceeds to 1406.

At 1406, method 1400 allows cylinder modes that provide the desired engine torque to be allowed. Allowed cylinder modes may be activated at 716 of FIG. 7.

An example using table 1: table 1 is indexed by engine speed and cylinder mode. The cylinder mode begins at a minimum value, two in this example, and it incremented until it reaches the maximum cylinder mode. For example, if the engine is operating at 1000 RPM and the desired engine torque is 54 N-m, table 1 outputs a value of 48 N-m corresponding to 1000 RPM and cylinder mode two (e.g., two active cylinders), 74 N-m corresponding to 1000 RPM and cylinder mode three (e.g., three active cylinders), and 96 N-m corresponding to 1000 RPM and cylinder mode four (e.g., four active cylinders). The cylinder mode with two active cylinders at 1000 RPM is not allowed because two active cylinders lack capacity to provide the desired 74 N-m of torque. Cylinder modes with three and four cylinders are allowed. In some examples, the desired engine torque plus a predetermined offset is compared to values output from the table. If the desired engine torque plus the predetermined offset is greater than an output from the table, the cylinder mode corresponding to the table output is not allowed. Allowed and not allowed cylinder modes may be indicated by values of variables stored in memory. For example, if three cylinder mode is allowed at 1000 RPM, a variable in memory corresponding to three cylinder mode at 1000 RPM may be populated with a value of one. If cylinder mode three is not allowed at 500 RPM, a variable in memory corresponding to cylinder mode three at 500 RPM may be populated with a value of zero. Method 1400 proceeds to exit.

Thus, engine cylinder modes and engine brake torque available in the cylinder modes may be a basis for determining which cylinder mode the engine operates with. Further, cylinder modes with lower fuel consumption may be given selection priority so that fuel may be conserved.

Figure 15:
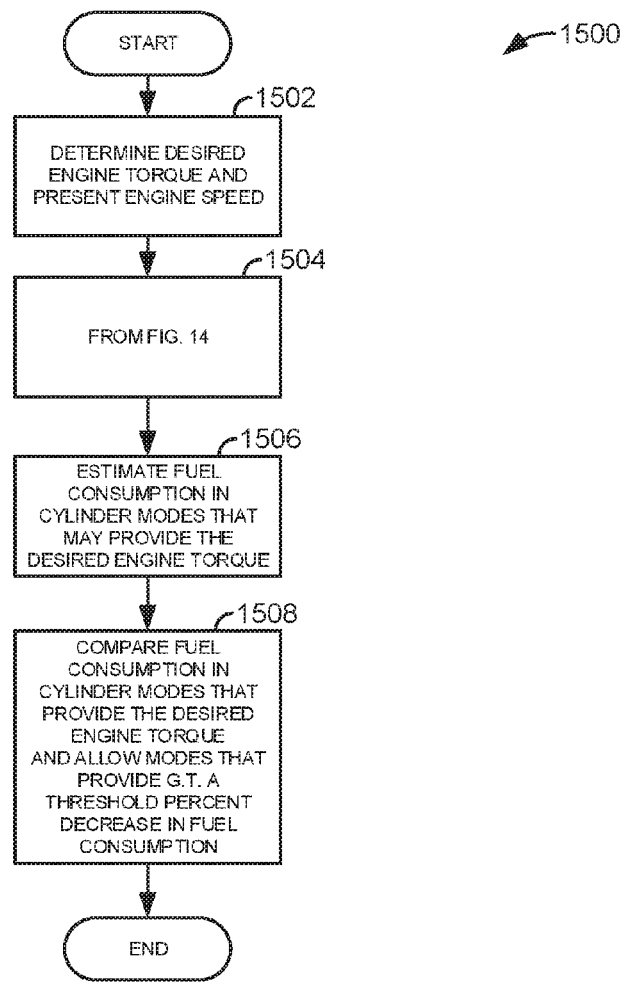
FIG. 15 is a flowchart of a method for evaluating engine fuel consumption as a basis for selectively allowing cylinder deactivation.

Referring now to FIG. 15, a method for evaluating engine fuel consumption in available cylinder modes as a basis for selectively allowing cylinder deactivation is show. The method of FIG. 15 may be included in the system described in FIGS. 1A-6C. The method of FIG. 15 may be included as executable instructions stored in non-transitory memory. The method of FIG. 15 may perform in cooperation with system hardware and other methods described herein to transform an operating state of an engine or its components.

At 1502, method 1500 determines a desired engine torque and present engine speed. Engine speed may be determined via an engine position or speed sensor. Method 1500 proceeds to 1504.

At 1504, method 1500 determines cylinder modes that may provide the desired engine torque. In one example, cylinder modes that may provide the desired engine torque are determined as described in FIG. 14.

At 1506, method 1500 estimates fuel consumption in cylinder modes that are allowed. The allowed cylinder modes are from 1406 of FIG. 14. In one example, a brake specific fuel table or function indexed by cylinder modes from the allowed cylinder modes from FIG. 14, engine speed, and desired engine torque outputs a brake specific fuel consumption value. Values stored in the brake specific fuel table may be empirically determined and stored to controller memory. The brake specific fuel consumption value may be adjusted by functions based on spark timing from minimum spark for best torque (MBT), intake valve closing time from a nominal intake valve closing time, engine air-fuel ratio, and engine temperature. The functions output empirically determined multipliers that modify the brake specific fuel consumption value output from the table. Brake specific fuel values for each allowed cylinder mode at the present engine speed are output from the brake specific fuel table. For example, from the example described at 1406, the actual number of active cylinders is three and four since three and four cylinder modes provide the desired engine torque. Method 1500 proceeds to 1508.

At 1508, method 1500 compares fuel consumption for the allowed cylinder modes that can provide the requested torque. In one example, the present engine fuel consumption, which may be determined by the present engine fuel flow rate, is compared to values output from the brake specific fuel table for allowed cylinder modes. The comparison may be performed by subtracting values output from the brake specific fuel table from the present engine fuel consumption rate. Alternatively, the comparison may be based on dividing the present engine fuel consumption value by the values output from the brake specific fuel table. Cylinder modes that provide greater than a threshold percentage improvement in engine fuel economy over the present cylinder mode are allowed.

Thus, cylinder modes and fuel consumption in the cylinder modes may be a basis for determining which cylinder mode the engine operates with. Further, cylinder modes with lower fuel consumption may be given selection priority so that fuel may be conserved.

Figure 16:
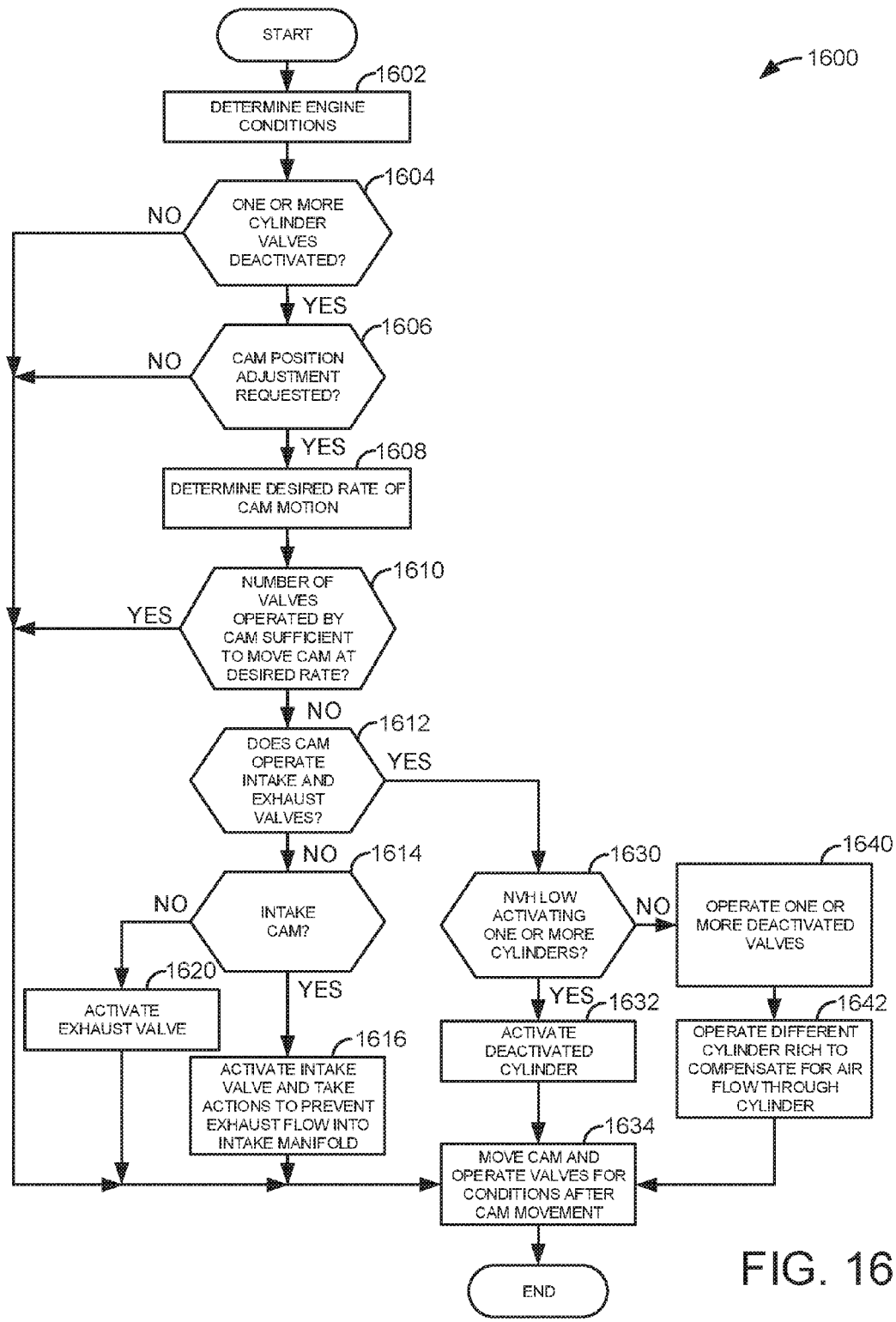
FIG. 16 is a flowchart of a method for evaluating engine cam phasing for selecting engine cylinder modes.

Referring now to FIG. 16, a method for evaluating a rate of cam phasing for cam torque actuated cam phase adjustments is shown. The method of FIG. 16 may be included in the system described in FIGS. 1A-6C. The method of FIG. 16 may be included as executable instructions stored in non-transitory memory. The method of FIG. 16 may perform in cooperation with system hardware and other methods described herein to transform an operating state of an engine or its components. Method 1600 may be performed for each engine camshaft.

At 1602, method 1600 determines engine conditions. Engine conditions may include but are not limited to an actual total number of cylinder valves that are deactivated during an engine cycle, engine speed, driver demand torque, vehicle speed, engine temperature, and ambient temperature. Method 1600 proceeds to 1604 after operating conditions are determined.

At 1604, method 1600 judges if one or more cylinder valves is deactivated. Method 1600 may judge that one or more cylinder is deactivated based on a value of a bit stored in memory, output of a sensor that measures valve operator position, cylinder pressure sensors, or other sensors. If method 1600 judges that one or more cylinder valves is deactivated, the answer is yes and method 1600 proceeds to 1606. Otherwise, the answer is no and method 1600 proceeds to 1634.

At 1606, method 1600 judges if a camshaft position adjustment relative to crankshaft position is desired. For example, method 1600 judges if it is desirable to advance camshaft timing 5 degrees relative to crankshaft timing so that intake or exhaust valves open 5 crankshaft degrees sooner after camshaft position is adjusted. The camshaft position may be adjusted in response to driver demand torque and engine speed. If driver demand torque is increasing rapidly and engine speed is increasing rapidly, it may be desirable to adjust camshaft position relative to crankshaft position at a higher rate of speed so that the engine provides a desired amount of torque and engine emissions. In one example, method 1600 determines if a camshaft position adjustment is desired based on a current camshaft position relative to crankshaft position and a change in driver demand torque and engine speed. If method 1600 judges that a camshaft position adjustment is desired, the answer is yes and method 1600 proceeds to 1608. Otherwise, the answer is no and method 1600 proceeds to 1634. In some examples, 1606 may be omitted and method 1600 may simply proceed to 1608.

At 1608, method 1600 determines a desired rate of camshaft position change relative to crankshaft position. In one example, method 1600 determines a desired rate of camshaft position change based on a rate of change in driver demand torque. If the rate of change of driver demand torque is low, the rate of change of camshaft position relative to crankshaft position is low. If the rate of change of driver demand torque is high, the rate of camshaft position change relative to crankshaft position is high. For example, the camshaft may be advanced at 0.5 crankshaft degrees per second when a change in driver demand torque is low (e.g., 5 N-m/second). However, if the change in driver demand torque is high (e.g., 200 N-m/second), the camshaft may be advanced at 5 crankshaft degrees per second In one example, the desired rate of camshaft position change relative to crankshaft position is empirically determined and stored to memory in a table or function. The table or function is indexed based on a rate of change in driver demand torque, the table or function outputs a desired rate of camshaft position change relative to crankshaft position. Method 1600 proceeds to 1610 after the desired rate of camshaft position change is determined.

At 1610, method 1600 judges if an actual total number of active cylinder valves (e.g., valves that open and close during an engine cycle) presently operating is sufficient to move the camshaft relative to the crankshaft at the desired rate. In one example, a table or function describes camshaft rate of position change relative to the crankshaft position based on an actual total number of active cylinder valves. The table is indexed via the actual total number of active valves and it outputs a rate of camshaft position change relative to crankshaft position. Values in the table or function are empirically determined and stored in memory. Output from the table or function is compared to the value determined at 1608. If the camshaft rate of position change from 1610 is greater than the camshaft rate of position change from 1608, the answer is yes and method 1600 proceeds to 1634. Otherwise, the answer is no and method 1600 proceeds to 1612.

At 1612, method 1600 judges if the camshaft operates both intake and exhaust valves. In one example, a bit in memory identifies the camshaft as operating only intake valves if a value of the bit is zero. If the value of the bit is one, the camshaft operates both intake and exhaust valves. If method 1600 judges that the camshaft operates intake and exhaust valves, the answer is yes and method 1600 proceeds to 1630. Otherwise, the answer is no and method 1600 proceeds to 1614.

At 1614, method 1600 judges if the camshaft is an intake camshaft. Method 1600 may judge if the camshaft is an intake camshaft based on a value of a bit stored in memory. The bit may be programmed at time of manufacture. If method 1600 judges that the camshaft is an intake camshaft, the answer is yes and method 1600 proceeds to 1616. Otherwise, the answer is no and method 1600 proceeds to 1620.

At 1620, method 1600 authorizes activating one or more deactivated exhaust valves. In one example, the desired rate of exhaust camshaft position change relative to crankshaft position determined at 1608 is used to index a table or function of empirically determined values that describe an actual total number of valves that have to operate to provide the desired rate of exhaust camshaft position adjustment relative to crankshaft position. Method 1600 requests or authorizes operation of the actual total number of exhaust valves output from the table or function. The exhaust valves may be activated with or without activating cylinders that include the exhaust valves being activated. If the driver demand torque is increasing, the cylinders with exhaust valves being activated may be activated to increase engine torque while increasing the camshaft position change. If the driver demand torque is decreasing, the cylinders with exhaust valves being activated may not be activated so that fuel consumption may be reduced. Method 1600 proceeds to 1634.

At 1634, method 1600 moves the camshaft and operates valves for operating conditions after the camshaft is moved. The camshaft may be moved while valves are being activated to move the camshaft to a desired position as soon as possible. After the camshaft reaches its desired position relative to the crankshaft position, cylinder valves may be deactivated based on vehicle conditions other than the desired rate of camshaft position change. In this way, valves may be reactivated to improve a rate that a camshaft position moves relative to a crankshaft position. The engine cylinders may also be reactivated when the cylinder valves are reactivated. Method 1600 proceeds to exit after the camshaft begins to move to its desired new position based on driver demand torque and engine speed.

At 1616, method 1600 authorizes activating one or more deactivated intake valves. In one example, the desired rate of intake camshaft position change relative to crankshaft position determined at 1608 is used to index a table or function of empirically determined values that describe an actual total number of valves that have to operate to provide the desired rate of intake camshaft position adjustment relative to crankshaft position. Method 1600 requests or authorizes operation of the actual total number of intake valves output from the table or function. The cylinders that include the intake valves that are being activated may be activated or they may not combust air and fuel during engine cycles when the intake valves are being operated. In one example, the cylinders with intake valves being activated combusts air and fuel during engine cycles in response to an increase in driver demand torque. The cylinders with intake valves being activated may not combust air and fuel during engine cycles in response to a decrease in driver demand torque. Deactivated intake valves may be activated as described at FIG. 22.

In addition, method 1600 may increase an amount of boost provided to the engine so that the additional boost may blow exhaust gases from the cylinder before the exhaust valve of the cylinder being reactivated is closed. By clearing exhaust gases from the cylinder, combustion stability may improve and the cylinder may provide additional power. Additionally, an amount of overlap (e.g., open time) between the cylinder's intake valves and exhaust valves may be increased to further allow pressurized air from the intake manifold to clear out the cylinder being activated. Method 1600 proceeds to 1634 after intake valves are activated.

At 1630, method 1600 judges if engine noise vibration and harshness (NVH) are less than threshold levels if one or more cylinders are reactivated and combustion occurs in the reactivated cylinders. In one example, method 1600 judges if reactivating one or more cylinders including combusting air and fuel in the reactivated cylinders will produce NVH greater than is desired based on output of a table or function that describes engine and/or powertrain NVH. The table is indexed via engine speed, driver demand torque, and cylinder mode being activated (e.g., four or six cylinder mode). The table outputs a numerical value that is empirically determined, via a microphone or accelerometer for example. If the output value is less than a threshold value, the answer is yes and method 1600 proceeds to 1632. Otherwise, the answer is no and method 1600 proceeds to 1640.

At 1632, method 1600 authorizes activating one or more cylinder via activating the cylinder's valves and supplying fuel, air, and spark to the cylinder. The cylinder begins combusting air and fuel when it is reactivated. Thus, if reactivating one or more cylinders to increase camshaft rate of position change produces little objectionable NVH, the cylinder is reactivated via reactivating the cylinder's valves and beginning combustion in the reactivated cylinder. Method 1600 proceeds to 1634.

At 1640, method 1600 authorizes activating one or more valves of a deactivated cylinder that is not combusting air and fuel. If the cylinder includes deactivated intake and exhaust valves, only the cylinders exhaust valves may be activated to improve the rate of camshaft position adjustment relative to crankshaft position. By reactivating only exhaust valves of the cylinder, cam torque may be increased to improve the camshaft position adjustment relative to crankshaft position without flowing air through the cylinder. Stopping air flow through the cylinder may help to keep catalyst temperature elevated and maintain a desired amount of oxygen in the catalyst. If both intake and exhaust valves of the cylinder are reactivated, air may flow through the cylinder after the intake and exhaust valves are activated. Spark and fuel are not supplied to the cylinders with reactivated valves so that NVH may not degrade. Method 1600 proceeds to 1642.

At 1642, method 1600 increases an amount of fuel delivered to an active cylinder combusting air and fuel to richen the mixture combusted by the active cylinder if air is flowing through the cylinder with one or more valves authorized to be activated at 1640. By richening the mixture of an active cylinder combusting air and fuel while air flows through a cylinder, it may be possible to maintain desired levels of hydrocarbons and oxygen in a catalyst so that the catalyst may convert exhaust gases efficiently. For example, if cylinder number eight of an eight cylinder engine has its intake and exhaust valves reactivated while cylinder number eight is not combusting air and fuel, the air-fuel ratio of cylinder number one that is combusting air and fuel may be richened to improve or maintain catalyst efficiency. Method 1600 proceeds to 1634 after enriching at least one cylinder's air-fuel ratio.

Figure 17:
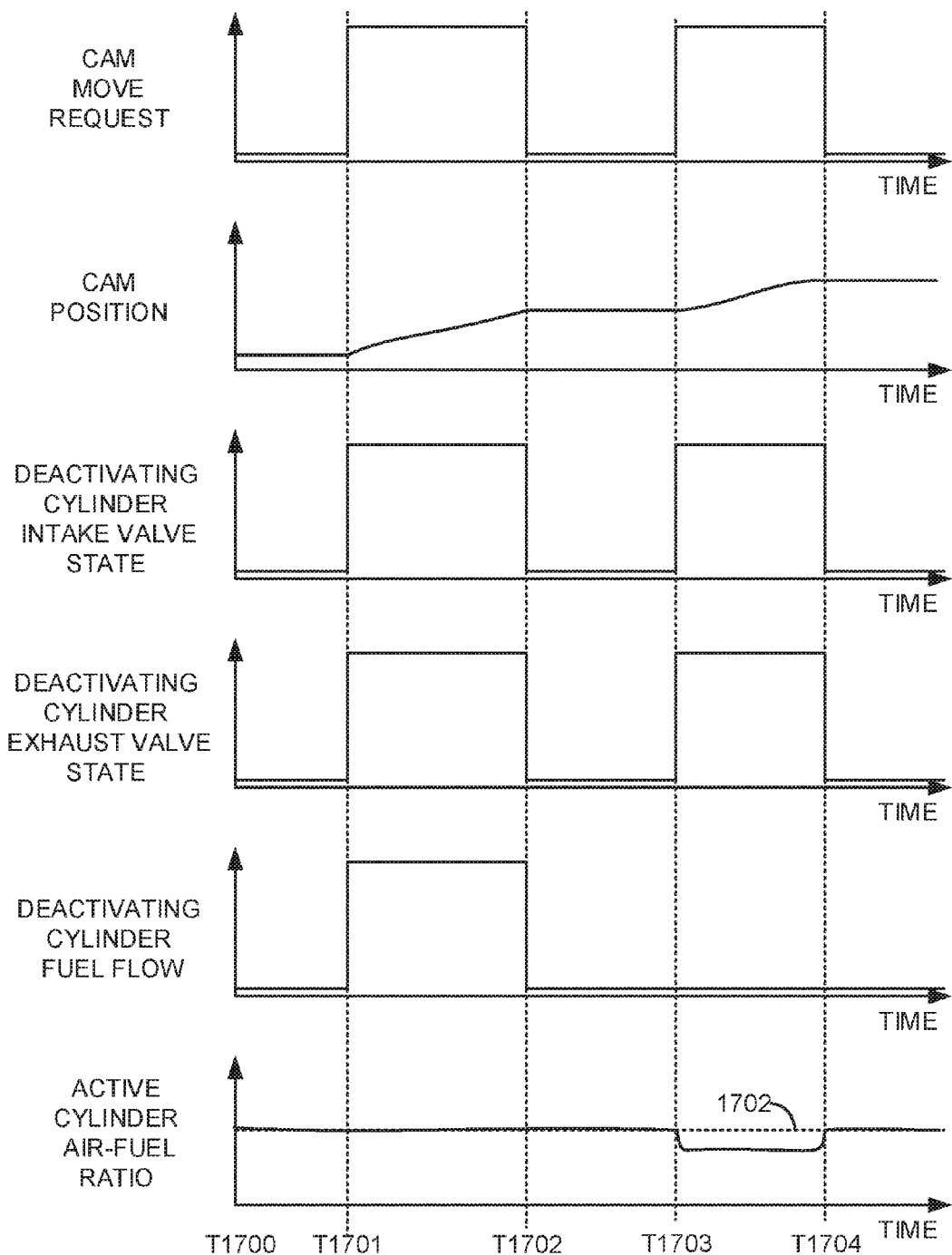
FIG. 17 is a sequence showing selecting engine cylinder modes responsive to engine cam phasing.

Referring now to FIG. 17, a sequence for operating an engine according to the method of FIG. 16 is shown. The vertical lines at time T1700-T1704 represent times of interest in the sequence. FIG. 17 shows six plots and the plots are time aligned and occur at the same time. In this example, the engine is a four cylinder engine with a firing order of 1-3-4-2. Cylinders 2 and 3 have deactivating valve operators for deactivating cylinders 3 and 4. Valves of cylinders 1 and 4 always remain active.

The first plot from the top of FIG. 17 is a plot of a camshaft movement request versus time. A camshaft movement request is a request to change a position of a camshaft relative to a position of a crankshaft For example, if a camshaft has a lobe that begins to open an intake valve of cylinder number one of an engine 370 crankshaft degrees before top-dead-center compression stroke (e.g., position of crankshaft zero degrees), the position of the camshaft may be moved relative to the crankshaft so that the camshaft lobe begins to open the intake valve of cylinder number one of the engine at 380 crankshaft degrees before top-dead-center compression stroke. Thus, in this example, the relative position of the camshaft is advanced 10 crankshaft degrees relative to the crankshaft position.

The vertical axis represents the camshaft move request. The cam move request trace is at a higher level and asserted when it is desired to move the engine camshaft relative to the engine crankshaft. The cam move request trace is at a lower level and not asserted when it is not desired to move the engine camshaft relative to the engine crankshaft. The horizontal axis represents time and time increases from the left side of the figure to the right side of the figure.

The second plot from the top of FIG. 17 is a plot of camshaft position versus time. The vertical axis represents camshaft position and the camshaft is more advanced in the direction of the vertical axis arrow. The horizontal axis represents time and time increases from the left side of the figure to the right side of the figure.

The third plot from the top of FIG. 17 is a plot of deactivating cylinder intake valve state. In this example, the deactivating cylinder may be cylinder number two or cylinder number three. The deactivating cylinder intake valve state indicates whether or not the intake valve of the deactivating cylinder is activated (e.g., opening and closing during an engine cycle) or deactivated (e.g., held closed during an entire engine cycle). The vertical axis represents deactivating cylinder intake valve state. The deactivating cylinder intake valve is active when the trace is at a higher level near the vertical axis arrow. The deactivating cylinder intake valve is deactivated when the trace is at a lower level near the horizontal axis. The horizontal axis represents time and time increases from the left side of the figure to the right side of the figure.

The fourth plot from the top of FIG. 17 is a plot of deactivating cylinder exhaust valve state. In this example, the deactivating cylinder may be cylinder number two or cylinder number three. The deactivating cylinder exhaust valve state indicates whether or not the exhaust valve of the deactivating cylinder is activated (e.g., opening and closing during an engine cycle) or deactivated (e.g., held closed during an engine cycle). The vertical axis represents deactivating cylinder exhaust valve state. The deactivating cylinder exhaust valve is active when the trace is at a higher level near the vertical axis arrow. The deactivating cylinder exhaust valve is deactivated when the trace is at a lower level near the horizontal axis. The horizontal axis represents time and time increases from the left side of the figure to the right side of the figure.

The fifth plot from the top of FIG. 17 is a plot of deactivating cylinder fuel flow state. In this example, the deactivating cylinder may be cylinder number two or cylinder number three. The deactivating cylinder fuel flow state indicates whether or not the fuel is flowing to the deactivating cylinder. The vertical axis represents deactivating cylinder fuel flow state. Fuel is flowing to the deactivating cylinder when the deactivating cylinder fuel flow trace is at a higher level near the vertical axis arrow. Fuel is not flowing to the deactivating cylinder when the deactivating cylinder fuel flow trace is at a lower level near the horizontal axis. The horizontal axis represents time and time increases from the left side of the figure to the right side of the figure.

The sixth plot from the top of FIG. 17 is a plot of active cylinder fuel air-fuel ratio. In this example, the active cylinder may be cylinder number 1 or cylinder number 4. The vertical axis represents active cylinder air-fuel ratio and the air-fuel ration increases (e.g., become leaner) in the direction of the vertical axis arrow. The horizontal axis represents time and time increases from the left side of the figure to the right side of the figure. Horizontal line 1702 represents a stoichiometric air-fuel ratio.

At time T1700, there is not a camshaft move request and the camshaft is relatively retarded. The deactivating cylinder intake valve state indicates that the deactivating cylinder intake valve is deactivated (e.g., not opening during a cycle of the engine). The deactivating cylinder exhaust valve state indicates that the deactivating cylinder exhaust valve is deactivated (e.g., not opening during a cycle of the engine). The active cylinder is operating at a stoichiometric air-fuel ratio and no fuel flows to the deactivating cylinder as indicated by the deactivating cylinder fuel flow state being at a low level.

At time T1701, the camshaft move request is asserted requesting a camshaft position change relative to a position of the engine crankshaft. The request may be initiated via an increase in a driver demand torque or a change in another operating condition. The rate of change in position of the engine camshaft relative to the position of the engine crankshaft (not shown) is greater than that which may be accomplished with the deactivating cylinder intake and exhaust valves deactivated since operating fewer valves provides less torque to actuate camshaft motion. Therefore, the deactivating cylinder's intake and exhaust valves are reactivated as indicated by the deactivating cylinder intake valve state and exhaust valve state transitioning to higher levels to indicate the intake and exhaust valves of the deactivating cylinder are reactivated. Additionally, fuel flows to the deactivating cylinder and combustion begins in the deactivating cylinder (not shown). The camshaft position is advanced while the deactivating cylinder intake and exhaust valves are activated. The air-fuel ratio of the active cylinders is stoichiometric.

At time T1702, the camshaft move request transitions to a not asserted state. The camshaft move request may transition to not asserted when the camshaft reaches its destination. Further, fuel stops flowing to the deactivating cylinder and combustion stops in the deactivating cylinder (not shown). The camshaft position reaches a middle advanced position and is maintained at its position. The air-fuel ratios of the active cylinders remain stoichiometric.

At time T1703, the camshaft move request is asserted again requesting a camshaft position change relative to a position of the engine crankshaft. The request may be initiated via an increase in a driver demand torque or a change in another operating condition. The rate of change in position of the engine camshaft relative to the position of the engine crankshaft (not shown) is greater than that which may be accomplished with the deactivating cylinder intake and exhaust valves deactivated since operating fewer valves provides less torque to actuate camshaft motion. As a result, the deactivating cylinder's intake and exhaust valves are reactivated as indicated by the deactivating cylinder intake valve state and exhaust valve state transitioning to higher levels to indicate the intake and exhaust valves of the deactivating cylinder are reactivated. Fuel flow to the deactivating cylinders remains stopped. In this example, combustion is not reinitiated in the deactivating cylinders because reactivating the deactivating cylinders is expected to produce NVH levels greater than is desired. The camshaft position is advanced while the deactivating cylinder intake and exhaust valves are activated. The air-fuel ratio of the active cylinders is enrichened so that when the richened exhaust from the activated cylinders meets with oxygen from the deactivating cylinders, a stoichiometric exhaust gases are provided to the catalyst.

At time T1704, the camshaft move request transitions to a not asserted state. The camshaft move request may transition to not asserted when the camshaft reaches its destination. Further, the deactivating cylinder's intake and exhaust valves are deactivated as indicated by the deactivating cylinder intake and exhaust valve states. The camshaft position reaches a fully advanced position and is maintained at its position. The air-fuel ratios of the active cylinders transition back to a stoichiometric air-fuel ratio by leaning the air-fuel mixtures of the deactivating cylinders.

In this way, cylinder intake and exhaust valves that have been deactivated may be reactivated to provide more rapid position adjustments to the engine camshaft. Further, stoichiometric exhaust gases may be provided to a catalyst to maintain catalyst efficiency whether air or exhaust gases flow from deactivating cylinders.

Figure 18:
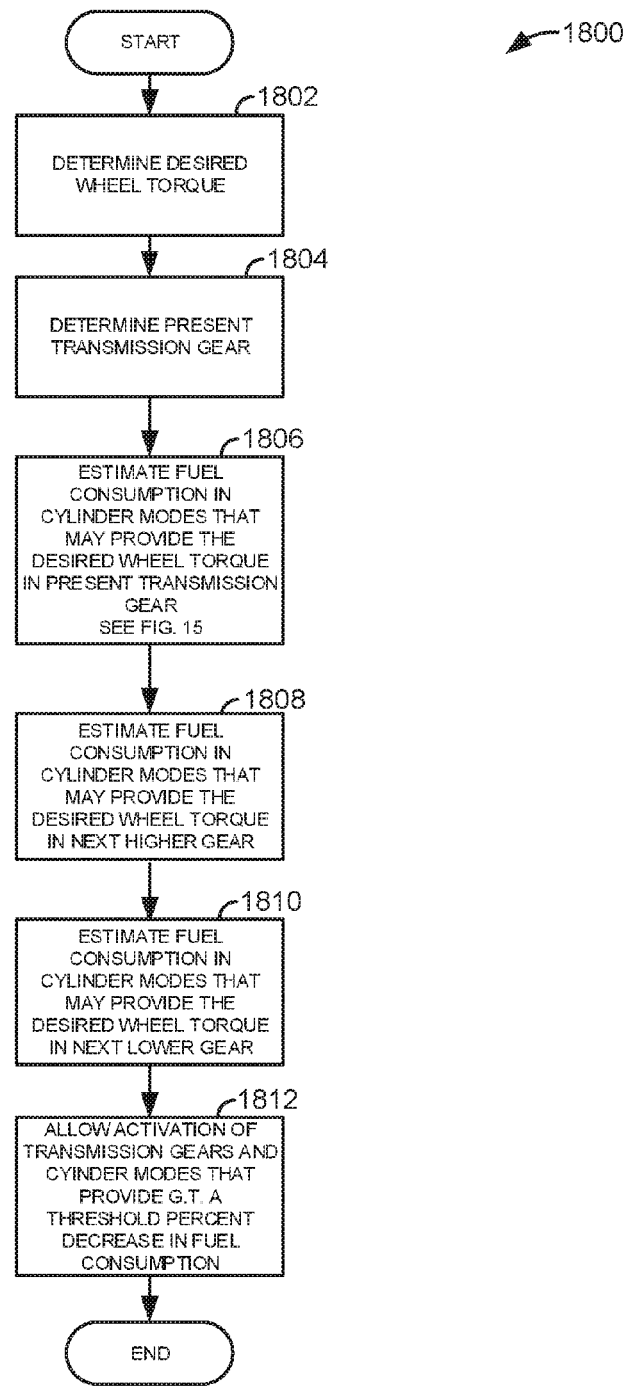
FIG. 18 is a flowchart of a method for selecting engine cylinder mode responsive to engine fuel consumption based on operating an engine in various transmission gears.

Referring now to FIG. 18, a method for judging whether or not to shift transmission gears when evaluating cylinder mode changes is shown. The method of FIG. 18 may be included in the system described in FIGS. 1A-6C. The method of FIG. 18 may be included as executable instructions stored in non-transitory memory. The method of FIG. 18 may perform in cooperation with system hardware and other methods described herein to transform an operating state of an engine or its components.

At 1802, method 1800 determines a desired wheel torque. In one example, desired wheel torque is determined based on accelerator pedal position and vehicle speed. For example, accelerator pedal position and vehicle speed index a table that outputs desired wheel torque. Values in the table may be empirically determined and stored to controller memory. In other examples, accelerator pedal position and vehicle speed may index a table that outputs desired engine brake torque or torque at another location of the driveline (e.g., transmission input shaft). The output from the table is multiplied by gear ratios between the torque location (e.g., engine), torque converter multiplication, and driveline torque losses to estimate desired wheel torque. Method 1800 proceeds to 1804.

At 1804, method 1800 determines the presently selected transmission gear. Method 1800 may determine the presently selected transmission gear via a value of a location in controller memory. For example, a variable in memory may range from a value of 1-10, which indicates the presently selected gear ratio. Method 1800 proceeds to 1806.

At 1806, method 1800 estimates engine fuel consumption in cylinder modes that may provide the desired wheel torque the present transmission gear. Method 1800 determined engine brake specific fuel consumption in the present transmission gear according to the method of FIG. 15. Method 1800 proceeds to 1808.

At 1808, method 1800 estimates engine fuel consumption in cylinder modes that may provide the desired wheel torque the next higher transmission gear. For example, if the transmission is presently in $3^{rd}$ gear, engine fuel consumption to provide equivalent wheel torque with the transmission in $4^{th}$ gear is determined. In one example, method 1800 determines engine brake specific fuel consumption in the next higher transmission gear as follows: the present vehicle speed is divided by the gear ratio between engine and the wheels including the next higher transmission gear to estimate the engine speed in the next higher transmission gear. The present wheel torque is divided by the gear ratio between the engine and the wheels to estimate engine torque for providing equivalent wheel torque in the next higher transmission gear. The gear ratio between the engine and the wheels may also be compensated for the torque converter if one is present. Method 1800 determines cylinder modes that may provide the desired wheel torque in the next higher transmission gear according to the method of FIG. 14 using the estimate of engine torque in the next higher gear that provides equivalent wheel torque to the present wheel torque. Note that the present wheel torque may be the desired wheel torque. The estimated engine fuel consumption is then determined as described in the description of the method of FIG. 15. Method 1800 proceeds to 1810.

At 1810, method 1800 estimates engine fuel consumption in cylinder modes that may provide the desired wheel torque the next lower transmission gear. For example, if the transmission is presently in $3^{rd}$ gear, engine fuel consumption to provide equivalent wheel torque with the transmission in 2nd gear is determined. In one example, method 1800 determines engine brake specific fuel consumption in the next lower transmission gear as follows: the present vehicle speed is divided by the gear ratio between engine and the wheels including the next lower transmission gear to estimate the engine speed in the next higher transmission gear. The present wheel torque is divided by the gear ratio between the engine and the wheels to estimate engine torque for providing equivalent wheel torque in the next lower transmission gear. The gear ratio between the engine and the wheels may also be compensated for the torque converter if one is present. Method 1800 determines cylinder modes that may provide the desired wheel torque in the next lower transmission gear according to the method of FIG. 14 using the estimate of engine torque in the next lower gear that provides equivalent wheel torque to the present wheel torque. Note that the present wheel torque may be the desired wheel torque. The estimated engine fuel consumption is then determined as described in the description of the method of FIG. 15. Method 1800 proceeds to 1812.

In some examples, method 1800 estimates engine fuel consumption in cylinder modes that may provide the desired wheel torque for all transmission gears. For example, if the transmission is presently in $3^{rd}$ gear, and the transmission includes five forward gears, engine fuel consumption to provide equivalent wheel torque with the transmission in gears 1, 2, 4, and 5 is determined. In this way, it may be possible to select whichever gear provides the most improvement in vehicle fuel economy.

At 1812, method 1800 allows activation of transmission gears and cylinder modes that provide greater than a threshold percentage of decrease in engine fuel consumption as compared to present cylinder mode and transmission gear. In one example, brake specific engine fuel consumption in engine cylinder modes that provide the desired engine torque or wheel torque in the next higher transmission gear are divided by the brake specific engine fuel consumption in the present cylinder mode and present transmission gear. If the result is greater than a threshold, the engine cylinder modes that provide the desired engine torque or wheel torque in the next higher transmission gear are allowed. Likewise, engine fuel consumption in engine cylinder modes that provide the desired engine torque or wheel torque in the next lower transmission gear are compared to engine fuel consumption in the present cylinder mode and present transmission gear. If the result is greater than a threshold, the engine cylinder modes that provide the desired engine torque or wheel torque in the next lower transmission gear are allowed. Additionally, method 1800 may require that an expected noise level and an expected vibration level in a new gear (e.g., a higher or lower gear than the present transmission gear) are less than threshold values of noise and vibration. Noise and vibration levels may be assessed as described at FIG. 22. Further, if an engine knock sensor or other sensor detects engine vibration greater than a threshold after changing transmission gears, the transmission may be shifted back to its former gear state.

Figure 19:
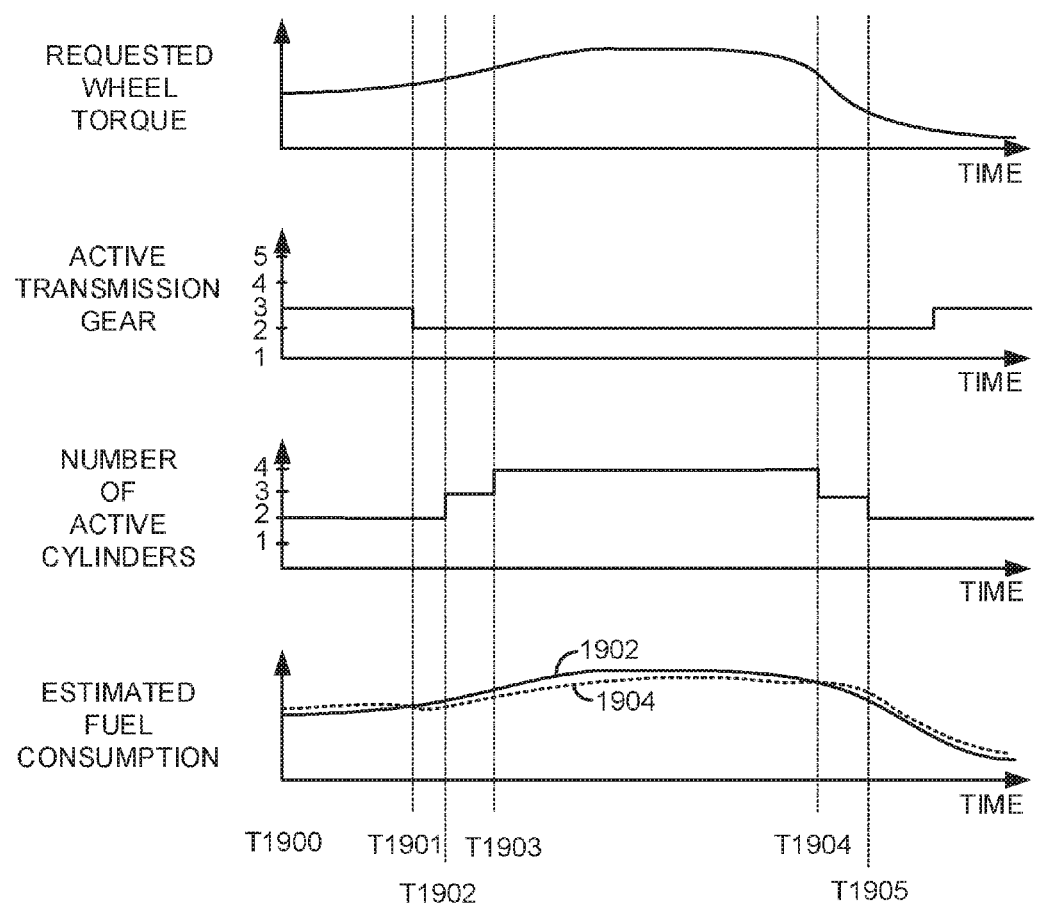
FIG. 19 is a sequence showing selecting transmission gears and an actual total number of active cylinders to improve engine fuel consumption.

Referring now to FIG. 19, a sequence for operating an engine according to the method of FIG. 18 is shown. The vertical lines at time T1900-T1905 represent times of interest in the sequence. FIG. 19 shows four plots and the plots are time aligned and occur at the same time. In this example, the vehicle is being maintained at a constant speed and requested wheel torque is varied to maintain the constant vehicle speed. The vehicle has a four cylinder engine.

The first plot from the top of FIG. 19 is a plot of a requested wheel torque versus time. In one example, requested wheel torque is based on accelerator pedal position and vehicle speed. Requested wheel torque increases in the direction of the vertical axis arrow. The horizontal axis represents time and time increases from the left side of the figure to the right side of the figure.

The second plot from the top of FIG. 19 is a plot of active transmission gear versus time. The vertical axis represents presently active transmission gear and transmission gears are indicated along the vertical axis. The horizontal axis represents time and time increases from the left side of the figure to the right side of the figure.

The third plot from the top of FIG. 19 is a plot of the actual total number of active engine cylinders versus time. The actual total number of active engine cylinders is listed along the vertical axis. The horizontal axis represents time and time increases from the left side of the figure to the right side of the figure.

The fourth plot from the top of FIG. 19 is a plot of estimated engine fuel consumption versus time. The vertical axis represents estimated engine fuel consumption and estimated engine fuel consumption increases in the direction of the vertical axis arrow. The horizontal axis represents time and time increases from the left side of the figure to the right side of the figure. Trace 1902 represents engine fuel consumption if the engine is operated with the transmission in third gear. Trace 1904 represents engine fuel consumption of the engine is operated with the transmission in second gear.

At time T1900, the requested wheel torque is a lower middle level and the transmission is in third gear. The actual total number of active engine cylinders is two and the estimated engine fuel consumption is a middle level.

Between time T1900 and time T1901, the requested wheel torque gradually increases. The active or present transmission gear is third gear and the actual total number of active engine cylinders is two. The estimated engine fuel consumption for operating the engine in second gear is greater than the estimated engine fuel consumption for operating the engine in third gear.

At time T1901, the wheel torque has increased to a value where the estimated engine fuel consumption for operating the engine while the transmission is in second gear is less than the estimated fuel consumption for operating the engine while the transmission is in third gear. Therefore, the transmission is downshifted to increase vehicle fuel efficiency. The number of active cylinders remains at a value of two and the estimated fuel consumption increases as the requested wheel torque increases.

At T1902, the number of active cylinders increases from two to three in response to the increase in requested wheel torque. The requested wheel torque and engine fuel consumption continue to increase. The transmission remains in second gear.

At T1903, the number of active cylinders increases from three to four in response to the increase in requested wheel torque. The requested wheel torque and engine fuel consumption continue to increase. The transmission remains in second gear as the requested wheel torque increases.

At time T1904, the requested wheel torque is decreasing and it has decreased to a level where the estimated engine fuel consumption for operating the vehicle in third gear is less than the estimated engine fuel consumption for operating the vehicle in second gear. Therefore, the transmission gear is changed to third gear. The actual total number of active cylinders is also decreased in response to the decreasing requested wheel torque.

At 1904, the requested wheel torque has decreased to a level where the actual total number of active cylinders is reduced from three to two. The transmission remains in third gear and the estimated engine fuel consumption decreases with the decrease in requested engine torque.

Figure 20:
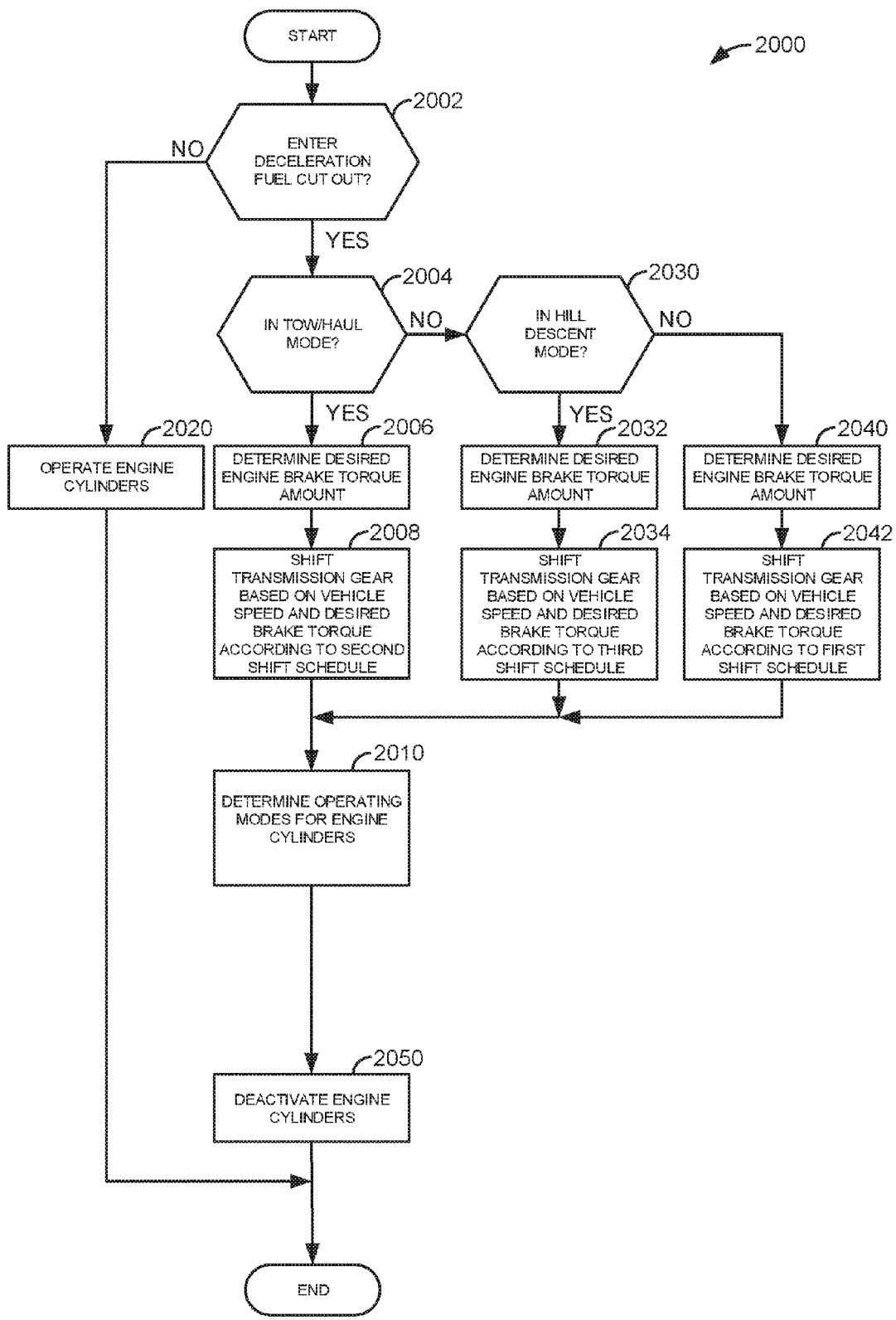
FIG. 20 is a flowchart of a method for selecting different engine cylinder modes in while operating a vehicle in various deceleration modes.

Referring now to FIG. 20, a method for evaluating tow/haul modes for selecting cylinder mode or VDE mode is shown. The method of FIG. 20 may be included in the system described in FIGS. 1A-6C. The method of FIG. 20 may be included as executable instructions stored in non-transitory memory. The method of FIG. 20 may perform in cooperation with system hardware and other methods described herein to transform an operating state of an engine or its components.

It may be more desirable to operate a cylinder with intake and exhaust valves closed and with air or exhaust trapped in the cylinder during an engine cycle because the vehicle may coast for a longer amount of time since the trapped air or exhaust provides a spring like function reducing the cylinder's braking torque. Further, closing the intake and exhaust valves limits air flow to the catalyst in the exhaust system so that excess fuel may not have to be added to engine exhaust to consume excess oxygen in the catalyst. However, during tow/haul and hill descent modes, it may be desirable to provide higher levels of cylinder braking torque so it may be desirable to open and close intake and exhaust valves.

At 2002, method 2000 judges if the engine is or should be in deceleration fuel cut off mode. In deceleration fuel cut off mode, one or more engine cylinders may be deactivated by stopping fuel flow to the cylinders. Further, gas flow through one or more cylinders may be stopped via deactivating intake valves or intake and exhaust valves of a cylinder being deactivated in closed positions as the engine rotates through an engine cycle. Thus, deactivated cylinders are not combusting air and fuel. In one example, method 2000 judges that the engine should be in a deceleration fuel cut off mode when driver demand decreases from a higher value to a lower value and vehicle speed is greater than a threshold speed. If method 2000 judges that the engine should be in deceleration fuel cut off mode, the answer is yes and method 2000 proceeds to 2004. Otherwise, the answer is no and method 2000 proceeds to 2020.

At 2020, method 2000 operates all engine cylinders and all cylinder valves are activated. Further, all engine cylinders combust air and fuel mixtures. Alternatively, less than all engine cylinders may be activated if the driver torque demand is low. Method 2000 proceeds to exit after cylinders are activated.

At 2004, method 2000 judges if the vehicle is in a tow or haul mode. In one example, method 2000 judges that the vehicle is in a tow or haul mode based on an operating state of a pushbutton, switch, or variable in memory. If method 2000 judges that the vehicle is in a tow or haul mode, the answer is yes and method 2000 proceeds to 2006. Otherwise, the answer is no and method 2000 proceeds to 2030.

A vehicle may have a transmission that shifts according to a first shift schedule (e.g., transmission shifts are based on driver demand torque and vehicle speed) when the vehicle is not in a tow or haul mode. The vehicle's transmission shifts according to a second shift schedule in a tow or haul mode. The second shift schedule may upshift at higher driver demand torques and higher vehicle speeds than the first shift schedule. The second shift schedule may downshift at higher vehicle speeds to increase driveline braking.

At 2006, method 2000 determines a desired engine brake torque amount for cylinders not combusting air and fuel. In one example, the desired engine brake torque amount may be empirically determined input to a table or function. The table or function may be indexed via driver demand torque, vehicle speed, and transmission gear. The table outputs the desired engine brake torque (e.g., negative torque the engine provides to the driveline to decelerate the vehicle driveline). Method 2000 proceeds to 2008 after determining the desired engine brake torque.

At 2008, method 2000 shifts transmission gears according to a second gear shift schedule. For example, the transmission may upshift from first to second gear at a driver demand torque of greater than 50 N-m and a vehicle speed of 16 KPH. The second transmission gear shift schedule up-shifts transmission gears at higher engine speeds and higher vehicle speeds than the first transmission gear shift schedule. The second transmission gear shift schedule also downshifts transmission gears at higher engine speeds and higher vehicle speeds than the first transmission shift schedule to provide additional engine braking than the first transmission gear shift schedule. The second transmission gear shift schedule up-shifts transmission gears at lower engine speeds and lower vehicle speeds than the third transmission gear shift schedule. The second transmission gear shift schedule downshifts transmission gears at lower engine speeds and lower vehicle speeds than the third transmission shift schedule to provide less engine braking than the third transmission gear shift schedule. Method 2000 proceeds to 2010 after shifting transmission gears according to the second transmission shift schedule.

At 2010, method 2000 determines the cylinder deactivation mode of each deactivated cylinder to achieve the desired engine brake torque provided via deactivated cylinders. Note that the cylinder deactivation mode is different than the cylinder mode. The cylinder deactivation mode defines how valves of a deactivated cylinder are operated whereas the cylinder mode defines the actual total number of active cylinders and the cylinders that are active. In one example, a cylinder with intake and exhaust valves that open and close during an engine cycle without fuel injection (e.g., a first cylinder deactivation mode) and combustion is assigned a first brake torque. A cylinder with intake valves that are held closed over an engine cycle and exhaust valves that open and close over the engine cycle without fuel injection (e.g., a second cylinder deactivation mode) is assigned a second brake torque. A cylinder with intake and exhaust valves that are held closed over an engine cycle without fuel injection (e.g., a third cylinder deactivation mode) is assigned a third brake torque. The first brake torque is greater than the second brake torque, and the second brake torque is greater than the third brake torque. Thus, the engine cylinders may provide three levels of brake torque in three different cylinder deactivation modes, and the desired brake torque may be provided by operating different cylinders at different brake torque producing levels.

Further, the assigned brake torque values for each of the three cylinder deactivation modes may be adjusted via adjusting intake valve closing timing. For example, the assigned brake torque values may be increased via retarding intake valve closing timing. Similarly, the assigned brake torque values may be decreased via advancing intake valve closing timing. In one example, a valve timing compensation function indexed via intake valve closing timing outputs a value that is multiplied by the assigned first brake torque, the assigned second brake torque, and the assigned third brake torque to provide valve timing compensated cylinder brake torque values used to determine valve timing compensated brake torque values provided by the cylinders in the different cylinder modes. Additionally, a barometric pressure compensation function indexed by barometric pressure outputs a value that is multiplied by the valve timing compensated brake torque values to provide barometric pressure and valve timing compensated brake torque values provided by the cylinders in the different cylinder deactivation modes Intake and exhaust valve timings for each cylinder deactivation mode may be adjusted to increase or decrease braking torque provided by the three cylinder deactivation modes based on barometric pressure and the desired engine brake torque. For example, if the barometric pressure decreases and desired brake torque increases, intake valve timing in each of the three cylinder deactivation modes may be retarded to compensate for lower barometric pressure and higher desired braking torque.

In one example, method 2000 determines valve operation for the engine cylinders according to the desired engine brake torque and the amount of valve timing and barometric pressure compensated brake torque each cylinder provides in the different operating modes. For example, for a four cylinder engine where the desired engine brake torque is 2.5 N-m, the deactivation modes of each cylinder are based on the valve timing and barometric pressure compensated brake torques the cylinders provide in the three different cylinder deactivation modes described above. If a cylinder provides 0.25 N-m of brake torque in the first cylinder deactivation mode, 0.5 N-m in second cylinder deactivation mode, and 1 N-m in the third cylinder deactivation mode, the four cylinder engine is operated with two cylinders in the third cylinder deactivation mode and two cylinders in the first cylinder deactivation mode.

The cylinder deactivation mode for each cylinder may be determined by method 2000 evaluating engine brake torque for all engine cylinders operating in the first cylinder deactivation mode. If engine brake torque for operating the engine with all cylinders in the first cylinder deactivation mode is greater than or equal to the desired engine brake torque, all engine cylinders are allowed to operate in the first cylinder deactivation mode where intake valve and exhaust valves are held closed as the engine rotates during an engine cycle. If the engine brake torque for operating the engine with all cylinders in the first cylinder deactivation mode is less than the desired engine brake torque, engine brake torque is determined for operating the engine with one cylinder in the second cylinder deactivation mode and three cylinders in the first cylinder deactivation mode. If engine brake torque for operating the engine with one cylinder in the second cylinder deactivation mode and three cylinders in the first cylinder deactivation mode is greater than or equal to the desired engine brake torque, one cylinder is authorized to operate in the second cylinder deactivation mode and three cylinders are authorized to operate in the first cylinder deactivation mode. Otherwise, engine torque for operating the engine with two cylinders in the second cylinder deactivation mode and two cylinders in the first cylinder deactivation mode is determined. In this way, one after the other, cylinder deactivation modes of each cylinder may be incremented from the first cylinder deactivation mode to the third cylinder deactivation mode until the engine cylinder deactivation modes that provide the desired engine brake torque are determined.

If the vehicle is not in tow/haul mode or hill descent mode, it may be determined to be in a fuel economy mode during deceleration conditions. As such, an actual number of engine cylinders with intake and exhaust valves held closed during an engine cycle and not combusting air and fuel may be increased to improve vehicle coasting time and fuel economy. For example, all engine cylinders may be commanded with intake and exhaust valves held closed during an engine cycle. Method 2000 proceeds to 2050.

At 2050, method 2000 authorizes deactivation of the engine cylinders and their deactivation modes that provide the desired engine brake torque. Valves are authorized activated or deactivated according to the cylinder deactivation modes and fuel is not injected to the cylinders so there is not combustion in the cylinders in the deceleration fuel cut off mode.

At 2030, method 2000 judges if the vehicle is in a hill descent mode. In one example, method 2000 judges that the vehicle is in hill descent mode based on an operating state of a pushbutton, switch, or variable in memory. If method 2000 judges that the vehicle is in a hill descent mode, the answer is yes and method 2000 proceeds to 2032. Otherwise, the answer is no and method 2000 proceeds to 2040.

In one example, the vehicle is controlled to a requested or desired speed when the accelerator pedal is not applied via controlling negative torque produced via the engine and the vehicle brakes in hill descent mode. The vehicle may enter hill descent mode via releasing the accelerator pedal. Further, engine braking may be controlled in hill descent mode via adjusting engine valve timing. Further still, transmission gears may be shifted to provide a desired braking at the vehicle wheels via the engine.

At 2032 method 2000 determines a desired engine brake torque amount for cylinders not combusting air and fuel. In one example, the desired engine brake torque amount may be empirically determined input to a table or function. The table or function may be specific to hill descent mode and different from the table or function for tow/haul mode. The table or function may be indexed via driver demand torque, vehicle speed, and transmission gear. The table outputs the desired engine brake torque (e.g., negative torque the engine provides to the driveline to decelerate the vehicle driveline). Method 2000 proceeds to 2034 after determining the desired engine brake torque.

At 2034, method 2000 shifts transmission gears according to a third gear shift schedule. The third transmission gear shift schedule up-shifts transmission gears at higher engine speeds and higher vehicle speeds than the first and second transmission gear shift schedules. The third transmission gear shift schedule also downshifts transmission gears at higher engine speeds and higher vehicle speeds than the first and second transmission shift schedules to provide additional engine braking than the first and second transmission gear shift schedules. Method 2000 proceeds to 2010 after shifting transmission gears according to the third transmission shift schedule.

At 2040 method 2000 determines a desired engine brake torque amount for cylinders not combusting air and fuel. In one example, the desired engine brake torque amount may be empirically determined input to a table or function. The table or function may be specific to fuel cut out mode not part of tow/haul mode or hill descent mode. The table or function may be indexed via driver demand torque, vehicle speed, and transmission gear. The table outputs the desired engine brake torque (e.g., negative torque the engine provides to the driveline to decelerate the vehicle driveline). Method 2000 proceeds to 2042 after determining the desired engine brake torque.

At 2042, method 2000 shifts transmission gears according to a first gear shift schedule. The first transmission gear shift schedule up-shifts transmission gears at lower engine speeds and lower vehicle speeds than the second and third transmission gear shift schedules. The first transmission gear shift schedule also downshifts transmission gears at lower engine speeds and lower vehicle speeds than the second and third transmission shift schedules to provide less engine braking than the second and third transmission gear shift schedules. Method 2000 proceeds to 2010 after shifting transmission gears according to the first transmission shift schedule.

In this way, cylinders may be operated in different modes where valves may be activated or deactivated to control engine braking while fuel flow to the engine cylinders is stopped. Different cylinders may be operated in different modes to provide the desired engine brake torque.

Figure 21:
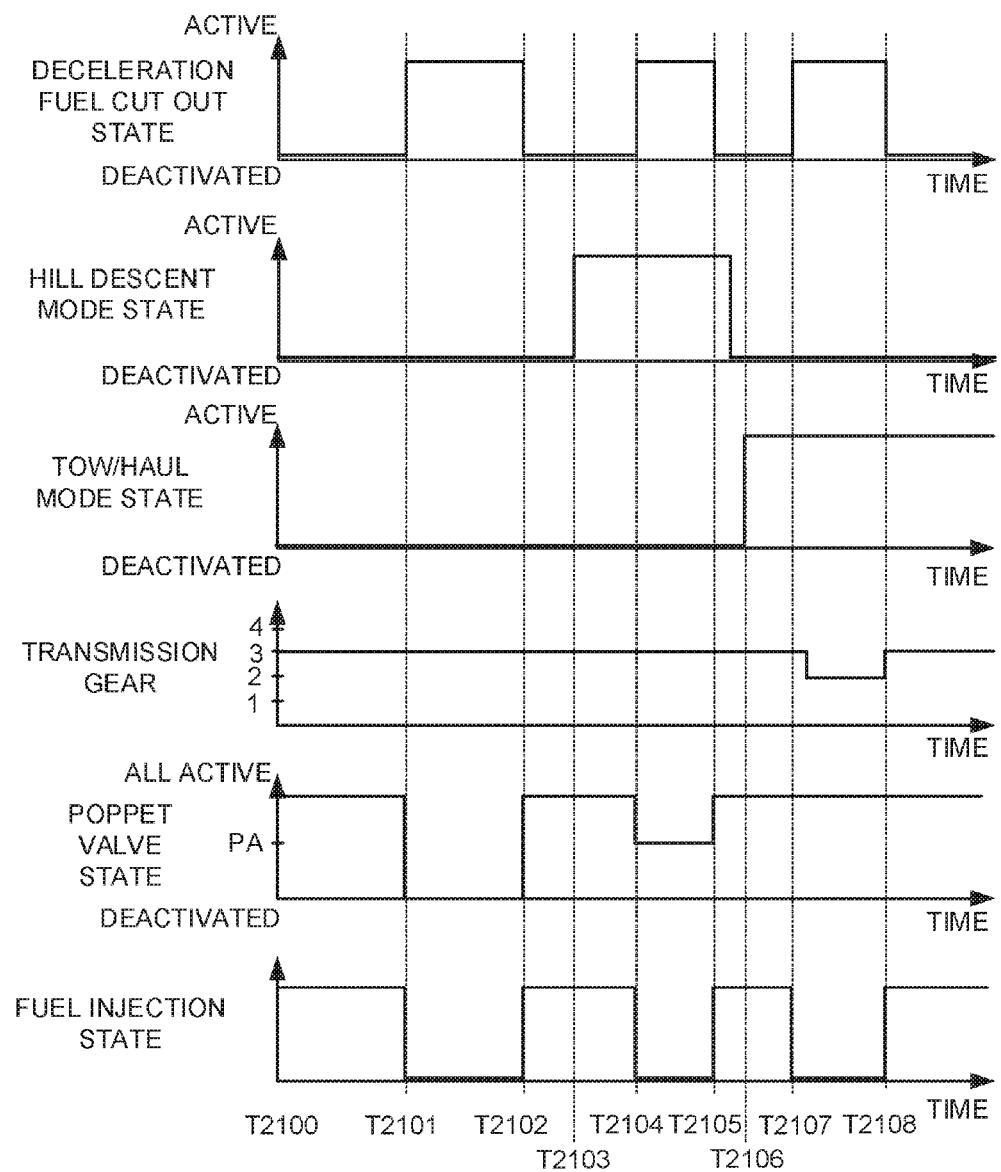
FIG. 21 is a sequence for operating an engine in different cylinder modes based on operating a vehicle in different deceleration modes.

Referring now to FIG. 21, a sequence for operating an engine according to the method of FIG. 20 is shown. The vertical lines at time T2100-T2108 represent times of interest in the sequence. FIG. 21 shows six plots and the plots are time aligned and occur at the same time.

The first plot from the top of FIG. 21 is a plot of deceleration fuel cut off state versus time. The vertical axis represents the deceleration fuel cut off state. The engine is in deceleration fuel cut off mode when the trace is at a higher level near the vertical axis arrow. The engine is not in deceleration fuel cut off mode when the trace is at a lower level near the horizontal axis. The horizontal axis represents time and time increases from the left side of the figure to the right side of the figure.

The second plot from the top of FIG. 21 is a plot of hill descent mode state versus time. The vertical axis represents hill descent mode state and the vehicle is in hill descent mode when the trace is at a higher level near the vertical axis arrow. The vehicle is not in hill descent mode when the trace is at a lower level near the horizontal axis. The horizontal axis represents time and time increases from the left side of the figure to the right side of the figure.

The third plot from the top of FIG. 21 is a plot of tow/haul mode state versus time. The vertical axis represents tow/haul mode state and the vehicle is in tow/haul mode when the trace is at a higher level near the vertical axis arrow. The vehicle is not in tow/haul mode when the trace is at a lower level near the horizontal axis. The horizontal axis represents time and time increases from the left side of the figure to the right side of the figure.

The fourth plot from the top of FIG. 21 is a plot of transmission gear versus time. The vertical axis represents transmission gear and transmission gears are indicated along the vertical axis. The horizontal axis represents time and time increases from the left side of the figure to the right side of the figure.

The fifth plot from the top of FIG. 21 is a plot of cylinder poppet valve state versus time. The vertical axis represents cylinder poppet valve state. The poppet valve state may be active (e.g., poppet valves opening and closing during an engine cycle), deactivated (e.g., poppet valves not opening and closing during an engine cycle), partially active (PA) (e.g., intake valves held closed during an engine cycle and exhaust valves opening and closing over the engine cycle). The horizontal axis represents time and time increases from the left side of the figure to the right side of the figure.

The sixth plot from the top of FIG. 21 is a plot of fuel injection state versus time. The vertical axis represents fuel injection state and fuel injection is activated when the trace is near the vertical axis arrow. Fuel injection is deactivated when the trace is near the horizontal axis. The horizontal axis represents time and time increases from the left side of the figure to the right side of the figure.

At time 2100, engine cylinders are active and cylinder valves are opening and closing over the engine cycle as the engine rotates and combusts air and fuel since the poppet valves are active and deceleration fuel cut out is not indicated. The vehicle is not in hill descent mode nor is it in tow/haul mode. The vehicle's transmission is in third gear and all cylinder poppet valves are active (e.g., opening and closing over the engine cycle). Fuel injection is active and fuel is being supplied to the engine cylinders.

At 2101, the engine enters deceleration fuel cut off mode. The engine may enter deceleration fuel cut off mode in response to a low driver demand torque and vehicle speed greater than a threshold. The vehicle is not in hill descent mode nor is it in tow/haul mode. The vehicle's transmission is in third gear and all cylinder poppet valves are deactivated (e.g., not opening and closing over the engine cycle). The cylinder poppet valves are deactivated so that the engine cylinders are in a third cylinder deactivation mode in response to a low requested engine brake torque (not shown). Further, exhaust gas or fresh air is trapped in the cylinder so that there is a spring effect on the piston. The closed intake and exhaust valves reduce engine pumping losses and may extend the distance that the vehicle coasts. Closing the engine's intake and exhaust valves also stops the engine from pumping fresh air to the catalyst in the engine's exhaust system so that the catalyst is not cooled as much as if fresh air flowed to the catalyst. Further, the amount of oxygen stored in the catalyst is not increased so that catalyst efficiency may be high if the engine cylinders resume combustion. Fuel injection is also ceased to the engine's cylinders so that there is no combustion in the engine cylinders.

At time 2102, then engine exits deceleration fuel cut off mode and the cylinder's poppet valves are reactivated as indicated by the poppet valve state trace. Fuel injection is also reactivated and combustion begins in the engine cylinders. The engine may exit deceleration fuel cut off in response to an increase in driver demand torque or vehicle speed being less than a threshold. The vehicle is not in hill descent mode nor is it in tow/haul mode. The vehicle's transmission is in third gear.

At time 2103, the vehicle enters hill descent mode. The vehicle may enter hill descent mode via a driver applying a pushbutton or other input device. The vehicle is not in deceleration fuel cut off mode and it is not in tow/haul mode. The vehicle's transmission is in third gear and the cylinder's poppet valves are active. Fuel is also injected to engine cylinders and the engine combusts air and fuel.

At time 2104, the engine enters deceleration fuel cut off mode while in hill descent mode. The vehicle is not in tow/haul mode and the transmission is in third gear. The cylinder's poppet valves are partially deactivated (e.g., intake valves are held closed during an engine cycle and exhaust valves open and close during the engine cycle) in response to a middle level engine brake torque request while the engine rotates. Engine cylinders are in a second cylinder deactivation mode when the engine brake torque is at the middle level. However, engine cylinders may enter the first mode if the vehicle is accelerating at a higher rate than is desired. Likewise, the engine cylinders may enter the third cylinder deactivation mode if the vehicle is decelerating faster than is desired. Fuel injection is deactivated so that there is no combustion in engine cylinders.

At time 2105, the vehicle exits deceleration fuel cut off mode in response to increasing driver demand torque or vehicle speed being less than a threshold speed (not shown). The vehicle remains in hill descent mode and the transmission is in third gear. The vehicle is not in tow/haul mode and the cylinder poppet valves are reactivated. Fuel injection to engine cylinders is also reactivated so that the engine cylinders resume combusting air and fuel.

Between time 2105 and time 2106, the vehicle exits hill descent mode. The driver may request exiting hill descent mode via applying an input to the vehicle or engine controller. The other engine/vehicle states remain at their previous levels.

At time 2106, the vehicle enters tow/haul mode. The vehicle may enter tow/haul mode via a driver applying a pushbutton or switch that provides input to the vehicle or engine controller. The other engine/vehicle states remain at their previous levels.

At time 2107, the engine enters deceleration fuel cut off mode in response to low driver demand torque and vehicle speed exceeding a threshold speed. The vehicle is also in tow/haul mode. The vehicle's transmission is downshifted into second gear shortly after entering deceleration fuel cut off mode to increase engine braking via increasing engine speed (not shown). All engine cylinder poppet valves remain active in response to a higher level engine brake torque request (not shown). Fuel injection is ceased to engine cylinders and the engine is not combusting air and fuel as the engine rotates. Operating all cylinder valves while the engine throttle is closed (not shown) increases engine pumping losses and engine braking torque.

At 2108, the vehicle exits deceleration fuel cut off mode in response to an increase in driver demand torque or engine speed being reduced to less than a threshold. The vehicle remains in tow/haul mode and the cylinder poppet valves continue to be activated.

In this way, cylinder modes in which cylinder poppet valves are operated in different ways may be used to vary engine braking torque so that a desired engine braking torque may be provided by the vehicle's engine. Further, some engine cylinders may be in a first operating mode while other engine cylinders are in a second or third operating mode so that the desired engine braking torque may be provided.

Figure 22:
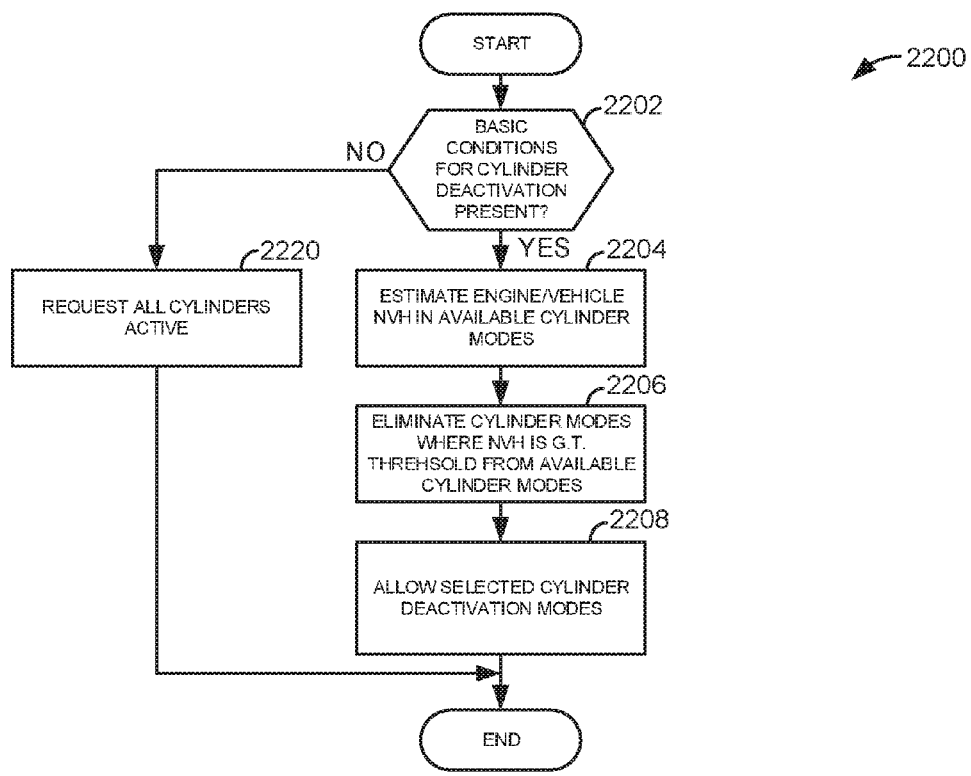
FIG. 22 is a flowchart for determining if conditions are present for operating an engine in various variable displacement (VDE) engine modes.

Referring now to FIG. 22, a method for selecting a cylinder mode from available cylinder modes is shown. The method of FIG. 22 may be included in the system described in FIGS. 1A-6C. The method of FIG. 22 may be included as executable instructions stored in non-transitory memory. The method of FIG. 22 may perform in cooperation with system hardware and other methods described herein to transform an operating state of an engine or its components.

At 2202, method 2200 judges if basic conditions are present to enable cylinder modes where cylinders may be deactivated. Basic conditions may include but are not limited to engine temperature being greater than a threshold, exhaust after treatment temperature greater than a threshold, battery start of charge greater than a threshold, and engine speed greater than a threshold. Method 2200 verifies whether or not the conditions are present via monitoring various system sensors. If method 2200 judges that basis conditions for cylinder deactivation or variable displacement engine operation are present, the answer is yes and method 2200 proceeds to 2204. Otherwise, the answer is no and method 2200 proceeds to 2220.

At 2220, method 2200 requests all engine cylinders are active and combusting air and fuel Intake and exhaust valves of activated cylinders open and close during an engine cycle so that air and combustion products flow through activated cylinders. Spark and fuel are also activated so that fuel-air mixtures are combusted in activated cylinders. Method 2200 proceeds to exit.

At 2204, method 2200 estimates noise, vibration, and harshness (NVH) in available cylinder modes. In one example, a noise table outputs empirically determined expected audible noise levels for the engine/vehicle. The noise table is indexed via the actual total number of active engine cylinders, engine speed, and engine torque. A vibration table outputs empirically determined expected audible noise levels for the engine/vehicle. The vibration table is indexed via the cylinder mode, engine speed, and engine torque. Noise and vibration values are output for present engine speed, engine speed after a transmission gear shift, present driver demand torque, and driver demand torque after a transmission shift. Additionally, method 2200 may compare outputs of vibration sensors (e.g., an engine knock sensor) and audible sensors to threshold levels for the purpose of eliminating presently active cylinder deactivation modes that may not provide desired levels of noise and vibration. Method 2200 proceeds to 2206.

At 2206, method 2200 evaluates noise and vibration outputs from the noise and vibration tables, if the expected noise level of a table output exceeds a threshold or if the expected vibration level of a table output exceeds a threshold, the cylinder mode that provided the expected noise and vibration is eliminated from presently available cylinder modes. For example, if expected engine noise for operating a four cylinder engine in a second cylinder mode with two cylinder active cylinders at 2000 RPM exceeds a threshold at the present driver demand torque or driver demand torque after a transmission shift, the second cylinder mode at 2000 RPM is eliminated from a list of available cylinder modes.

Alternatively, or additionally, method 2200 may compare noise and vibration sensor outputs to threshold levels. If engine noise exceeds a threshold in a presently activated cylinder mode, the presently activated cylinder mode is eliminated from available cylinder modes so that a cylinder mode that provides less engine noise may be selected. Likewise, if engine vibration exceeds a threshold in a presently activated cylinder mode, the presently activated cylinder mode is eliminated from available cylinder modes so that a cylinder mode that provides less engine vibration may be selected.

Additionally, method 2200 may allow cylinder modes where expected cylinder blow through (e.g., air flow from the engine's intake manifold to the engine's exhaust manifold that does not participate in combustion) immediately following a cylinder mode change is expected to be less than a threshold value. It may be desirable to avoid cylinder mode changes where cylinder blow through is higher than the threshold to avoid disturbing oxygen in a catalyst downstream of the engine. Engine cylinder blow through amount may be determined according to U.S. patent application Ser. No. 13/293,015 filed Nov. 9, 2011, which is hereby fully incorporated by reference for all purposes. In one example, a table or function outputs an engine or cylinder blow through amount based on cylinder mode, engine speed, and cylinder valve timing. If output from the table is less than the threshold amount, the cylinder mode may be allowed. Method 2200 proceeds to 2208.

At 2208, method 2200 allows cylinder modes that are available and that have not been eliminated from the available cylinder modes. Further, transmission gears that are available and that have not been eliminated are allowed. Cylinder modes may be allowed so that they may eventually be selected for operating the engine at 716 of FIG. 7. A cylinder mode where all engine cylinders are activated is always an allowed cylinder mode unless engine or valve degradation is present. In one example, a matrix that includes cells representing cylinder modes is used to keep track of allowed and eliminated cylinder modes. Cylinder modes may be allowed by installing a value of one in cells that correspond to available cylinder modes. Cylinder modes may be eliminated by installing a value of zero in cells that correspond to cylinder modes that are not available or that are eliminated from engine operation. As previously noted, different cylinder modes may have a same number of actual total active cylinders while having different active cylinders. For example, if it is determined to be desirable to operate three cylinders of a four cylinder engine to meet driver demand torque, cylinder mode numbers three and four may be allowed where cylinder mode three has a firing order of 1-3-2 and cylinder mode four has a firing order of 3-4-2. In one engine cycle, cylinder mode three may be active. During a subsequent engine cycle, cylinder mode four may be active. In this way, the engine firing order may be varied while maintaining an actual total number of active cylinders. Method 2200 proceeds to exit.

In this way, cylinder deactivation modes may be made available or eliminated may be identified. Further, basic conditions may have to be met before available cylinder modes may be made allowable cylinder modes for engine operation.

Figure 23:
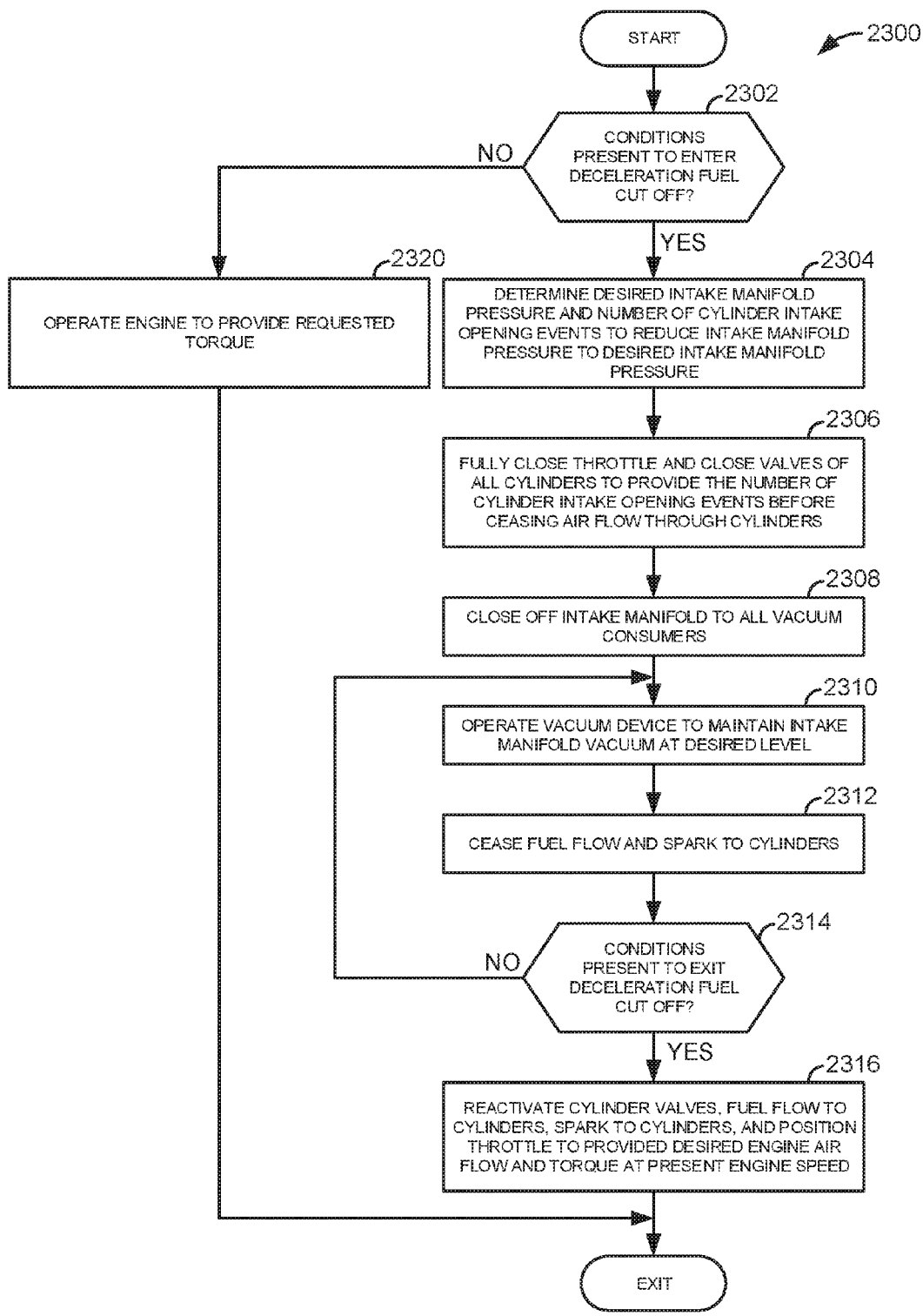
FIG. 23 is a flowchart of a method for controlling engine intake manifold pressure.

Referring now to FIG. 23, a method for controlling engine intake manifold absolute pressure (MAP) during a deceleration fuel cut off mode is shown. The method of FIG. 23 may be included in the system described in FIGS. 1A-6C. The method of FIG. 23 may be included as executable instructions stored in non-transitory memory. The method of FIG. 23 may perform in cooperation with system hardware and other methods described herein to transform an operating state of an engine or its components.

At 2302, method 2300 judges if the engine is or should be in deceleration fuel cut off mode. In deceleration fuel cut off mode, one or more engine cylinders, which may include all engine cylinders, may be deactivated by stopping fuel flow to the cylinders. Further, gas flow through one or more cylinders may be stopped via deactivating intake valves or intake and exhaust valves of a cylinder being deactivated in closed positions as the engine rotates through an engine cycle. In one example, method 2300 judges that the engine should be in a deceleration fuel cut off mode when driver demand decreases from a higher value to a lower value and vehicle speed is greater than a threshold speed. If method 2300 judges that the engine should be in deceleration fuel cut off mode, the answer is yes and method 2300 proceeds to 2304. Otherwise, the answer is no and method 2000 proceeds to 2320.

At 2320, method 2300 operates the engine to provide a desired amount of torque. The desired amount of torque may be a driver demand torque or based on the driver demand torque. Valves of the engine are activated as requested to provide the desired torque and the engine combusts air and fuel to provide the desired torque. Method 2300 proceeds to exit after providing the desired amount of torque.

At 2304, method 2300 determines a desired intake manifold pressure and an actual total number of cylinder intake valve opening events (e.g., intake valves of each cylinder open once during an intake stroke of the cylinder with opening intake valves) or intake strokes of cylinders inducting air to reduce intake manifold pressure to a desired intake manifold pressure. The actual total number of cylinder intake valve opening events may provide a better inference of intake manifold pressure than time to pump the intake manifold pressure down. In one example, the methods described in U.S. Pat. Nos. 6,708,102 or 6,170,475, which are hereby fully incorporated for all purposes, may be used to estimate intake manifold pressure for a desired number of intake valve opening events or intake strokes into the future. For example, the throttle may follow a predetermined trajectory from its current position to a fully closed position in response to entering deceleration fuel cut off mode. The predicted throttle position may be estimated from the predetermined trajectory via the following equation:

$$\theta(k+1)=\theta(k)+[\theta(k)-\theta(k-1)]$$

where $\theta(k+1)$ is the estimate of throttle position at the next engine intake event; $\theta(k)$ is the measured throttle position at the present engine intake event; and $\theta(k-1)$ is the measured throttle position at the previous engine intake event.

The gas in the engine intake manifold is fresh air and the pressure in the engine intake manifold is directly related to the cylinder air charge. The throttle position, intake manifold pressure, intake manifold temperature, and engine speed are determined from the various engine sensors. To determine intake manifold pressure evolution, the starting point is a standard dynamic model governing the change of pressure in the intake manifold as follows:

$$P_m = \frac{RT}{V}(MAF - M_{cyl})$$

where, T is the temperature in the intake manifold as sensed by intake manifold temperature sensor, V is the volume of the intake manifold, R is the specific gas constant, MAF is the mass flow rate, into the intake manifold and $M_{cyl}$ is the flow rate into the cylinder. The mass flow rate into the cylinders ($M_{cyl}$) is represented as a linear function of intake manifold pressure with the slope and offset being dependent on engine speed and ambient conditions as follows:

$$M_{cyl} = \alpha_1(N)P_m - \alpha_2(N)\frac{P_{amb}}{P_{amb\_nom}}$$

where $P_{amb}$ and $P_{amb\_nom}$ are the current ambient pressure and the nominal value of the ambient pressure (e.g. 101 kPa). The engine pumping parameters $\alpha_1(N)$ and $\alpha_2(N)$ are regressed from the static engine mapping data obtained at nominal ambient conditions. After substituting this expression into the dynamic equation for intake manifold pressure and differentiating both sides to obtain the rate of change of the pressure in the intake manifold, we obtain:

$$\dot{P}_m = \frac{RT}{V}\left[\frac{d}{dt}MAF - \alpha_1 \dot{P}_m - \dot{\alpha}_1 P_m - \dot{\alpha}_2 \frac{P_{amb}}{P_{amb\_nom}}\right]$$

The dynamics governing change of engine speed are slower than the intake manifold dynamics A good tradeoff between performance and simplicity is to retain $\alpha_1$ (slope) and neglect $\alpha_2$ (offset). With this simplification, the second derivative of $P_m$ is given by;

$$\dot{P}_M = \frac{RT}{V}\left[\frac{d}{dt}MAF - \alpha_1 \dot{P}_m - \dot{\alpha}_1 P_m\right]$$

To discretize the above equation, $dP_m$ (k) is defined as a discrete version of the time derivative of $P_m$, that is $dP_m(k) = (P_m(k+1) - P_m(k))/\Delta t$, to obtain:

$$dP_m(k+1) = \left(1 - \Delta t\alpha_1(N(k))\frac{RT}{V}\right)dP_m +$$
$$\frac{RT}{V}[MAF(k+1) - MAF(k-1)] - \frac{RT}{V}[\alpha_1(N(k+1)) - \alpha_1(N(k))]P_m(k)$$

Thus, this equation defines the predicted rate of change of the intake manifold pressure one engine event into the future, which is used to determine the future values of intake manifold pressure. However, at time instant k, th signals from the next (k+1) instant are not available. To implement the right hand side, instead of its value at time k+1, we use the one event ahead predicted value of the MAF signal at time k obtained by using the one event ahead prediction of the throttle position as follows:

$$MAF^{+1}(k) = \frac{P_{amb}}{P_{amb\_nom}}\sqrt{\frac{T_{amb\_nom}}{T_{amb}}} C(\theta^{+1}(k))\text{Fn\_subsonic}\left(\frac{P_m(k) + \Delta t dP_m^{+1}(k-1)}{P_{amb}}\right)$$

here $P_{amb}$ and $P_{anb\_nom}$ are current and nominal (i.e., 101 kPa.) absolute ambient pressures, $T_{amb}$ and $T_{amb\_nom}$ are current and nominal (i.e., 300 K) absolute ambient temperatures, and $C(\theta)$ is the throttle sonic flow characteristic obtained from static engine data. Fn_subsonic is the standard subsonic flow correction:

$$Fn_{subsonic} = \begin{cases} \sqrt{14.96501\left[\left(\frac{P_m}{P_{amb}}\right)^{1.42959} - \left(\frac{P_m}{P_{amb}}\right)^{1.7148}\right]} & \text{if } \frac{P_m}{P_{amb}} \geq 0.52845 \\ 1.0 & \text{if } \frac{P_m}{P_{amb}} < 0.52845 \end{cases}$$

where $P_m$ (k) is the current measurement of intake manifold pressure. For in-vehicle implementation, the Fn_subsonic function can be implemented as a tabulated lookup function of the pressure ratio. In this case, the magnitude of the slope should be limited to prevent oscillatory behavior under wide open throttle conditions, possibly by extending the zero crossing of the function to a value of the pressure ratio slightly over 1.

Several different choices are available to obtain the quantity MAF(k) to be used in determining the future rate of change in the intake manifold pressure. The following formula, which uses the previous value of the predicted throttle position and current value of the manifold pressure, provides the best performance in terms of overshoot and stability at wide open throttle:

$$MAF(k) = \frac{P_{amb}}{P_{amb\_nom}}\sqrt{\frac{T_{amb\_nom}}{T_{amb}}} C(\theta^{+1}(k-1))\text{Fn\_subsonic}\left(\frac{P_m(k)}{P_{amb}}\right)$$

To avoid predicting the engine speed, instead of subtracting the present value of $\alpha_1$ from its one step ahead prediction, we approximate $\alpha_1$ by subtracting the one event old value from the present. The above changes result in the $dP_m$ signal corresponding to the one event ahead predicted value of the time derivative of $P_m$, i.e., the rate of change of the future intake manifold pressure:

$$dP_n^{+1}(k) = \left(1 - \Delta t\alpha_1(N(k))\frac{RT}{V}\right)dP_m^{+1}(k-1) +$$
$$\frac{RT}{V}[MAF^{+1}(k) - MAF(k)] - \frac{RT}{V}[\alpha_1(N(k)) - \alpha_1(N(k-1))]P_m(k)$$

Note that the value of $dP_m^{+1}$ (k) depends only on the signals available at intake event k. Hence, it can be used in the prediction of intake manifold pressure as follows:

$$P_m^{+1}(k) = P_m(k) + \Delta t dP_m^{+1}(k-1)$$

$$P_m^{+2}(k) = P_m(k) + \Delta t dP_m^{+1}(k-1) + \Delta t dP_m^{+1}(k)$$

where $P_m^{+1}(k)$ and $P_m^{+2}(k)$ are one and two steps ahead predictions of the intake manifold pressure. The manifold pressure evolution equations may be extended beyond two intake, events into the future to a number of intake events that provides the desired intake manifold pressure. In one example, the desired intake manifold pressure during deceleration mode may be empirically determined and stored in memory. For example, the desired intake manifold pressure may be empirically determined and indexed in memory based on atmospheric pressure and vehicle speed. In one example, the desired engine intake manifold pressure is a pressure in the intake manifold when the engine is operating at idle speed when driver demand torque is zero or substantially zero (e.g., less than 10 N-m. F her, the desired intake manifold pressure may be adjusted responsive to ambient pressure. For example, if ambient pressure increases, desired intake manifold pressure may be decreased. Method 2300 proceeds to 2306 after determining the desired engine intake manifold pressure and the number of cylinder intake events to achieve the desired intake manifold pressure.

At 2306, method 2300 fully closes the engine throttle and closes all engine intake events after the number of intake events determined at 2304 to provide the desired intake manifold pressure has been performed. For example, if it is determined at 2304 that the desired intake manifold pressure is 75 kPa and that the desired intake manifold pressure may be reached as the throttle closes in four cylinder intake valve opening events, intake valves of cylinders, and in some cases exhaust valves, are closed such that a total actual number of cylinder intake events after entering deceleration fuel cut off is four. In this way, the cylinder valves are closed based on an actual total number of intake valve opening events since a deceleration fuel cut off mode request to provide a desired intake manifold pressure. Since the cylinder valves are closed, the engine may be started subsequently without having to evacuate air from the intake manifold. Consequently, less fuel may be used to richen engine exhaust to improve catalyst efficiency. Further, the engine may be operated with less spark retard when reactivating cylinders since cylinder charge is less than a full charge. Method 2300 proceeds to 2308.

At 2308, method 2300 closes off the engine intake manifold to all vacuum consumers. Vacuum consumers may include but are not limited to vacuum reservoirs; vehicle brakes; heating, ventilation, and cooling systems; and vacuum actuators such as turbocharger waste gates. However, if vacuum in some systems (e.g., brakes) is reduced to less than a threshold, systems may again have access to the engine intake manifold for vacuum via opening a valve 176 as shown in FIG. 1B. Further, the valves may be reactivated during such conditions so that the engine may provide additional vacuum to vacuum consumers. In one example, vacuum consumers are provided selective access to engine intake manifold pressure via one or more solenoid valves. Method 2300 proceeds to 2310.

At 2310, method 2300 operates a vacuum source to maintain engine intake manifold pressure at the desired level. If air leaks by the throttle, intake manifold pressure may increase so that if the engine is restarted with intake manifold pressure at atmospheric pressure, more fuel may be used to start the engine than is desired. Consequently, engine fuel consumption may increase more than is desired if the engine is restarted with a higher intake manifold pressure than is desired. Therefore, the vacuum source may be activated in response to intake manifold pressure greater than the desired intake manifold pressure so that the intake manifold pressure is less than atmospheric pressure (e.g., a vacuum is in the intake manifold) The vacuum source may be supplied electrical power generated via the vehicle's kinetic energy or a battery. Additionally, the vacuum source may be activated to evacuate air from a vacuum reservoir in response to low vacuum in the vacuum reservoir. Method 2300 proceeds to 2312.

At 2312, method 2300 ceases fuel flow and spark to engine cylinders. Air inducted during the intake events after the throttle begins to close, the intake events corresponding to the actual number of intake valve opening events determined at 2304, is combined with fuel and combusted before fuel and spark delivery to engine cylinders is ceased. Method 2300 proceeds to 2314.

At 2314, method 2300 judges if conditions are present to exit deceleration fuel cut off. In one example, deceleration fuel cut off may be exited in response to a driver demand torque greater than a threshold or vehicle speed less than a threshold. If method 2300 judges that conditions are present to exit decoration fuel cut off mode, the answer is yes and method 2300 proceeds to 2316. The engine continues to rotate during decoration fuel cut off since a portion of the vehicle's kinetic energy may be transferred to the engine. Otherwise, method 2300 returns to 2310.

At 2316, method 2300 reactivates cylinder valves so that the valves open and close during an engine cycle. Further, fuel flow and spark delivery are also provided to the cylinders. Combustion is resumed in the cylinders and the engine throttle position is adjusted to provide the desired engine air flow and engine torque. The cylinder valve timing and throttle positions may be empirically determined values stored in memory indexed by engine speed and engine demand torque (e.g., driver demand torque). Method 2300 proceeds to exit.

In this way, engine intake manifold pressure may be controlled to improve cylinder reactivation and combustion in engine cylinders so that fuel consumption may be reduced and catalyst balance (e.g., balance between hydrocarbons and oxygen in the catalyst) may be restored with less fuel being provided to the engine and/or catalyst.

Figure 24:
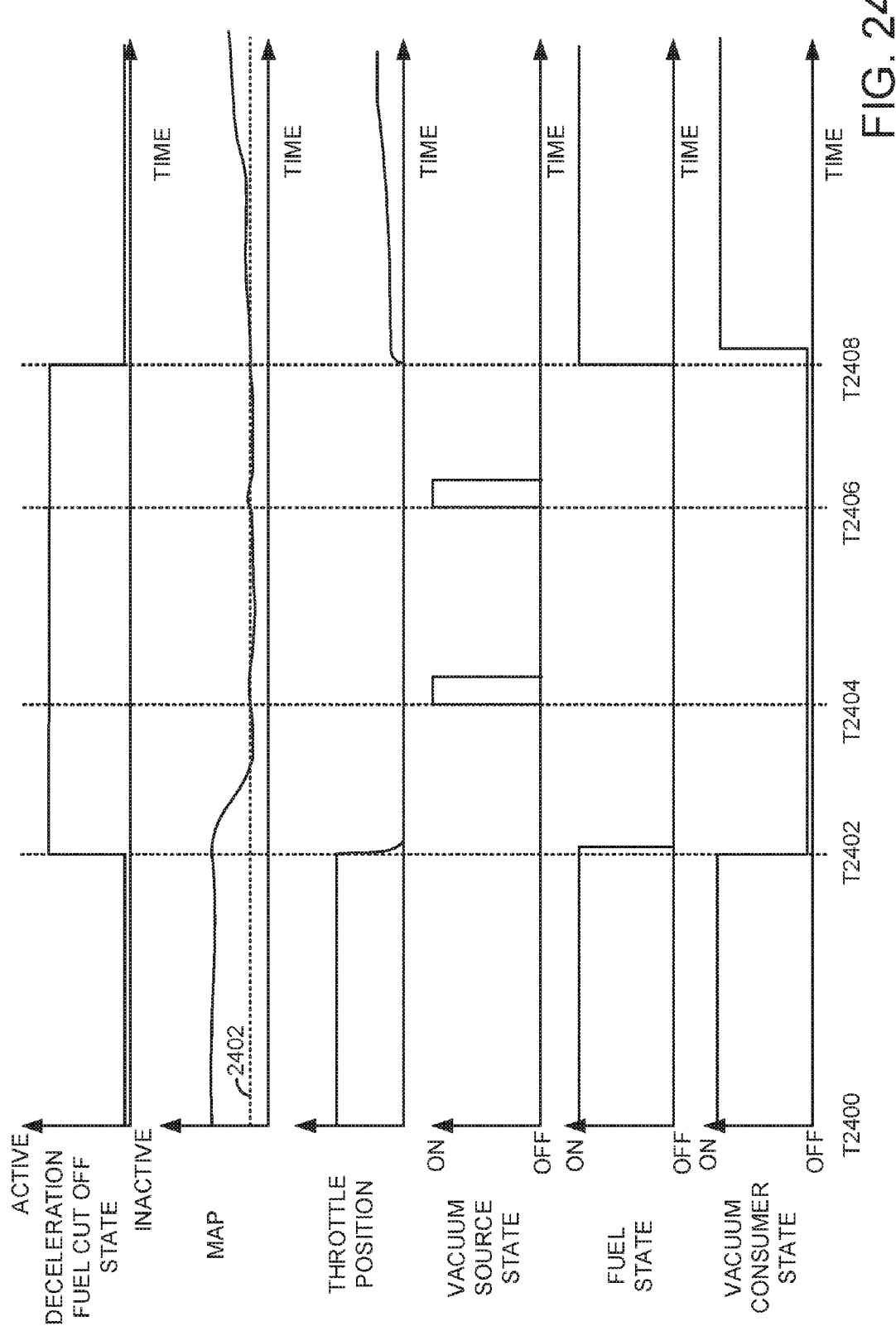
FIG. 24 is a sequence showing engine intake manifold pressure control according to the method of FIG. 23.

Referring now to FIG. 24, a sequence for operating an engine according to the method of FIG. 23 is shown. The vertical lines at time T2400-T2408 represent times of interest in the sequence. FIG. 24 shows six plots and the plots are time aligned and occur at the same time.

The first plot from the top of FIG. 24 is a plot of deceleration fuel cut off state versus time. The vertical axis represents the deceleration fuel cut off state. The engine is in deceleration fuel cut off mode when the trace is at a higher level near the vertical axis arrow. The engine is not in deceleration fuel cut off mode when the trace is at a lower level near the horizontal axis. The horizontal axis represents time and time increases from the left side of the figure to the right side of the figure.

The second plot from the top of FIG. 24 is a plot of engine manifold absolute pressure (MAP) versus time. The vertical axis represents MAP and MAP increases in the direction of the vertical axis arrow. The horizontal axis represents time and time increases from the left side of the figure to the right side of the figure. Horizontal line 2402 represents a desired MAP during deceleration fuel cut off mode.

The third plot from the top of FIG. 24 is a plot of engine throttle position versus time. The vertical axis represents throttle position and throttle position increases in the direction of the vertical axis arrow. The horizontal axis represents time and time increases from the left side of the figure to the right side of the figure.

The fourth plot from the top of FIG. 24 is a plot of vacuum source state versus time. The vertical axis represents vacuum source operating state (e.g., vacuum pump operating state) and the vacuum source is active when the trace is near the vertical axis arrow. The vacuum source is not active when the trace is near the horizontal axis. The horizontal axis represents time and time increases from the left side of the figure to the right side of the figure.

The fifth plot from the top of FIG. 24 is a plot of fuel delivery state versus time. The vertical axis represents fuel delivery state and fuel is delivered to engine cylinders when the trace is near the vertical axis arrow. Fuel is not delivered to engine cylinders when the trace is near the horizontal axis. The horizontal axis represents time and time increases from the left side of the figure to the right side of the figure.

The sixth plot from the top of FIG. 24 is a plot of vacuum consumer state versus time. The vertical axis represents vacuum consumer state and the vacuum consumer state is active when the trace is near the vertical axis arrow. The vacuum consumers are not active when the trace is near the horizontal axis. Vacuum consumers are not in pneumatic communication with the engine intake manifold when the vacuum consumer trace is at a lower level. Vacuum consumers are in pneumatic communication with the engine intake manifold when the vacuum consumer trace is at a higher level. The horizontal axis represents time and time increases from the left side of the figure to the right side of the figure.

At time T2400, the engine is not in deceleration fuel cut off mode as indicated by the deceleration fuel cut off state being at a lower level. The engine MAP is relatively high indicating a higher engine load. The throttle position is open a large amount and the vacuum device state is off to indicate that the vacuum source is not activated. Fuel is being supplied to engine cylinders as indicated by the fuel state being at a high level. The vacuum consumers are operating and able to consume vacuum based on the vacuum consumer state.

At time 2402, the engine transitions into deceleration fuel cut off mode as indicated by the desired fuel cut off state trace moving from a lower level to a higher level. The engine may enter deceleration fuel cut off mode in response to a reduction in driver demand torque and vehicle speed being greater than a threshold. The throttle is closed in response to entering deceleration fuel cut off mode. Likewise, fuel flow is cut off to engine cylinders as indicated by the fuel state trace being at a lower level. The vacuum consumer state moves to a lower level to indicate that vacuum consumers are blocked from receiving vacuum from the engine intake manifold. By blocking air flow into the engine intake manifold from vacuum consumers, intake manifold pressure may be reduced so that a large amount of fuel is not necessary to restart the engine with stoichiometric air-fuel ratios in engine cylinders. Cylinder valves are also closed in response to entering deceleration fuel cut off mode. A total actual number of intake valve opening events may be performed in response to entering deceleration fuel cut off mode before air flow through engine cylinders is ceased by closing cylinder intake valves over one or more engine cycles while the engine continues to rotate. The total actual number of intake valve opening events may be a number that provides a desired engine intake manifold pressure. In some examples, engine intake valves and exhaust valves may be closed over an engine cycle in response to entering deceleration fuel cut off mode.

Between 2402 and 2404, MAP is reduced and the engine remains in deceleration fuel cut off mode. MAP is reduced to a level of desired MAP 2402. In one example, MAP is reduced to desired MAP 2402 by opening cylinder intake valves an actual total number of times based on an estimate of intake manifold pressure reaching 2402.

At 2404, MAP increases to a level above 2402 due to air leakage past the engine throttle or other air flow into the engine intake manifold. The vacuum source is activated in response to the increased MAP so that MAP is lowered to 2402. The engine remains in deceleration fuel cut off mode and the throttle remains closed. The engine continues to rotate (not shown) and fuel flow to engine cylinders is stopped. Cylinder intake valves remain deactivated and closed over each engine cycle (not shown). The vacuum source is deactivated shortly after being activated in response to MAP being less than 2402. The vacuum source state indicates vacuum source activation (ON) and deactivation (OFF).

At 2406, MAP increases to a level above 2402 for a second time due to air leakage past the engine throttle or other air flow into the engine intake manifold. The vacuum source is activated in response to the increased MAP so that MAP is lowered to 2402. The engine remains in deceleration fuel cut off mode and the throttle remains closed. The engine continues to rotate (not shown) and fuel flow to engine cylinders is stopped. Cylinder intake valves remain deactivated and closed over each engine cycle (not shown). The vacuum source is deactivated shortly after being activated in response to MAP being less than 2402. The vacuum source state indicates vacuum source activation (ON) and deactivation (OFF).

At time T2408, the engine exits deceleration fuel cut off mode while intake manifold pressure is low. The engine may exit deceleration fuel cut off mode in response to an increase in driver demand torque. The lower intake manifold pressure may reduce the use of spark retard and conserve fuel to reactivate engine cylinders and the catalyst in the engine exhaust system. The engine cylinders are reactivated by supplying fuel to the cylinders and reactivating cylinder valves (not shown). The vacuum consumers are also reactivated by allowing communication between the vacuum consumers and the engine intake manifold. MAP increases as the throttle is opened.

In this way, MAP may be controlled during deceleration fuel cut off mode to reduce fuel consumption. Further, driveline torque disturbances may be reduced since the engine is started with a smaller air charge as compared to if the engine is started with atmospheric pressure in the engine intake manifold.

Figure 25:
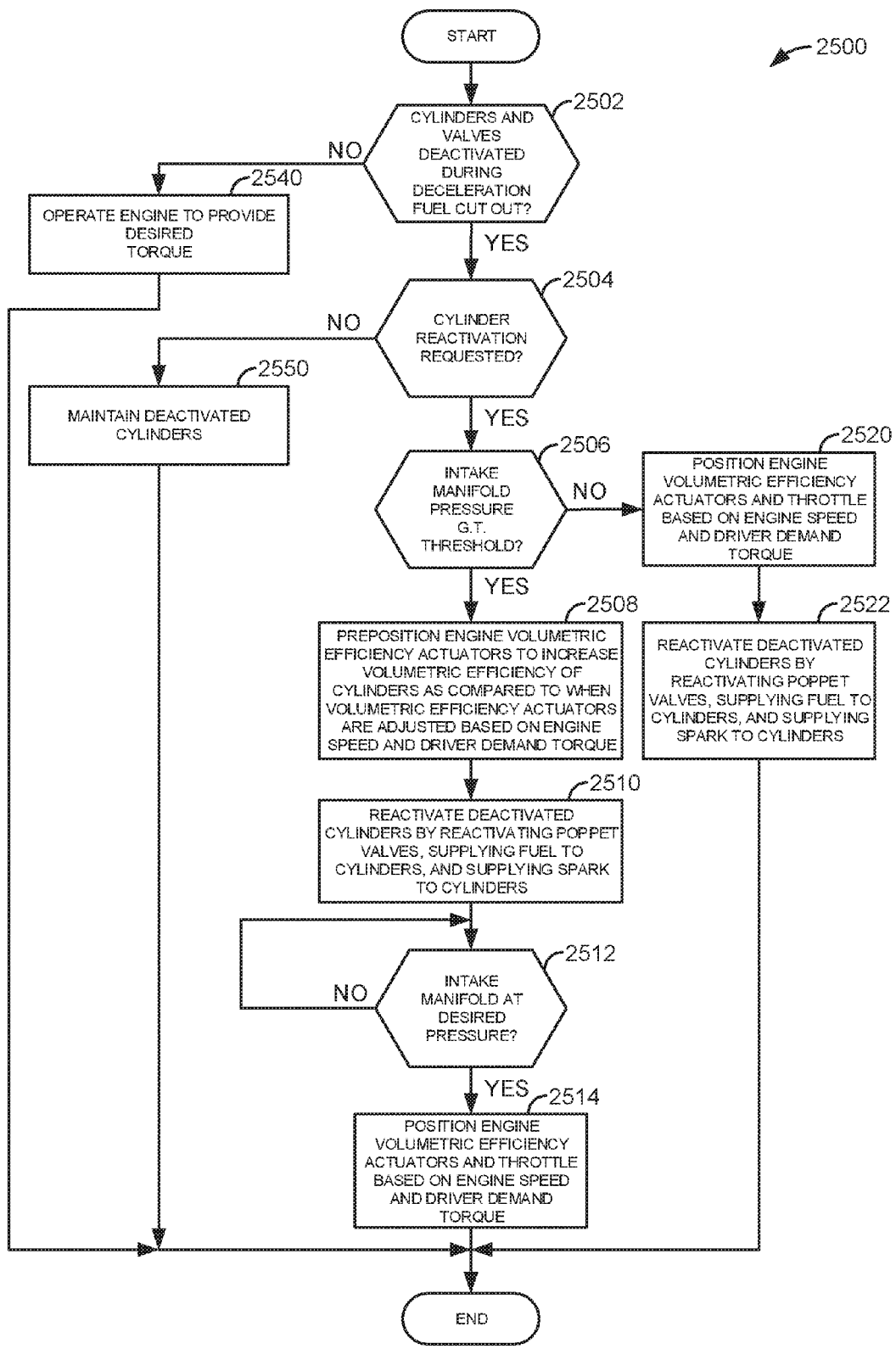
FIG. 25 is a flowchart of a method for controlling engine intake manifold pressure.

Referring now to FIG. 25, a method for controlling engine intake manifold absolute pressure (MAP) during cylinder reactivation after entering a deceleration fuel cut off mode is shown. The method of FIG. 25 may be included in the system described in FIGS. 1A-6C. The method of FIG. 25 may be included as executable instructions stored in non-transitory memory. The method of FIG. 25 may perform in cooperation with system hardware and other methods described herein to transform an operating state of an engine or its components.

At 2502, method 2500 judge if cylinders and valves are deactivated during a deceleration fuel cut off mode. In one example, method 2500 may judge that engine cylinders are deactivated (e.g., not combusting air and fuel mixtures while the engine rotates) and valves are deactivated (e.g., held closed, not opening and closing as the engine rotates over an engine cycle) when a bit in memory is a predetermined value. Note that all or only a fraction of engine cylinders may be deactivated. If method 2500 judges that engine cylinders and valves are deactivated during deceleration fuel cut off mode, the answer is yes and method 2500 proceeds to 2504. Otherwise, the answer is no and method 2500 proceeds to 2540.

At 2540, method 2500 operates engine cylinders and valves to provide a desire torque. The desired torque may be based on accelerator pedal position or a controller determined torque. The engine cylinders are activated by supplying fuel to the cylinders. The valves are activated by enabling valve operators. Further, volumetric efficiency actuators are adjusted to different positions than at 2508 for a same engine speed and torque demand to improve vehicle emissions and fuel economy. Method 2500 proceeds to exit.

At 2504, method 2500 judges if cylinder reactivation is requested. Cylinder reactivation may be requested in response to an increase in driver demand torque or vehicle speed being less than a threshold speed. If method 2500 judges that cylinder reactivation is requested, the answer is yes and method 2500 proceeds to 2506. Otherwise, method 2500 proceeds to 2550.

At 2550, method 2500 maintains the cylinders in a deactivated state. Fuel is not supplied to the cylinders and the cylinder valves remain deactivated. Method 2500 proceeds to exit.

At 2506, method 2500 judges if engine intake manifold pressure is greater than a threshold pressure. If engine intake manifold pressure is greater than a threshold pressure, the engine cylinders may produce more torque than is desired or spark timing may be retarded to reduce engine torque. If engine intake manifold pressure is greater than desired, cylinders may combust more fuel than is desired to provide stoichiometric exhaust gases. Therefore, it may be desirable to reduce engine intake manifold pressure as soon as possible when reactivating engine cylinders so that fuel may be conserved. If method 2500 judges that intake manifold pressure is greater than the threshold pressure, the answer is yes and method 2500 proceeds to 2508. Otherwise, the answer is no and method 2500 proceeds to 2520. The threshold pressure may vary with engine speed, vehicle speed, and ambient pressure.

At 2520, method 2500 adjusts engine volumetric efficiency actuators and the engine throttle based on engine speed and driver demand torque. In one example, driver demand torque is based on accelerator pedal position and vehicle speed. The engine volumetric efficiency actuators may include but are not limited to engine camshafts, charge motion control valves, and variable plenum volume valves. The positions of the volumetric efficiency actuators may be empirically determined and stored to a table in memory that is indexed via driver demand torque and engine speed. Different tables output different positions for the camshafts, charge motion control valves, and the variable plenum volume valves. Method 2500 proceeds to 2522.

At 2522, method 2500 reactivates engine cylinders and cylinder valves. The cylinders are reactivated by supplying spark and fuel to the cylinders. The cylinder poppet valves are reactivated by activating valve operators. The valve operators may be part of an assembly as shown in FIG. 5B, other valve operators described herein, or other known valve operators. Activating the valve operator causes the intake valves to open and close during an engine cycle. Method 2500 proceeds to exit after activating the engine cylinders.

At 2508, method 2500 prepositions engine volumetric efficiency actuators to increase engine volumetric efficiency before engine cylinders and valves are reactivated. The volumetric efficiency actuators are positioned to increase engine volumetric efficiency at the engine's present speed and driver demand torque as compared to when the volumetric efficiency actuators are adjusted responsive to engine speed and driver demand torque. In one example, cylinder charge motion control valves are fully opened to reduce resistance to flow entering engine cylinders. Further, intake valve timing and exhaust valve timing are adjusted via camshaft timing to provide no intake valve and exhaust valve overlap (e.g., simultaneous opening of intake and exhaust valves). Further, intake valve timing may be advanced or retarded to maximize air in the cylinder at intake valve closing time. The variable plenum volume valve is adjusted to minimize intake manifold volume. The engine throttle is not adjusted when the engine volumetric efficiency actuators are adjusted. Engine boost may also be increased to increase engine volumetric efficiency via closing a turbocharger waste gate or bypass valve. Method 2500 proceeds to 2510 after engine volumetric efficiency actuators are adjusted.

At 2510, method 2500 reactivates engine cylinders and cylinder valves. The cylinders are reactivated by supplying spark and fuel to the cylinders. The cylinder poppet valves are reactivated by activating valve operators. The valve operators may be part of an assembly as shown in FIG. 5B, other valve operators described herein, or other known valve operators. Activating the valve operator causes the intake valves to open and close during an engine cycle. Method 2500 proceeds to 2512 after activating the engine cylinders.

At 2512, method 2500 judges if the engine intake manifold pressure is at a desired pressure. The desired pressure may be empirically determined and based on engine speed and driver demand torque. If method 2500 judges that engine intake manifold pressure is at the desired engine intake manifold pressure the answer is yes and method 2500 proceeds to 2514. Otherwise, the answer is no and method 2500 returns to 2512.

At 2514, method 2500 positions engine volumetric efficiency actuators and the engine throttle based on engine speed and driver demand torque. The positions of the volumetric efficiency actuators may be empirically determined and stored to a table in memory that is indexed via driver demand torque and engine speed. Different tables output different positions for the camshafts, charge motion control valves, and the variable plenum volume valves. Method 2500 proceeds to exit.

Figure 26:
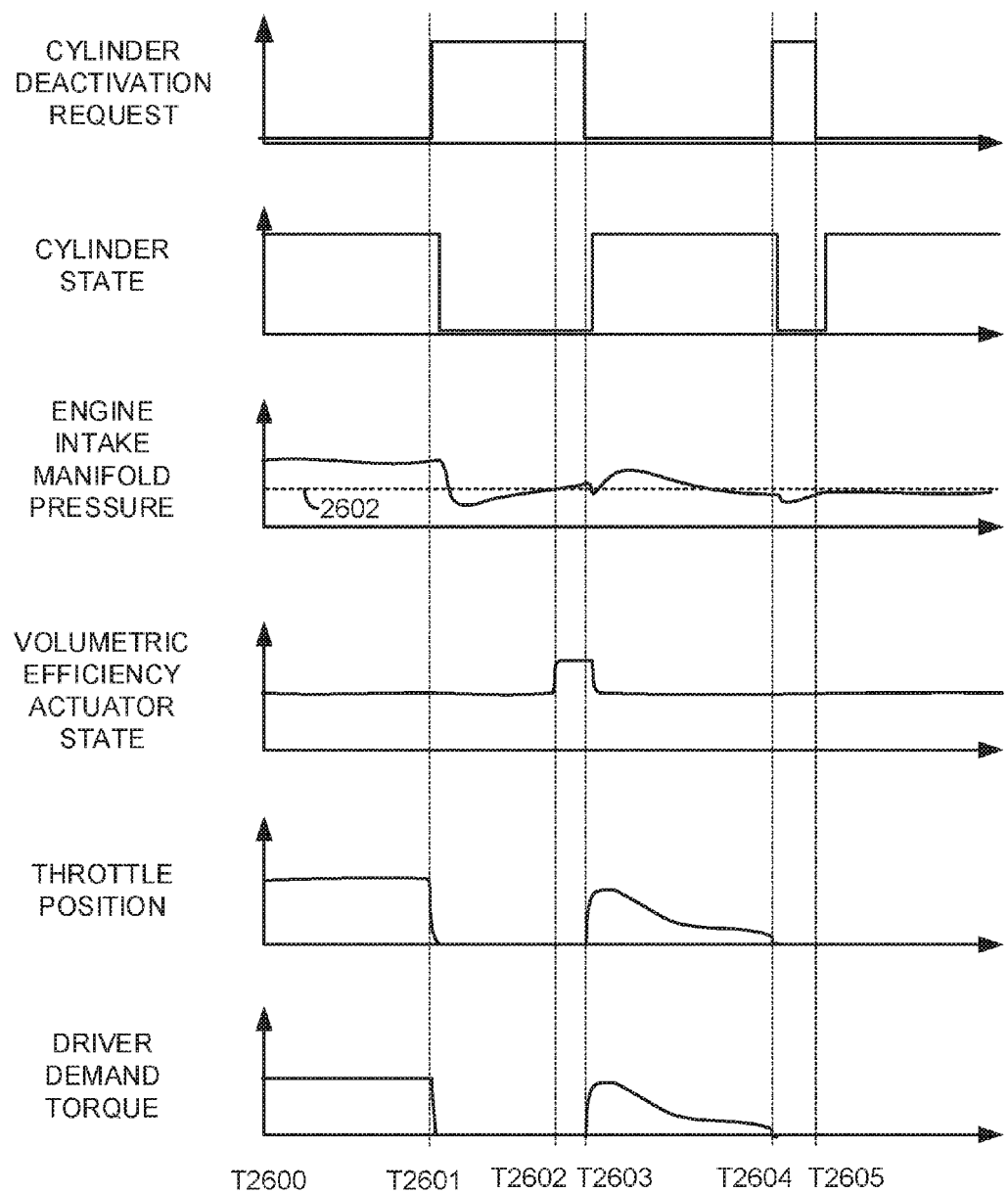
FIG. 26 is an operating sequence for controlling engine intake manifold pressure.

Referring now to FIG. 26, a sequence for operating an engine according to the method of FIG. 25 is shown. The vertical lines at time T2600-T2405 represent times of interest in the sequence. FIG. 26 shows six plots and the plots are time aligned and occur at the same time.

The first plot from the top of FIG. 24 is a plot of cylinder deactivation request versus time. The vertical axis represents the cylinder deactivation request. Cylinder deactivation is requested when the cylinder deactivation request trace is at a higher level near the vertical axis arrow. Cylinder deactivation is not requested when the cylinder deactivation request trace is at a lower level near the horizontal axis. The horizontal axis represents time and time increases from the left side of the figure to the right side of the figure.

The second plot from the top of FIG. 26 is a plot of cylinder state versus time. The vertical axis represents the cylinder state. The cylinder is deactivated when the cylinder state trace is at a lower level near the horizontal axis. The cylinder is not deactivated when the cylinder trace is at a higher level near the vertical axis arrow. The horizontal axis represents time and time increases from the left side of the figure to the right side of the figure.

The third plot from the top of FIG. 26 is a plot of engine intake manifold pressure versus time. The vertical axis represents engine intake manifold pressure and engine intake manifold pressure increases in the direction of the vertical axis arrow. The horizontal axis represents time and time increases from the left side of the figure to the right side of the figure. Horizontal line 2602 represents a desired engine intake manifold pressure during deceleration cut out. The level of 2602 may be a same pressure as when the engine is operating at idle speed and no driver demand torque.

The fourth plot from the top of FIG. 26 is a plot of engine volumetric efficiency actuator state versus time. The vertical axis represents engine volumetric efficiency actuator state and the engine volumetric efficiency actuator increases engine volumetric efficiency in the direction of the vertical axis arrow. The engine volumetric efficiency actuator state lowers engine volumetric efficiency when the trace is near the horizontal axis. The horizontal axis represents time and time increases from the left side of the figure to the right side of the figure.

The fifth plot from the top of FIG. 26 is a plot of engine throttle position versus time. The vertical axis represents engine throttle position and the throttle opening amount increases when the trace is closer to the vertical axis arrow. The engine throttle opening amount decreases when the trace is near the horizontal axis. The horizontal axis represents time and time increases from the left side of the figure to the right side of the figure.

The sixth plot from the top of FIG. 26 is a plot of driver demand torque versus time. The vertical axis represents driver demand torque and the driver demand torque increases in the direction of the vertical axis arrow. The driver demand torque decreases when the driver demand torque trace is near the horizontal axis. The horizontal axis represents time and time increases from the left side of the figure to the right side of the figure.

At time T2600, the cylinder deactivation request is not asserted and the cylinder state is asserted to indicate that engine cylinders are active and combusting air and fuel. The engine intake manifold pressure is at a higher level and the engine throttle position is open more than a middle level. The engine volumetric efficiency actuators (e.g., camshafts, charge motion control valves, and plenum control valve are at a middle position to provide a middle level of engine volumetric efficiency. The driver demand torque is a middle level.

At time T2601, the cylinder deactivation request is asserted. The cylinder deactivation request is asserted in response to a decrease in driver demand torque and the engine may be in deceleration fuel cut out. The engine throttle position is also decreased in response to the decrease in driver demand torque. The cylinder state transitions to not asserted to indicate engine cylinders are deactivated in response to the cylinder deactivation request. The engine intake manifold pressure decreases in response to closing the throttle. The cylinder intake valves of cylinders are closed after the throttle closes and after an actual total number of cylinder intake events that reduced the intake manifold pressure to desired level 2602. The cylinder exhaust valves may also be closed (not shown). The engine intake valves are held closed over one or more engine cycles when the cylinders are deactivated. Fuel flow to the cylinders is also deactivated (not shown). The position of engine volumetric efficiency actuators remains unchanged.

Between time T2601 and time T2602, engine intake manifold pressure (MAP) increases in response to air leaking into the engine intake manifold. The air is not evacuated from the engine intake manifold since the cylinder intake valves are closed. The cylinder deactivation request remains asserted and the cylinders remain deactivated. The throttle position remains in a fully closed state and the driver demand remains low.

At time T2602, the position of the engine volumetric efficiency actuators is adjusted to increase engine volumetric efficiency an anticipation of reactivating engine cylinders. The engine volumetric efficiency actuators are not adjusted to positions based on engine speed and driver demand torque. Rather, they are adjusted to positions that increase engine volumetric efficiency beyond positions of engine volumetric efficiency the actuators provide when they are adjusted responsive to engine speed and driver demand torque. In this example, the position of volumetric efficiency actuators is adjusted in response to engine intake manifold pressure exceeding a desired engine intake manifold pressure 2602. By adjusting volumetric efficiency actuators in response to MAP, undesirable changes in the positions of the volumetric efficiency actuators may be avoided. Engine intake manifold pressure increases from a pressure below 2602 to a pressure greater than 2602. However, the engine volumetric efficiency actuators may be adjusted a predetermined amount of time after deactivating cylinders or in response to a request to reactivate engine cylinders. As an alternative, the engine volumetric efficiency actuator position may be adjusted to increase engine volumetric efficiency in response to the request for cylinder deactivation. In one example, camshaft timing is advance or retarded to maximize air inducted from the engine intake manifold into engine cylinders (e.g., camshaft timing is adjusted to provide a higher in cylinder pressure at the time of intake valve closing). Further, intake valve opening and exhaust valve opening overlap is adjusted to zero or negative to reduce air flow into the cylinder from the exhaust system (not shown). The engine throttle position and driver demand torque remain unchanged.

At time T2603, the cylinder deactivation request is transitioned to not asserted in response to an increase in driver demand torque. The cylinder deactivation request may transition to not asserted in response to an increase in driver demand torque or vehicle speed being less than a threshold speed (not shown). Shortly thereafter, the engine cylinders are reactivated (e.g., intake and exhaust valves open and close each engine cycle and spark and fuel are combusted within engine cylinders) as indicated by the cylinder state transitioning to indicate active cylinders. Further, the position of the volumetric efficiency actuators is adjusted to a position based on engine speed and driver demand torque. The throttle position moves in response to the driver demand torque.

Between time T2603 and time T2604, the driver demand torque increases and then decreases. The throttle position also increases and decreases in response to the driver demand torque. The engine intake manifold pressure increases and then decreases to below 2602.

At time T2604, cylinder deactivation is requested a second time. However, because engine intake manifold pressure is below level 2602, the position of the volumetric efficiency actuators is not adjusted. The engine cylinders are deactivated (e.g., combustion is inhibited in the cylinders via ceasing fuel flow and spark to the cylinders, cylinder valves are also deactivated so that they are held closed over one or more engine cycles) as indicated by the cylinder state trace transitioning to a lower level.

At time T2605, the cylinder deactivation request transitions to not asserted in response to vehicle speed less than a threshold (not shown). The engine cylinders are also reactivated as indicated by the cylinder state trace transitioning to a higher level. The engine volumetric efficiency actuator positions are not adjusted responsive to the deactivation request not being asserted because engine intake manifold pressure is less than 2602.

Figure 27A:
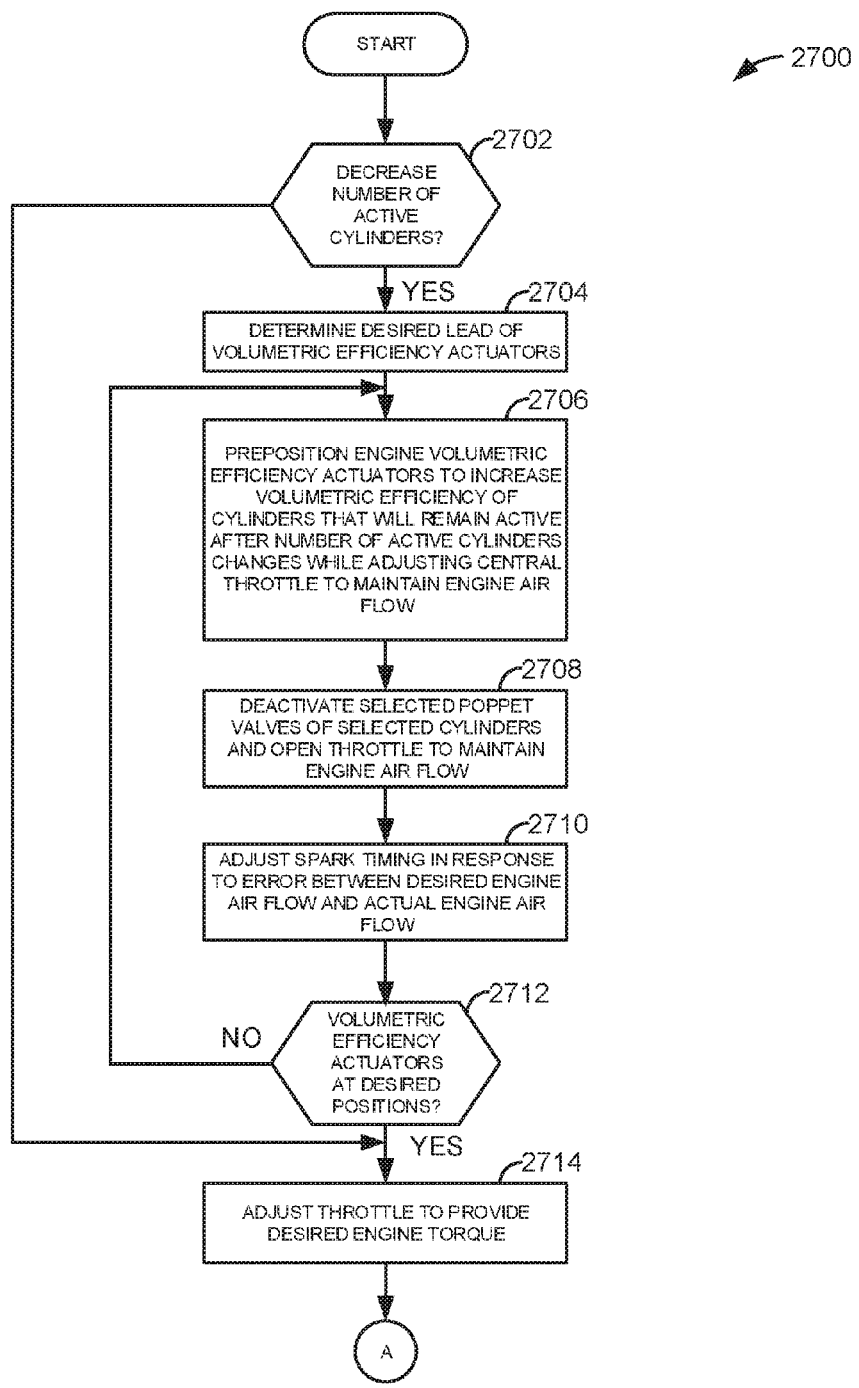
FIGS. 27A and 27B show a flowchart for adjusting engine actuators to improve engine cylinder mode changes.
Figure 27B:
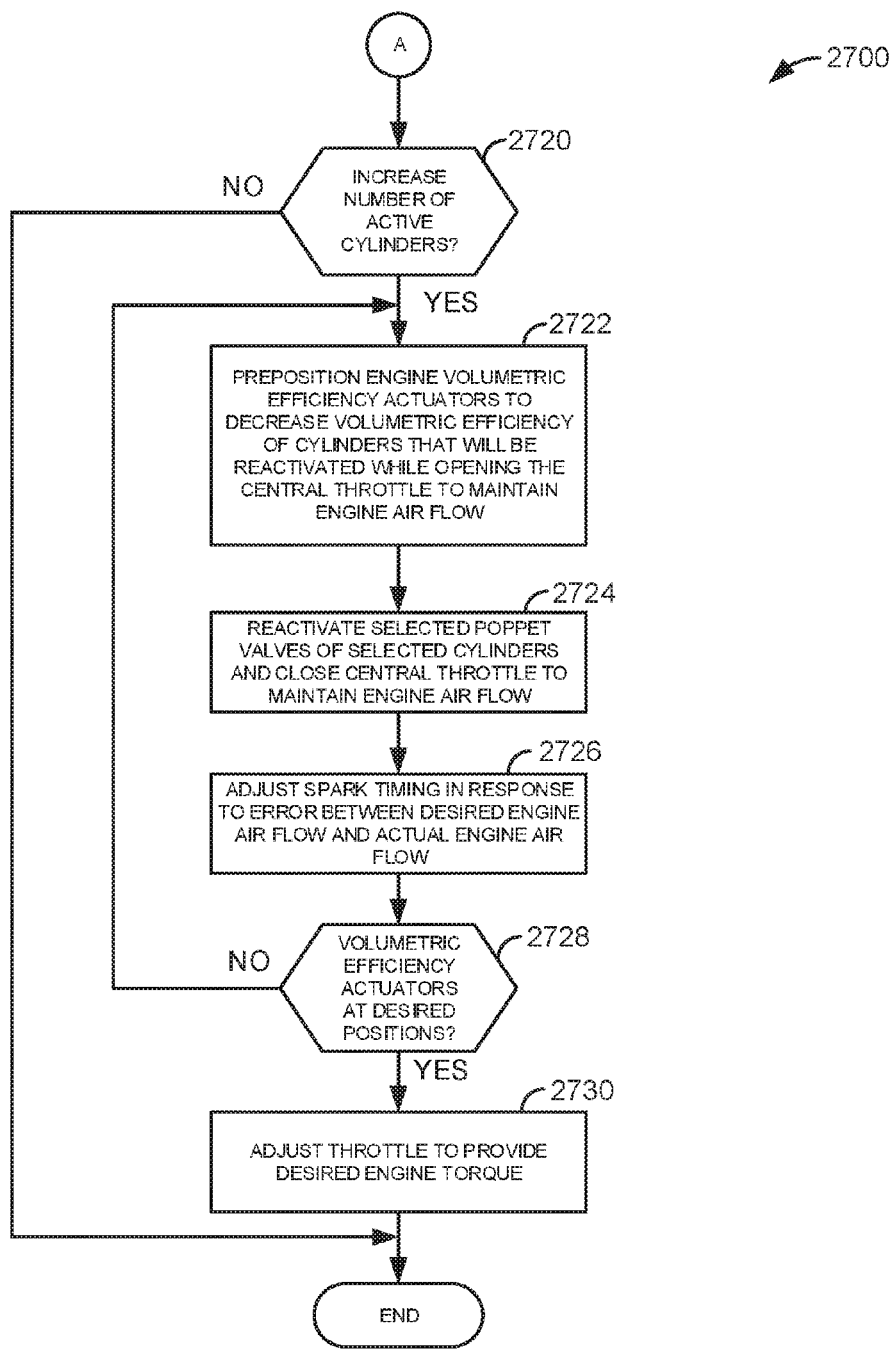

In this way, MAP may be controlled when exiting a cylinder deactivation state to conserve fuel and reduce torque disturbances. The volumetric efficiency actuators are adjusted to increase the amount of air inducted into engine cylinders so that the engine intake manifold pressure is reduced soon after reactivating engine cylinders. Referring now to FIGS. 27A and 27B, a method for controlling engine torque during cylinder modes is shown. The method of FIGS. 27A and 27B may be included in the system described in FIGS. 1A-6C. The method of FIGS. 27A and 27B may be included as executable instructions stored in non-transitory memory. The method of FIGS. 27A and 27B may perform in cooperation with system hardware and other methods described herein to transform an operating state of an engine or its components.

At 2702, method 2700 judges if there is a request to decrease an actual total number of active cylinders (e.g., cylinders with valves that open and close during an engine cycle and cylinders that combust air and fuel during the engine cycle). Method 2700 may judge that there is a request to decrease an actual total number of actual cylinders in response to a decrease in driver demand torque, vehicle speed greater than a threshold, and/or other conditions. If method 2700 judges that there is a request to decrease an actual total number of active cylinders, the answer is yes and method 2700 proceeds to 2704. Otherwise, the answer is no and method 2700 proceeds to 2714.

At 2704, method 2700 determines a desired lead of volumetric efficiency actuators for decreasing an actual total number of active cylinders. The lead for the volumetric efficiency actuators is an amount of time from when positions of volumetric efficiency actuators are adjusted for decreasing an actual total number of active cylinders to a time when deactivation of cylinders begins. Adjusting the lead time for the volumetric efficiency actuators may smooth engine torque and provide time for volumetric efficiency actuators to reach desired positions before cylinder deactivation begins so that the engine does not provide more or less torque than is desired. In one example, the lead time is empirically determined and stored in memory. Further, the value of lead time stored in memory may be adjusted based on a difference in desired cylinder air charge and actual cylinder air charge during a transition that decreases the total actual number of active cylinders. The lead time value is extracted from memory. Method 2700 proceeds to 2706.

At 2706, method 2700 prepositions the engine volumetric efficiency actuators including an amount of boost provided by a turbocharger to increase engine volumetric efficiency. For example, boost may be increased, charge motion control valves may be fully opened, intake plenum volume valves are positioned to decrease intake manifold volume, compressor bypass valves may be at least partially closed, and camshaft timing is adjusted to maximize cylinder charge at intake valve closing time. Engine boost may be increased via closing a waste gate or closing the compressor bypass valve. Adjusting the positions of engine volumetric efficiency actuators increases the volumetric efficiency of cylinders that remain active after the actual total number of active cylinders is decreased. Further, the engine's central throttle is at least partially closed at the same time (e.g., simultaneously) as the previously mentioned engine volumetric efficiency actuators are adjusted. Closing the central throttle maintains the engine air flow rate while engine volumetric efficiency actuators are adjusted to increase engine volumetric efficiency. Method 2700 proceeds to 2708.

At 2708, selected cylinders are deactivated after the lead time expires. The cylinders are deactivated via holding intake valves of the cylinders closed over one or more engine cycles while the engine rotates. In some examples, exhaust valves of the cylinders being deactivated may also be held closed over one or more engine cycles while the engine rotates. Further, fuel flow and spark are not delivered to cylinders that are being deactivated. While cylinders are being deactivated, the central throttle is snapped open and fuel delivery is increased to active cylinders so that torque produced by active cylinders counters a torque loss due to deactivating cylinders. Method 2700 proceeds to 2710.

At 2710, method 2700 adjusts spark timing in response to an error between desired engine air flow and actual engine air flow. The desired engine air flow is engine air flow based on driver demand torque at the time of the cylinder deactivation request. The actual engine air flow is air flow that is measured via an air flow sensor. For example, if the actual engine air flow is greater than the desired engine air flow, the engine air flow error is negative and spark timing is retarded to maintain engine torque. If the actual engine air flow is less than the desired engine air flow, the engine air flow error is positive and spark timing is advanced to maintain engine torque. Method 2700 proceeds to 2712.

At 2712, method 2700 judges if engine volumetric efficiency actuators are at their desired positions. For example, method 2700 judges if actual engine boost is equal to desired engine boost. Further, method 2700 judges if actual camshaft timing is equal to desired camshaft timing. Likewise, method 2700 judge if actual charge motion control valve position is equal to desired charge motion control valve position. Method 2700 may judge that volumetric efficiency actuators are at their desired positions based on output of one or more sensors such as an intake manifold pressure sensor. If the engine volumetric efficiency actuators are at their desired positions, the answer is yes and method 2700 proceeds to 2714. Otherwise, the answer is no and method 2700 returns to 2706 to provide more time to move the engine volumetric efficiency actuators.

At 2714, method 2700 adjusts the engine central throttle to provide a desired engine torque. The desired engine torque may be based on a driver demand torque. Method 2700 proceeds to 2720.

At 2720, method 2700 judges if there is a request to increase an actual total number of active cylinders (e.g., cylinders with valve that open and close during an engine cycle and cylinders that combust air and fuel during the engine cycle). Method 2700 may judge that there is a request to increase an actual total number of actual cylinders in response to an increase in driver demand torque, vehicle speed less than a threshold, and/or other conditions. If method 2700 judges that there is a request to increase an actual total number of active cylinders, the answer is yes and method 2700 proceeds to 2722. Otherwise, the answer is no and method 2700 proceeds to exit.

At 2722, prepositions the engine volumetric efficiency actuators including an amount of boost provided by a turbocharger to decrease engine volumetric efficiency. For example, boost may be decreased, charge motion control valves may be at least partially closed, intake plenum volume valves are positioned to increase intake manifold volume, and camshaft timing is adjusted to reduce cylinder charge at intake valve closing time. Adjusting the positions of engine volumetric efficiency actuators decreases the volumetric efficiency of cylinders that are active before the actual total number of active cylinders is increased. Further, the engine's central throttle is at least partially opened at the same time (e.g., simultaneously) as the previously mentioned engine volumetric efficiency actuators are adjusted. Opening the central throttle maintains the engine air flow rate while engine volumetric efficiency actuators are adjusted to decrease engine volumetric efficiency.

Additionally, in some examples, intake valve and exhaust valve opening time overlap of engine cylinders (e.g., activated and/or cylinders being activated) may be increased in response to turbocharger waste gate position one cylinder cycle before cylinder reactivation. The turbocharger waste gate position may be indicative of exhaust pressure in deactivated cylinders that include exhaust valves that open and close while the cylinder is deactivated. However, in other examples, the amount of overlap may be based on an amount of residual exhaust gas in the cylinder. For example, the amount of overlap may be increased as the residual amount of exhaust gas in the cylinder increases. If the deactivated cylinders include non-deactivating exhaust valves, boost pressure may be decreased less as compared to if the cylinder is configured with deactivating exhaust valves because exhaust density in cylinders with non-deactivating cylinders may be higher for otherwise same conditions because exhaust in cylinders with non-deactivating cylinders may be cooler. Method 2700 proceeds to 2724.

At 2724, selected cylinders are reactivated. The cylinders are reactivated via opening and closing intake valves of the cylinders over one or more engine cycles while the engine rotates. In some examples, exhaust valves of the cylinders being reactivated may also be opened and closed over one or more engine cycles while the engine rotates. Further, fuel flow and spark are delivered to cylinders that are being reactivated. While cylinders are being reactivated, the central throttle is snapped closed and fuel delivery is decreased to active cylinders so that torque produced by active cylinders counters a torque increase due to reactivating cylinders. Method 2700 proceeds to 2726.

At 2726, method 2700 adjusts spark timing in response to an error between desired engine air flow and actual engine air flow. The desired engine air flow is engine air flow based on driver demand torque at the time of the cylinder deactivation request. For example, if the actual engine air flow is greater than the desired engine air flow, the engine air flow error is negative and spark timing is retarded to maintain engine torque. If the actual engine air flow is less than the desired engine air flow, the engine air flow error is positive and spark timing is advanced to maintain engine torque. Method 2700 proceeds to 2728.

At 2728, method 2700 judges if engine volumetric efficiency actuators are at their desired positions. For example, method 2700 judges if actual engine boost is equal to desired engine boost. Further, method 2700 judges if actual camshaft timing is equal to desired camshaft timing. Likewise, method 2700 judge if actual charge motion control valve position is equal to desired charge motion control valve position. Method 2700 may judge that volumetric efficiency actuators are at their desired positions based on output of one or more sensors such as an intake manifold pressure sensor. If the engine volumetric efficiency actuators are at their desired positions, the answer is yes and method 2700 proceeds to 2714. Otherwise, the answer is no and method 2700 returns to 2706 to provide more time to move the engine volumetric efficiency actuators.

At 2730, method 2700 adjusts the engine central throttle to provide a desired engine torque. The desired engine torque may be based on a driver demand torque. Method 2700 proceeds to exit.

In this way, positions of engine volumetric efficiency actuators may be adjusted when increasing and decreasing the actual total number of active cylinders. Moving the volumetric efficiency actuators at the same time the engine central throttle is moved may reduce engine torque disturbances and reduce engine fuel consumption.

Figure 28A:
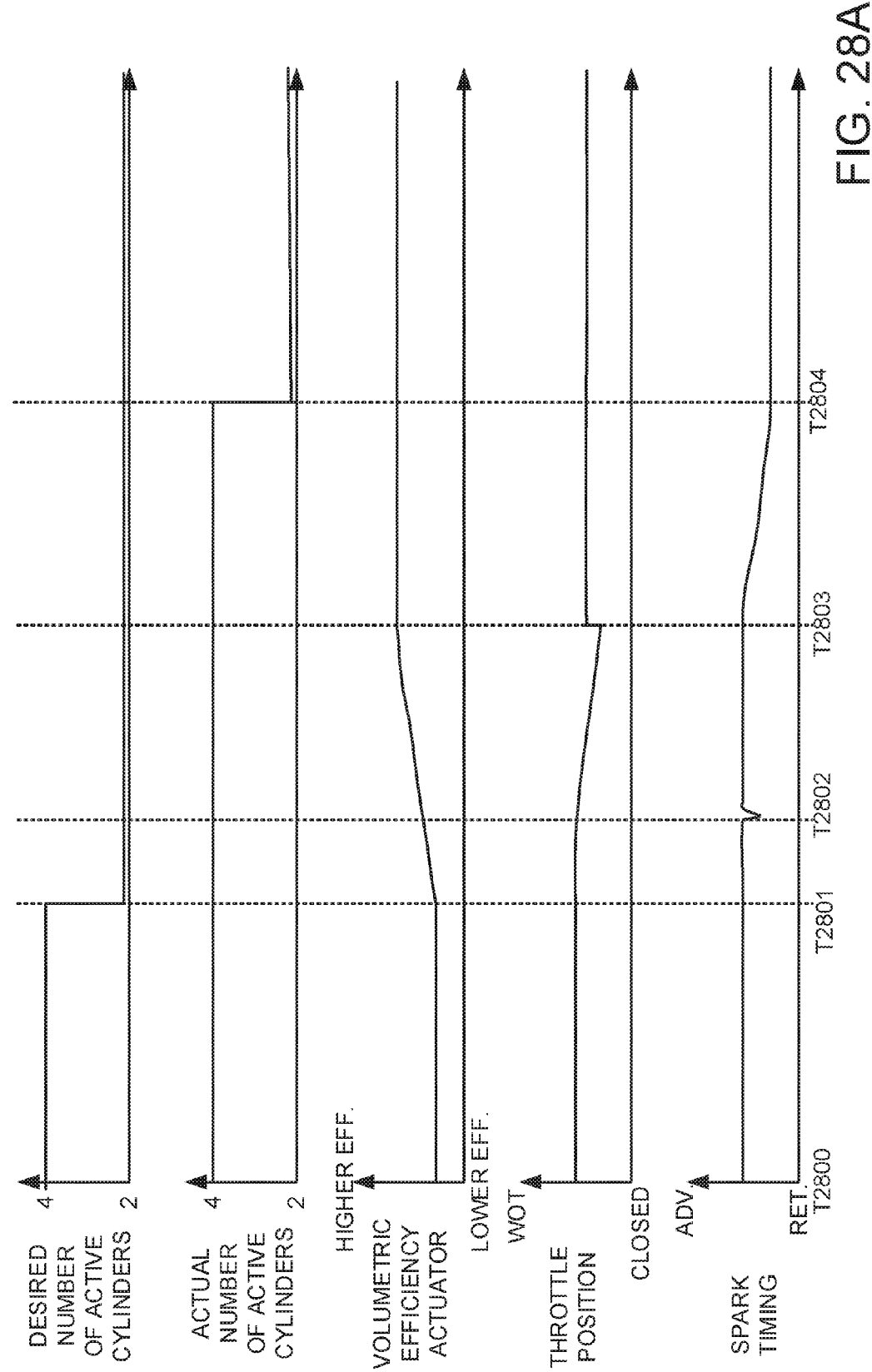
FIGS. 28A and 28B show sequences for improving cylinder mode changes.

Referring now to FIG. 28A, a sequence for operating an engine according to the method of FIGS. 27A and 27B is shown. The engine in the sequence is a four cylinder engine having a firing order of 1-3-4-2. The vertical lines at time T2800-T2804 represent times of interest in the sequence. FIG. 28A shows five plots and the plots are time aligned and occur at the same time.

The first plot from the top of FIG. 28A is a plot of a desired number of active engine cylinders (e.g., cylinders with intake and exhaust valves that open and close during an engine cycle and cylinders in which combustion occurs) versus time. The vertical axis represents the desired number of active engine cylinders and the desired number of active cylinders is listed along the vertical axis. The horizontal axis represents time and time increases from the left side of the figure to the right side of the figure.

The second plot from the top of FIG. 28A is a plot of an actual number of active engine cylinders (e.g., cylinders with intake and exhaust valves that open and close during an engine cycle and cylinders in which combustion occurs) versus time. The vertical axis represents the actual number of active engine cylinders and the actual number of active cylinders is listed along the vertical axis. The horizontal axis represents time and time increases from the left side of the figure to the right side of the figure.

The third plot from the top of FIG. 28A is a plot of engine volumetric efficiency actuator position (e.g., waste gate position for adjusting engine boost, camshaft position, charge motion control valve position, plenum actuator position) versus time. The vertical axis represents engine volumetric efficiency actuator position and the position of the actuator increases engine volumetric efficiency in the direction of the vertical axis arrow. The position of the actuator decreases engine volumetric efficiency near the horizontal axis. The horizontal axis represents time and time increases from the left side of the figure to the right side of the figure.

The fourth plot from the top of FIG. 28A is a plot of central throttle position versus time. The vertical axis represents central throttle position and central throttle position increases in the direction of the vertical axis arrow. The horizontal axis represents time and time increases from the left side of the figure to the right side of the figure.

The fifth plot from the top of FIG. 28A is a plot of spark timing versus time. The vertical axis represents spark timing and spark timing advances in the direction of the vertical axis arrow. The spark timing is retarded near the horizontal axis. The horizontal axis represents time and time increases from the left side of the figure to the right side of the figure.

At time T2800, the desired actual total number of engine cylinders is four and the actual total number of active cylinders is four. The engine volumetric efficiency actuators are positioned to provide a lower level of volumetric efficiency. For example, a waste gate is opened to reduce boost, cam timing is advanced to reduce cylinder charge, a plenum valve is positioned to increase intake manifold volume, and charge motion control valves are closed to decrease volumetric efficiency. The engine throttle is partially open and spark timing is advanced to a middle level.

At time 2801, the desired actual total number of active cylinders transitions from four to two. The desired actual total number of active cylinders may be reduced in response to a reduction in driver demand torque (not shown) or other conditions. The actual total number of active cylinders remains at a value of four since no cylinders have been deactivated in response to the desired actual total number of active cylinders. The volumetric efficiency actuator position is providing a low level of engine volumetric efficiency and the throttle position is at a middle level. The spark timing is advanced to a middle level.

Between time T2801 and time T2802, the volumetric efficiency actuator position is changed to increase engine volumetric efficiency and the throttle begins closing. The desired actual total number of active cylinders and the actual total number of active cylinders remain constant. Spark timing also remains constant.

At time T2802, spark timing is retarded in response to an error between actual engine air flow being greater than desired engine air flow. Retarding spark timing truncates engine torque so that engine torque may be maintained constant. The volumetric efficiency actuator position continues to change to increase engine volumetric efficiency and the throttle continues closing. The desired actual total number of active cylinders and the actual total number of active cylinders remain constant.

At time T2803, deactivation of cylinder valves begins. The cylinder valves may be deactivated via valve operators described in FIG. 5B, other valve operators described herein, or other known valve operators. In one example, valve operators are deactivated to deactivate cylinder intake valves. Cylinder exhaust valves may also be deactivated. The throttle position is increased to open the throttle so that additional air flows into the two cylindersthat remain active. By increasing throttle position, intake manifold pressure (MAP) increases, thereby increasing air flow into active engine cylinders. Air flow ceases to deactivated cylinders as the intake valves of the cylinders being deactivated are deactivated and held closed. The spark timing begins to be retarded since the air charge amount of active cylinders increases. The engine volumetric efficiency actuator does not change position and the desired actual total number of active cylinders remains at a value of two. The actual total number of active cylinders also remains at two since engine cylinders have not been deactivated.

At time T2804, the actual total number of active engine cylinder changes from four to two. The intake valves of two cylinders (e.g., cylinder numbers 2 and 3) are deactivated (not shown) and the throttle position remains constant. The spark timing ceases to change and the engine volumetric efficiency actuator does not change position.

In this way, positions of volumetric efficiency actuators and the engine throttle may be adjusted prior to deactivating cylinder valves so that less fuel is used during cylinder mode transitions. Further, spark timing may be adjusted responsive to cylinder air charge error instead of in response to a change in engine throttle position so that less spark retard may be used.

Figure 28B:
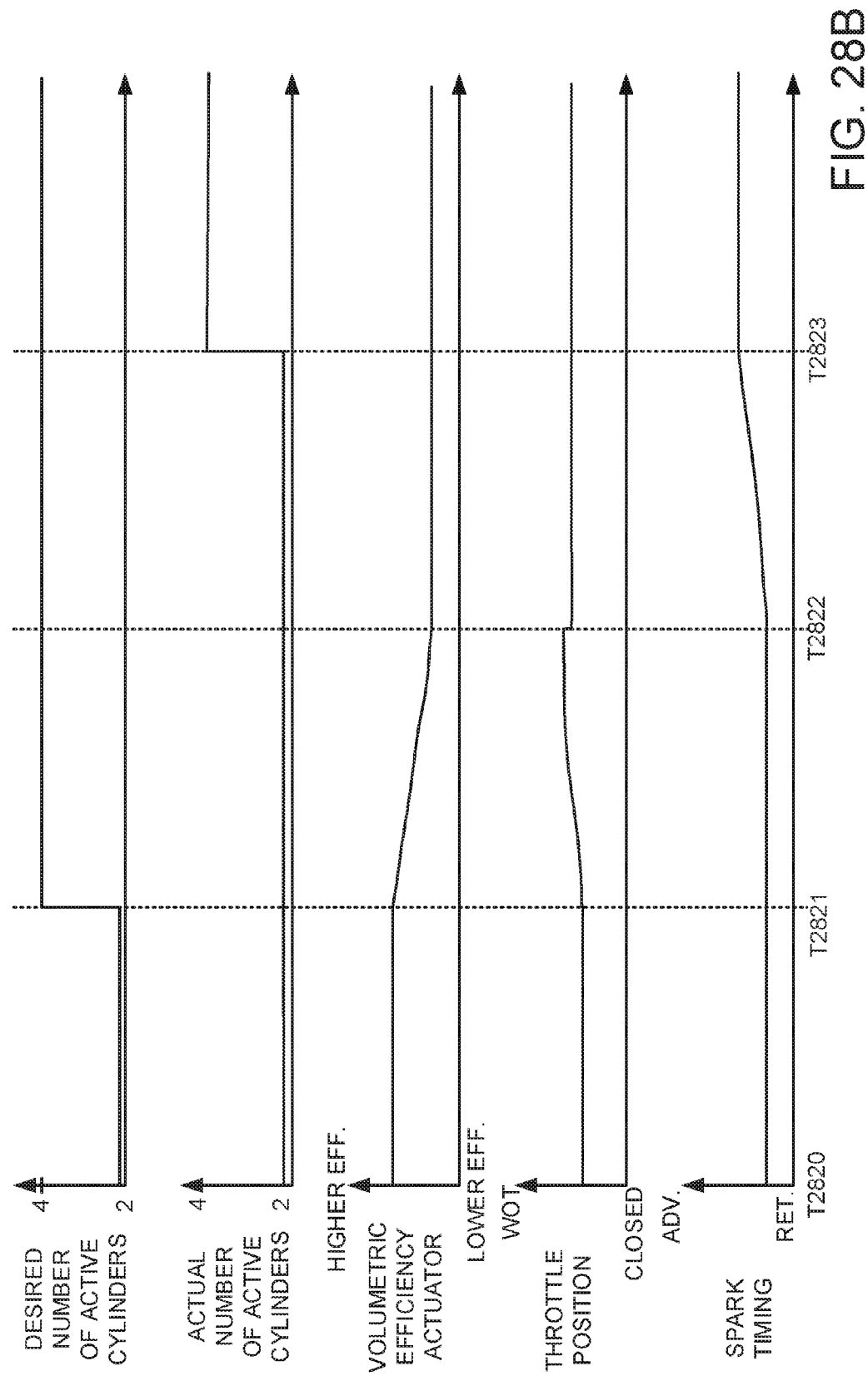

Referring now to FIG. 28B, a sequence for operating an engine according to the method of FIGS. 27A and 27B is shown. The engine in the sequence is a four cylinder engine having a firing order of 1-3-4-2. The vertical lines at time T2820-T2823 represent times of interest in the sequence. FIG. 28B shows five plots and the plots are time aligned and occur at the same time.

The first plot from the top of FIG. 28B is a plot of a desired number of active engine cylinders (e.g., cylinders with intake and exhaust valves that open and close during an engine cycle and cylinders in which combustion occurs) versus time. The vertical axis represents the desired number of active engine cylinders and the desired number of active cylinders is listed along the vertical axis. The horizontal axis represents time and time increases from the left side of the figure to the right side of the figure.

The second plot from the top of FIG. 28B is a plot of an actual number of active engine cylinders (e.g., cylinders with intake and exhaust valves that open and close during an engine cycle and cylinders in which combustion occurs) versus time. The vertical axis represents the actual number of active engine cylinders and the actual number of active cylinders is listed along the vertical axis. The horizontal axis represents time and time increases from the left side of the figure to the right side of the figure.

The third plot from the top of FIG. 28B is a plot of engine volumetric efficiency actuator position (e.g., waste gate position for adjusting engine boost, camshaft position, charge motion control valve position, plenum actuator position) versus time. The vertical axis represents engine volumetric efficiency actuator position and the position of the actuator increases engine volumetric efficiency in the direction of the vertical axis arrow. The position of the actuator decreases engine volumetric efficiency near the horizontal axis. The horizontal axis represents time and time increases from the left side of the figure to the right side of the figure.

The fourth plot from the top of FIG. 28B is a plot of central throttle position versus time. The vertical axis represents central throttle position and central throttle position increases in the direction of the vertical axis arrow. The horizontal axis represents time and time increases from the left side of the figure to the right side of the figure. The fifth plot from the top of FIG. 28B is a plot of spark timing versus time. The vertical axis represents spark timing and spark timing advances in the direction of the vertical axis arrow. The spark timing is retarded near the horizontal axis. The horizontal axis represents time and time increases from the left side of the figure to the right side of the figure.

At time T2820, the desired actual total number of engine cylinders is two and the actual total number of active cylinders is two. The engine volumetric efficiency actuators are positioned to provide a higher level of volumetric efficiency. For example, a waste gate is closed to increase boost, cam timing is retarded to increase cylinder charge, a plenum valve is positioned to decrease intake manifold volume, and charge motion control valves are opened to increase volumetric efficiency. The engine throttle is partially open and spark timing is advanced to a lower middle level.

At time 2821, the desired actual total number of active cylinders transitions from two to four. The desired actual total number of active cylinders may be increased in response to an increase in driver demand torque (not shown) or other conditions. The actual total number of active cylinders remains at a value of two since no cylinders have been reactivated in response to the desired actual total number of active cylinders. The volumetric efficiency actuator position is providing a higher level of engine volumetric efficiency and the throttle position is at a middle level. The spark timing is advanced to a lower middle level.

Between time T2821 and time T2822, the volumetric efficiency actuator position is changed to decrease engine volumetric efficiency and the throttle begins opening. The desired actual total number of active cylinders and the actual total number of active cylinders remain constant. Spark timing is constant.

At time T2822, reactivation of cylinder valves begins. The cylinder valves may be reactivated via valve operators described in FIG. 5B, other valve operators described herein, or other known valve operators. In one example, valve operators are reactivated to reactivate cylinder intake valves. Cylinder exhaust valves may also be reactivated. The throttle position is decreased to close the throttle so that less air flows into the two cylinders that are active. By decreasing throttle position, intake manifold pressure (MAP) decreases, thereby decreasing air flow into active engine cylinders. Air flows into reactivating cylinders as the intake valves of the cylinders being reactivated are opened and closed. The spark timing remains begins to be advanced since the air charge amount of active cylinders decreases. The engine volumetric efficiency actuator does not change position and the desired actual total number of active cylinders remains at a value of four. The actual total number of active cylinders remains at two since engine cylinders have not been reactivated.

At time T2823, the actual total number of active engine cylinder changes from two to four. The intake valves of two cylinders (e.g., cylinder numbers 2 and 3) are reactivated (not shown) and the throttle position remains constant. The spark timing ceases to change and the engine volumetric efficiency actuator does not change position.

In this way, positions of volumetric efficiency actuators and the engine throttle may be adjusted prior to reactivating cylinder valves so that less fuel is used during cylinder mode transitions. Further, spark timing may be adjusted responsive to cylinder air charge error instead of in response to a change in engine throttle position so that less spark retard may be used.

Figure 29:
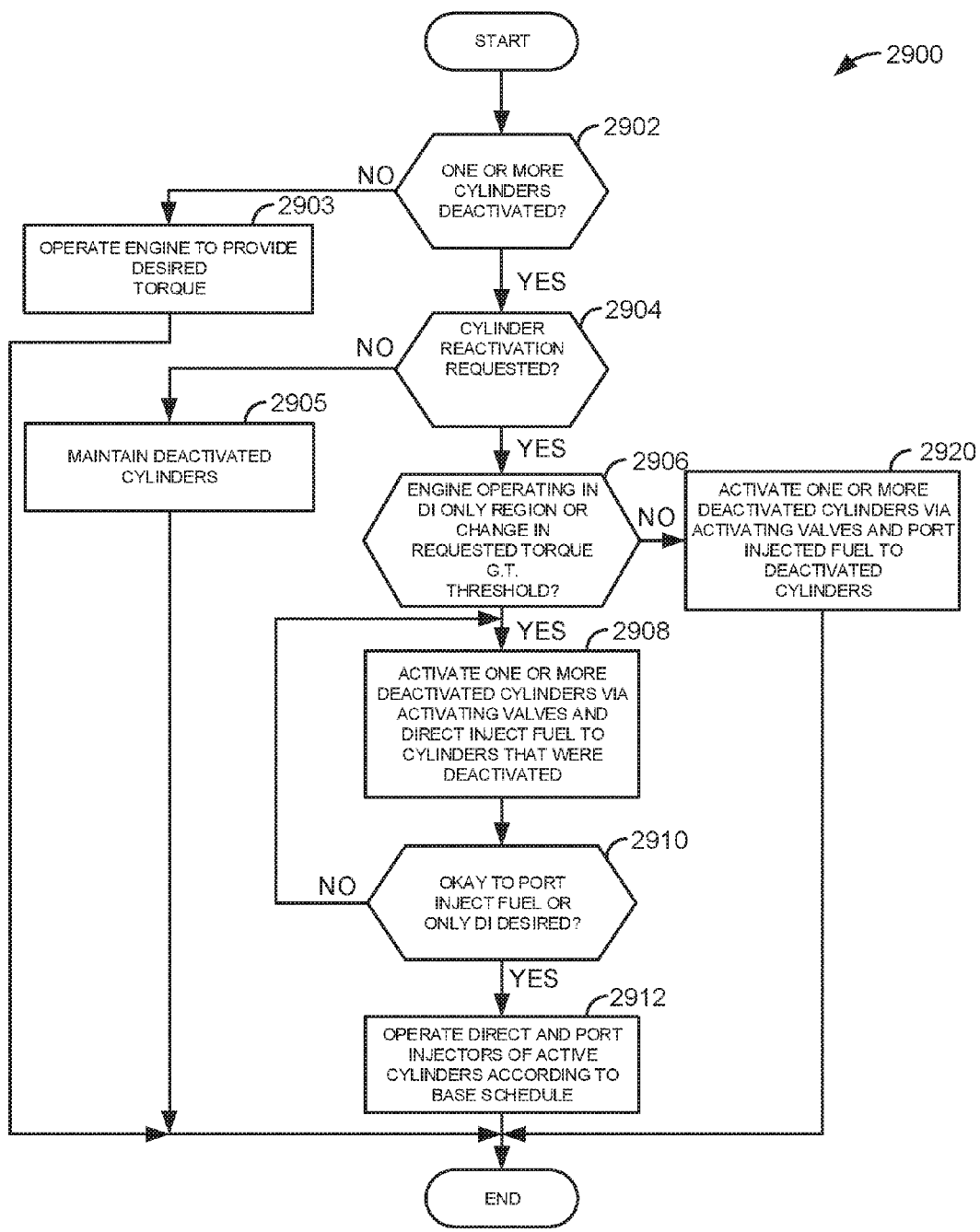
FIG. 29 is a flowchart for delivering fuel to an engine during cylinder mode changes.

Referring now to FIG. 29, a method for controlling engine fuel injection during cylinder reactivation after entering a cylinder deactivation mode is shown. The method of FIG. 29 may be included in the system described in FIGS. 1A-6C. The method of FIG. 29 may be included as executable instructions stored in non-transitory memory.

The method of FIG. 29 may perform in cooperation with system hardware and other methods described herein to transform an operating state of an engine or its components.

At 2902, method 2900 judges if one or more engine cylinders are deactivated (e.g., intake valves held closed over an engine cycle as the engine rotates and no combustion in the deactivated cylinders). In one example, method 2900 may judge that one or more cylinders are deactivated based on a value of a variable stored in memory or output of one or more sensors. If method 2900 judges that one or more engine cylinders is deactivated, the answer is yes and method 2900 proceeds to 2904. Otherwise, the answer is no and method 2900 proceeds to 2903.

At 2903, method 2900 operates engine cylinders and valves to provide a desire torque. The desired torque may be based on accelerator pedal position or a controller determined torque. The engine cylinders are activated by supplying fuel to the cylinders. The valves are activated by enabling valve operators. Method 2900 proceeds to exit.

At 2904, method 2900 judges if cylinder reactivation is requested. Cylinder reactivation may be requested in response to an increase in driver demand torque or vehicle speed being less than a threshold speed. If method 2900 judges that cylinder reactivation is requested, the answer is yes and method 2900 proceeds to 2906. Otherwise, method 2900 proceeds to 2905.

At 2905, method 2900 maintains the cylinders in a deactivated state. Fuel is not supplied to the cylinders and the cylinder valves remain deactivated. Method 2900 proceeds to exit.

At 2906, method 2900 judges if the engine is operating in a direct fuel injection (DI) only region or if there is a change in requested engine torque that is greater than a threshold. An engine with port and direct fuel injectors may operate only the direct fuel injectors within a first defined engine operating range (e.g., a defined engine speed and torque output range). Likewise, an engine with port and direct fuel injectors may operate only port fuel inject within a second defined engine operating range. Further, in some engine operating ranges, fuel may be supplied to the engine via port and direct fuel injectors. Method determines engine speed and engine torque then determines if the engine is operating in a range where only direct fuel injection is activated. If so, the answer is yes and method 2900 proceeds to 2908. Otherwise, the answer is no and method 2900 proceeds to 2920.

At 2920, method 2900 activates one or more deactivated engine cylinders by supplying spark and fuel to the deactivated cylinders. Additionally, valves of the deactivated cylinders that were held closed over one or more engine cycles are activated to open and close over an engine cycle. The fuel is injected to the cylinders via port fuel injectors since the engine is not operating in a direct injection only engine operating region and since the rate of change in requested engine torque is less than the threshold. Method 2900 proceeds to exit after activating one or more deactivated cylinders.

At 2908, method 2900 reactivates one or more engine cylinders via reactivating cylinder valves and supplying fuel and spark to the deactivated cylinders. The engine cylinders are reactivated such that valves that were held closed during one or more engine cycles open and close during one or more engine cycles. Fuel is supplied to the formerly deactivated cylinders by directly injecting fuel to the cylinders.

Direct injection offers the opportunity to combust air and fuel in the formerly deactivated cylinders sooner than port injecting fuel because direct fuel injectors can inject fuel during a compression stroke of a cylinder cycle (e.g., later in the cylinder cycle) while a port fuel injector has to inject fuel during an intake stroke of the cylinder cycle or earlier to support combustion during the cylinder cycle. Therefore, if cylinder reactivation is requested after an intake stoke of a cylinder, fuel can be injected during the compression stroke of the cylinder to support combustion in the cylinder during the compression stroke. In this way, direct injection may enable combustion in a deactivated cylinder in less than 180 crankshaft degrees from the crankshaft degree where cylinder activation is requested, whereas it may take more than 180 crankshaft degrees from the crankshaft degree where cylinder activation is requested for port fuel injected fuel injected to a formerly deactivated cylinder to participate in combustion.

If the engine is operating in a range where only port fuel is injected to cylinders, except in engine cycles where the cylinders are reactivated, the cylinders may be reactivated by directly injecting fuel into the cylinders for a predetermined number of engine cycles or cylinder intake events. Port fuel injection may be reactivated in the newly reactivated cylinders after the predetermined number of engine cycles or cylinder intake events at which time direct fuel injection to the newly reactivated cylinders ceases. In this way, the formerly deactivated cylinders may start sooner and direct injection to the cylinders may cease after the predetermined number of engine cycles or cylinder intake events so that mixture preparation in the cylinders may improve soon after the cylinders are reactivated. This may be particularly desirable during conditions where the rate of change in requested engine torque is greater than a threshold so that the driver may experience faster torque response to driver demand torque. If the engine is operating in a region where only direct injection is provided to engine cylinders, direct injection is resumed to the deactivated cylinders and the cylinders operate with improved charge cooling. Direct fuel injection may continue in the engine cylinders until engine operating conditions change. Method 2900 proceeds to 2910.

At 2910, method 2900 judges if it is permissible to port inject fuel or if only direct fuel injection (DI) is desired. Port fuel injection may be started after a predetermined actual total number of cylinder intake events since the request to activate one or more cylinders. The predetermined actual total number of events ensures that fuel is timely injected to formerly deactivated cylinders via direct fuel injection and that fuel mixture preparation improves in a timely manner after deactivated cylinders are reactivated. Alternatively, only direct fuel injection may be desired at the present engine operating conditions. If method 2900 judges that it is permissible to port fuel inject fuel or if only direct fuel injection is desired, the answer is yes and method 2900 proceeds to 2912. Otherwise, method 2900 returns to 2908.

At 2912, method 2900 operates direct and port fuel injectors according to a base schedule. The base schedule may be based on engine speed and driver demand torque. Therefore, direct fuel injection may be used to reactivate deactivated at earlier crankshaft angles after the request to activate cylinders, then port fuel injection or port fuel injection and direct fuel injection may replace only directly injecting fuel. Method 2900 proceeds to exit.

Figure 30:
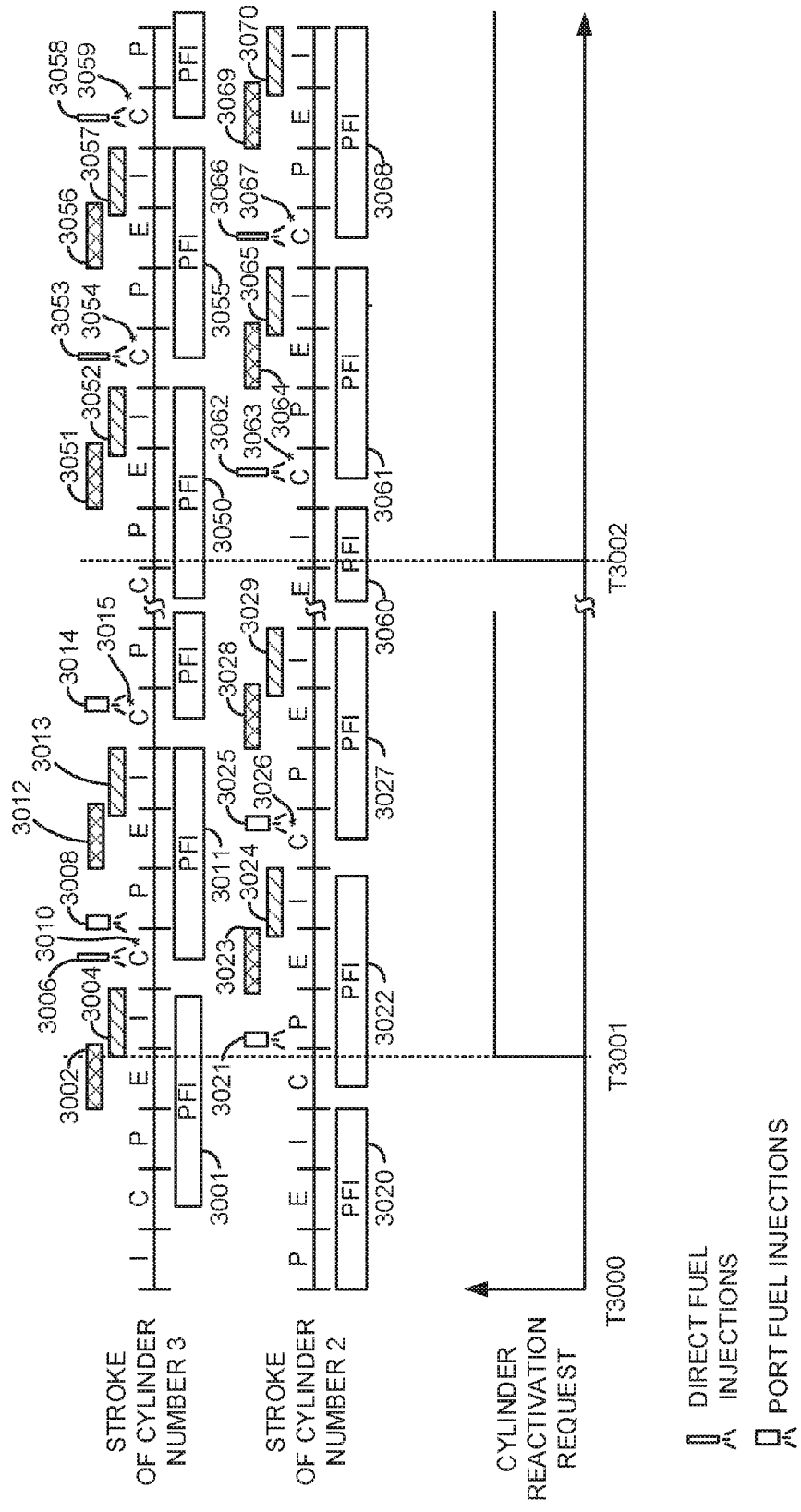
FIG. 30 is a sequence for showing fuel delivery to an engine during cylinder mode changes.

Referring now to FIG. 30, a sequence for operating an engine according to the method of FIG. 29 is shown. The vertical lines at time T3000-T3002 represent times of interest in the sequence. FIG. 30 shows three plots and the plots are time aligned and occur at the same time. The SS marks along each plot represent a brake in time. The brake in time may be long or short in duration. Events to the left of the SS marks represent engine operating conditions where fuel is only port injected unless engine cylinders are being reactivated. Events to the right of the SS marks represent engine operating conditions where fuel is only directly injected. The sequence of FIG. 30 is for a four cylinder engine with a firing order of 1-3-4-2. The three plots are aligned by crankshaft position. Example exhaust valve opening times are indicated by the cross hatched patterns 3002, 3012, 3023, 3028, 3051, 3056, 3064, and 3069. Example intake valve opening time are indicated by the hatched patterns 3004, 3013, 3024, 3029, 3052, 3057, 3065, and 3070. Start of direct fuel injection events are indicated by nozzles 3006, 3053, 3058, 3062, and 3066. Spark events are indicated by the * at 3010, 3015, 3026, 3054, 3059, 3063, and 3067. Start of port fuel injection events are indicated by nozzles at 3008, 3014, 3021, and 3025.

The first plot from the top of FIG. 30 is a plot of engine events versus engine position for cylinder number three. Engine strokes are plotted along the horizontal axis and indicated by the letters I, C, P, and E. I represents intake stroke. C represents compression stroke, P represents power or expansion stroke, and E represents exhaust stroke. Vertical bars separate each engine stroke and represent top-dead-center or bottom-dead-center of piston travel. Port fuel injection windows such as 3001 and 3011 are identified as PFI. Fuel may be injected to a cylinder for a cylinder cycle via port fuel injectors during the port fuel injection window. Port injecting fuel outside of the port fuel injection window delivers fuel into a different cylinder cycle. Direct fuel injection to cylinders may be during intake and compression strokes.

The second plot from the top of FIG. 30 is a plot of engine events versus engine position for cylinder number two. Engine strokes are plotted along the horizontal axis and indicated by the letters I, C, P, and E. I represents intake stroke. C represents compression stroke, P represents power or expansion stroke, and E represents exhaust stroke. Vertical bars separate each engine stroke and represent top-dead-center or bottom-dead-center of piston travel.

The third plot is a plot of a cylinder reactivation request state versus engine position. The vertical axis represents cylinder reactivation state and cylinder reactivation is requested when the plot's trace is near the height of the vertical axis arrow. The cylinder reactivation state is not requesting cylinder reactivation when the plot's trace is near the horizontal axis. In some examples, the cylinder reactivation request may be replaced by a requested number of active cylinders variable.

At time T3000, cylinder numbers two and three are deactivated (e.g., fuel is not injected to the cylinders and the intake and exhaust valves of the cylinders are held in a closed state over an engine cycle) and the cylinder reactivation request is not asserted. Consequently, fuel is not injected to cylinder numbers two and three. Further, intake and exhaust valves of cylinder numbers two and three are held closed. Cylinder numbers one and four are combusting air and fuel mixtures (not shown) while the engine rotates.

At time T3001, a request is made to reactivate engine cylinders as is indicated by the cylinder reactivation request transitioning to a higher level. The cylinder reactivation request occurs half way through port fuel injection (PFI) window 3001 and it may be based on an increase in driver demand torque. Because the port fuel injector has to provide precise smaller fuel amounts and larger fuel amounts, its flow rate is such that it cannot provide enough fuel during port fuel injection window 3001 to provide for a stoichiometric mixture in cylinder number three. Therefore, fuel is directly injected so that combustion may start in cylinder number three as soon as possible after the cylinder reactivation request. Fuel is directly injected after the first intake stroke after time T3001. The fuel injected at 3006 is combusted at 3010.

The cylinder reactivation request occurs at the end of port injection window 3020 before deactivated intake and exhaust valves begin operating. Port fuel injection begins at 3021 early in port fuel injection window 3022 so that the port fuel injector of cylinder number two has sufficient time to inject a fuel amount that produces a stoichiometric mixture in cylinder number two. Fuel is not directly injected into cylinder number two because the cylinder reactivation request occurs too late in the compression stroke to directly inject a desired amount of fuel.

Fuel is port injected into cylinder number three for a second combustion event in cylinder number three at 3008. Fuel is port injected early in port fuel injection window 3011 so that a stoichiometric mixture may be provided in cylinder number three. The fuel injected at 3008 is inducted into cylinder number three when the intake valve is open at 3013. The second combustion event occurs in cylinder number three at 3015.

Fuel is port injected into cylinder number two for a second combustion event in cylinder number two at 3025. Fuel is port injected early in port fuel injection window 3027 so that a stoichiometric mixture may be provided in cylinder number two. The fuel injected at 3025 is inducted into cylinder number two when the intake valve is open at 3029. The second combustion event occurs in cylinder number three at 3026.

Cylinder numbers two and three are deactivated a second time between the SS marks and time T3002. Fuel is not injected at this time and combustion does not occur in the cylinders. Cylinder numbers one and four combust air and fuel while the engine rotates (not shown). Cylinder reactivation is not requested.

At time T3002, the cylinder reactivation request is asserted for a second time. The cylinder reactivation request may be asserted in response to an increase in driver demand torque or other conditions. The engine is operating at conditions where only direct fuel injection is scheduled. Because port fuel injection is not scheduled, the first direct injection since the cylinder reactivation request is at 3062. Fuel is injected during a compression stroke of cylinder number two and it combusts with air that is trapped in the cylinder when cylinder number two was deactivated. The injected fuel is combusted at a first combustion event 3063 since the cylinder reactivation request at T3002. However, in some examples, exhaust may be trapped in cylinder number two or air may leak by pistons if cylinder number two is deactivated for an extended period of time. During those conditions, the first direct fuel injection into cylinder number two after the cylinder reactivation request would be at 3066 after fresh air is drawn into cylinder number two.

A first direct injection for cylinder number three after time T3002 occurs at 3053 after intake and exhaust valves are reactivated and opened at 3051 and 3052. The fuel injected at 3053 is combusted at 3054.

A second direct injection into cylinder number two is performed at 3066. Fuel injected at 3066 is combusted with air inducted at 3065. Spark at 3067 initiates the second combustion event in cylinder number two since the cylinder reactivation request at T3002.

A second direct injection into cylinder number three is performed at 3058. Fuel injected at 3058 is combusted with air inducted at 3057. Spark at 3059 initiates the second combustion event in cylinder number three since the cylinder reactivation request at T3002.

In this way, direct fuel injection may reduce an amount of time to reactivate engine cylinders that have been deactivated. Further, port fuel may be injected after the engine cylinders are reactivated with direct injection to improve mixing in engine cylinders, thereby reducing engine emissions.

Figure 31:
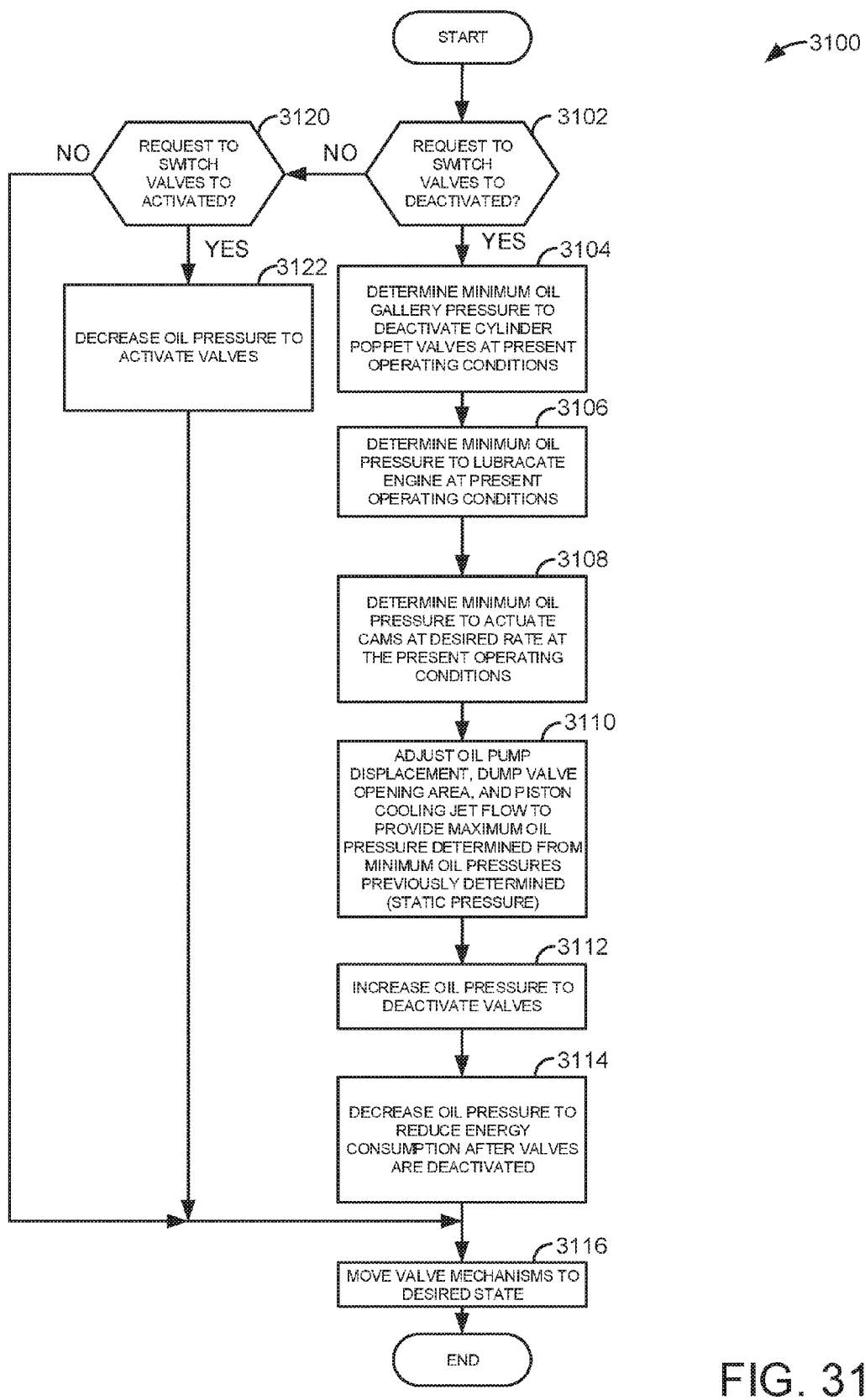
FIG. 31 is a flowchart of a method for controlling engine oil pressure during cylinder mode changes.

Referring now to FIG. 31, a method for controlling an engine oil pump responsive to cylinder mode is shown. The method of FIG. 31 may be included in the system described in FIGS. 1A-6C. The method of FIG. 31 may be included as executable instructions stored in non-transitory memory. The method of FIG. 31 may perform in cooperation with system hardware and other methods described herein to transform an operating state of an engine or its components.

At 3102, method 3100 judges if there is a request to switch cylinder intake valves or intake valves and exhaust valves to a deactivated state. The request may be based on the method of FIG. 22. If method 3100 judges that there is a request to switch cylinder poppet valves to a deactivated state, the answer is yes and method 3100 proceeds to 3104. Otherwise, method 3100 proceeds to 3120.

At 3104, method 3100 determines a minimum oil gallery pressure to deactivate cylinder poppet valves at the present engine operating conditions. In one example, the engine intake and exhaust poppet valves are normally active and are deactivated by supplying pressurized oil to valve operators. The pressurized oil deactivates the intake and exhaust valves so that the intake and exhaust valves are held closed over one or more engine cycles. If the pressure of the oil is reduced, the deactivated valves are reactivated so that they open and close over an engine cycle.

The minimum oil pressure to deactivate the cylinder poppet valves may be empirically determined based on parameters such as engine oil temperature and engine speed. The minimum oil pressure to deactivate the cylinder poppet valves may be stored in a table or function in memory that may be indexed via the parameters. Method 3100 indexes the table or function to determine the minimum oil pressure to deactivate cylinder poppet valves at the present engine operating conditions and proceeds to 3106.

At 3106, method 3100 determines a minimum oil pressure to lubricate the engine at the present engine operating conditions. The minimum oil pressure to lubricate the engine may be empirically determined based on parameters such as engine oil temperature, engine torque, and engine speed. The minimum oil pressure to lubricate the engine may be stored in a table or function in memory that may be indexed via the parameters. Method 3100 indexes the table or function to determine the minimum oil pressure to lubricate the engine at the present engine operating conditions and proceeds to 3108.

At 3108, method 3100 determines a minimum oil pressure to actuate variable timing camshafts at the present engine operating conditions. The minimum oil pressure to actuate variable timing camshafts may be empirically determined based on parameters such as engine oil temperature, engine torque, and engine speed. The minimum oil pressure to actuate variable timing camshafts may be stored in a table or function in memory that may be indexed via the parameters. Method 3100 indexes the table or function to determine the minimum oil pressure to actuate variable timing camshafts at the present engine operating conditions and proceeds to 3110.

At 3110, method 3100 determines a maximum oil pressure from the minimum oil pressures determined at 3104-3108 and adjusts actuators to provide the same value. For example, if the minimum poppet valve deactivation oil pressure is 100 kPa, the minimum oil pressure to lubricate the engine is 200 kPa, and the minimum oil pressure to adjust camshaft position relative to crankshaft position is 150 kPa, the maximum oil pressure from the minimum oil pressures is 200 kPa. The oil pressure supplied by the oil pump is commanded to 200 kPa. This resultant oil pressure command is the static oil pressure command. The oil pressure may be adjusted via adjusting oil pump displacement, position of a dump valve, or oil flow through cooling jets. Method 3100 proceeds to 3110.

At 3112, method 3100 commands an increase in oil pressure in an oil gallery leading to cylinder poppet valve operators. The oil pressure may be increased via increasing a pump displacement command, decreasing flow through an oil gallery dump valve, decreasing flow through piston cooling jets, or increasing oil pump speed. The oil pressure command is increased to a value higher than a value to maintain the valves in a closed state so that the valves are deactivated quickly. This increase in oil pressure command is the dynamic command. The dynamic command may be empirically determined and stored in a table or array that is indexed by engine speed and oil temperature. The dynamic command is relatively short in duration and the static command is longer in duration. In this way, the oil pump pressure command may be comprised of a static command and a dynamic command Additionally, method 3100 may adjust oil pressure output from the oil pump responsive to oil quality. For example, if oil quality is high, oil pump pressure may be reduced based on improved oil lubricating capacity of newer or higher quality oil. Further, method 3100 may not activate cylinder cooling jets at a same time as activating or deactivating cylinders via intake and exhaust valve operators. Method 3100 proceeds to 3114.

At 3114, method 3100 reduces oil pressure in the oil gallery to the value determined at 3110, or the static oil pressure command, once it is determined that desired cylinder poppet valves are deactivated. Method 3100 proceeds to 3116.

At 3116, method 3100 the cylinder poppet valves are moved to the requested state or held in their present state if there is not a request to change the cylinder state. Method 3100 proceeds to exit.

At 3120 method 3100 judges if there is a request to switch cylinder intake valves or intake valves and exhaust valves to an activated state. The request may be based on driver demand torque and/or other vehicle operating conditions. If method 3100 judges that there is a request to switch cylinder poppet valves to an activated state, the answer is yes and method 3100 proceeds to 3122. Otherwise, method 3100 proceeds to 3114.

At 3122, method 3100 decreases oil pressure in an oil gallery leading to cylinder poppet valve operators. The oil pressure may be decreased via decreasing a pump displacement command, increasing flow through an oil gallery dump valve, increasing flow through piston cooling jets, or decreasing oil pump speed. Method 3100 proceeds to 3114.

Figure 32:
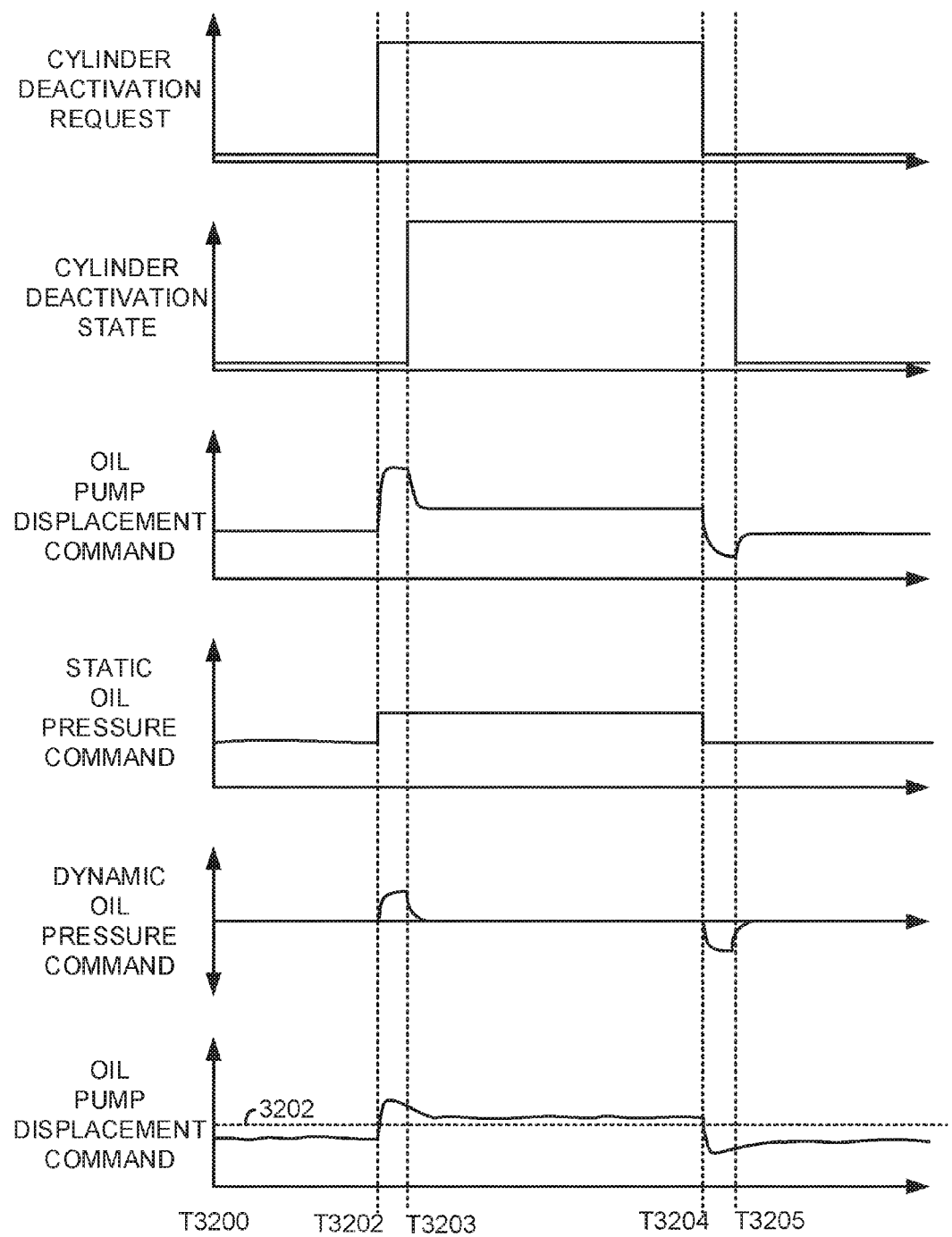
FIG. 32 is a sequence showing oil pressure control during cylinder mode changes.

Referring now to FIG. 32, a sequence for operating an engine according to the method of FIG. 31 is shown. The vertical lines at time T3200-T3204 represent times of interest in the sequence. FIG. 32 shows six plots and the plots are time aligned and occur at the same time.

The first plot from the top of FIG. 32 is a plot of a cylinder deactivation request state versus time. The cylinder deactivation request is the basis for activating and deactivating cylinders. Further, cylinder valves may be activated and deactivated based the cylinder deactivation request. The vertical axis represents the cylinder deactivation request and cylinder deactivation is being requested when the trace is at a higher level near the vertical axis arrow. Cylinder deactivation is not requested when the trace is at a lower level near the horizontal axis. The horizontal axis represents time and time increases from the left side of the figure to the right side of the figure.

The second plot from the top of FIG. 32 is a plot of cylinder deactivation state versus time. The vertical axis represents cylinder deactivation state and one or more engine cylinders are deactivated when the deactivation state trace is at a higher level near the vertical axis arrow. Cylinders are not deactivated when the trace is at a lower level near the horizontal axis. Fuel ceases to flow deactivated cylinders and intake and exhaust valves of deactivated cylinders are held closed over one or more engine cycles so that combustion does not occur in deactivated cylinders. The horizontal axis represents time and time increases from the left side of the figure to the right side of the figure.

The third plot from the top of FIG. 32 is a plot of engine oil pump displacement command versus time. The vertical axis represents the engine oil pump displacement command and the value of the engine oil pump displacement command increase in the direction of the vertical axis arrow. The engine oil pump displacement command is the combined values of the static oil pressure command and the dynamic oil pressure command. The horizontal axis represents time and time increases from the left side of the figure to the right side of the figure.

The fourth plot from the top of FIG. 32 is a plot of the static oil pressure demand versus time. The vertical axis represents the static oil pressure demand and the value of the static oil pressure demand increases in the direction of the vertical axis arrow. The horizontal axis represents time and time increases from the left side of the figure to the right side of the figure.

The fifth plot from the top of FIG. 32 is a plot of the dynamic oil pressure command versus time. The vertical axis represents the dynamic oil pressure command and the value of the dynamic oil pressure command increases in the direction of the vertical axis arrow. The horizontal axis represents time and time increases from the left side of the figure to the right side of the figure.

The sixth plot from the top of FIG. 32 is a plot of the engine oil gallery pressure command versus time. The vertical axis represents the engine oil gallery pressure and the value of the engine oil gallery pressure command increases in the direction of the vertical axis arrow. The horizontal axis represents time and time increases from the left side of the figure to the right side of the figure. Horizontal line 3202 represents a minimum oil gallery pressure to hold a deactivated valve in a deactivated state.

At time T3200, the cylinder deactivation is not requested and cylinders are not deactivated. The static oil pressure command is at a lower level and the oil pump displacement command is at a lower level. The dynamic oil pressure command is zero. The engine oil gallery pressure is at a lower level.

At time T3202, the cylinder deactivation request is asserted. The cylinder deactivation request may be asserted in response to a decrease in driver demand torque or other vehicle operating condition. The cylinder deactivation state indicates that cylinders are not deactivated. The dynamic oil pressure command is increased in response to the cylinder deactivation request. The static oil pressure command is also increased in response to the cylinder deactivation request. The oil pump displacement command increases in response to the cylinder deactivation request. The oil pump displacement command adjusts oil pump displacement. The oil gallery pressure increases in response to the oil pump displacement command.

Alternatively, an oil gallery dump valve may be at least partially closed to increase oil gallery pressure as shown. Further, in some examples, engine cooling jet flow may be reduced to increase oil gallery pressure as shown. Further still, in some examples, oil pump speed is increased to increase oil gallery pressure as shown.

At time T3203, the cylinder deactivation state transitions to a higher level to indicate that cylinder valves are deactivated and held closed over one or more engine cycles. The cylinder deactivation state may be based on output of one or more sensors (e.g., valve operator sensors, exhaust sensors, or other sensors). The oil pump displacement command is decreasing and the dynamic oil pressure command is decreasing. The static oil pressure command remains at is previous value. The oil gallery pressure levels off at an oil pressure slightly greater than 3202 so that the valves may remain deactivated and oil pump energy consumption may be reduced.

At time T3204, the cylinder reactivation request is asserted by transitioning the cylinder deactivation state to a lower level. The cylinder reactivation may be made in response to an increase in driver demand torque or other vehicle operating condition. The cylinder deactivation state indicates that cylinders are deactivated. The dynamic oil pressure command is reduced in response to the cylinder reactivation request. The static oil pressure command is also reduced in response to the cylinder reactivation request. The oil pump displacement command decreases in response to the cylinder reactivation request. The oil pump displacement command adjusts oil pump displacement. The oil gallery pressure decreases in response to the oil pump displacement command Alternatively, an oil gallery dump valve may be at least partially opened to decrease oil gallery pressure as shown. Further, in some examples, engine cooling jet flow may be increased to decrease oil gallery pressure as shown. Further still, in some examples, oil pump speed is decreased to decrease oil gallery pressure as shown. At time T3204, the cylinder deactivation state transitions to a lower level to indicate that cylinder valves are reactivated and opened and closed over one or more engine cycles. The cylinder reactivation state may be based on output of one or more sensors (e.g., valve operator sensors, exhaust sensors, or other sensors). The oil pump displacement command is increasing and the dynamic oil pressure command is increasing. The static oil pressure command remains at is previous value. The oil gallery pressure levels off at value that corresponds to a maximum oil pressure of minimum oil pressure to lubricate the engine, minimum oil pressure to actuate camshafts at a desired rate.

In this way, cylinder and cylinder valve deactivation may be accelerated while decreasing energy consumed by the oil pump. Further, the cylinder valves may be reactivated quickly by including a dynamic oil pressure control command Referring now to FIG. 33, a method for controlling engine knock responsive to cylinder operating mode is shown. The method of FIG. 33 may be included in the system described in FIGS. 1A-6C. The method of FIG. 33 may be included as executable instructions stored in non-transitory memory.

Figure 33:
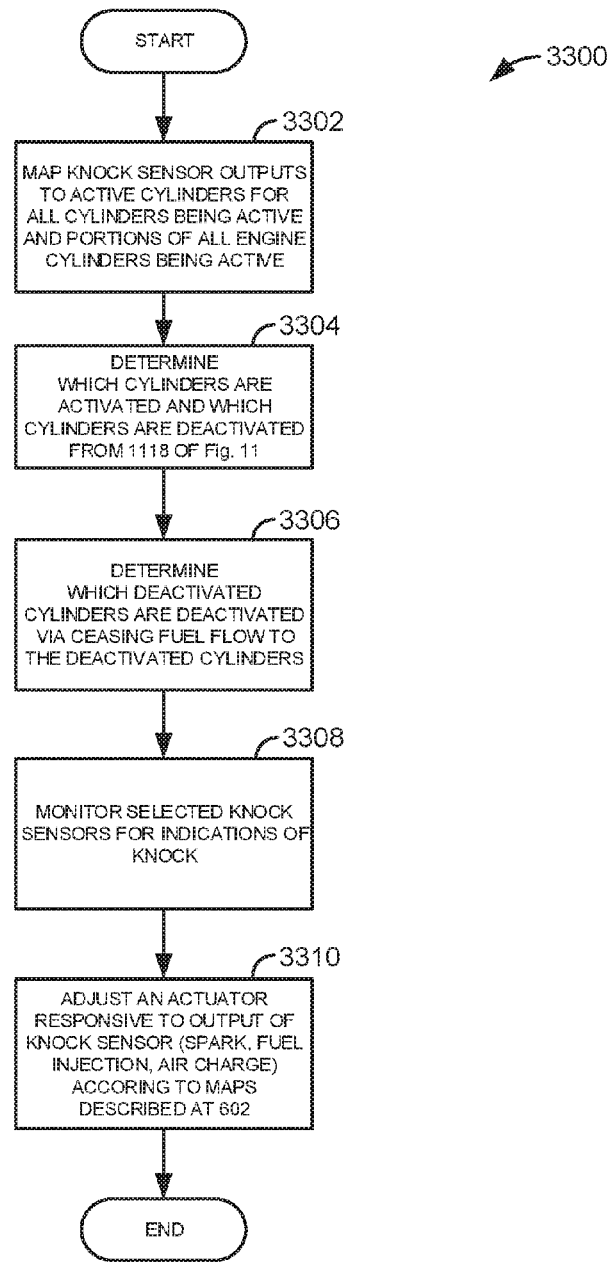
FIG. 33 is a flowchart of a method to improve engine knock control during cylinder mode changes.

The method of FIG. 33 may perform in cooperation with system hardware and other methods described herein to transform an operating state of an engine or its components.

At 3302, method 3300 maps or assigns outputs of engine knock sensors to active cylinders. Alternatively, method 3300 may map outputs of engine knock sensors based on a deactivated cylinder map. For example, for a four cylinder engine with a firing order of 1-3-4-2 and engine knock sensors positioned as shown in FIG. 2A, knock sensors may be mapped according to table 2.

TABLE 2

| Cylinder deactivation mode | Cylinder mode | | | | | | |
|---|---|---|---|---|---|---|---|
| | 1 | 2 | 3 | 4 | 5 | 6 | 7 |
| FUEL | 1, 2 | 1, 2 | 1 | 2 | 1 | 2 | 1 |
| FUEL AND AIR | 1, 2 | 1, 2 | 1, 2 | 1, 2 | 1, 2 | 2 | 1, 2 |

Table 2 includes two cylinder deactivation modes. The first mode is labeled FUEL and it describes a mode where cylinders are deactivated via ceasing to supply fuel to the cylinders while intake and exhaust valves continue to open and close over an engine cycle. The second mode is labeled FUEL AND AIR and it describes a mode where cylinders are deactivated via ceasing to supply fuel to the cylinders while intake and exhaust valves are held in a closed state over an engine cycle.

Cylinder modes are identified as 1, 2, 3, 4, 5, 6, and 7. Changes between the various modes may be based on time the engine operates in a mode, amount of oil in deactivated cylinders, number of engine revolutions in the mode, and other conditions described herein that may lead to mode changes between different cylinder modes. Mode 1 is where cylinders 1-4 are active (e.g., combusting air and fuel while valves open and close over an engine cycle) and the engine rotates via torque produced via cylinders 1-4. Mode 2 is where cylinders 1 and 4 are active and the engine rotates via torque produced via cylinders 1 and 4. Mode 3 is where cylinders 1, 4, and 2 are active and the engine rotates via torque produced via cylinders 1, 4, and 2. Mode 4 is where cylinders 1, 3, and 4 are active and the engine rotates via torque produced via cylinders 1, 3, and 4. Mode 5 where cylinders 3 and 2 are active and the engine rotates via torque produced via cylinders 3 and 2. Mode 6 is where cylinders 3, 4, and 2 are active and the engine rotates via torque produced via cylinders 3, 4, and 2. Mode 7 is where cylinders 1, 3, and 2 are active and the engine rotates via torque produced via cylinders 1, 3, and 2. Alternatively, the cylinder modes may describe cylinders that are deactivated.

In this example, the table cells are filled with values 1 and/or 2, but other values may be used. A value of one indicates a knock sensor positioned near cylinder numbers 1 and 2 is selected for sampling and determining engine knock. A value of two indicates a knock sensor positioned near cylinders numbered 3 and 4 is selected for sampling and determining engine knock. For example, when the engine is operating in cylinder mode A with a FUEL cylinder deactivation mode, knock sensors 1 and 2 are selected and sampled for determining engine knock in cylinders 1-4. On the other hand, when the engine is operating in cylinder mode F with a FUEL AND AIR cylinder deactivation mode, knock sensor 2 is the only knock sensor selected and sampled for determining engine knock in cylinders 3, 4, and 2.

Table 2 shows that individual engine knock sensors may be assigned to detect knock in different cylinders for different cylinder modes and different cylinder deactivation modes. One engine knock sensor may provide improved signal to noise in one cylinder mode and one cylinder deactivation mode while a different knock sensor may provide improved signal to noise in the one cylinder mode and a second cylinder deactivation mode. Further, engine knock thresholds may be adjusted responsive to the knock sensor that is providing knock data according to knock sensor assignments. The engine knock sensor or sensors that are assigned to a particular cylinder mode and cylinder deactivation mode are sampled during an engine cycle for indications of knock in active cylinders. An engine knock sensor not assigned to a particular cylinder mode and a cylinder deactivation mode is not sampled or the samples taken for that knock sensor are not used to determined engine knock during an engine cycle. In this way, engine knock sensors may be mapped to improve signal to noise ratios Similar maps may be provided for six and eight cylinder engines. Method 33 proceeds to 3304.

At 3304, method 3300 determines which engine cylinders are activated and deactivated. In one example, the activated cylinders are determined as described at 1118 of FIG. 11 which determines if conditions are present for deactivating one or more cylinders. In other examples, active cylinders may be identified values of variables at particular locations in memory. The values of the variables may be revised each time a cylinder is activated or deactivated. For example, a variable in memory may indicate the operating state of cylinder number one. A value of one in the variable may indicate that cylinder number one is active while a value of zero in the variable may indicate that cylinder number one is deactivated. The operating state of each cylinder may be determined in this way. Method 3300 proceeds to 3306.

At 3306, method 3300 determines which engine cylinders are deactivated by ceasing fuel flow to the cylinders but not ceasing air flow to the cylinders. Method 3300 also determines which cylinders are deactivated by ceasing fuel flow and air flow to the deactivated cylinders. In one example, the controller assigns each cylinder a variable in memory to keep track of the cylinder's deactivation mode. A cylinder's deactivation mode is saved in controller memory when the cylinder is deactivated. For example, a value of a variable is 1 when cylinder number one is deactivated by ceasing fuel flow to the deactivated cylinder number one but not ceasing air flow to the deactivated cylinder number one. Conversely, the value of the variable is 0 when the cylinder number one is deactivated by ceasing fuel flow and air flow to the deactivated cylinder number one. A cylinder may be deactivated via any of the methods and systems described herein. The values of the variables may be revised each time a cylinder deactivated.

In some examples, a table similar to table 2 may be constructed to output a threshold knock value based on the cylinder mode and cylinder deactivation mode. Values in the table may be empirically determined and stored to the table. The table is indexed via the cylinder mode and the cylinder deactivation mode. The table outputs the threshold knock values that knock sensor outputs are compared against. If knock sensor output exceeds the threshold knock value, knock may be determined. Method 3300 proceeds to 3308.

At 3308, method 3300 monitors selected knock sensors to determine engine knock. In particular, knock sensors are selected based on the map of knock sensors described at 3302. The map of knock sensors is indexed via the cylinder mode and the cylinder deactivation mode. The table outputs engine knock sensors that are sampled during an engine cycle for engine knock in the various cylinder modes and cylinder deactivation modes. In one example, the knock sensors are monitored during specific crankshaft angular ranges for detecting knock in activated cylinders.

If knock sensor output exceeds a threshold level (e.g., the knock threshold levels described at 3306), engine knock is indicated. In some examples, the knock sensor output may be integrated and compared to the threshold level. If the integrated knock sensor output is greater than the threshold, engine knock is indicated. Method 3300 proceeds to 3310.

At 3310, method 3300 adjusts an actuator in response to the indication of knock. In one example, spark timing is retarded to reduce engine knock. Fuel injection start of injection timing may be retarded to reduce cylinder pressure and engine knock. Alternatively, the amount of fuel injected may be increased. Further, cylinder air charge may be reduced in some instances to reduce the possibility of engine knock. Further still, the ratio of an amount of port fuel injected to an amount of directly injected fuel may be adjusted in response to engine knock. For example, the amount of directly injected fuel may be increased while the amount of port injected fuel may be decreased. Method 3300 proceeds to exit after the actuator is adjusted.

Figure 34:
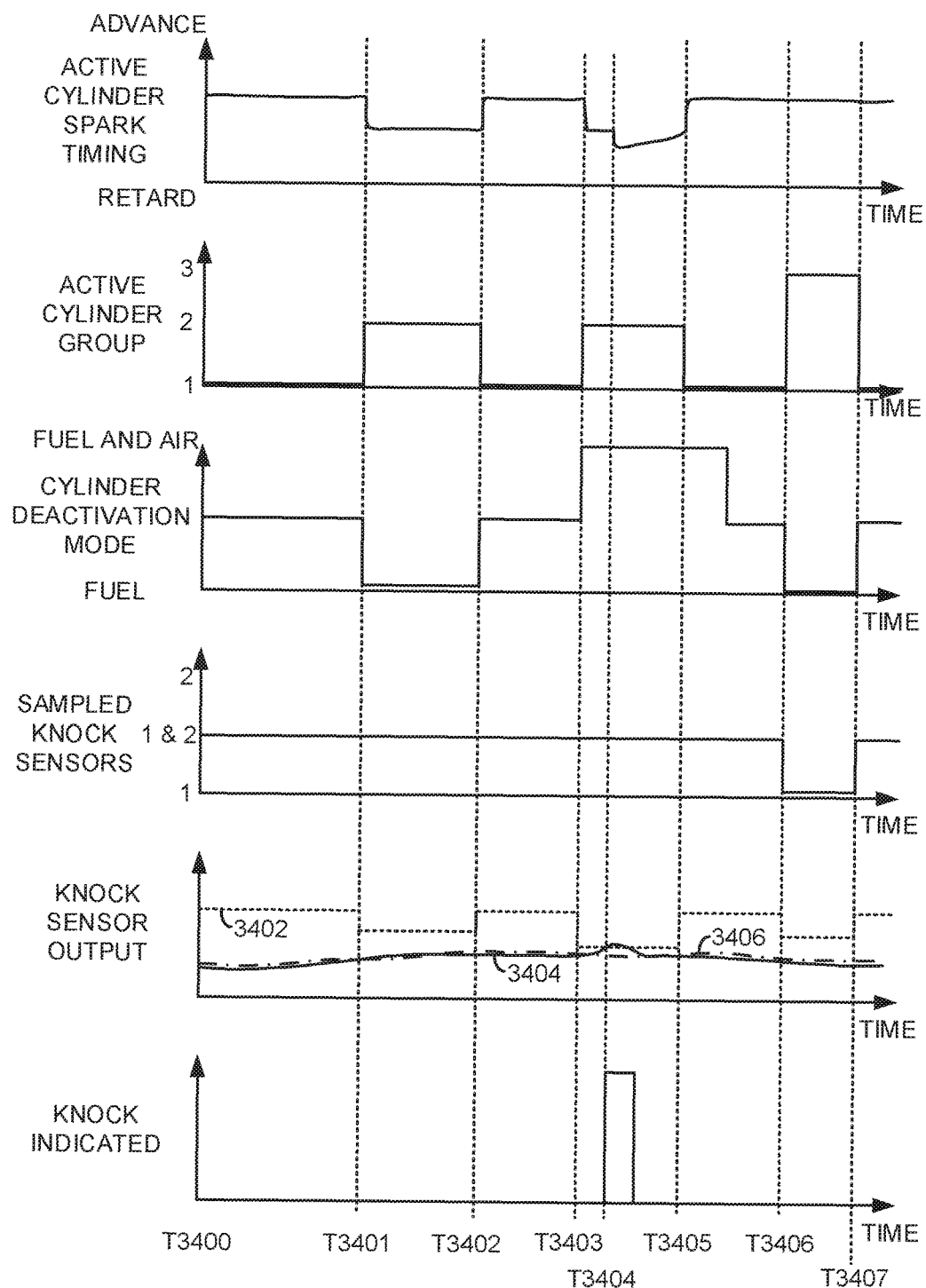
FIG. 34 is a sequence showing engine knock control during different engine cylinder modes.

Referring now to FIG. 34, a sequence for operating an engine according to the method of FIG. 34 is shown. The vertical lines at time T3400-T3407 represent times of interest in the sequence. FIG. 34 shows six plots and the plots are time aligned and occur at the same time. The sequence of FIG. 34 represents a sequence for operating a four cylinder engine at a substantially constant speed and driver demand torque (e.g., torque and speed change by less than 5%).

The first plot from the top of FIG. 34 is a plot of spark timing for active cylinders (e.g., cylinders combusting air and fuel) versus time. The vertical axis represents spark timing for active cylinders and spark is more advanced when the trace is at a higher level near the vertical axis arrow. Spark is less advanced or retarded when the trace is at a lower level near the horizontal axis. The horizontal axis represents time and time increases from the left side of the figure to the right side of the figure.

The second plot from the top of FIG. 34 is a plot of active cylinder group versus time. The vertical axis represents active cylinder group and the cylinder group is active when the trace is at the level of the cylinder group. In this example, there are two possible cylinder groups A and B as indicated along the vertical axis. Group 1 indicates cylinders 1-4 are active and combusting air and fuel. Group 2 indicates cylinders 1 and 4 are active and combusting air and fuel. Cylinders 2 and 3 are deactivated when group 3 is active. The horizontal axis represents time and time increases from the left side of the figure to the right side of the figure.

The third plot from the top of FIG. 34 is a plot of cylinder deactivation mode versus time. The vertical axis represents the cylinder deactivation mode. Cylinders are not deactivated when the cylinder deactivation trace is near the center of the vertical axis. Deactivated cylinders are deactivated via ceasing to supply air and fuel to the deactivated cylinders when trace is near the vertical axis arrow. Deactivated cylinders are deactivated via ceasing to supply fuel to the deactivated cylinders while air flows through the deactivated cylinders when trace is near the horizontal axis. The horizontal axis represents time and time increases from the left side of the figure to the right side of the figure.

The fourth plot from the top of FIG. 34 is a plot that shows sampled knock sensors versus time. The vertical axis represents the knock sensor being sampled. A value of one indicates that only the first knock sensor is sampled. A value of two indicates that only the second knock sensor is sampled. Values 1 and 2 indicate that both first and second knock sensors are sampled. The horizontal axis represents time and time increases from the left side of the figure to the right side of the figure.

The fifth plot from the top of FIG. 34 is a plot of knock sensor output amplitude versus time. The vertical axis represents knock sensor amplitude and knock sensor output increases in the direction of the vertical axis arrow. Solid line 3404 is output from the first knock sensor. Dashed line 3406 is output from the second knock sensor. The horizontal axis represents time and time increases from the left side of the figure to the right side of the figure. Dashed line 3402 represents a threshold level for comparing knock sensor output. If knock sensor output is greater than 3402, engine knock is indicated. The level of 3402 is adjusted for cylinder group and cylinder deactivation mode.

The sixth plot from the top of FIG. 34 is a plot of indicated engine knock versus time. The vertical axis represents indicated engine knock. The horizontal axis represents time and time increases from the left side of the figure to the right side of the figure. An engine actuator may be adjusted responsive to indicated engine knock to reduce the possibility of further engine knock.

At time T3400, cylinder group 1 is active and spark timing is more advanced. Cylinders are not deactivated so the cylinder deactivation mode indicates no deactivated cylinders. The sampled knock sensors are 1 & 2 so that the first and second knock sensors are sampled to determine if engine knock is present. The outputs from the first and second knock sensors is less than threshold 3402 so engine knock is not indicated.

At time T3401, the active cylinder group switches to group 2. Two engine cylinders are deactivated under group 2 (e.g., cylinder numbers 2 and 3). The active cylinder group may change in response to a decrease in driver demand torque or other changes in vehicle operating conditions (e.g., engine temperature reaching a threshold temperature). Spark timing is retarded to reflect a higher load in the two active cylinders even though driver demand torque has not changed (not shown). The two cylinders are deactivated via deactivating fuel flow cylinders. Fuel injection is stopped to stop fuel flow to the two cylinders. Air continues to flow through the deactivated cylinders since the cylinder deactivation mode is FUEL. The sampled knock sensors remain unchanged. The knock sensor threshold 3402 is reduced to a lower level since background noise may be reduced since two engine cylinders are inactive and combustion noise may be reduced. The outputs of the knock sensors does not exceed threshold 3402 so engine knock is not indicated.

At time T3402, the active cylinder group switches back to group 1. The active cylinder group may change state in response to an increase in driver demand torque, a decrease in engine temperature, or another condition. The cylinder deactivation mode switches back to the center value to indicate no cylinders are deactivated. The sampled knock sensors remain unchanged. The knock sensor threshold increases back to its previous level and no engine knock is indicated since the knock sensor outputs are less than threshold 3402. Engine spark timing returns to its previous value.

At time T3403, the active cylinder group switches again to group 2. The two cylinders are deactivated via deactivating fuel and air to the cylinders. Fuel injection is stopped to stop fuel flow to the two cylinders and intake and exhaust valves of the two deactivated cylinders are held closed during an engine cycle to cease air flow to the two deactivated cylinders. The sampled knock sensors remain unchanged. The knock sensor threshold 3402 is reduced to a lowest level since background noise may be reduced by lack of combustion in deactivated cylinders and deactivating cylinder valves since valve impact is reduced. The outputs of the first and second knock sensors does not exceed threshold 3402 so engine knock is not indicated. Spark timing is retarded to reflect the increased load on the active cylinders to maintain the driver demand torque.

At time T3404, output of the first knock sensor exceeds threshold 3402. Therefore, engine knock is indicated as shown in the sixth plot. Spark timing is further retarded in response to the indication of engine knock. The active cylinder group remains 2 and cylinder air flow and fuel flow to deactivated cylinders remains stopped. The sampled knock sensors remain unchanged. The knock sensor output decreases in response to the increased spark retard.

At time T3405, the active cylinder group switches back to group 1. The cylinder deactivation mode switches back to the center value to indicate no cylinders are deactivated. The sampled knock sensors remain unchanged. The knock sensor threshold increases back to its initial level and no engine knock is indicated since the knock sensor outputs are less than threshold 3402.

At time T3406, the active cylinder group switches to group 3. Three cylinders (e.g., cylinders numbered 1, 4, and 2) are active in cylinder group 3. The sampled knock sensors switches from 1 & 2 to 1. Therefore, the first knock sensor is the only knock sensor sampled when group 3 is activated and cylinders are deactivated via ceasing fuel flow without ceasing air flow to deactivated cylinders (e.g., FUEL as shown in table 2). By switching the knock sensors sampled, the signal to noise ratio for determining engine knock may be improved. Engine knock is not indicated since the first and second knock sensor output is less than threshold 3402.

At time T3407, the active cylinder group switches back to group 1. The cylinder deactivation mode switches back to the center value to indicate no cylinders are deactivated. The knock sensor threshold increases back to its initial level and no engine knock is indicated since the outputs of the first and second knock sensors less than threshold 3402.

In this way, different knock sensors may be sampled in response to the active cylinder group and cylinder deactivation mode. Further, the threshold level that knock sensor outputs are compared to may change in response to cylinder mode and cylinder deactivation mode. The cylinder modes, knock sensors sampled, knock threshold levels, and cylinder groups are exemplary in nature and are not intended to limit the scope or breadth of the disclosure.

Figure 35:
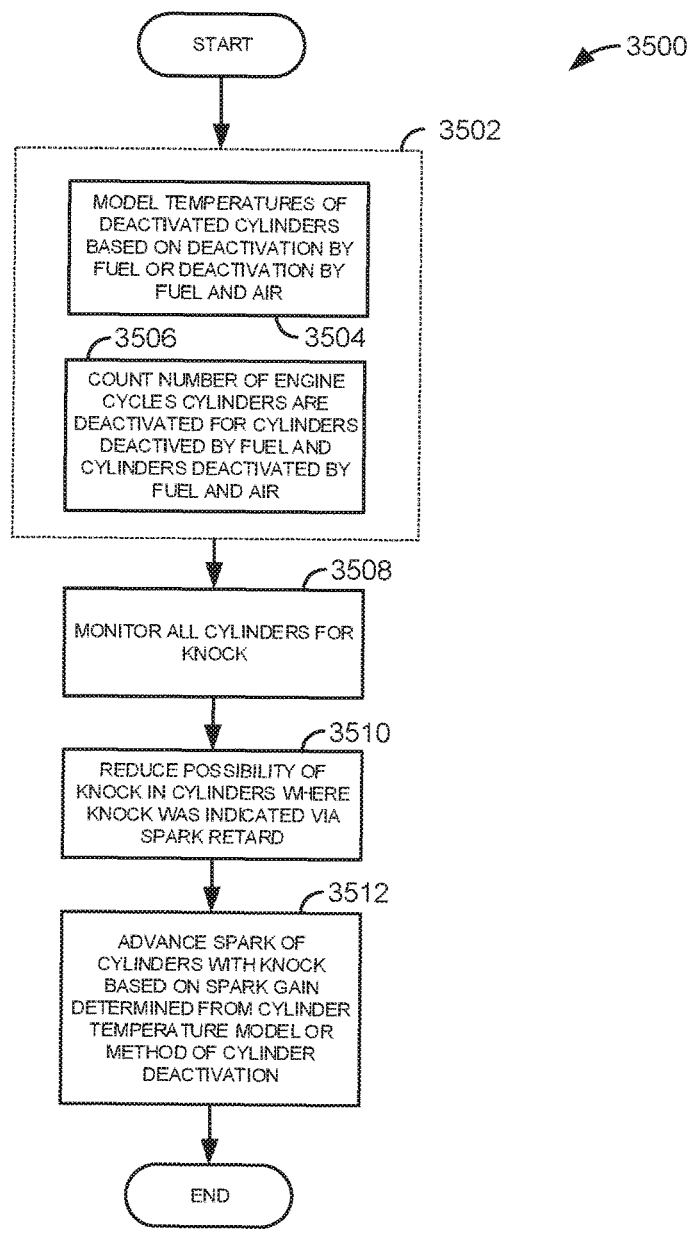
FIG. 35 is a flowchart of a method for adjusting spark gain.

Referring now to FIG. 35, a method for controlling engine knock responsive to cylinder deactivation mode is shown. The method of FIG. 35 may be included in the system described in FIGS. 1A-6C. The method of FIG. 35 may be included as executable instructions stored in non-transitory memory. The method of FIG. 35 may perform in cooperation with system hardware and other methods described herein to transform an operating state of an engine or its components.

At 3502, method 3500 estimates temperatures of engine cylinders via a model and/or counts an actual total number of engine cycles the deactivated cylinders are deactivated. Temperatures of active and deactivated cylinders are modeled. In one example, a steady state temperature of a cylinder is determined at 3504 via the following equation:

$$CYLss = Cyl\_temp\_fn(N,L,Cyl\_d\_state) \cdot AF\_fn(afr) \cdot Spk\_fn(spkMBT) \cdot EGR\_fn(EGR)$$

where CYLss is the estimate of steady state cylinder temperature (e.g., temperature of a cylinder); Cyl_temp_fn is cylinder temperature as a function of engine speed (N), engine load (L), and cylinder deactivation state (CYL_d_state); AF_fn is a function that provides a real number multiplier for cylinder air/fuel ratio (afr); Spk_fn a function that provides a real number multiplier for cylinder spark based on spark retard for MBT spark timing (spkMBT); and EGR_fn is a function that provides a real number multiplier for exhaust gas recirculation percentage (EGR). CYL_d_state identifies if the cylinder is active and combusting air and fuel or deactivated and not combusting air and fuel so that the output CYLss changes if the engine cylinder changes from activated to deactivated or vise-versa. The steady state temperature of a cylinder is modified by a time constant to provide the cylinder temperature estimate via the following equation:

$$CYL_{tmp} = CYL_0 e^{\frac{-t}{\tau}} + CYLss(1 - e^{\frac{-t}{\tau}})$$

where $CYL_{tmp}$ is the final estimated cylinder temperature, $CYL_0$ is the initial cylinder temperature, t is time, and τ is a system time constant. In one example, τ is a function of air flow through the cylinder whose temperature is being estimated and engine temperature. In particular, air flows through the cylinder when fuel flow to the cylinder is deactivated and combustion in the cylinder ceases. The value of τ increases as air flow through the cylinder decreases, and the value of τ decreases as air flow through the cylinder increases. The value of τ decreases as engine temperature increases and the value of τ increases as engine temperature decreases. The value of $CYL_{tmp}$ approaches the value CYLss if the cylinder is not deactivated for a longer duration. Method 3500 proceeds to 3506.

At 3506, method 3500 counts an actual total number of engine cycles the one or more cylinders are deactivated and not combusting air and fuel. In one example, a counter counts the actual number of engine cycles the one or more cylinders are deactivated by counting an actual total number of engine revolutions since the one or more cylinders were deactivated and dividing the result by two since there are two engine revolutions in one engine cycle. The actual number of engine revolutions is determined via output of the engine crankshaft position sensor.

At 3508, method 3500 monitors all engine cylinders for knock. All engine cylinders may be monitored for knock via one or more engine knock sensors. Engine knock sensors may include but are not limited to accelerometers, pressure sensors, and acoustic sensors. Knock for individual cylinders may be monitored during predetermined crankshaft angular intervals or windows. Engine knock may be present when output of a knock sensor exceeds a threshold value. Method 3500 proceeds to 3510.

At 3510, method 3500 reduces the possibility of knock in engine cylinders where knock is indicated. In one example, method 3500 reduces the possibility of engine knock in cylinders where engine knock was indicated at 3508 by retarding spark timing of cylinders where engine knock was indicated. In other examples, start of fuel injection timing may be retarded. Method 3500 proceeds to 3512.

At 3512, method 3500 advances spark timing of cylinders in which spark timing was retarded to reduce the possibility of engine knock. Spark timing is advanced to improve engine fuel economy, engine emissions, and engine efficiency. Spark timing may be advanced up to a spark timing limit (e.g., minimum spark advance for best engine torque (MBT)) from the retarded spark timing based on a base spark advance gain.

A spark advance gain for a cylinder may be based on the cylinder's temperature estimated at 3504 and/or the counted number of cycles the cylinder was deactivated and the counted number of cylinder cycles the cylinder is activated since the cylinder was deactivated its last time. The base spark advance gain may be added to the retarded spark timing. In one example, the spark advance gain for a cylinder may be expressed as X degrees/second where the value of variable X is based on cylinder temperature. Thus, spark may be advanced from a retarded timing by adding the spark advance gain value to the retarded spark timing. For example, if MBT spark timing is 20 degrees before top-dead-center and the spark timing is retarded to 10 crankshaft degrees before top-dead-center in response to engine knock, the spark advance gain advances spark timing from 10 crankshaft before top-dead-center to 20 crankshaft degrees before top-dead-center in one second, unless engine knock is indicated while advancing spark timing. In other examples, the spark advance gain may be a multiplier that increases or decreases a base spark timing. For example, the spark advance gain may be a real number that varies between 1 and 2 such that if a base spark timing is 10 degrees before top-dead-center, spark timing may be advanced up to 20 degrees before top-dead-center by multiplying the base spark timing by the spark advance gain. In this way, spark timing may be advanced back to MBT spark timing to improve engine emissions, fuel economy, and performance. Method 3500 proceeds to exit.

Alternatively, the spark gain may be a function of the counted number of cycles the cylinder was deactivated and the counted number of cylinder cycles the cylinder is activated since the cylinder was deactivated its last time. For example, if the cylinder was deactivated for 10,000 engine cycles and activated for 5 engine cycles before knock was encountered in the cylinder, the spark gain may be a larger value (e.g., 2 deg/second). However, if the cylinder was deactivated for 500 engine cycles and activated for 5 cycles before knock was encountered in the cylinder, the spark gain may be a smaller value (e.g., 1 deg/second).

Thus, a rate at which spark may be advanced after retarding spark for engine knock may be adjusted responsive to temperatures of cylinders and/or a number of actual total engine cycles since one or more cylinders were deactivated. Consequently, the rate that spark is advanced may be adjusted to reduce the possibility of engine knock when advancing spark. Yet, spark may be advanced at a rate that improves engine efficiency, economy, and performance.

Figure 36:
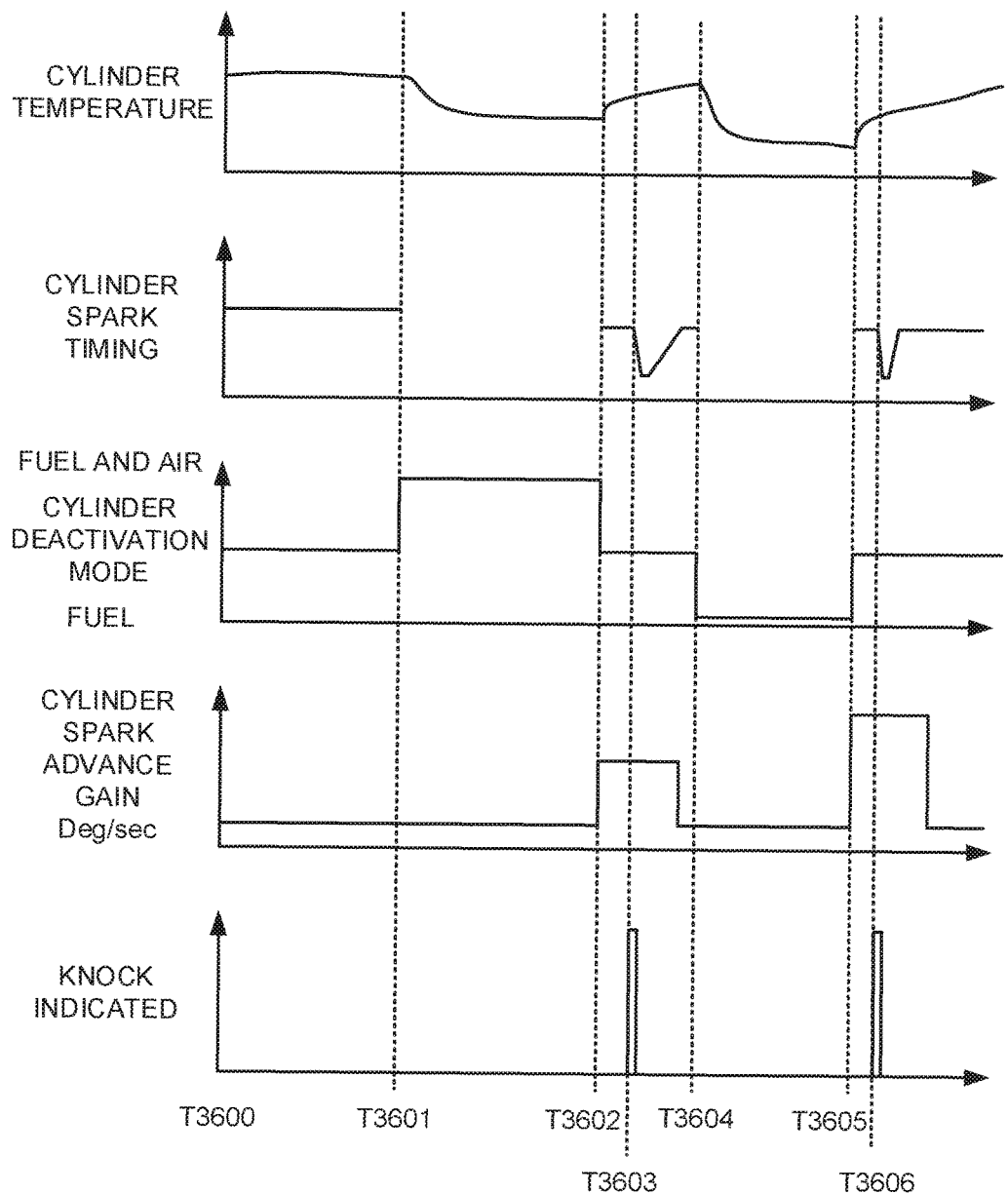
FIG. 36 is a sequence showing adjustable spark gain.

Referring now to FIG. 36, a sequence for operating an engine according to the method of FIG. 35 is shown. The vertical lines at time T3600-T3606 represent times of interest in the sequence. FIG. 36 shows five plots and the plots are time aligned and occur at the same time. The sequence of FIG. 36 represents a sequence for operating a four cylinder engine at a constant speed and driver demand torque.

The first plot from the top of FIG. 36 is a plot of cylinder (e.g., a cylinder that is not combusting fuel and air) temperature versus time for operation of the cylinder being illustrated. The vertical axis represents cylinder temperature and cylinder temperature increases in the direction of the vertical axis arrow. The horizontal axis represents time and time increases from the left side of the figure to the right side of the figure.

The second plot from the top of FIG. 36 is a plot of cylinder spark timing versus time for operation of the cylinder being illustrated. The vertical axis represents spark timing of the cylinder and the spark advance increases in the direction of the vertical axis arrow. The horizontal axis represents time and time increases from the left side of the figure to the right side of the figure.

The third plot from the top of FIG. 36 is a plot of cylinder deactivation mode versus time for the cylinder being illustrated. The vertical axis represents the cylinder deactivation mode. The cylinder is not deactivated when the cylinder deactivation trace is near the center of the vertical axis. The cylinder is deactivated via ceasing to supply air and fuel to the cylinder when trace is near the vertical axis arrow. The cylinder is deactivated via ceasing to supply fuel to the cylinder while air flows through the cylinder when trace is near the horizontal axis. The horizontal axis represents time and time increases from the left side of the figure to the right side of the figure.

The fourth plot from the top of FIG. 36 is a plot of cylinder spark advance gain for the illustrated cylinder in crankshaft degrees per second versus time. The vertical axis represents spark advance gain and spark advance gain increases in the direction of the vertical axis arrow. The horizontal axis represents time and time increases from the left side of the figure to the right side of the figure.

The fifth plot from the top of FIG. 36 is a plot of indicated engine knock versus time. The vertical axis represents indication of engine knock and engine knock is indicated when the trace is at a level near the vertical axis arrow. The horizontal axis represents time and time increases from the left side of the figure to the right side of the figure.

At time T3600, the cylinder temperature is high and cylinder's spark timing is more advanced. The cylinder is not deactivated as indicated by the cylinder deactivation mode trace being at a middle level. The cylinder's spark gain is at a lower level and engine knock is not indicated.

At time T3601, the engine cylinder is deactivated via stopping fuel flow and air flow to the cylinder as indicted by the cylinder deactivation mode trace. Air flow is stopped to the deactivated cylinder by holding intake and exhaust poppet valves of the cylinder closed during an engine cycle. Alternatively, intake valves of the deactivated cylinder may be held closed while exhaust valves of deactivated cylinder open and close during an engine cycle. The temperature of the cylinder begins to decline, but at a lower rate since air is not flowing through the deactivated cylinder. The cylinder spark advance gain remains unchanged while the cylinder is deactivated. Spark timing for the cylinder is not shown since the cylinder is deactivated. Engine knock is not indicated.

At time T3602, the cylinder is reactivated by supplying fuel and air to the cylinder as indicated by the cylinder deactivation mode trace transitioning to the middle level. The cylinder spark advance gain increases based on the cylinder's temperature. The cylinder's spark timing returns to an advance level and the cylinder's temperature begins increasing. Knock is not indicated.

At time T3603, engine knock is indicated and the cylinder's spark timing is retarded to mitigate the engine knock. The cylinder temperature is increasing but at a level less than a long term stable level for the present engine speed and load. The cylinder is active and the cylinder spark advance gain is at an elevated level.

Between time T3603 and time T3604, the spark timing for the cylinder is increased using the spark advance gain based on the cylinder's temperature. Knock in the cylinder is not present as the cylinder's spark advance increases. The spark advance increases at a predetermined rate (e.g., 10 crankshaft degrees/second) so that engine efficiency, performance, and emission may be improved after cylinder spark timing is retarded in response to engine knock. The cylinder spark advance gain is decreased after the cylinder has been activated and cylinder temperature has increased.

At time T3604, engine cylinder is deactivated a second time via stopping fuel flow to the cylinder while air continues to flow through the deactivated cylinder as indicted by the cylinder deactivation mode trace. The cylinder temperature is at a level it was at back at time T3600 and then it begins to decline at a fast rate since air flowing through the cylinder cools the cylinder. Knock in the cylinder is not indicated because the cylinder is deactivated.

At time T3605, the cylinder is reactivated by supplying spark and fuel to the cylinder. The cylinder may be reactivated in response to an increase in requested engine torque or other operating conditions. The cylinder spark timing is at a more advanced value or timing. The cylinder temperature begins to increase after the cylinder is reactivated. The cylinder spark advance gain is also increased in response to activating the cylinder. Knock is not indicated in the cylinder.

At time T3606, engine knock is indicated. The cylinder's temperature is at a lower level and when knock is indicated. Spark timing for the cylinder is retarded in response to knock in the cylinder. The cylinder's temperature continues to increase.

After time T3606, the cylinder spark timing is advanced at a predetermined rate (e.g., 15 crankshaft degrees/second) so that engine efficiency, performance, and emission may be improved after active cylinder spark timing is retarded in response to engine knock. The cylinder spark timing increases in a ramp-like fashion and it increases at a faster rate than at time T3603. Spark timing may be increased at a faster rate since the cylinder temperature is lower than at time T3603. Engine knock is not indicated in the cylinder and the cylinder temperature continues to increase.

In this way, engine spark timing may be adjusted responsive to the cylinder deactivation mode and the cylinder spark advance gain. Further, engine knock may be mitigated while degradation of engine performance and emissions is reduced.

Figure 37:
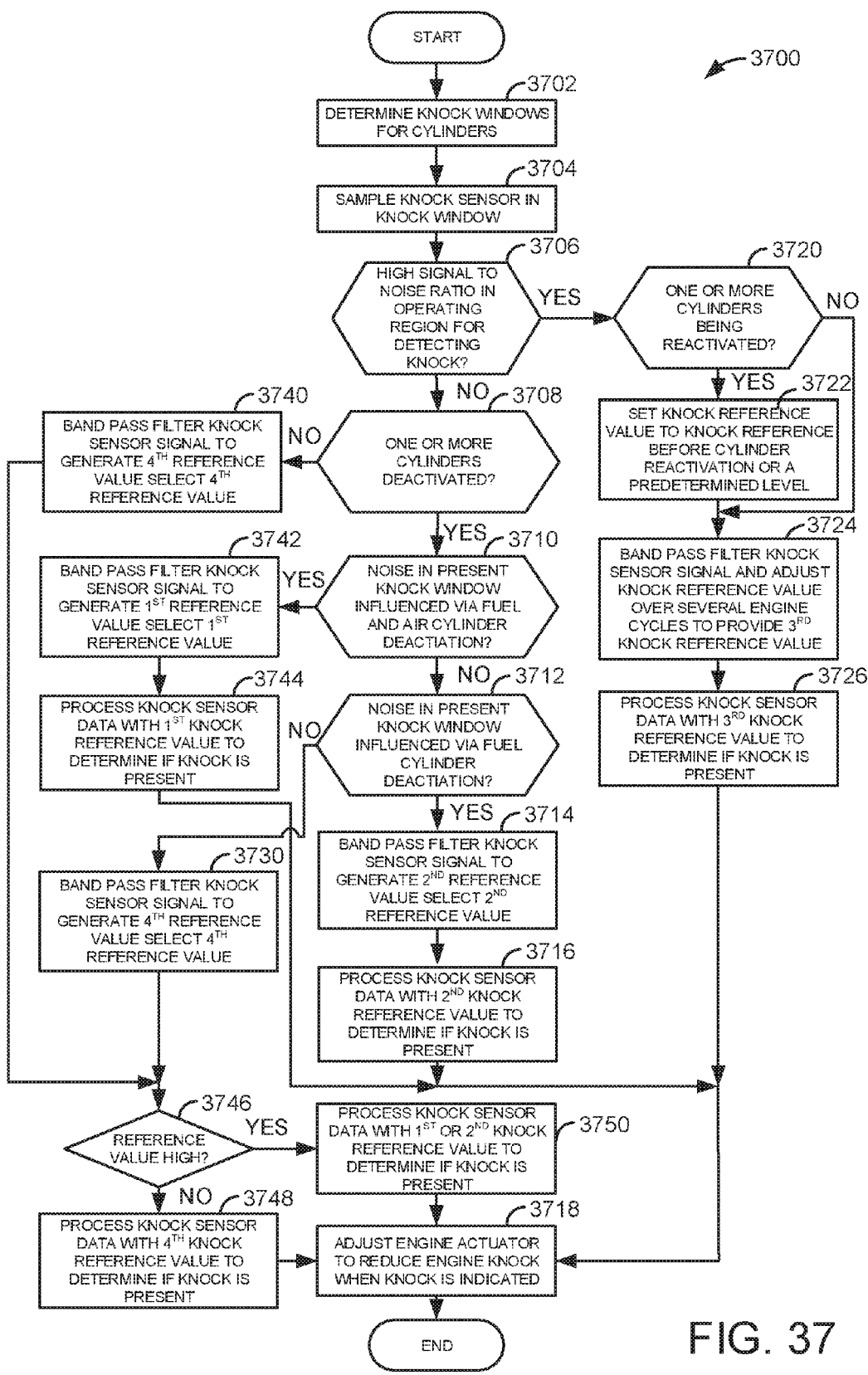
FIG. 37 is a flowchart of a method for determining a knock reference value depending on cylinder mode.

Referring now to FIG. 37, a method for controlling engine knock in the presence of cylinder deactivation is shown. The method of FIG. 37 may be included in the system described in FIGS. 1A-6C. The method of FIG. 37 may be included as executable instructions stored in non-transitory memory. The method of FIG. 37 may perform in cooperation with system hardware and other methods described herein to transform an operating state of an engine or its components.

Referring now to 3702, method 3700 determines engine knock windows for detecting knock in each engine cylinder. In one example, engine knock detection windows are engine crankshaft intervals where engine knock is expected to occur. For example, if top-dead-center compression stroke for cylinder number one is 0 crankshaft degrees, knock in cylinder number on may be expected in a range of between 20 crankshaft degrees after top-dead-center cylinder number one compression stroke and 50 crankshaft degrees after top-dead-center cylinder number one compression stroke. Thus, the knock detection for cylinder number one is between 20 and 50 crankshaft degrees after top-dead-center cylinder number one compression stroke in this example. Knock detection windows for other engine cylinders may be defined similarly. The engine knock window ranges for each cylinder may be empirically determined and stored in a table or function in controller memory. The table may be indexed via engine speed and engine torque. Method 3700 proceeds to 3704.

At 3704, method 3700 selectively samples one or more engine knock sensor outputs based on the present engine position and the engine knock windows. For example, method 3700 samples an engine knock sensor in a range of between 20 crankshaft degrees after top-dead-center cylinder number one compression stroke and 50 crankshaft degrees after top-dead-center cylinder number one compression stroke to determine knock sensor output for the knock window of cylinder number one. Method 3700 proceeds to 3706.

At 3706, method 3700 judges if there is a good signal to noise ratio for the knock sensor output in the latest or present knock sensor window. In one example, method 3700 may base the judgement on predetermined signal to noise ratios stored a table or function in controller memory. The table or function may be indexed according to the present cylinder knock window, engine speed, and engine torque. If method 3700 judges that there is a good signal to noise ratio, the answer is yes and method 3700 proceeds to 3720. Otherwise, the answer is no and method 3700 proceeds to 3708.

At 3708, method 3700 judges if one or more engine cylinders are deactivated. In one example, variables in memory contain values that identify deactivated cylinders. For example, a variable that represents the operational state of cylinder number one may have a value of zero if the cylinder is deactivated and a value of one if the cylinder is active and combusting fuel and air. If method 3700 judges that one or more engine cylinders are deactivated, the answer is yes and method 3700 proceeds to 3710. Otherwise, the answer is no and method 3700 proceeds to 3740.

At 3710, method 3700 judges if knock sensor output noise in the knock window at the present crankshaft angle (e.g., present knock window), or if, the knock sensor output noise during a knock window in which knock sensor output was just sampled (e.g., present knock window), is influenced by fuel and air based cylinder deactivation of a cylinder. For example, combustion events for eight cylinder engines are only ninety crankshaft degrees apart. Therefore, for an eight cylinder engine with a firing order of 1-3-7-2-6-5-4-8, combustion noise (e.g., valve closing and block vibration induced via combustion pressure) from cylinder number 6 may enter the knock window of cylinder number 5. If method 3700 is evaluating knock sensor noise in the knock window of cylinder number five, and cylinder number five is deactivated via deactivating fuel flow and air flow to cylinder number five, then method 3700 may judge that fuel and air based cylinder deactivation influences knock sensor noise in the cylinder number five knock window. Note that even though in this example cylinder number five is deactivated, noise in its knock window may be used for processing knock sensor output when cylinder number five is active during conditions of a low signal to noise ratio.

Alternatively, if method 3700 is evaluating knock sensor noise in the knock window of cylinder number five, cylinder number six is deactivated via deactivating fuel flow and air flow to cylinder number six, and noise (e.g., noise of exhaust valves closing while intake valves are held closed during a cylinder cycle or noise from compression and expansion in the deactivated cylinder) from cylinder number six enters the knock window of cylinder number five while cylinder number five is active and combusting air and fuel, then method 3700 may judge that fuel and air based cylinder deactivation influences knock sensor noise in the cylinder number five knock window. If method 3700 judges that knock sensor output noise in the knock window at the present crankshaft angle (e.g., present knock window), or if, the knock sensor output noise during a knock window in which knock sensor output was just sampled (e.g., present knock window), is influenced by fuel and air based cylinder deactivation of a cylinder, the answer is yes and method 3700 proceeds to 3742. Otherwise, the answer is no and method 3700 proceeds to 3712.

At 3712, method 3700 judges if knock sensor output noise in the knock window at the present crankshaft angle (e.g., present knock window), or if, the knock sensor output noise during a knock window in which knock sensor output was just sampled (e.g., present knock window), is influenced by fuel based cylinder deactivation of a cylinder. For example, if method 3700 is evaluating knock sensor noise in the knock window of cylinder number five, and cylinder number five is deactivated via deactivating fuel flow while air flows to cylinder number five, then method 3700 may judge that fuel based cylinder deactivation influences knock sensor noise (e.g., noise from opening and closing of valves of cylinder numbers five and six and compression and expansion noise from cylinder numbers five and six) in the cylinder number five knock window.

Alternatively, if method 3700 is evaluating knock sensor noise in the knock window of cylinder number five, cylinder number six is deactivated via deactivating fuel flow while air flows to cylinder number six, and noise (e.g., noise of exhaust valves closing while intake valves are held closed during a cylinder cycle or noise from compression and expansion in the deactivated cylinder) from cylinder number six enters the knock window of cylinder number five while cylinder number five is active and combusting air and fuel, then method 3700 may judge that fuel based cylinder deactivation influences knock sensor noise in the cylinder number five knock window. If method 3700 judges that knock sensor output noise in the knock window at the present crankshaft angle (e.g., present knock window), or if, the knock sensor output noise during a knock window in which knock sensor output was just sampled (e.g., present knock window), is influenced by fuel based cylinder deactivation of a cylinder, the answer is yes and method 3700 proceeds to 3742. Otherwise, the answer is no and method 3700 proceeds to 3730.

At 3714, method 3700 band pass filters output from a knock sensor sampled during the present knock window. The band pass filter may be a first order or higher order filter. An average of the filtered knock sensor data is taken to provide a second knock reference value. In some examples, the second knock reference value may be determined during conditions where knock is expected to not occur. For example, a second knock reference value may be determined when spark timing is retarded three crankshaft degrees before borderline spark timing. Further, second knock reference values may be determined periodically (e.g., once for every 1000 combustion events in a cylinder at a particular engine speed and torque) instead of every engine cycle. Method 3700 proceeds to 3716.

At 3716, method 3700 processes the knock sensor data taken in the present knock window based on the second knock reference to determine if knock is present in the cylinder in which combustion occurred for the present knock window. In one example, the knock sensor data taken in the present knock window is integrated to provide an integrated knock value. The integrated knock value is then divided by the second knock reference value and the result is compared to a threshold value. If the result is greater than the threshold value, knock is indicated for the cylinder associated with the knock window. Otherwise, knock is not indicated. Knock may be indicated by changing a value of a variable in memory. Method 3700 proceeds to 3718.

At 3718, method 3700 adjusts an actuator to mitigate engine knock. In one example, spark timing for the cylinder associated with the knock window is retarded. Additionally, or alternatively, air flow to the cylinder associated with the knock window may be reduced via adjusting valve timing. In still other example, an air-fuel ratio of the cylinder associated with the knock window may be enriched via adjusting timing of a fuel injector. Method 3700 exits after taking actions to mitigate knock.

At 3720, method 3700 judges if one or more engine cylinders are being reactivated. Method 3700 may judge that one or more engine cylinders are being reactivated or are requested to be reactivated based on one or more variables in memory changing state. For example, a variable that represents the operational state of cylinder number one may have a value of zero if the cylinder is deactivated and the value may transition to a value of one if the cylinder is being reactivated. If method 3700 judges that one or more engine cylinders are being reactivated, the answer is yes and method 3700 proceeds to 3722. Otherwise, the answer is no and method 3700 proceeds to 3724.

At 3722, method 3700 adjusts one or more knock reference values for the cylinders being reactivated to a predetermined value or values that the knock reference values had just before the cylinders being reactivated were deactivated. The predetermined value may be empirically determined and stored to memory. The values that the knock reference values had just before the cylinders being reactivated were deactivated are stored to memory when cylinder deactivation is requested. Thus, knock reference values for knock windows of each cylinder at various engine speeds and torques are stored to memory in response to cylinder deactivation and the same knock reference values are retrieved from memory in response to activating deactivated cylinders so that the knock reference values are reasonable for activated cylinder conditions instead of using knock reference values determined during cylinder deactivation. Retrieving the knock reference values from memory may improve knock detection when cylinders are reactivated. Method 3700 proceeds to 3724.

At 3724, method 3700 band pass filters output from a knock sensor sampled during the present knock window. The band pass filter may be a first order or higher order filter. An average of the filtered knock sensor data is taken to provide a third knock reference value. In some examples, the third knock reference value may be determined during conditions where knock is expected to not occur. For example, a third knock reference value may be determined when spark timing is retarded three crankshaft degrees before borderline spark timing. Further, third knock reference values may be determined periodically (e.g., once for every 1000 combustion events in a cylinder at a particular engine speed and torque) instead of every engine cycle. The knock reference value may not be revised to the third reference value until a predetermined amount of time or engine cycles has occurred since cylinder reactivation. Instead, the third knock reference value may be the knock reference value determined at 3722 until the predetermined conditions are met. Method 3700 proceeds to 3726.

At 3726, method 3700 processes the knock sensor data taken in the present knock window based on the third knock reference to determine if knock is present in the cylinder in which combustion occurred for the present knock window. In one example, the knock sensor data taken in the present knock window is integrated to provide an integrated knock value. The integrated knock value is then divided by the third knock reference value and the result is compared to a threshold value. If the result is greater than the threshold value, knock is indicated for the cylinder associated with the knock window. Otherwise, knock is not indicated. Knock may be indicated by changing a value of a variable in memory. Method 3700 proceeds to 3718.

At 3730 and 3740, method 3700 band pass filters output from a knock sensor sampled during the present knock window. The band pass filter may be a first order or higher order filter. An average of the filtered knock sensor data is taken to provide a fourth knock reference value. In some examples, the fourth knock reference value may be determined during conditions where knock is expected to not occur. For example, a fourth knock reference value may be determined when spark timing is retarded three crankshaft degrees before borderline spark timing. Further, fourth knock reference values may be determined periodically (e.g., once for every 1000 combustion events in a cylinder at a particular engine speed and torque) instead of every engine cycle. Method 3700 proceeds to 3746.

At 3746, method 3700 judges if the fourth knock reference value is greater than a threshold. The threshold may be empirically determined and stored to memory. If the further knock reference value is higher than the threshold, the knock intensity value may be lowered because of the way knock intensity is determined. Therefore, to improve the signal to noise ratio of the knock sensor output, the first knock reference value (e.g., determined at 3742) or the second knock reference value (e.g., determined at 3714) may be selected to process knock sensor data instead of the fourth knock reference value. If method 3700 judges that the fourth knock reference value is greater than the threshold, the answer is yes and method 3700 proceeds to 3750. Otherwise, the answer is no and method 3700 proceeds to 3748.

At 3748, method 3700 processes the knock sensor data taken in the present knock window based on the fourth knock reference to determine if knock is present in the cylinder in which combustion occurred for the present knock window. In one example, the knock sensor data taken in the present knock window is integrated to provide an integrated knock value. The integrated knock value is then divided by the fourth knock reference value and the result is compared to a threshold value. If the result is greater than the threshold value, knock is indicated for the cylinder associated with the knock window. Otherwise, knock is not indicated. Knock may be indicated by changing a value of a variable in memory. Method 3700 proceeds to 3718.

At 3750, method 3700 processes the knock sensor data taken in the present knock window based on the first or second knock reference determined for the present engine speed and torque, but with deactivated cylinders, to determine if knock is present in the cylinder in which combustion occurred for the present knock window. The integrated knock value is then divided by the first or second knock reference value and the result is compared to a threshold value. If the result is greater than the threshold value, knock is indicated for the cylinder associated with the knock window. Otherwise, knock is not indicated. Knock may be indicated by changing a value of a variable in memory. The first knock reference value may be used to determine engine knock during a first condition and the second knock reference may be used to determine engine knock during a second condition. For example, the first knock reference value may be used if engine valve closing noise is greater than a threshold. The second knock reference value may be used if engine value closing noise is less than the threshold. Method 3700 proceeds to 3718.

At 3742, method 3700 band pass filters output from a knock sensor sampled during the present knock window. The band pass filter may be a first order or higher order filter. An average of the filtered knock sensor data is taken to provide a first knock reference value. In some examples, the first knock reference value may be determined during conditions where knock is expected to not occur. For example, a first knock reference value may be determined when spark timing is retarded three crankshaft degrees before borderline spark timing. Further, first knock reference values may be determined periodically (e.g., once for every 1000 combustion events in a cylinder at a particular engine speed and torque) instead of every engine cycle. Method 3700 proceeds to 3744.

At 3744, method 3700 processes the knock sensor data taken in the present knock window based on the first knock reference to determine if knock is present in the cylinder in which combustion occurred for the present knock window. In one example, the knock sensor data taken in the present knock window is integrated to provide an integrated knock value. The integrated knock value is then divided by the first knock reference value and the result is compared to a threshold value. If the result is greater than the threshold value, knock is indicated for the cylinder associated with the knock window. Otherwise, knock is not indicated. Knock may be indicated by changing a value of a variable in memory. Method 3700 proceeds to 3718.

Method 3700 may be performed for each engine cylinder as the engine rotates through all the engine cylinder knock windows in an engine cycle. The examples in the description of method 3700 are exemplary in nature and are not intended to limit the disclosure.

Additionally, knock control for deactivated cylinders may be suspended by not updating variables and/or adjusting spark timing to deactivated cylinders (e.g., not providing spark to deactivated cylinders). In one example, cylinders that are deactivated are indicated to an engine knock controller so that the knock controller does not have to continue to process knock sensor data for deactivated cylinders.

In this way, knock reference values may be adjusted responsive to cylinder deactivation modes and cylinder deactivation to improve signal to noise ratios and engine knock detection. Further, multiple knock reference values may be provided at a particular engine speed and torque based on cylinder deactivation.

Figure 38:
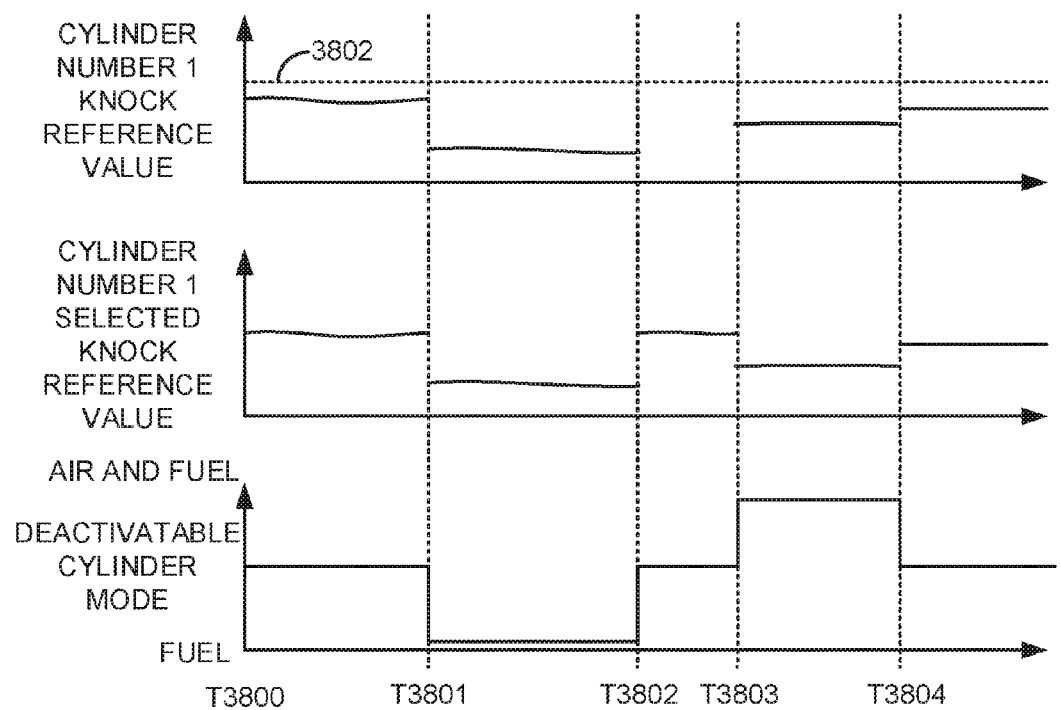
FIG. 38 is a sequence showing selection of a knock reference value.

Referring now to FIG. 38, a sequence for operating an engine according to the method of FIG. 37 is shown. The vertical lines at time T3800-T3804 represent times of interest in the sequence. FIG. 38 shows three plots and the plots are time aligned and occur at the same time. The sequence of FIG. 38 represents a sequence for operating a four cylinder engine at a constant speed and driver demand torque.

The first plot from the top of FIG. 38 is a plot of a knock reference value for cylinder number one versus time. The vertical axis represents the knock reference value for cylinder number one and the knock reference value increases in the direction of the vertical axis arrow. A higher knock reference value indicates higher background engine noise (e.g., engine noise not caused by knock in the cylinder being evaluated for knock). The horizontal axis represents time and time increases from the left side of the figure to the right side of the figure. The cylinder number one knock reference value may be based on a first, second, third, or further reference value depending on operating conditions. Horizontal line 3802 represents a threshold level above which the fourth knock reference value may not be selected.

The second plot from the top of FIG. 38 is a plot of a selected knock reference value for cylinder number one versus time. The vertical axis represents the selected knock reference value for cylinder number one and the knock reference value increases in the direction of the vertical axis arrow. The selected knock reference value may be based on a first, second, third, or fourth knock reference value. The four knock reference values are determined as described in FIG. 37 and the selected knock reference is based on the present vehicle conditions. The selected reference value is the reference value used to process the knock sensor information sampled in the knock window to judge whether or not knock is indicated (e.g., at 3748 of FIG. 37). The horizontal axis represents time and time increases from the left side of the figure to the right side of the figure.

The third plot from the top of FIG. 38 is a plot of cylinder deactivation mode versus time. The vertical axis represents the cylinder deactivation mode. Cylinders are not deactivated when the cylinder deactivation trace is near the center of the vertical axis. Deactivated cylinders are deactivated via ceasing to supply air and fuel to the deactivated cylinders when trace is near the vertical axis arrow. Deactivated cylinders are deactivated via ceasing to supply fuel to the deactivated cylinders while air flows through the deactivated cylinders when trace is near the horizontal axis. The horizontal axis represents time and time increases from the left side of the figure to the right side of the figure.

At time 3800, the cylinder number one knock reference value is a higher middle value less than threshold 3802. The cylinder number one knock reference value is the third knock reference value (e.g., 3724 of FIG. 37) because cylinders are not deactivated and the knock sensor signal to noise ratio is low. Engine cylinders are not deactivated as indicated by the deactivated cylinder state being at the middle level. The selected knock reference mode is the value of the cylinder number one knock reference value since the cylinder number one knock reference value is less than threshold 3802.

At time 3801, the cylinder number one knock reference value changes to a lower value less than threshold 3802. The cylinder number one knock reference value is the first knock reference value (e.g., 3742 of FIG. 37) because cylinders are deactivated via fuel and air and because the knock sensor signal to noise ratio is low. Engine cylinders are deactivated via air and fuel (e.g., fuel flow and air flow through cylinder number one is ceased) as indicated by the deactivated cylinder state being at the lower level. The selected knock reference mode is the value of the cylinder number one knock reference value since the cylinder number one knock reference value is less than threshold 3802. Since cylinders are deactivated at time T3801, and since the deactivated cylinder affects noise in the cylinder number one knock window, the cylinder number one reference value is the first knock reference value (e.g., from 3742 of FIG. 37).

At time T3802, the cylinder number one knock reference value increases in response to reactivating cylinders. The cylinder number one knock reference value is the third knock reference value (e.g., 3724 of FIG. 37) because it was the value before cylinders were deactivated at time T3801. Engine cylinders are reactivated via supplying air and fuel to cylinder number one as indicated by the deactivated cylinder state being at the middle level. The selected knock reference value is adjusted to the cylinder number one knock reference value before cylinders were deactivated at time T3801. By using the knock reference value before cylinders were deactivated, an improve knock reference value may be provided since the knock reference value is based on active cylinders (e.g., the current engine operating state) and not deactivated cylinders (e.g., the former engine operating state).

At time 3803, the cylinder number one knock reference value changes to a lower value less than threshold 3802. The cylinder number one knock reference value is the second knock reference value (e.g., 3714 of FIG. 37) because cylinders are deactivated via fuel (e.g., fuel injection to the cylinders ceases while air is flowing through the cylinders) and because the knock sensor signal to noise ratio is low. The selected knock reference value is the value of the cylinder number one knock reference value since the cylinder number one knock reference value is less than threshold 3802. Since cylinders are deactivated at time T3803, and since the deactivated cylinder affects noise in the cylinder number one knock window, the cylinder number one reference value is the second knock reference value (e.g., from 3714 of FIG. 37).

At time T3804, the cylinder number one knock reference value increases in response to reactivating cylinders. The cylinder number one knock reference value is the third knock reference value (e.g., 3724 of FIG. 37) because it was the value before cylinders were deactivated at time T3803. Engine cylinders are reactivated via supplying air and fuel to cylinder number one as indicated by the deactivated cylinder state being at the middle level. The selected knock reference value is adjusted to the cylinder number one knock reference value before cylinders were deactivated at time T3803.

In this way, the knock reference values of the cylinders that are the basis for determining the presence or absence of engine knock may be adjusted responsive to cylinder deactivation and cylinder deactivation mode.

Figure 39:
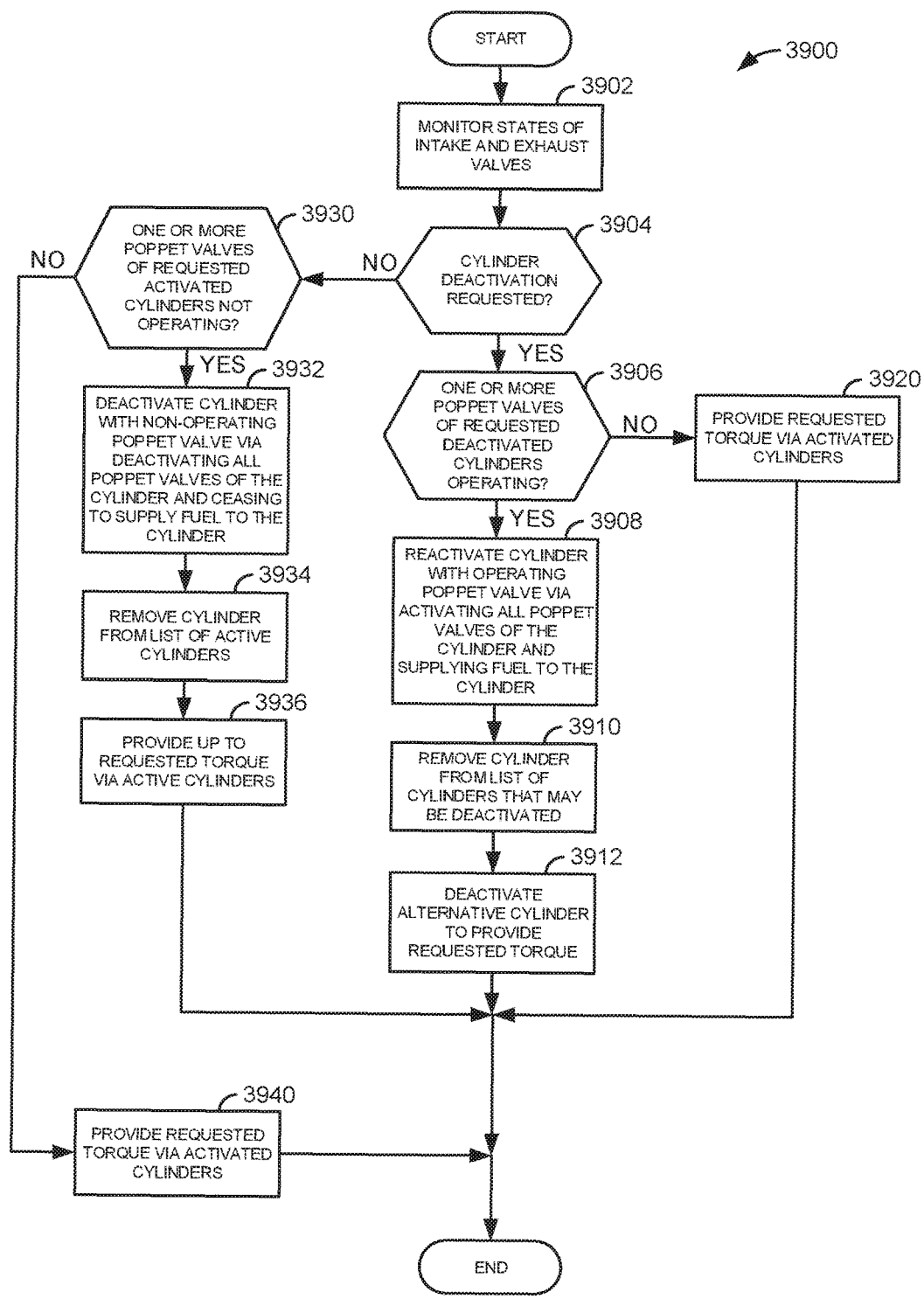
FIG. 39 is a flowchart of a method for selecting engine cylinder modes in the presence of valve degradation.

Referring now to FIG. 39, a method for performing diagnostics of an engine is shown. The method of FIG. 39 may be included in the system described in FIGS. 1A-6C. The method of FIG. 39 may be included as executable instructions stored in non-transitory memory. The method of FIG. 39 may perform in cooperation with system hardware and other methods described herein to transform an operating state of an engine or its components.

At 3902, method 3900 monitors the operating states of engine intake and exhaust valves. In one example, the operating states of engine intake and exhaust valves are monitored via pressure sensors in the engine cylinders, engine exhaust system, and/or in the engine intake system (e.g., in the engine intake manifold). Method 3900 proceeds to 3904.

At 3904, method 3900 judges if cylinder deactivation (e.g., ceasing combustion in the cylinder or cylinders) is requested or if cylinder deactivation is presently underway. Method 3900 may determines which engine cylinders are activated (e.g., combusting air and fuel) and deactivated as described at 1118 of FIG. 11 or active cylinders may be identified values of variables at particular locations in memory. The values of the variables may be revised each time a cylinder is activated or deactivated. For example, a variable in memory may indicate the operating state of cylinder number one. A value of one in the variable may indicate that cylinder number one is active while a value of zero in the variable may indicate that cylinder number one is deactivated. The operating state of each engine cylinder may be determined in this way. A request to deactivate cylinders may also be based on a value of a variable in memory. Cylinder activation requests and deactivation requests may be commands issued by the controller. If method 3900 judges that one or more cylinders is deactivated or requested deactivated, the answer is yes and method 3900 proceeds to 3906. Otherwise, the answer is no and method 3500 proceeds to 3930.

At 3906, method 3900 judges if one or more poppet valves of cylinders requested deactivated are active after commanding the poppet valve deactivated and providing sufficient time to deactivate the cylinders (e.g., one full engine cycle after the request was made). One or more poppet valves may be determined to be active based on cylinder pressure, exhaust pressure, or intake pressure. Alternatively, sensors may be placed on the individual valve operators to determine whether or not valves continue to operate after being commanded deactivated. If method 3900 judges that one or more poppet valves that were commanded deactivated (e.g., held closed as the engine rotates during an engine cycle) continues to operate (e.g., open and close as the engine rotates during the engine cycle), the answer is yes and method 3900 proceeds to 3908. Otherwise, the answer is no and method 3900 proceeds to 3920. Note that method 3900 may wait a predetermined amount of time after commanding the one or more poppet valves deactivated before proceeding to 3908 to ensure the poppet valve condition is valid.

At 3908, method 3900 reactivates the cylinder or cylinders in which the poppet valves continue to operate. The cylinder or cylinders are reactivated by activating the cylinder's poppet valves and supplying fuel and spark to the cylinders. Activating the cylinder poppet valves provides air to the cylinder. The air and fuel are combusted in the activated cylinder. Method 3900 proceeds to 3910.

At 3910, method 3900 removes the cylinder with one or more valves that did not deactivate from a list of cylinders that may be deactivated. Thus, method 3900 inhibits cylinder deactivation for the cylinder with valves that did not deactivate when the valves were commanded to be deactivated. Method 3900 proceeds to 3912.

At 3912, method 3900 deactivates an alternative cylinder to provide a desired number of deactivated cylinders. For example, if cylinder number two of a four cylinder engine is requested to be deactivated, but valves of cylinder number two do not deactivate while cylinder numbers one, three, and four are activated, cylinder number two is reactivated as described at 3910 and cylinder number three is commanded deactivated. In this example, the desired number of deactivated cylinders is one and the number of desired active cylinders is three. In this way, the desired number of active and deactivated cylinders may be provided. Consequently, improved fuel economy may be maintained even in the presence of valve operator degradation. Method 3900 proceeds to exit.

At 3920, method 3900 provides a desired amount of engine torque via active cylinders. The desired amount of engine torque may be based on a driver demand torque, and the driver demand torque may be based on a position of an accelerator pedal and vehicle speed. The desired amount of torque from the active cylinders is provided by controlling air flow and fuel flow to the active cylinders. Method 3900 proceeds to exit.

At 3930, method 3900 judges if one or more poppet valves of cylinders requested activated or activated cylinders are deactivated after commanding the poppet valve activated and providing sufficient time to activate the cylinders (e.g., one full engine cycle after the request was made). One or more poppet valves may be determined to be deactivated based on cylinder pressure, exhaust pressure, or intake pressure. Alternatively, sensors may be placed on the individual valve operators to determine whether or not valves do not open and close during an engine cycle after being commanded activated. If method 3900 judges that one or more poppet valves that were commanded activated (e.g., open and close as the engine rotates during an engine cycle) do not open and close during the engine cycle, the answer is yes and method 3900 proceeds to 3932. Otherwise, the answer is no and method 3900 proceeds to 3940. Note that method 3900 may wait a predetermined amount of time before proceeding to 3932 after commanding the one or more poppet valves activated to ensure the poppet valve condition is valid.

At 3932, method 3900 deactivates the cylinder or cylinders in which the poppet valves do not open and close during a cylinder cycle. The cylinder or cylinders are deactivated by deactivating the cylinder's poppet valves and ceasing the supply of fuel and spark to the cylinders. Deactivating the cylinder poppet valves ceases air flow to the cylinder. Method 3900 proceeds to 3934.

At 3934, method 3900 removes the cylinder with one or more valves that did not activate from a list of cylinders that may be activated. Thus, method 3900 inhibits cylinder activation for the cylinder with valves that did not activate when the valves were commanded to be activated. Combustion is inhibited in cylinders removed from the list of cylinders that may be activated. Method 3900 proceeds to 3936.

At 3936, method 3900 provides a requested engine torque up to the capacity of cylinders in the list of cylinders that may be activated. The actual total number of cylinders that are active may be increased in response to the engine torque request or decreased in response to the engine torque request. As a result, a significant amount of engine torque may be provided even if poppet valves of one or more cylinders become degraded. Method 3900 proceeds to exit.

At 3940, method 3900 provides a desired amount of engine torque via active cylinders. The desired amount of engine torque may be based on a driver demand torque, and the driver demand torque may be based on a position of an accelerator pedal and vehicle speed. The desired amount of torque from the active cylinders is provided by controlling air flow and fuel flow to the active cylinders. Method 3900 proceeds to exit.

Figure 40:
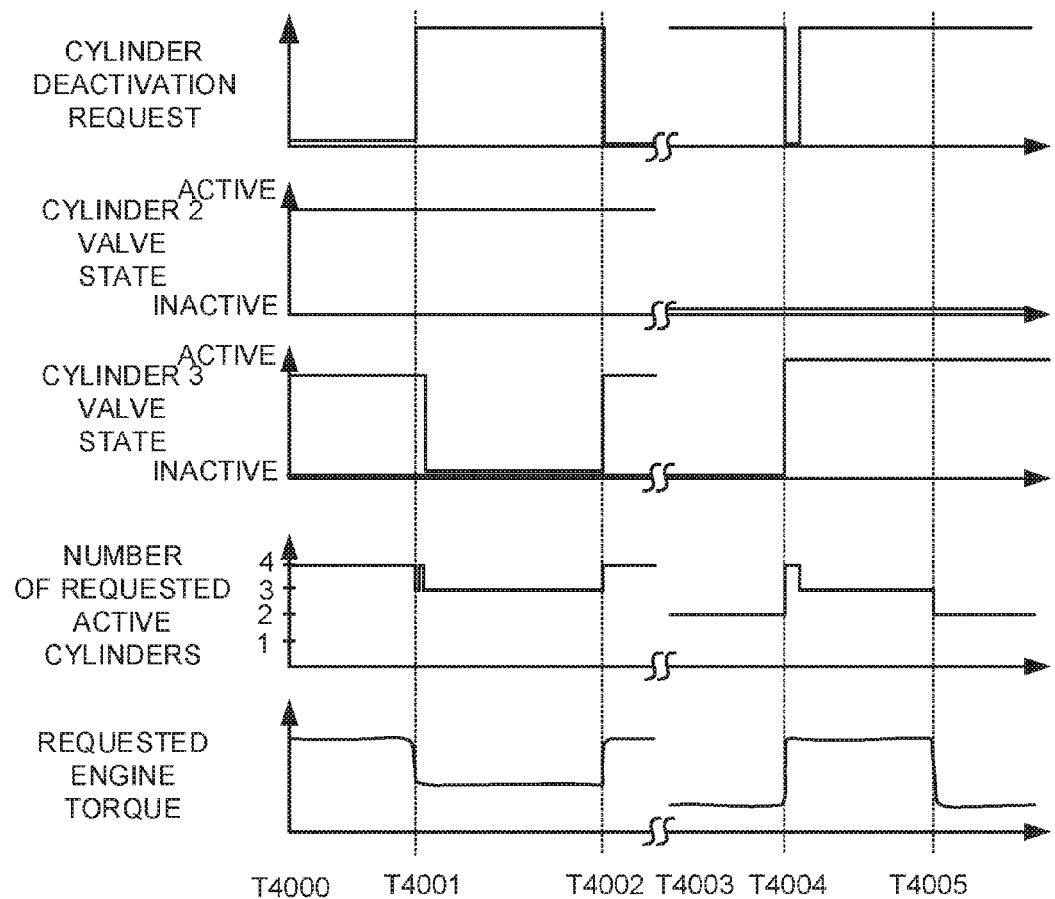
FIG. 40 is a flowchart of a sequence for selecting engine cylinder modes in the presence of valve degradation.

Referring now to FIG. 40, a sequence for operating an engine according to the method of FIG. 39 is shown. The vertical lines at time T4000-T4005 represent times of interest in the sequence. FIG. 40 shows five plots and the plots are time aligned and occur at the same time. The SS along the time line of each plot indicates a break in the sequence. The time between the break may be long or short. The sequence of FIG. 40 represents a sequence for operating a four cylinder engine with a firing order of 1-3-4-2.

The first plot from the top of FIG. 40 is a plot of cylinder deactivation request (e.g., a request to cease combustion in one or more cylinders) versus time. The vertical axis represents the cylinder deactivation request and cylinder deactivation is requested when the trace it at a level near the vertical axis arrow. The horizontal axis represents time and time increases from the left side of the figure to the right side of the figure.

The second plot from the top of FIG. 40 is a plot of cylinder number two valve operating state versus time. Cylinder valves in cylinder number two are active when the trace is at a higher level near the vertical axis arrow. Cylinder valves in cylinder number two are inactive when the trace is at a lower level near the horizontal axis. The horizontal axis represents time and time increases from the left side of the figure to the right side of the figure. The third plot from the top of FIG. 40 is a plot of cylinder number three valve operating state versus time. Cylinder valves in cylinder number three are active when the trace is at a higher level near the vertical axis arrow. Cylinder valves in cylinder number three are inactive when the trace is at a lower level near the horizontal axis. The horizontal axis represents time and time increases from the left side of the figure to the right side of the figure.

The fourth plot from the top of FIG. 40 is a plot of an actual total number of requested active cylinders versus time. The vertical axis represents the actual total number of requested active cylinders and the actual total number of requested active cylinders is posted along the vertical axis. The horizontal axis represents time and time increases from the left side of the figure to the right side of the figure.

The fifth plot from the top of FIG. 40 is a plot of requested engine torque versus time. The vertical axis represents requested engine torque and the value of the requested engine torque increases in the direction of the vertical axis arrow. The horizontal axis represents time and time increases from the left side of the figure to the right side of the figure.

At time T4000, cylinders are not requested deactivated as indicated by the cylinder deactivation request being at a lower level. Valves of cylinder number two and three are active. The valves of cylinder numbers two and three are active based on the number of requested active (e.g., combusting air and fuel) cylinders being four. The requested engine torque is at a higher level.

At time 4001, the requested engine torque decreases. The requested engine torque may decrease in response to a decrease in driver demand torque. The number of requested engine cylinders is decreased from four to three in response to the requested engine torque decrease. Further, the cylinder deactivation request is asserted in response to the decrease in requested engine torque. Cylinder number two is requested deactivated and cylinder poppet valves of cylinder number two are commanded closed. However, the valves of cylinder number two remain active as indicated by the cylinder number two valve state. Because the poppet valves of cylinder number two remained active (e.g., opening and closing as the engine rotates through an engine cycle), cylinder number two is commanded reactivated as indicated by the number of requested active cylinders transitioning back to four. Shortly thereafter, cylinder number three is commanded deactivated in response to the number of active cylinders changing back to three. The poppet valves of cylinder number three become inactive (e.g., are held closed during the engine cycle) and the requested number of active cylinders remains constant at a value of three.

At time T4002, the requested engine torque increases and the number of requested active cylinders is increased back to four. Cylinder number three is reactivated and the valves of cylinder number three are activated as indicated by the cylinder number three valve state. Cylinder number two remains active and the cylinder deactivation request is not asserted in response to the number of requested active cylinders.

At time T4003, the cylinder deactivation request is asserted in response to the number of requested active cylinders being two. The valves of cylinder number two and cylinder number three are inactive. The requested engine torque is at a low level that allows the engine to provide the requested torque will less than its full complement of cylinders being active.

At time 4004, the engine torque request increases in response to an increase in driver demand torque (not shown). The number of requested active cylinders increases to a value of four in response to the increased requested torque. Valves of cylinder number three reactivate, but valves of cylinder number two do not reactivate in response to the number of requested active cylinders. Shortly after time T4004, the number of requested active cylinders transitions to a value of three and cylinder number two is commanded deactivated (e.g., cease delivery of fuel and hold poppet valves closed during an engine cycle). Further, the cylinder deactivation request is asserted again for cylinder number two. The engine provides as much of the requested torque as the torque capacity of the three active cylinders permits.

At time 4005, the requested engine torque is decreased in response to a decrease in driver demand torque. The number of requested active cylinders is decreased from three to two in response to the decrease in requested engine torque. The valves of cylinder number three are deactivated and cylinder numbers two and three are deactivated in response to the number of requested active cylinders. The cylinder deactivation request is also remains asserted.

In this way, the number of requested active engine cylinders may be adjusted responsive to valves that may not be deactivated when they are requested deactivated. Further, the number of requested active engine cylinders may be adjusted responsive to valves that may be deactivate when they are requested activated.

Figure 41:
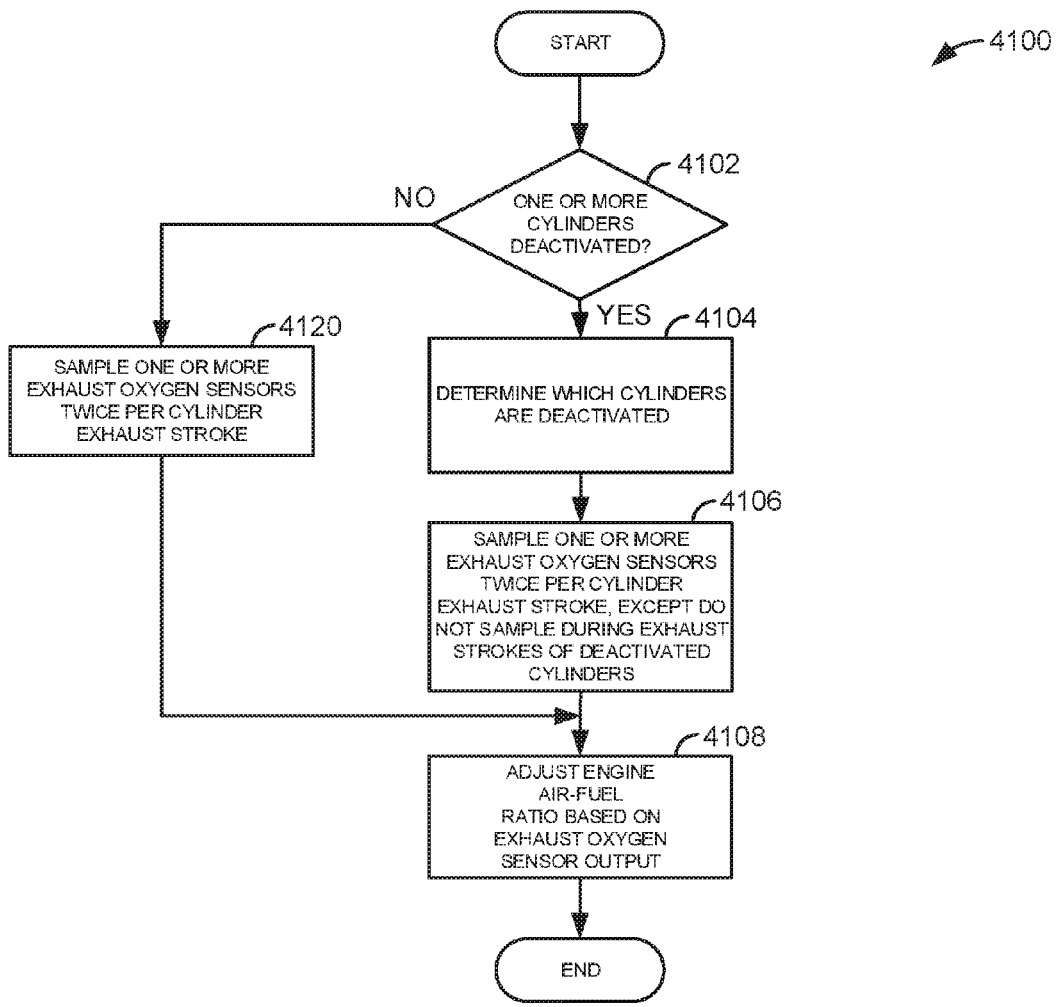
FIG. 41 is a flowchart for sampling an oxygen sensor responsive to cylinder deactivation.

Referring now to FIG. 41, a method for sampling oxygen sensors of an engine with cylinder deactivation is shown. The method of FIG. 41 may be included in the system described in FIGS. 1A-6C. The method of FIG. 41 may be included as executable instructions stored in non-transitory memory. The method of FIG. 41 may perform in cooperation with system hardware and other methods described herein to transform an operating state of an engine or its components.

At 4102, method 4100 judges if one or more cylinders of the engine are deactivated. Method 4100 may evaluate a value of a variable stored in memory to determine if one or more engine cylinders are deactivated. If method 4100 judges that one or more engine cylinders are deactivated, the answer is yes and method 4100 proceeds to 4104. Otherwise, the answer is no and method 4100 proceeds to 4120.

At 4120, method 4100 samples an oxygen sensor of a cylinder bank twice per exhaust stroke of each cylinder on the cylinder bank. Thus, if the engine is a four cylinder engine with a single bank of cylinders, method 4100 samples the exhaust sensor eight times in two engine revolutions. The samples are then averaged to provide an air-fuel ratio estimate for the engine. Additionally, cylinder specific air-fuel ratios may be estimated via averaging the two samples taken during a cylinder's exhaust stroke to determine the cylinder's air-fuel ratio. Method 4100 proceeds to 4108.

At 4108, method 4100 adjusts fuel supplied to engine cylinders based on the oxygen sensor samples. If the oxygen sensor indicates a leaner air-fuel ratio than is desired, additional fuel may be injected to the engine. If the oxygen sensor indicates a richer air-fuel ratio than is desired, less fuel may be injected to the engine. Method 4100 proceeds to exit.

At 4104, method 4100 determines which engine cylinders are deactivated. In one example, method 4100 evaluates values stored in memory that indicate active and deactivated cylinders. Method 4100 determines which cylinders are deactivated and proceeds to 4106.

At 4106, method 4100 samples an oxygen sensor of a cylinder bank twice per exhaust stroke of each cylinder on the cylinder bank, except for exhaust strokes of deactivated cylinders which are not sampled. Alternatively, oxygen samples taken during exhaust strokes of deactivated cylinders may be discarded. The samples are then averaged to determine an average engine air-fuel ratio. Method 4100 proceeds to 4108.

By not sampling oxygen sensors during exhaust strokes of deactivated cylinders, it may be possible to reduce air-fuel ratio bias that may be induced on an engine air-fuel estimate. In particular, if one cylinder air-fuel mixture is leaner or richer than other cylinders and its exhaust gases are expelled near an exhaust stroke of a deactivated cylinder, bias to the engine air-fuel ratio may be reduced by not sampling output from the cylinder that is leaner or richer twice during an engine cycle.

Figure 42:
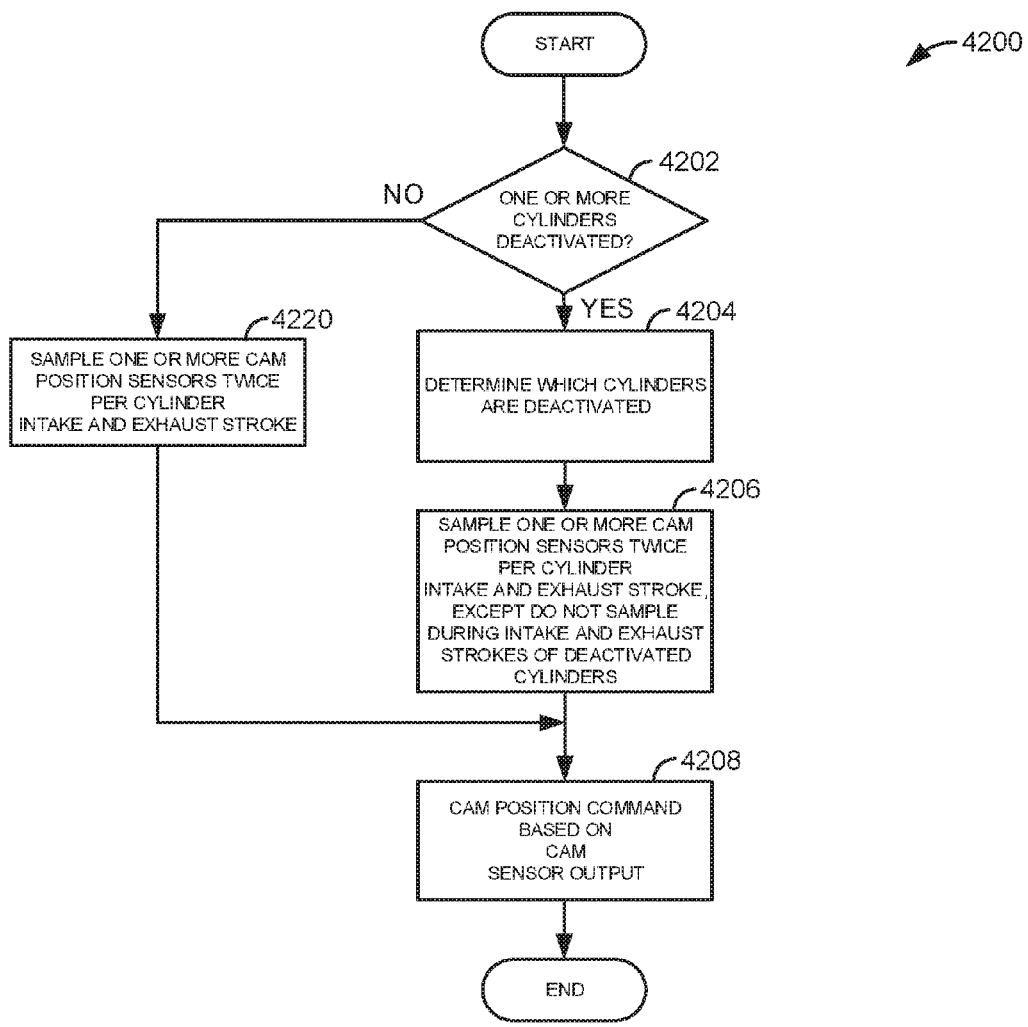
FIG. 42 is a flowchart for sampling a camshaft sensor responsive to cylinder deactivation.

Referring now to FIG. 42, a method for sampling cam sensors of an engine with cylinder deactivation is shown. The method of FIG. 42 may be included in the system described in FIGS. 1A-6C. The method of FIG. 42 may be included as executable instructions stored in non-transitory memory. The method of FIG. 42 may perform in cooperation with system hardware and other methods described herein to transform an operating state of an engine or its components.

At 4202, method 4200 judges if one or more cylinders of the engine are deactivated. Method 4200 may evaluate a value of a variable stored in memory to determine if one or more engine cylinders are deactivated. If method 4200 judges that one or more cylinders are deactivated, the answer is yes and method 4200 proceeds to 4204. Otherwise, the answer is no and method 4200 proceeds to 4220.

At 4220, method 4200 samples an intake cam sensor twice per intake stroke of each cylinder on a cylinder bank that includes an intake cam monitored by the intake cam sensor. Likewise, method 4200 samples an exhaust cam sensor twice per exhaust stroke of each cylinder on a cylinder bank that includes an exhaust cam monitored by the exhaust cam sensor. Thus, if the engine is a four cylinder engine with a single intake cam, method 4200 samples the cam sensor eight times in two engine revolutions. Cam position and speed may be determined for each cam sensor sample taken. Method 4200 proceeds to 4208.

At 4208, method 4200 adjusts a cam phase actuator command to adjust cam position based on the cam sensor samples. If the cam sensor indicates cam position is not at its desired position and/or if the cam is moving slower or faster than is desired, the cam phase command is adjusted to reduce the error between the actual cam position and the desired cam position. Method 4200 proceeds to exit.

At 4204, method 4200 determines which engine cylinders are deactivated. In one example, method 4200 evaluates values stored in memory that indicate active and deactivated cylinders. Method 4200 determines which cylinders are deactivated and proceeds to 4206.

At 4206, method 4200 samples a cam sensor of a cylinder bank twice per intake stroke for an intake cam or twice for each exhaust stroke for an exhaust cam, except for exhaust strokes of deactivated cylinders which are not sampled. Alternatively, cam sensor samples taken during intake or exhaust strokes of deactivated cylinders may be discarded. The samples are then processed to determine cam position and speed. Additionally, cam samples may be averaged to reduce cam signal noise. Method 4200 proceeds to 4208.

By not sampling cam sensors during intake or exhaust strokes of deactivated cylinders, it may be possible to reduce cam position bias that may be induced on engine cam position. The rate a cam phase actuator moves may be affected by whether or not a cylinder is deactivated. Therefore, it may be desirable to eliminate cam samples taken when valve springs of deactivated cylinders are not assisting cam movement relative to crankshaft position.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle system, comprising:
an engine including a block and a cylinder head, and a total actual number of cylinders included in the block, the cylinder head including a first actual total number of deactivating valve operators in a first configuration, the cylinder head including a second actual total number of deactivating valve operators in a second configuration; and
a controller including executable instructions stored in non-transitory memory to deactivate a first actual total number of cylinders and change an engine firing order while deactivating the first actual total number of cylinders, where a first cylinder is activated and a second cylinder is deactivated to change the engine firing order while deactivating the first actual total number of cylinders, where the first actual total number of cylinders is a constant value, where engine cylinders are deactivated via holding cylinder poppet valves in closed states while the engine rotates over an engine cycle, and additional instructions to cease fuel flow to deactivated cylinders and adjust boost pressure provided via a turbocharger in response to a request to activate an engine cylinder.

2. The vehicle system of claim 1, where the engine firing order always includes a same two cylinder numbers.

3. The vehicle system of claim 1, wherein the deactivating valve operators slide along a camshaft to selectively activate and deactivate cylinders.

4. The vehicle system of claim 1, further comprising additional instructions to adjust a total number of deactivated cylinders in the engine cycle in response to an estimate of an amount of oil in one or more deactivated cylinders.

5. The vehicle system of claim 1, further comprising additional instructions to sample an exhaust gas oxygen sensor via a first method in response to deactivating a cylinder of the engine and sample the exhaust gas oxygen sensor via a second method in response to activating the cylinder.

6. A vehicle system, comprising:
 an engine including a block and a cylinder head, and a total actual number of cylinders included in the block, the cylinder head including a first actual total number of deactivating valve operators in a first configuration, the cylinder head including a second actual total number of deactivating valve operators in a second configuration; and
 a controller including executable instructions stored in non-transitory memory to deactivate a first actual total number of cylinders and change an engine firing order while deactivating the first actual total number of cylinders, and additional executable instructions to decrease boost pressure output of a turbocharger at an engine speed and a driver torque demand in response to a request to reactivate an engine cylinder.

* * * * *